US012288256B1

(12) United States Patent
Samuels et al.

(10) Patent No.: US 12,288,256 B1
(45) Date of Patent: Apr. 29, 2025

(54) SYSTEMS, METHODS, AND PROGRAM PRODUCTS FOR OPERATING AN EXCHANGE-TRADED FUND

(71) Applicant: SolidusLink AG, Schlieren (CH)

(72) Inventors: Eliot Samuels, Schlieren (CH); Andrew Ward Moedinger, Schlieren (CH); Gareth Jose-Lee Pinto, Birmensdorf (CH); Hans Martin Eliasson, Olten (CH); Henry Gaston Williamson, Jr., St. Simons Island, GA (US); Christina Corazon Smith-Lutz, Olten (CH)

(73) Assignee: SolidusLink AG, Schlieren (CH)

( * ) Notice: Subject to any disclaimer, the term of this patent is extended or adjusted under 35 U.S.C. 154(b) by 0 days.

(21) Appl. No.: 18/070,145

(22) Filed: Nov. 28, 2022

Related U.S. Application Data

(63) Continuation of application No. 16/952,971, filed on Nov. 19, 2020, now Pat. No. 11,551,298.

(60) Provisional application No. 62/938,062, filed on Nov. 20, 2019.

(51) Int. Cl.
  *G06Q 40/04* (2012.01)
  *G06Q 10/30* (2023.01)
  *G06Q 30/018* (2023.01)
  *G06Q 40/03* (2023.01)

(52) U.S. Cl.
  CPC .............. *G06Q 40/04* (2013.01); *G06Q 10/30* (2013.01); *G06Q 30/0185* (2013.01); *G06Q 40/03* (2023.01)

(58) Field of Classification Search
  CPC .......... G06Q 40/04; G06Q 10/30; G06Q 40/03
  See application file for complete search history.

(56) References Cited

U.S. PATENT DOCUMENTS

| | | | |
|---|---|---|---|
| 6,374,231 B1 | 4/2002 | Bent et al. | |
| 7,444,300 B1 | 10/2008 | Broms et al. | |
| 7,496,531 B1 | 2/2009 | Gastineau et al. | |
| 7,509,286 B1 | 3/2009 | Bent et al. | |
| 7,519,551 B2 | 4/2009 | Bent et al. | |
| 7,536,350 B1 | 5/2009 | Bent et al. | |
| 7,624,062 B1 * | 11/2009 | Kelly ................ | G06Q 40/06 705/37 |
| 7,668,771 B1 | 2/2010 | Bent et al. | |

(Continued)

FOREIGN PATENT DOCUMENTS

| | | | |
|---|---|---|---|
| EP | 2128812 A1 | 12/2009 | |
| WO | WO-2005119534 A1 * | 12/2005 | ........... G06F 3/0482 |

(Continued)

OTHER PUBLICATIONS

PAX Gold White Paper V1.0, last updated Sep. 5, 2019, By Charles Cascarilla available at https://www.paxos.com/wp-content/uploads/2019/09/PAX-Gold-Whitepaper.pdf.

(Continued)

*Primary Examiner* — David P Sharvin
*Assistant Examiner* — Gregory Harper
(74) *Attorney, Agent, or Firm* — Amster, Rothstein & Ebenstein LLP

(57) ABSTRACT

The present invention generally relates to systems, methods and program products for use with Exchange-Traded Funds ("ETF") holding one or more secured notes backed by one or more precious metals.

22 Claims, 80 Drawing Sheets

(56) References Cited

U.S. PATENT DOCUMENTS

| | | | |
|---|---|---|---|
| 7,668,772 B1 | 2/2010 | Bent et al. | |
| 7,672,886 B2 | 3/2010 | Bent et al. | |
| 7,672,901 B1 | 3/2010 | Bent et al. | |
| 7,672,902 B1 | 3/2010 | Bent et al. | |
| 7,680,716 B1 | 3/2010 | Bent et al. | |
| 7,680,734 B1 | 3/2010 | Bent et al. | |
| 7,689,501 B1* | 3/2010 | Gastineau | G06Q 40/06 705/37 |
| 7,716,131 B2 | 5/2010 | Bent et al. | |
| 7,739,186 B1 | 6/2010 | Gerber | |
| 7,752,107 B1 | 7/2010 | Bent et al. | |
| 7,752,129 B2 | 7/2010 | Bent et al. | |
| 7,769,688 B1 | 8/2010 | Bent et al. | |
| 7,809,640 B1 | 10/2010 | Bent et al. | |
| 7,813,987 B1 | 10/2010 | Kuhnle et al. | |
| 7,865,426 B2 | 1/2011 | Volpert | |
| 7,933,821 B1 | 4/2011 | Bent et al. | |
| 7,996,308 B1 | 8/2011 | Bent et al. | |
| 8,019,667 B1 | 9/2011 | Bent et al. | |
| 8,019,668 B1 | 9/2011 | Bent et al. | |
| 8,032,456 B1 | 10/2011 | Bent et al. | |
| 8,131,621 B1 | 3/2012 | Merk | |
| 8,150,766 B1 | 4/2012 | Bent et al. | |
| 8,239,321 B1 | 8/2012 | Bent et al. | |
| 8,260,697 B1 | 9/2012 | Bent et al. | |
| 8,260,705 B1 | 9/2012 | Bent et al. | |
| 8,290,859 B1 | 10/2012 | Bent et al. | |
| 8,290,860 B1 | 10/2012 | Bent et al. | |
| 8,290,861 B1 | 10/2012 | Bent et al. | |
| 8,311,916 B1 | 11/2012 | Bent et al. | |
| 8,311,939 B1 | 11/2012 | Bent et al. | |
| 8,326,720 B2 | 12/2012 | Spirgel et al. | |
| 8,352,342 B1 | 1/2013 | Bent, II et al. | |
| 8,355,985 B1 | 1/2013 | Bent et al. | |
| 8,359,267 B1 | 1/2013 | Bent et al. | |
| 8,370,236 B1 | 2/2013 | Bent et al. | |
| 8,380,621 B1 | 2/2013 | Bent et al. | |
| 8,386,382 B1 | 2/2013 | Bent et al. | |
| 8,386,383 B1 | 2/2013 | Bent et al. | |
| 8,401,962 B1 | 3/2013 | Bent et al. | |
| 8,452,682 B1* | 5/2013 | Gastineau | G06Q 40/04 705/37 |
| 8,452,702 B1 | 5/2013 | O'Donnell et al. | |
| 8,458,089 B1 | 6/2013 | Gareis | |
| 8,498,933 B1 | 7/2013 | Bent et al. | |
| 8,521,569 B1 | 8/2013 | Bent et al. | |
| 8,560,442 B1 | 10/2013 | Bent et al. | |
| 8,566,201 B1 | 10/2013 | Bent et al. | |
| 8,571,960 B1 | 10/2013 | Bent et al. | |
| 8,571,984 B1 | 10/2013 | Bent et al. | |
| 8,583,545 B1 | 11/2013 | Bent et al. | |
| 8,589,289 B1 | 11/2013 | O'Donnell et al. | |
| 8,606,676 B1 | 12/2013 | Bent et al. | |
| 8,612,324 B1 | 12/2013 | Bent et al. | |
| 8,626,641 B1 | 1/2014 | Merk | |
| 8,655,689 B1 | 2/2014 | Gareis | |
| 8,655,765 B1 | 2/2014 | Gastineau et al. | |
| 8,688,577 B1 | 4/2014 | Bent et al. | |
| 8,712,911 B1 | 4/2014 | Bent et al. | |
| 8,719,062 B1 | 5/2014 | Bent et al. | |
| 8,719,157 B1 | 5/2014 | Bent et al. | |
| 8,781,931 B1 | 7/2014 | Bent et al. | |
| 8,793,179 B1 | 7/2014 | Berry et al. | |
| 9,374,370 B1 | 6/2016 | Bent, II et al. | |
| 9,430,798 B1 | 8/2016 | Bent et al. | |
| 9,483,762 B1 | 11/2016 | Bent, II et al. | |
| 9,569,773 B1 | 2/2017 | Bent, II et al. | |
| 9,607,335 B1 | 3/2017 | Bent et al. | |
| 9,805,344 B1 | 10/2017 | Bent, II et al. | |
| 9,811,811 B1 | 11/2017 | Bent et al. | |
| 9,892,460 B1 | 2/2018 | Winklevoss et al. | |
| 9,898,782 B1 | 2/2018 | Winklevoss et al. | |
| 9,904,914 B1 | 2/2018 | Bent, II et al. | |
| 9,946,997 B1 | 4/2018 | Bent et al. | |
| 9,965,750 B1 | 5/2018 | Bent, II et al. | |
| 9,965,804 B1 | 5/2018 | Winklevoss et al. | |
| 9,965,805 B1 | 5/2018 | Winklevoss et al. | |
| 10,068,228 B1 | 9/2018 | Winklevoss et al. | |
| 10,068,294 B1 | 9/2018 | Bent et al. | |
| 10,134,035 B1 | 11/2018 | Bent, II et al. | |
| 10,255,635 B1 | 4/2019 | Winklevoss et al. | |
| 10,282,784 B2 | 5/2019 | Feldman et al. | |
| 10,325,257 B1 | 6/2019 | Winklevoss et al. | |
| 10,354,325 B1 | 7/2019 | Skala et al. | |
| 10,460,389 B1 | 10/2019 | Bettinger, II et al. | |
| 10,552,910 B1 | 2/2020 | Bent et al. | |
| 10,559,032 B2 | 2/2020 | Ionascu et al. | |
| 10,623,182 B1 | 4/2020 | Bent, II et al. | |
| 10,650,376 B1 | 5/2020 | Winklevoss et al. | |
| 10,762,565 B2 | 9/2020 | Samuels et al. | |
| 10,832,317 B1 | 11/2020 | Bent, II et al. | |
| 11,055,779 B1 | 7/2021 | Faust, Jr. | |
| 11,334,883 B1 | 5/2022 | Auerbach et al. | |
| 11,501,370 B1* | 11/2022 | Paya | G06Q 20/3676 |
| 2003/0093350 A1 | 5/2003 | Bloom et al. | |
| 2005/0044022 A1 | 2/2005 | Spirgel et al. | |
| 2005/0044035 A1* | 2/2005 | Scott | G06Q 40/02 705/37 |
| 2006/0190378 A1* | 8/2006 | Szydlo | G06Q 40/03 705/35 |
| 2007/0078738 A1 | 4/2007 | Levin et al. | |
| 2007/0078739 A1 | 4/2007 | Levin et al. | |
| 2007/0233589 A1* | 10/2007 | Vasinkevich | G06Q 40/04 705/36 R |
| 2008/0091622 A1* | 4/2008 | Yass | G06Q 40/06 705/36 R |
| 2008/0147464 A1 | 6/2008 | Sauter et al. | |
| 2008/0288416 A1* | 11/2008 | Arnott | G06Q 40/12 711/E12.001 |
| 2009/0043713 A1 | 2/2009 | Weber et al. | |
| 2009/0063363 A1* | 3/2009 | Present | G06Q 40/06 705/37 |
| 2009/0063366 A1 | 3/2009 | Friedman et al. | |
| 2009/0248561 A1 | 10/2009 | McIntosh | |
| 2009/0248591 A1 | 10/2009 | Feldman et al. | |
| 2011/0022511 A1* | 1/2011 | Bloom | G06Q 40/04 705/37 |
| 2011/0022542 A1 | 1/2011 | Lutnick et al. | |
| 2011/0047093 A1 | 2/2011 | Faust, Jr. | |
| 2011/0202450 A1 | 8/2011 | Cherney et al. | |
| 2011/0258102 A1* | 10/2011 | Blasi | G06Q 40/04 705/37 |
| 2012/0036059 A1* | 2/2012 | Ionascu | G06Q 40/04 705/37 |
| 2012/0166326 A1 | 6/2012 | Sapir et al. | |
| 2012/0239543 A1 | 9/2012 | Ryan | |
| 2013/0006828 A1 | 1/2013 | Dale et al. | |
| 2016/0019646 A1* | 1/2016 | Gedeon | G06Q 40/04 705/36 R |
| 2017/0213286 A1* | 7/2017 | Samuels | G06Q 30/06 |
| 2019/0026828 A1 | 1/2019 | Preston et al. | |
| 2019/0066204 A1 | 2/2019 | Teixeira et al. | |
| 2019/0066216 A1 | 2/2019 | Teixeira et al. | |
| 2019/0228035 A1* | 7/2019 | Riggs | G06F 16/906 |
| 2020/0286170 A1 | 9/2020 | Kramer et al. | |
| 2020/0311723 A1 | 10/2020 | Miller et al. | |
| 2020/0311811 A1 | 10/2020 | Snyder et al. | |
| 2021/0090169 A1 | 3/2021 | Wang et al. | |
| 2021/0217087 A1* | 7/2021 | Spirgel | G06Q 40/04 |

FOREIGN PATENT DOCUMENTS

| | | | | |
|---|---|---|---|---|
| WO | 2007035850 A2 | 3/2007 | | |
| WO | WO-2012162722 A1 * | 12/2012 | | G06Q 40/06 |
| WO | 2019045900 A1 | 3/2019 | | |

OTHER PUBLICATIONS

Form of World of Gold Trust, Authorized Participant Agreement, https://www.sec.gov/Archives/edgar/data/1618181/ 000119312518153039/d419625dex43.htm, last visited Nov. 17, 2020.

(56) References Cited

OTHER PUBLICATIONS

Amendment No. 5 to form S-1 Registration Statement Under the Securities Act of 1933, streetTRACKS® Gold Trust Sponsored by World Gold Trust Services, LLC filed with the Securities and Exchange Commission on Nov. 16, 2004.
Form N-1A Registration Statement Under the Securities Act of 1933, Post-Effective Amendment No. 411 and/or Registration Statement Under the Investment Company Act of 1940 Amendment No. 4, iShares U.S. ETF Trust, filed with the U.S. Securities and Exchange Commission on Apr. 18, 2018.
Form No. 4 to Form S-1 Registration Statement Under the Securities Act of 1933, iSHARES(R) Comex(R) Gold Trust Sponsored By Barclays Global Investors, N.A., filed with the Securities and Exchange Commission on Jan. 25, 2005.
Form S-1 Registration Statement Under the Securities Act of 1933 Euro Gold Trust Pound Gold Trust Yen Gold Trust each, a series of World Currency Gold Trust Sponsored by WGC USA Asset Management Company, LLC filed with the Securities and Exchange Commission on Mar. 30, 2017.
Amendment No. 1 to Form S-1 Registration Statement Under the Securities Act of 1933 SPDR Gold MiniSharesSM Trust a series of World Gold Trust Sponsored By WGC USA Asset Management Company, LLC filed with the Securities and Exchange Commission on Feb. 1, 2019.
Form S-3 Registration Statement Under the Securities Act of 1933 GraniteShares Gold Trust filed with the Securities and Exchange Commission on Mar. 22, 2019.
"SPDR Gold Shares FAQs", 2009. Available at: http://www.spdrgoldshares.com/media/GLD/file/SPDR_GLD_FAQs.pdf (Year: 2009).
"iShares Gold Trust FAQs", Mar. 2013. Available at: https://www.sec.gov/Archives/edgar/data/1278680/000119312513093467/d497035dfwp.htm (Year: 2013).
"Principles for the Regulation of Exchange Traded Funds", Jun. 2013. Available at: https://www.iosco.org/library/pubdocs/pdf/IOSCOPD414.pdf (Year: 2013).
"Bond ETFs: Benefits, Challenges, Opportunities", Jul. 2015. Available at: https://www.blackrock.com/corporate/literature/whitepaper/viewpoint-bond-etfs-benefits-challenges-opportunities-july-2015.pdf (Year: 2015).
ETN Fundamentals, Mar. 2014. Available at: https://research.tdameritrade.com/grid/public/common/PDFS/ETFs/Fundamentals%20of%20iPath%20ETNs.pdf (Year: 2014).
Prospectus for the issue ETFS Metal Securities including ETFS Physical Precious Metals Basket (2012). Available at: https://www.wisdomtree.eu/en-gb/-/media/eu-media-files/key-documents/prospectus/etf-securities/prospectus-etfs-metal-securities-limited-(2012-version).
Martin Lettau, et al., Exchange Traded Funds 101 for Economists, Jan. 2018. Available at: https://www.nber.org/system/files/working_papers/w24250/w24250.pdf (Year: 2018).
Aberdeen Standard Precious Metals Basket ETF Trust SEC Filing Form 10-Q, Aug. 2019. Available at: https://www.aberdeenstandard.com/indexingservice/documents?documentId=US-200819-97321-6 (Year: 2019).
U.S. Appl. No. 16/952,937, filed Nov. 19, 2020, Non-Final Office Action mailed Feb. 3, 2021.
U.S. Appl. No. 16/952,971, filed Nov. 19, 2020, Issued as U.S. Pat. No. 11,551,298.
U.S. Appl. No. 18/094,223, filed Jan. 6, 2023, Application Undergoing Preexam Processing.
U.S. Appl. No. 18/070,145, filed Nov. 28, 2022, Present Application.

\* cited by examiner

C20-1
Obtain one or more orders, the one or more orders including at least one of the following:

(1) a first order for an amount of shares for a first amount precious metal (2) a second order for an amount of shares for a second amount of precious metal and a first amount of secured notes from a secondary market (3) a third order for an amount of shares for a third amount of precious metal and a first amount of fiat (4) a fourth order for an amount of shares for a second amount of a fiat and a second amount of secured notes from a secondary market

FIG. 2-20C

C20-2: Obtain an order for a first amount of shares in the fund for one or more of the following from a secondary market: (a) an amount of precious metal; (b) an amount of secured notes; and/or (c) a combination thereof

FIG. 2-20D

C20-3: Generate and publish offering including a first offering for a first amount of shares in the fund for one or more of the following from a secondary market: (a) an amount of precious metal; (b) an amount of secured notes; and/or (c) a combination thereof

S210-1: Generate a first message including one or more of the following instructions (1) first instructions for the Entity System 1000 to generate and send first settlement instructions to a vault administrator system associated with a vault (2) second instructions for the Entity System 1000 to generate and send second settlement instructions (3) third instructions for the Entity System 1000 to generate and send third settlement instructions

S214-2: Generate first settlement instructions including instructions for one or more of the following (1) a first set of deposits including one or more transfer instructions to transfer precious metal from the Entity System account to a first administrator account (2) a second set of deposits including one or more transfer instructions to transfer fiat from the Entity System account to a second administrator account (3) a third set of deposits including one or more transfer instructions to transfer secured notes from the Entity System account to a third administrator account

S214-3: send the first settlement instructions to one or more of the following: (a) the vault via the vault administrator system; (b) a financial institution; and (c) a custodian via the custodial system

CONTINUED FROM S240

S242-1: Transfer one or more of the following (1) the fourth amount of notes from each respective issuer account to the Entity System 1000 account (2) fiat associated with the order from an account associated with at least one market maker to the Entity System 1000 account (3) secured notes from a secondary market, from an account associated with at least one market maker to the Entity System 1000 account S244-1: Transfer one or more of the following (1) the fourth amount of notes from the Entity System 1000 account to a fourth administrator account (2) fiat associated with the order from the Entity System 1000 account to a fifth administrator account (3) secured notes from a secondary market, from the Entity System 1000 account to a sixth administrator account (4) pre-existing secured notes from a secondary market, from the Entity System 1000 account to a seventh administrator account

FIG. 2-90B

R20-1
Obtain one or redemption orders, the one or more orders including at least one of the following:

(1) a first order to redeem an amount of shares for an amount of precious metal (2) a second order to redeem an amount of shares for an amount of precious metal and an amount of secured notes from a secondary market (3) a third order to redeem an amount of shares for an amount of precious metal and a first amount of fiat (4) a fourth order to redeem an amount of shares for an amount of secured notes from a secondary market

FIG. 5-20C

R20-2: Obtain an order to redeem one or more of the following from a secondary market: (a) an amount of precious metal; (b) an amount of secured notes; and/or (c) a combination thereof for a second amount of shares in the fund

FIG. 5-20D

R20-3: Generate and publish offering including a first offering to redeem one or more of the following from a secondary market: (a) an amount of precious metal; (b) an amount of secured notes; and/or (c) a combination thereof for a first amount of shares in the fund

Administrator Sys. 102 and/or Administrator Sys. 104

S242-1R: Transfer one or more of the following (1) the fourth amount of notes from the entity account to each respective issuer account (2) fiat associated with the order from the entity account to an account associated with at least one market maker (3) secured notes intended for a secondary market, from the entity account to an account associated with at least one market maker S244-1R: Transfer one or more of the following (1) the fourth amount of notes from a fourth administrator account to the entity account (2) fiat associated with the order from a fifth administrator account to the entity account (3) secured notes intended for a secondary market, from a sixth administrator account to the entity account (4) pre-existing secured notes intended for a secondary market, from a seventh administrator account to the entity account

FIG. 5-50E

Example Creation Order 722

| | |
|---|---|
| Entity Identification 722-1: | The Firm |
| Fund Identification 722-2: | The Gold ETF |
| Date of Order 722-3: | 2020-12-12 |
| Time of Order 722-4: | 12:34:00 PM |
| Entity Vault Account Information 722-5: | 123456789 |
| Entity Custodian Account Information 722-6: | 09804A1 |
| DTC Participant Identification Information 722-7: | 123456 |
| Entity Contact Information 722-8: | Entity@Entity.com |
| Fund Ticker 722-9: | TICK |
| Creation of shares 722-10: | 2000 |
| Redemption of shares 722-11: | - |
| Amount of Precious Metal 722-12: | 2 Units |
| Order Identification 722-13: | 12345 |

FIG. 7D

Example Redemption Order 724

| | |
|---|---|
| Entity Identification 724-1: | The Participant |
| Fund Identification 724-2: | The Gold ETF |
| Date of Order 724-3: | 2020-11-15 |
| Time of Order 724-4: | 14:41:32 PM |
| Entity Vault Account Information 724-5: | 123412346789 |
| Entity Custodian Account Information 724-6: | 094B1543 |
| DTC Participant Identification Information 724-7: | 1245351 |
| Entity Contact Information 724-8: | (123) 456-7890 |
| Fund Ticker 724-9: | TICK |
| Creation of shares 724-10: | - |
| Redemption of shares 724-11: | 100 |
| Amount of Precious Metal 724-12: | .5 Units |
| Order Identification 724-13: | 432563 |

C20-1: Obtain an order for a first amount of shares in the fund for a second amount of precious metal C20-2: Verify the order for the first amount of shares in the fund for the second amount of precious metal C60': Update diversification information associated with the secured notes held by the fund C60'-1: Obtain current diversification information associated with the secured notes held by the fund prior to obtaining the first order C60'-2: Determine order diversification information associated with the second amount of precious metal C60'-3: Update the current diversification information based on the order diversity information C60'-4: Store the updated current diversification information as the current diversity information C60'-5: Store the order diversification information

C50'

C50'-1: Generate settlement instructions associated with transferring the second amount of precious metal to a first set of custody accounts associated with one or more vaults in accordance with the order diversity information C50'-2: Send the settlement instructions to the Entity System 1000

C50'-3: Receive confirmation information indicating receipt of the second amount of precious metal in the first set of custody accounts

CONTINUED WITH FIG. 8B

FIG. 8A

SYSTEMS, METHODS, AND PROGRAM PRODUCTS FOR OPERATING AN EXCHANGE-TRADED FUND

CROSS-REFERENCE TO RELATED APPLICATIONS

This application is a continuation of U.S. patent application Ser. No. 16/952,971, filed on Nov. 19, 2020 and entitled "SYSTEMS, METHODS, AND PROGRAM PRODUCTS FOR OPERATING AN EXCHANGE-TRADED FUND", which claims the benefit of and priority to U.S. Provisional Patent Application No. 62/938,062, filed on Nov. 20, 2019 and entitled "SYSTEMS, METHODS, AND PROGRAM PRODUCTS FOR OPERATING AN EXCHANGE-TRADED FUND", the entire contents of which is hereby incorporated by reference herein.

U.S. patent application Ser. No. 16/952,971, filed on Nov. 19, 2020 and entitled "SYSTEMS, METHODS, AND PROGRAM PRODUCTS FOR OPERATING AN EXCHANGE-TRADED FUND" is related to U.S. patent application Ser. No. 16/952,937, filed on Nov. 19, 2020 and entitled "SYSTEMS, METHODS, AND PROGRAM PRODUCTS FOR OPERATING AN EXCHANGE-TRADED FUND the entire contents of which is hereby incorporated by reference herein.

BACKGROUND

Exchange-Traded Funds (ETFs) typically include a basket of securities or other investments that are often chosen to follow or track a benchmark or index. Shares in the fund are sold intraday in financial markets while holdings in the fund may be balanced or rebalanced regularly in order to maintain their tracking function. Some ETFs are designed to track the prices of commodities, either perishable, such as agricultural products or non-perishable. Some existing ETFs track precious metals prices or indexes by holding title to precious metals directly in the fund. Holding title to large amounts of precious metals, however, presents a multitude of issues for a fund, including: (i) counterparty risk concentration, (ii) logistical challenges, (iii) security concerns, (iv) insurance limits, and (v) a variety of regulatory concerns. Many of these issues can be alleviated by applying various forms of diversification, but in order to correctly and efficiently implement such diversification at scale, with a large quantity of precious metal assets, multiple factors and a large volume of data must be evaluated quickly as transactions are made throughout the day. Accordingly, there is a need for a method and system of providing an ETF that provides for proper tracking of precious metals pricing, in a practicable manner, with an approach to diversification that reduces the myriad of issues presented by an ETF maintaining title to large amounts of precious metals.

FIELD

The present invention generally relates to systems, methods and program products for use with Exchange-Traded Funds ("ETF") that track one or more precious metals, such as gold, silver, platinum, rhodium, and/or palladium, to name a few.

SUMMARY

Systems, methods, and program products for providing an ETF that tracks precious metal pricing while, in general, avoiding maintaining title to the precious metals are discussed herein. In embodiments, the present disclosure provides a system and a method to issue shares in an ETF that holds secured notes backed by precious metals that are issued by one or more secured note issuers. In embodiments, the shares may be issued only after deposit of precious metal.

In embodiments, the present disclosure provides a system and method for redeeming shares in an ETF that holds secured notes backed by precious metal. In embodiments, the shares are redeemed for precious metal.

In embodiments, a method includes: a. obtaining, by an administrator computer system associated with an administrator of a fund holding secured notes collateralized by a precious metal, from a first authorized participant computer system associated with a first authorized participant in the fund, a first order comprising: (1) an order for a first amount of shares of the fund corresponding to a second amount of precious metal; and (2) authorized participant identification information associated with the first authorized participant; b. verifying, by the administrator computer system, the first order, wherein the verifying step includes: (1) confirming that the first authorized participant is an authorized participant of the fund based on the authorized participant identification information; (2) confirming that the first amount of shares are available; and (3) determining that the second amount of precious metal corresponds to the first amount of shares; c. updating, by the administrator computer system, diversification information associated with the secured notes held by the fund, wherein the updating step includes: (1) obtaining current diversification information associated with the secured notes held by the fund prior to obtaining the first order; (2) determining order diversification information associated with the second amount of precious metal corresponding to the first amount of shares; (3) updating the current diversification information based on the order diversification information; (4) storing the updated current diversification information as the current diversification information; and (5) storing the order diversification information; d. generating, by the administrator system, settlement instructions associated with transferring the second amount of precious metal to a first set of custody accounts associated with one or more vaults in accordance with the order diversification information; e. sending, by the administrator system, to the first authorized participant computer system, the settlement instructions associated with transferring the second amount of precious metal to the first set of custody accounts; f. receiving, by the administrator system, from one or more vault administrator systems corresponding to the first set of custody accounts, confirmation information indicating receipt of the second amount of precious metal in the first set of custody accounts; g. generating, by the administrator computer system, secured note issuance instructions associated with issuance of one or more secured notes collateralized by up to the second amount of precious metal, wherein the generating step includes: (1) determining for each secured note issuer of a second set of secured note issuers, a respective allocation of the second amount precious metal based on the order diversification information, wherein the respective allocation of the second amount of precious metal is determined based at least on the following equation: $\Sigma\Sigma D_{N,k}(A_N(G))=G$, for N=1 to M, and k=1 to $V_N$, where M is a total number of secured note issuers in the second set of secured note issuers, $A_N$ is represents a first calculation of the allocation with each respective secured note issuer N of the second set of secured note issuers M, $D_{N,k}$ represents a second calculation of an account allocation value for each respective account k of the first set of custody accounts $V_N$ for each respective secured note issuer N of the second set of secured note issuers M, and G is the second amount of precious metal; (2) generating, for each secured note issuer of the second set of secured note issuers, respective note generation instructions to generate one or more secured notes collateralized by the respective allocation of the second amount of precious metal associated with the respective secured note issuer, wherein the respective secured note generation instructions include note transfer instructions to transfer respective issued secured notes associated with the respective secured note generation instructions to the fund; and (3) storing, for each secured note issuer of the second set of secured note issuers, the generated respective note generation instructions; h. sending, by the administrator computer system to a third set of secured note issuer devices associated with the second set of secured note issuers, the secured note issuance instructions, including, for each secured note issuer of the second set of secured note issuers, the respective note transfer instructions; i. confirming, by the administrator computer system, issuance of the secured notes issued in accordance with the note transfer instructions; j. generating, by the administrator computer system, share transfer instructions to provide the first amount of shares to the first authorized participant; and k. sending, by the administrator computer system, the share transfer instructions to a custodian device associated with a custodial system associated with the fund to provide the first amount of shares to one or more accounts associated with the first authorized participant.

In embodiments, prior to step a, share price information indicating an amount of precious metal corresponding to an amount of shares in the fund is published by the administrator computer system.

In embodiments, the share price information includes diversification information associated with a first set of one or more secured note issuers that issue secured notes held by the fund.

In embodiments, the first order includes the second amount of precious metal that corresponds to the first amount of shares.

In embodiments, the second amount of precious metal includes a third amount of a first precious metal and a fourth amount of a second precious metal.

In embodiments, the first order includes, the second amount of precious metal and a third amount of secured notes collateralized by the precious metal.

In embodiments, the first order includes the second amount of precious metal and a third amount of fiat.

In embodiments, the verifying step b includes confirming that the first amount of shares are available for issuance by the fund.

In embodiments, the verifying step b includes confirming that the first amount of shares have been previously issued and are currently unassigned.

In embodiments, the verifying step b includes confirming that the second amount of precious metal corresponds to the first amount of shares based at least on the share price information.

In embodiments, the verifying step b includes confirming that the third amount of the first precious metal and the fourth amount of the second precious metal correspond to the first amount of shares.

In embodiments, the verifying step b includes confirming that the second amount of precious metal and the third amount of secured notes collateralized by the precious metal correspond to the first amount of shares.

In embodiments, the verifying step b includes confirming that the second amount of precious metal and the third amount of fiat correspond to the first amount of shares.

In embodiments, the updating step c includes determining order diversification information diversification information associated with the second amount of precious metal and the third amount of secured notes.

In embodiments, the updating step c includes determining order diversification information associated with the third amount of the first precious metal and the fourth amount of the second precious metal.

In embodiments, steps c(3), c(4) and c(5) occur after step d.

In embodiments, at least a first custody account and a second custody account of the first set of one or more custody accounts are associated with a first vault of the one or more vaults.

In embodiments, the settlement instructions include instructions to transfer the third amount of the first precious metal and the fourth amount of the second precious metal to the first set of custody accounts associated with one or more vaults in accordance with the order diversity instructions.

In embodiments, the settlement instructions include instructions to transfer the second amount of precious metal to the first set of custody accounts associated with one or more vaults and to transfer the third amount of fiat to a second set of one or more issuer fiat accounts associated with the first set of one or more secured note issuers.

In embodiments, the receiving step f includes receiving by the administrator system, from one or more vault administrator systems corresponding to the first set of custody accounts, confirmation information indicating receipt in the first set of custody accounts of the third amount of the first precious metal and the fourth amount of the second precious metal.

In embodiments, the receiving step f includes receiving from the first set of one or more secured note issuers, confirmation of receipt of the third amount of fiat by the second set of one or more fiat accounts associated with the first set of one or more secured note issuers.

In embodiments, the second amount of precious metal includes the second amount of precious metal less a reserve portion that is held in reserve by the administrator system.

In embodiments, the second set of secured note issuers includes all of the secured note issuers of the first set of one or more secured note issuers.

In embodiments, the second set of secured note issuers includes less than all of the secured note issuers of the first set of secured note issuers.

In embodiments, the respective allocation of the second amount of secured notes of one or more secured note issuer of the second set of secured note issuers is zero.

In embodiments, the step of generating respective note generation instructions does not include generating note generation instructions for the one or more secured note issuers associated with a zero allocation of the second amount of precious metal.

In embodiments, the sending step h includes sending the secured note issuance instructions to one or more broker devices associated with one or more brokers wherein the one or more broker devices send the secured note issuer instructions to the third set of secured note issuer devices.

In embodiments, the share transfer instructions include instructions to generate the first amount of shares.

In embodiments, the share transfer instructions include instructions to transfer previously issued and unassigned shares as the first amount of shares to the first authorized participant.

In embodiments, the custodian device is also associated with a transfer agent for the custodial system associated with the fund.

In embodiments, the allocation of the second amount of precious metal is also based on one or more characteristics of each respective secured note issuer, wherein the characteristics include: (1) a tangible common equity ratio associated with the respective secured note issuer; (2) a capitalization rate associated with the respective secured note issuer; (3) a current portfolio of assets associated with the respective secured note issuer; (4) a country of origin associated with the respective secured note issuer; (5) a credit quality associated with the respective secured note issuer; (6) a credit score associated with the respective secured note issuer; (7) a duration remaining associated with secured notes associated with the respective secured note issuer; (8) maturity dates of the secured notes associated with the respective secured note issuer; and (9) an owner or sponsor associated with the respective secured note issuer.

In embodiments, the fund holds a reserve amount of precious metal.

In embodiments, the settlement instructions include instructions to transfer the reserve amount of the second amount of precious metal to one or more vaults associated with the fund as a reserve.

In embodiments, a method includes: a. obtaining, by an administrator computer system associated with an administrator of a fund holding secured notes collateralized by a precious metal, from a first authorized participant computer system associated with a first authorized participant in the fund, a first order comprising: (1) a first amount of shares of the fund corresponding to a second amount of secured notes; and (2) authorized participant identification information associated with the first authorized participant; b. verifying, by the administrator computer system, the first order, wherein the verifying step includes: (1) confirming that the first authorized participant is an authorized participant in the fund based on the authorized participant identification information; (2) confirming that the first amount of shares are available; and (3) determining that the second amount of secured notes corresponds to the first amount of shares; c. updating, by the administrator computer system, diversification information associated with the secured notes held by the fund, wherein the updating step includes: (1) obtaining current diversification information associated with the secured notes held by the fund prior to obtaining the first order; (2) determining order diversification information associated with the second amount of secured notes; (3) updating the current based on the order diversification information; (4) storing the updated current diversification information as the current diversification information; and (5) storing the order diversification information; d. generating, by the administrator computer system, secured note providing instructions associated with providing the second amount of secured notes to the first authorized participant, wherein the generating step includes: determining for each secured note issuer of a second set of secured note issuers, a respective allocation of the second amount of secured notes based on the order diversification information, wherein the respective allocation of the second amount of secured notes is determined based at least on the following equation: $\Sigma\Sigma D_{N,k}(A_N(G))=G$, for N=1 to M, and k=1 to $V_N$, where M is a total number of secured note issuers in the second set of secured note issuers, $A_N$ represents a first calculation of the allocation with each respective secured note issuer N of the second set of secured note issuers M, $D_{N,k}$ represents a second calculation of an account allocation value for each respective account k of the first set of custody accounts $V_N$ for each respective secured note issuer N of the second set of secured note issuers M, and G is a second amount of precious metal associated with the second amount of secured notes; (2) generating, secured note transfer instructions including for each secured note issuer of the second set of secured note issuers, respective note transfer instructions to provide one or more secured notes of the second amount of secured notes to the fund based on the respective allocation; and (3) storing for each secured note issuer of the second set of secured note issuers, the respective note transfer instructions; e. sending, by the administrator computer system to a third set of secured note issuer devices associated with the second set of secured note issuers, the secured note issuance instructions, including, for each secured note issuer of the second set of secured note issuers the respective secured note transfer instructions; f. confirming, by the administrator computer system, receipt of the second amount of secured notes based on the secured note issuance instructions; g. generating, by the administrator computer system, share transfer instructions to issue the first amount of shares to the first authorized participant; and h. sending, by the administrator computer system, the share transfer instructions to a custodian device associated with a custodial system associated with the fund to provide the first amount of shares to one or more accounts associated with the first authorized participant.

In embodiments, the precious metal includes at least a first precious metal and a second precious metal.

In embodiments, prior to step a, share price information indicating an amount of secured notes corresponding to an amount of shares in the fund is published by the administrator computer system.

In embodiments, the share price information includes diversification information diversification information associated with a first set of one or more secured note issuers that issue the secured notes held by the fund.

In embodiments, the first order includes the second amount of secured notes that corresponds to the first amount of shares.

In embodiments, the first order includes the second amount of secured notes and a third amount of fiat that correspond to the first amount of shares.

In embodiments, the verifying step b includes confirming that the first amount of shares are available for issuance by the fund.

In embodiments, the verifying step b includes confirming that the first amount of shares have been previously issued and are currently unassigned.

In embodiments, the verifying step b includes confirming that the second amount of secured notes corresponds to the first amount of shares.

In embodiments, the verifying step b includes confirming that the second amount of secured notes and the third amount of fiat correspond to the first amount of shares.

In embodiments, steps c(3), c(4) and c(5) occur after step d.

In embodiments, the respective allocation of the second amount of secured notes of one or more secured note issuer of the second set of secured note issuers is zero.

In embodiments, the generating step d does not include generating secured note generation instructions for the one or more secured note issuers associated with a zero allocation of the second amount of secured notes.

In embodiments, prior to step d, confirmation that the third amount of fiat was received by a fourth set of one or more fiat accounts associated with the second set of secured note issuers is received from a third set of secured note issuer devices associated with the second set of secured note issuers.

In embodiments, the sending step e includes the administrator computer system sending the secured note issuance instructions to one or more broker devices associated with one or more brokers and the one or more broker devices sending the secured note issuer instructions to the third set of secured note issuer devices.

In embodiments, the share transfer instructions include instructions to issue the first amount of shares.

In embodiments, the share transfer instructions include instructions to transfer previously issued and unassigned shares in the amount of the first amount of shares.

In embodiments, the allocation of the second amount of precious metal is also based on one or more characteristics of each respective secured note issuer, wherein the characteristics include: (1) a tangible common equity ratio associated with the respective secured note issuer; (2) a capitalization rate associated with the respective secured note issuer; (3) a current portfolio of assets associated with the respective secured note issuer; (4) a country of origin associated with the respective secured note issuer; (5) a credit quality associated with the respective secured note issuer; (6) a credit score associated with the respective secured note issuer; (7) a duration remaining associated with secured notes associated with the respective secured note issuer; (8) maturity dates of the secured notes associated with the respective secured note issuer; and (9) an owner or sponsor associated with the respective secured note issuer.

In embodiments, the fund holds a reserve amount of precious metal.

In embodiments, the settlement instructions include instructions to transfer the reserve amount of the second amount of precious metal to one or more vaults associated with the fund as a reserve.

In embodiments, a method includes: a. obtaining, by the administrator computer system associated with an administrator of a fund holding secured notes collateralized by a precious metal, from a first authorized participant computer system associated with a first authorized participant in the fund, a first order to redeem a first amount of shares of the fund corresponding to a second amount of precious metal including authorized participant identification information associated with the first authorized participant; b. verifying, by the administrator computer system, the first order, wherein the verifying step includes: (1) confirming that the first authorized participant is an authorized participant associated with the fund based on the authorized participant identification information; (2) confirming that the first authorized participant owns the first amount of shares; (3) determining that the second amount of precious metal corresponds to the first amount of shares; c. generating, by the administrator computer system, first settlement instructions to transfer the first amount of shares from a first authorized participant account associated with the first authorized participant to a fund account associated with the fund; d. sending, by the administrator computer system, the first settlement instructions to the first authorized participant device associated the first authorized participant of the fund; e. confirming, by the administrator computer system, receipt of the first amount of shares in the fund account; f. determining, by the administrator computer system, a third amount of secured notes corresponding to the second amount of secured metal and the first amount of shares; g. updating, by the administrator computer system, order diversification information diversification information associated with the third amount of secured notes corresponding to the second amount of precious metal in accordance with current diversification information diversification information associated with the secured notes held by the fund prior to receiving the first order, wherein the order diversification information diversification information indicates an allocation of the third amount of secured notes among a first set of one or more secured note issuers, wherein the allocation is based at least on the equation: $\Sigma\Sigma D_{N,k}(A_N(G))=G$, for N=1 to M, and k=1 to $V_N$, where M is a total number of secured note issuers in the first set of one or more secured note issuers, $A_N$ represents a first calculation of the allocation with each respective secured note issuer N of the first set of one or more secured note issuers M, $D_{N,k}$ represents a second calculation of an account allocation value for each respective account k of the first set of custody accounts $V_N$ for each respective secured note issuer N of the first set of one or more secured note issuers M, and G is the second amount of precious metal; h. generating, by the administrator computer system, secured note redemption instructions to transfer the third amount of secured notes to the first set of one or more secured note issuers in accordance with the order diversification information diversification information to redeem the third amount of secured notes for the second amount of precious metal; i. sending, by the administrator computer system, the secured note redemption instructions to a second set of one or more secured note issuer devices associated with the first set of one or more secured note issuers to: (1) transfer the third amount of secured notes from the fund to the first set of one or more secured note issuers; and (2) redeem the third amount of secured notes; j. receiving, by the administrator computer system, confirmation of the transfer of the third amount of secured notes to the first set of one or more secured note issuers; k. generating, by the administrator computer system, precious metal settlement instructions to transfer the second amount of precious metal in accordance with the order diversification information; l. sending, by the administrator computer system, the precious metal settlement instructions to a fourth set of one or more vault administrator devices associated with a third set of custody accounts at one or more vaults; m. receiving, by the administrator computer system, confirmation of the transfer of the second amount of precious metal in accordance with the order diversification information; n. generating, by the administrator computer system, share eliminating instructions to eliminate the first amount of shares corresponding to the third amount of secured notes and the second amount of precious metal; o. sending, by the administrator computer system, the share burning instructions to the custodian device; and p. receiving, by the administrator computer system, confirmation that the first amount of shares has been eliminated.

In embodiments, prior to the obtaining step a, share price information indicating an amount of precious metal corresponding to an amount of shares in the fund is published by the administrator computer system.

In embodiments, the share price information includes diversification information diversification information associated with a first set of one or more secured note issuers that issue secured notes held by the fund.

In embodiments, the first order includes the second amount of precious metal that corresponds to the first amount of shares.

In embodiments, the second amount of precious metal includes a third amount of a first precious metal and a fourth amount of a second precious metal.

In embodiments, the first order includes the second amount of precious metal and a third amount of secured notes collateralized by the precious metal.

In embodiments, the first order includes the second amount of precious metal and a third amount of fiat.

In embodiments, the verifying step b includes confirming that the second amount of precious metal corresponds to the first amount of shares.

In embodiments, the verifying step b includes confirming that the third amount of a first precious metal and a fourth amount of a second precious metal.

In embodiments, the verifying step b includes confirming that the second amount of precious metal and a third amount of secured notes correspond to the first amount of shares.

In embodiments, the verifying step b includes confirming that the second amount of precious metal and the third amount of fiat correspond to the first amount of shares.

In embodiments, transfers into and out of the fund account are controlled by the administrator computer system.

In embodiments, after step d, the first authorized participant device sends transfer instructions based on the first settlement instructions to a custodian device associated with a custodian of the fund to transfer the first amount of shares.

In embodiments, the precious metal settlement instructions include instructions to transfer the third amount of the first precious metal and the fourth amount of the second precious metal in accordance with the order diversification information.

In embodiments, the step of generating precious metal settlement instructions further includes generating fiat settlement instructions to transfer the third amount of fiat to a first authorized user fiat account.

In embodiments, the confirmation includes confirmation of the transfer of the third amount of the first precious metal and the fourth amount of the second precious metal.

In embodiments, the share eliminating instructions include instructions to burn the first amount of shares.

In embodiments, the burning instructions include instructions to reallocate at least a portion of the first amount of shares.

In embodiments, the sending step d includes sending the transfer instructions to a custodian device associated with a transfer agent device for a custodial system associated with the fund.

In embodiments, the allocation of the second amount of precious metal is also based on one or more characteristics of each respective secured note issuer, wherein the characteristics include: (1) a tangible common equity ratio associated with the respective secured note issuer; (2) a capitalization rate associated with the respective secured note issuer; (3) a current portfolio of assets associated with the respective secured note issuer; (4) a country of origin associated with the respective secured note issuer; (5) a credit quality associated with the respective secured note issuer; (6) a credit score associated with the respective secured note issuer; (7) a duration remaining associated with secured notes associated with the respective secured note issuer; (8) maturity dates of the secured notes associated with the respective secured note issuer; and (9) an owner or sponsor associated with the respective secured note issuer.

In embodiments, the fund holds a reserve amount of precious metal.

In embodiments, the precious metal settlement instructions include instructions to transfer amount of precious metal with the second amount of precious metal in accordance with the order diversification information.

In embodiments, step m includes receiving confirmation of the transfer of the reserve amount of precious metal in accordance with the order diversification information.

In embodiments, a method includes: a. obtaining, by the administrator computer system associated with an administrator of a fund holding secured notes collateralized by a precious metal, from a first authorized participant computer system associated with a first authorized participant in the fund, a first order to redeem a first amount of shares of the fund corresponding to a second amount of secured notes collateralized by a precious metal including authorized participant identification information associated with the first authorized participant; b. verifying, by the administrator computer system, the first order, wherein the verifying step includes: (1) confirming that the first authorized participant is an authorized participant associated with the fund based on the authorized participant identification information; (2) confirming that the first authorized participant owns the first amount of shares; (3) determining that the second amount of secured notes corresponds to the first amount of shares; c. generating, by the administrator computer system, first settlement instructions to transfer the first amount of shares from a first authorized participant account associated with the first authorized participant to a fund account associated with the fund; d. sending, by the administrator computer system, the first transfer instructions to a custodian device associated with a custodian of shares of the fund; e. confirming, by the administrator computer system, receipt of the first amount of shares in the fund account; f. updating, by the administrator computer system, order diversification information diversification information associated with the second amount of secured notes corresponding to a third amount of precious metal collateralizing the second amount of secured notes in accordance with current diversification information diversification information associated with the secured notes held by the fund prior to receiving the first order, wherein the order diversification information diversification information indicates an allocation of the second amount of secured notes among a first set of one or more secured note issuers, wherein the allocation is based at least on the equation: $\Sigma\Sigma D_{N,k}(A_N(G))=G$, for N=1 to M, and k=1 to $V_N$, where M is a total number of secured note issuers in the first set of one or more secured note issuers, $A_N$ is represents a first calculation of the allocation with each respective secured note issuer N of the first set of one or more secured note issuers M, $D_{N,k}$ represents a second calculation of an account allocation value for each respective account k of the first set of custody accounts $V_N$ for each respective secured note issuer N of the first set of one or more secured note issuers M, and G is the third amount of precious metal associated with the second amount of secured notes; g. generating, by the administrator computer system, secured note redemption instructions to transfer the second amount of secured notes from the fund to the first authorized participant account in accordance with the order diversity; h. sending, by the administrator computer system, the second amount of secured notes from the fund to the first authorized participant account in accordance with the order diversity; i. confirming, by the administrator computer system, that the second amount of secured notes is received in the first authorized participant account; j. generating, by the administrator computer system, share eliminating instructions to eliminate the first amount of shares corresponding to the second amount of secured notes and the third amount of precious metal; k. sending, by the administrator computer system, the share burning instructions to the custodian device; and 1. receiving, by the administrator computer system, confirmation that the first amount of shares has been eliminated.

In embodiments, prior to the obtaining step a, share price information indicating an amount of secured notes corresponding to an amount of shares in the fund is published by the administrator computer system.

In embodiments, the share price information includes diversification information diversification information associated with a first set of one or more secured note issuers that issue secured notes held by the fund.

In embodiments, the order includes the second amount of secured notes.

In embodiments, the order includes the second amount of secured notes and a third amount of fiat.

In embodiments, the verifying step b includes confirming that the second amount of secured notes corresponds to the first amount of shares.

In embodiments, the verifying step b includes confirming that the second amount of secured notes and a third amount of fiat corresponds to the first amount of shares.

In embodiments, transfers into and out of the fund account are controlled by the administrator computer system.

In embodiments, the share eliminating instructions include instructions to burn the first amount of shares.

In embodiments, the share eliminating instructions include instructions to reallocate the first amount of shares.

In embodiments, the sending step d includes sending the transfer instructions to a custodian device associated with a transfer agent device for a custodial system associated with the fund.

In embodiments, the allocation of the second amount of precious metal is also based on one or more characteristics of each respective secured note issuer, wherein the characteristics include: (1) a tangible common equity ratio associated with the respective secured note issuer; (2) a capitalization rate associated with the respective secured note issuer; (3) a current portfolio of assets associated with the respective secured note issuer; (4) a country of origin associated with the respective secured note issuer; (5) a credit quality associated with the respective secured note issuer; (6) a credit score associated with the respective secured note issuer; (7) a duration remaining associated with secured notes associated with the respective secured note issuer; (8) maturity dates of the secured notes associated with the respective secured note issuer; and (9) an owner or sponsor associated with the respective secured note issuer.

In embodiments, the fund holds a reserve amount of precious metal.

In embodiments, the precious metal settlement instructions include instructions to transfer amount of precious metal with the second amount of precious metal in accordance with the order diversification information.

In embodiments, step m includes receiving confirmation of the transfer of the reserve amount of precious metal in accordance with the order diversification information.

In embodiments, a method includes: a. obtaining, by the administrator computer system associated with an administrator of a fund holding secured notes collateralized by a precious metal, from a first authorized participant computer system associated with a first authorized participant in the fund, a first order to redeem a first amount of shares of the fund corresponding to a second amount of secured notes collateralized by a precious metal including authorized participant identification information associated with the first authorized participant; b. verifying, by the administrator computer system, the first order, wherein the verifying step includes: (1) confirming that the first authorized participant is an authorized participant associated with the fund based on the authorized participant identification information; (2) confirming that the first authorized participant owns the first amount of shares; (3) determining that the second amount of secured notes corresponds to the first amount of shares; c. generating, by the administrator computer system, first settlement instructions to transfer the first amount of shares from a first authorized participant account associated with the first authorized participant to a fund account associated with the fund; d. sending, by the administrator computer system, the first transfer instructions to a custodian device associated with a custodian of shares of the fund; e. confirming, by the administrator computer system, receipt of the first amount of shares in the fund account; f. updating, by the administrator computer system, order diversification information diversification information associated with the second amount of secured notes corresponding to a third amount of precious metal collateralizing the second amount of secured notes in accordance with current diversification information diversification information associated with the secured notes held by the fund prior to receiving the first order, wherein the order diversification information diversification information indicates an allocation of the second amount of secured notes among a first set of one or more secured note issuers, wherein the allocation is based at least on the equation: $\Sigma\Sigma D_{N,k}(A_N(G))=G$, for N=1 to M, and k=1 to $V_N$, where M is a total number of secured note issuers in the first set of one or more secured note issuers, $A_N$ represents a first calculation of the allocation with each respective secured note issuer N of the first set of one or more secured note issuers M, $D_{N,k}$ represents a second calculation of an account allocation value for each respective account k of the first set of custody accounts $V_N$ for each respective secured note issuer N of the first set of one or more secured note issuers M, and G is the third amount of precious metal associated with the second amount of secured notes; g. generating, by the administrator computer system, secured note redemption instructions to transfer the second amount of secured notes from the fund to the first set of one or more secured note issuers in accordance with the order diversification information diversification information to redeem the second amount of secured notes for the third amount of precious metal; h. sending, by the administrator computer system, the secured note redemption instructions to a second set of one or more secured note issuer devices associated with the first set of one or more secured note issuers to: (1) transfer the second amount of secured notes from the fund to the first set of one or more secured note issuers; and (2) redeem the second amount of secured notes for the third amount of precious metal; i. receiving, by the administrator computer system, confirmation of the transfer of the second amount of secured notes to the first set of one or more secured note issuers; j. generating, by the administrator computer system, precious metal settlement instructions to transfer the third amount of precious metal in accordance with the order diversification information; k. sending, by the administrator computer system, the precious metal settlement instructions to a fourth set of one or more vault administrator devices associated with a third set of custody accounts at one or more vaults; 1. receiving, by the administrator computer system, confirmation of the transfer of the second amount of precious metal; m. generating, by the administrator computer system, share eliminating instructions to eliminate the first amount of shares corresponding to the second amount of secured notes and the third amount of precious metal; n. sending, by the administrator computer system, the share burning instructions to the custodian device; and o. receiving, by the administrator computer system, confirmation that the first amount of shares has been eliminated.

In embodiments, the custodian device is also associated with a transfer agent for the custodial system associated with the fund.

In embodiments, the allocation of the second amount of precious metal is also based on one or more characteristics of each respective secured note issuer, wherein the characteristics include: (1) a tangible common equity ratio associated with the respective secured note issuer; (2) a capitalization rate associated with the respective secured note issuer; (3) a current portfolio of assets associated with the respective secured note issuer; (4) a country of origin associated with the respective secured note issuer; (5) a credit quality associated with the respective secured note issuer; (6) a credit score associated with the respective secured note issuer; (7) a duration remaining associated with secured notes associated with the respective secured note issuer; (8) maturity dates of the secured notes associated with the respective secured note issuer; and (9) an owner or sponsor associated with the respective secured note issuer.

In embodiments, the fund holds a reserve amount of precious metal.

In embodiments, the settlement instructions include instructions to transfer the reserve amount of the second amount of precious metal to one or more vaults associated with the fund as a reserve.

In embodiments, prior to the obtaining step a, share price information indicating an amount of secured notes corresponding to an amount of shares in the fund is published by the administrator computer system.

In embodiments, the share price information includes diversification information diversification information associated with a first set of one or more secured note issuers that issue secured notes held by the fund.

In embodiments, the first order includes the second amount of secured notes.

In embodiments, the first order includes the second amount of secured notes and a third amount of fiat.

In embodiments, the verifying step b further includes confirming that the second amount of secured notes corresponds to the first amount of shares.

In embodiments, the verifying step b further includes confirming that the second amount of secured notes and the third amount of fiat corresponds to the first amount of shares.

In embodiments, transfers into and out of the fund account are controlled by the administrator computer system.

In embodiments, the second amount of precious metal includes a third amount of a first precious metal and the fourth amount of a second precious metal.

In embodiments, the precious metal settlement instructions include instructions to transfer the third amount of the first precious metal and the fourth amount of the second precious metal.

In embodiments, the step of generating precious metal settlement instructions further includes generating fiat settlement instructions to transfer the third amount of fiat to a first authorized user fiat account.

In embodiments, the receiving step 1 includes receiving confirmation includes confirmation of the transfer of the third amount of the first precious metal and the fourth amount of the second precious metal.

In embodiments, the receiving step 1 includes receiving confirmation that the third amount of fiat was received in a first authorized participant fiat account.

In embodiments, the share eliminating instructions include instructions to burn the first amount of shares.

In embodiments, the share eliminating instructions include instructions to reallocate the first amount of shares.

In embodiments, a method includes: a. providing, by an administrator computer system, a first set of rules; b. receiving, by the administrator computer system from a first authorized participant computer system associated with a first authorized participant, a first request to purchase shares, wherein the first request includes: i. first authorized participant identification information associated with the first authorized participant; and ii. a first number of shares to be purchased, wherein the receiving step includes: (a) confirming an identity of the first authorized participant based on at least the authorized participant identification information; (b) determining a first amount of a precious metal associated with the first number of shares; (c) generating a first response, the first response including: 1. amount information indicating the first amount of the precious metal associated with the first number of shares; 2. deposit information associated with a deposit of the first amount of precious metal in a vault; and 3. sending, by the administrator computer system, the first response to the first authorized participant computer system, wherein the first authorized participant is instructed to deposit the first amount of the precious metal into a specific custody account at a vault; c. receiving, by the administrator system, confirmation of the deposit of the first amount of the precious metal into the account at the vault; d. forwarding, by the administrator computer system to a secured note issuer administrator computer system, the confirmation of the deposit; e. providing, via the administrator system, diversification of the first amount precious metal based on the first set of rules; wherein providing diversification includes: i. receiving, by the administrator system from the secured note issuer administrator computer system, diversification instructions, wherein the diversification instructions are based on providing a determined deposit value of precious metal for each issuer of a plurality of issuers of secured notes in the precious metal, and wherein the deposit value is determined in accordance with the first rules and the following equation: $T_{N,k}=D_{N,k}(A_N(G))$, for N=1 to M, and k=1 to $V_N$, where M is a number of issuers, $V_N$ is a vector defining the number of vault accounts for each respective issuer N of the M issuers, $A_N$ is a function which calculates the diversification allotment for each respective issuer N of the M issuers, G is the part of the first amount of the precious metal to diversify, $D_{N,k}$ is a function which calculates the deposit value for each respective vault account k of the $V_N$ vault accounts of each respective issuer N of the M issuers, and $T_{N,k}$ is the deposit value for each respective vault account k of the $V_N$ vault accounts of each respective issuer N of the M issuers, where the following must be true $\Sigma\Sigma D_{N,k}(A_N(G))=\Sigma A_N(G)=G$; ii. sending, by the administrator computer system to a vault computer system associated with the vault, the diversification instructions, wherein the diversification instructions are implemented at the vault to transfer portions of the first amount of precious metal to one or more secured note issuer accounts to provide the deposit amount of precious metal to each issuer of the plurality of issuers; iii. receiving, by the administrator computer system from the vault computer system, confirmation that the diversification instructions were implemented at the vault; iv. sending, by the administrator computer system to the secured note issuer administrator system, the confirmation that the diversification instructions were implemented, wherein details regarding the deposit amount associated with each issuer are recorded by the secured note issuer administrator computer system; f. providing, via the administrator computer system, secured notes corresponding to the first amount of precious metal, wherein the step of providing secured notes includes; i. requesting secured note specifications associated with each issuer of the plurality of issuers based on the determined deposit value of each issuer; ii. receiving from the secured note issuer administrator computer system, the secured note specifications; iii. providing the secured note specifications to at least one issuer computer system associated with each issuer of the plurality of issuers, the secured note specifications; iv. receiving from the at least one issuer computer system associated with each issuer of the plurality of issuers confirmation to create secured notes based on the secured note specifications; v. requesting creation of the secured notes based on the secured note specifications from the secured note issuer administrator computer system, wherein the secured note issuer administrator computer system creates the secured notes; vi. receiving from the secured note issuer administrator computer system, confirmation of creation of the secured notes; vii. providing to the secured note issuer administrator computer system, a second request to transfer the secured notes from the respective secured note issuer accounts to the first authorized participant account, wherein the secured notes are transferred to the first authorized participant account by the secured note issuer administrator computer system; g. receiving, by the administrator computer system from the secured note issuer administrator computer system, confirmation of the transfer of the secured notes to the first authorized participant account; h. providing, by the administrator computer system to the secured note issuer administrator computer system, a third request to transfer the secured notes to a fund account associated with a fund issuing the first amount of shares, wherein the secured notes are transferred into the fund account by the secured note issuer administrator computer system; i. receiving, by the administrator computer system from the secured note issuer administrator computer system, confirmation that the secured notes have been transferred to the fund account; and j. providing, by the administrator computer system, the first amount of shares to the first authorized participant account.

In embodiments, the first set of rules are stored in a memory device operatively connected to the administrator computer system and the secured note issuer administrator computer system.

In embodiments, the first set of rules are received by at least one of the administrator computer system and the secured note issuer administrator computer system and are stored in a memory operatively connected to administrator computer system and the secured note issuer administrator computer system.

In embodiments, the first set of rules is generated by at least one of the administrator computer system and the secured note issuer administrator computer system and stored in a memory operatively connected to at least one of the administrator computer system and the secured note issuer administrator computer system.

In embodiments, the administrator computer system includes the secured note issuer administrator computer system.

In embodiments, the secured note issuer administrator computer system includes the administrator computer system.

In embodiments, the first amount of precious metal is a first amount of a basket of different precious metals.

In embodiments, the method further includes, after step (c), a step of: generating, by the administrator computer system, a share creation request to create the first number of shares in a fund associated with the administrator computer system. In embodiments, the share creation request is transmitted to a custodial computer system associated with one or more custody companies that hold shares of the fund in custody. In embodiments, the step of providing the first amount of shares to the first authorized participant account includes: i. generating, by the administrator computer, a share transfer request to transfer the first amount of shares to the first authorized participant account; and ii. sending, by the administrator computer system, the share transfer request to the custodial computer system, wherein the custodial system transfers the first amount of shares from the fund account to the first authorized participant account. In embodiments, the transfer of the first amount of shares from the fund account to the first authorized participant account by the custodial system uses an electronic ledger transaction.

In embodiments, the secured notes are transferred to the first authorized participant account by the secured note issuer administrator computer system using an electronic ledger entry.

In embodiments, the secured notes are transferred into the fund account using an electronic ledger entry.

In embodiments, the step of providing the first amount of shares to the first authorized participant account is performed using an electronic ledger.

In embodiments, the vault may include a plurality of vaults.

In embodiments, the vault computer system may include a plurality of vault computer systems.

In embodiments, a method includes: a. obtaining, by a secured note issuer administrator computer system, a first set of rules; b. receiving, by the secured note issuer administrator computer system, confirmation of a deposit of a first amount of a precious metal in a vault by a first authorized participant, wherein the first amount of the precious metal is associated with a number of shares to be purchased by the first authorized participant; c. registering, by the secured note issuer administrator computer system, the deposit of the first amount of the precious metal in a first authorized participant account associated with the first authorized participant; d. receiving, by the secured note issuer administrator computer system, a first request for diversification instructions associated with the first amount of the precious metal; e. providing, by secured note issuer administrator computer system, diversification instructions in accordance with the first set of rules, wherein the step of providing diversification instructions includes: i. determining a deposit amount of the precious metal for each issuer of a plurality of issuers of secured notes secured by the first amount of the precious metal, wherein the deposit amount of precious metal is determined in accordance with the following equation: $T_{N,k} = D_{N,k}(A_N(G))$, for N=1 to M and k=1 to $V_N$, where M is a number of issuers, $V_N$ is a vector defining the number of vault accounts for each respective issuer N of the M issuers, $A_N$ is a function which calculates the diversification allotment for each respective issuer N of the M issuers, G is the first amount of the precious metal, $D_{N,k}$ is a function which calculates the deposit value for each respective vault account k of the $V_N$ vault accounts of each respective issuer N of the M issuers, and $T_{N,k}$ is the deposit value for each respective vault account k of the $V_N$ vault accounts of each respective issuer N of the M issuers, where the following must be true $\Sigma\Sigma D_{N,k}(A_N(G))=\Sigma A_N(G)=G$; ii. generating, by secured note issuer administrator computer system, diversification instructions, the diversification instructions comprising instructions to transfer one or more portions of the first amount of the precious metal to one or more issuer accounts associated with one or more issuers of the plurality of issuers in order to match the determined deposit value for each of the issuers; iii. sending, by secured note issuer administrator computer system, the diversification instructions to the administrator computer system, wherein the first amount of the commodity is transferred in the vault based on the diversification instructions; f. receiving, by the secured note issuer administrator computer system, confirmation that the first amount of the precious metal has been transferred in accordance with the diversification instructions in the vault; g. registering, by the secured note issuer administrator computer system, deposit details associated with the first amount of precious metal based on the confirmation; h. generating, by the secured note issuer administrator computer system, secured note specifications, wherein the step of generating secured note specifications includes: i. receiving a second request for secured note specifications for each issuer of the plurality of issuers based on the deposit value of each issuer; ii. generating, by the secured note issuer administrator computer system, respective secured note specifications for each issuer of the plurality of issuers; iii. sending, by the secured note issuer administrator computer system to the administrator computer system, the secured note specifications, wherein the secured note specifications are forwarded to respective issuers of the plurality of issuers; i. generating, by the secured note issuer administrator computer system, secured notes in accordance with the secured note specifications, wherein the step of generating the secured notes includes: i. receiving, by the secured note issuer administrator computer system, a third request to create the secured notes based on the secured note specifications; ii. generating, by the secured note issuer administrator computer system, one or more respective secured notes secured by the deposit amount of the precious metal associated with each of the issuers; iv. transferring, by the secured note issuer administrator computer system, the respective secured notes from the first authorized participant account to a fund account associated with a fund in which the first participant is buying shares; j. sending, by the secured note issuer administrator computer system to the administrator computer system, confirmation of the transfer of the respective secured notes to the fund account, wherein the administrator computer system provides the first amount of shares to the first authorized participant account.

In embodiments, the first set of rules are stored in a first memory operably connected to the secured note issuer administrator computer system and the administrator computer system.

In embodiments, the first set of rules is received by the secured note issuer administrator computer system and stored in a memory associated with the secured note issuer administrator computer system and the administrator computer system.

In embodiments, the first set of rules is generated by the secured note issuer administrator computer system and stored in a memory operable connected to the secured note issuer administrator computer system and the administrator computer system.

In embodiments, the first amount of precious metal includes a basket of precious metals.

In embodiments, the secured note issuer administrator computer system includes the administrator computer system.

In embodiments, the administrator computer system includes the secured note issuer administrator computer system.

In embodiments, the registering step (c) includes registering the deposit of the first amount of the precious metal in a first authorized participant account in an electronic ledger.

In embodiments, the registering step (g) includes registering the deposit details in an electronic ledger.

In embodiments, the secured notes are generated in paper form.

In embodiments, the secured notes are generated in electronic form.

In embodiments, the transfer of secured notes from the first authorized participant account to the fund account is via an electronic ledger.

In embodiments, the vault may include a plurality of vaults.

In embodiments, the vault computer system may include a plurality of vault computer systems.

In embodiments, a method includes: a. providing, by an administrator computer system, a first set of rules; b. receiving, by the administrator computer system from a first authorized participant, a first request to redeem shares in a fund, wherein the first request includes: i. first authorized participant identification information associated with the first authorized participant; and ii. a first number of shares to be redeemed, wherein the receiving step includes: (a) confirming an identity of the first authorized participant based on at least the authorized participant identification information; (b) providing instructions to the first authorized participant to deposit the first number of shares into a fund account associated with the fund in which the shares are issued; wherein the first amount of shares is transferred to the fund account; c. receiving, by the administrator computer system, confirmation of receipt of the first amount of shares in the fund account; d. providing, via the administrator computer system, secured note specifications associated with secured notes corresponding to the first amount of shares; wherein the step of providing the secured note specifications includes: i. providing, by the administrator computer system to a secured note issuer administrator computer system, a second request for secured note specifications, wherein the secured note issuer administrator computer system provides the secured note specifications in accordance with the first set of rules and in accordance with the following equation: $T_{N,k}=D_{N,k}(A_N(G))$, for N=1 to M and k=1 to $V_N$, where M is a number of issuers, $V_N$ is a vector defining the number of vault accounts for each respective issuer N of the M issuers, $A_N$ is a function which calculates the diversification allotment for each respective issuer N of the M issuers, G is part of a first amount of the secured notes associated to the first amount of shares to diversify, $D_{N,k}$ is a function which calculates the deposit value of precious metal associated with the secured notes for each respective vault account k of the $V_N$ vault accounts of each respective issuer N of the M issuers, and $T_{N,k}$ is the deposit value of precious metal associated with the secured notes for each respective vault account k of the $V_N$ vault accounts of each respective issuer N of the M issuers, where the following holds $\Sigma\Sigma D_{N,k}(A_N(G))=\Sigma A_N(G)$; ii. receiving, from the secured note issuer administrator computer system, the secured note specifications, iii. generating, a third request to transfer respective secured notes identified based on the secured note specifications from the fund account to the first authorized participant's account, wherein the respective secured notes identified based on the secured note specifications are transferred from the fund account to the first authorized participant's account by the secured note issuer administration computer system; iv. receiving confirmation that the respective secured notes identified based on the secured note specifications have been transferred from the fund account to the first authorized participant's account; e. generating, by the administrator computer system a fourth request to confirm redemption of the respective secured notes to the first authorized participant; f. receiving, by the administrator computer system confirmation from the first authorized participant, confirmation to redeem the respective secured notes; g. generating, by the administrator computer system to the secured note issuer administrator computer system, a fifth request to redeem the respective secured notes, wherein the respective secured notes are transferred from the first authorized participant account to respective issuer accounts associated with the respective secured notes by the secured note issuer administrator computer system and secured notes are deregistered; h. receiving, from the secured note issuer administration computer system, vault transfer instruction to transfer a second amount of precious metal in the vault from the respective issuers' accounts to the account of the first authorized participant; i. sending, by the administrator computer system the vault transfer instructions to the vault, wherein the second amount of precious metal is transferred in accordance with the transfer instructions at the vault; j. receiving, by the administrator computer system, confirmation of the transfer of the precious metal in accordance with the transfer instructions; k. sending, by the administrator computer system to the secured note issuer administrator computer system, the confirmation, wherein the transfer is registered by the secured note issuer administrator computer system; l. notifying, by the administrator system, at least one issuer computer system associated with the secured note issuer of the redemption of the secured notes; m. deleting, by the administrator computer system, the first amount of shares from the fund; n. sending, by the administrator computer system to the first authorized participant, confirmation of the redemption of the first amount of shares.

In embodiments, the first set of rules are stored in a memory operatively connected to the administrator computer system and the secured note issuer administrator computer system.

In embodiments, the first set of rules are received by at least one of the administrator computer system and the secured note issuer administrator computer system and are stored in a memory operatively connected to administrator computer system and the secured note issuer administrator computer system.

In embodiments, the first set of rules is generated by at least one of the administrator computer system and the secured note issuer administrator computer system and stored in a memory operatively connected to at least one of the administrator computer system and the secured note issuer administrator computer system.

In embodiments, the administrator computer system includes the secured note issuer administrator computer system.

In embodiments, the secured note issuer administrator computer system includes the administrator computer system.

In embodiments, the first amount of precious metal is a first amount of a basket of different precious metals.

In embodiments, the deleting step (m) includes deleting the first number of shares from an electronic ledger.

In embodiments, the vault may include a plurality of vaults.

In embodiments, the vault computer system may include a plurality of vault computer systems.

In embodiments, a method includes: a. obtaining, by a secured note issuer administrator computer system, a first set of rules; b. providing, by the secured note issuer administrator computer system, secured note specifications indicating secured notes to be redeemed for precious metal; i. receiving, from an administrator computer system, a request for the secured note specifications corresponding to a first number of shares being redeemed by a first authorized participant; ii. providing, by the secured note issuer administrator computer system, the secured note specifications, the secured note specifications are provided in accordance with the first set of rules and in accordance with the following equation: $T_{N,k}=D_{N,k}(A_N(G))$, for N=1 to M and k=1 to $V_N$, where M is a number of issuers, $V_N$ is a vector defining the number of vault accounts for each respective issuer N of the M issuers, $A_N$ is a function which calculates the diversification allotment for each respective issuer N of the M issuers, G is a first amount of the secured notes associated to the first amount of shares, $D_{N,k}$ is a function which calculates the deposit value of precious metal associated with the secured notes for each respective vault account k of the $V_N$ vault accounts of each respective issuer N of the M issuers, and $T_{N,k}$ is the deposit value of precious metal associated with the secured notes for each respective vault account k of the $V_N$ vault accounts of each respective issuer N of the M issuers, where the following holds $\Sigma\Sigma D_{N,k}(A_N(G))=\Sigma A_N(G)$; iii. sending the secured note specifications to the administrator system; c. transferring, by the secured note issuer administrator computer system, the selected secured notes based on the secured note specifications from a fund account to an account associated with the first authorized participant, the transferring step including: i. receiving, from the administrator computer system, a request to transfer selected secured notes; ii. transferring the selected secured notes to the first authorized participant account; iii. sending a first confirmation to the administrator system to confirm transfer of the selected secured notes to the first authorized participant account; d. notifying, by the secured note issuer administrator computer system, at least one computer system associated with each of the plurality of issuers of secured notes of the request for redemption related to the selected secured notes; e. redeeming, by the secured note issuer administration computer system, the selected secured notes, the redeeming step including: i. receiving from the administrator computer system a second request to redeem the selected secured notes; ii. transferring each secured note of the selected secured notes from the first authorized participant's account to a respective issuer's account; iii. generating vault transfer instructions to transfer the deposit amounts of precious metal from the respective issuer accounts to the first authorized participant account; iv. sending the vault transfer instructions to a vault computer system associated with the vault, wherein the deposit amounts of precious metal are distributed in the vault in accordance with the vault transfer instructions; v. receiving, from the administrator computer system, a third confirmation that the precious metal has been distributed in accordance with the transfer instructions; vii. providing, to the administrator computer system, confirmation of completion of the redemption process for the selected secured notes.

In embodiments, the first set of rules are stored in a memory operatively connected to the administrator computer system and the secured note issuer administrator computer system.

In embodiments, the first set of rules are received by at least one of the administrator computer system and the secured note issuer administrator computer system and are stored in a memory operatively connected to administrator computer system and the secured note issuer administrator computer system.

In embodiments, the first set of rules is generated by at least one of the administrator computer system and the secured note issuer administrator computer system and stored in a memory operatively connected to at least one of the administrator computer system and the secured note issuer administrator computer system.

In embodiments, the secured note issuer administrator computer system includes the administrator computer system.

In embodiments, the administrator computer system includes the secured note issuer administrator computer system.

In embodiments, the first amount of precious metal is a first amount of a basket of different precious metals.

In embodiments, the selected secured notes are transferred in paper form.

In embodiments, the selected secured notes are transferred using an electronic ledger.

In embodiments, the step of redeeming may include registering corresponding deposit amounts of precious metal associated with each issuer as non-pledged.

In embodiments, the step of registering corresponding deposit amounts includes registering the corresponding deposit amounts in an electronic ledger.

In embodiments, the vault may include a plurality of vaults.

In embodiments the vault computer system may include a plurality of vault computer systems.

BRIEF DESCRIPTION OF THE DRAWINGS

Exemplary embodiments of the present invention will be described with references to the accompanying figures, wherein:

FIG. 1A-2 is a schematic diagram of an additional exemplary system for operating a fund in accordance with exemplary embodiments of the present invention;

FIG. 1A-3 is a schematic diagram of another exemplary system for operating a fund in accordance with exemplary embodiments of the present invention;

FIG. 1B-1 through FIG. 1B-7 are block diagrams of an exemplary secured note issuer administrator system in accordance with exemplary embodiments of the present invention;

FIG. 1E-1 through FIG. 1E-5 is a portion of the schematic diagram of FIG. 1E, where the exemplary system includes more than one fund in accordance with exemplary embodiments of the present invention;

FIG. 2-10 is a flow chart further detailing embodiments depicted in C10 of the exemplary processes illustrated in FIG. 2A through FIG. 2D, in accordance with embodiments of the present invention;

FIG. 2-20A through FIG. 2-20E are flow charts further detailing embodiments depicted in C20 of the exemplary processes illustrated in FIG. 2A through FIG. 2D, in accordance with embodiments of the present invention;

FIG. 2-30A through FIG. 2-30B are flow charts further detailing embodiments depicted in C30 of the exemplary processes illustrated in FIG. 2A through FIG. 2C, in accordance with embodiments of the present invention;

FIG. 2-40 is a flow chart further detailing embodiments depicted in C40 of the exemplary processes illustrated in FIG. 2A through FIG. 2D, in accordance with embodiments of the present invention;

FIG. 2-50A through FIG. 2-50C are flow charts further detailing embodiments depicted in C50 of the exemplary processes illustrated in FIG. 2A through FIG. 2C, in accordance with embodiments of the present invention;

FIG. 2-60A through FIG. 2-60B are flow charts further detailing embodiments depicted in C60 of the exemplary processes illustrated in FIG. 2A through FIG. 2D, in accordance with embodiments of the present invention;

FIG. 2-80A through FIG. 2-80B are flow charts further detailing embodiments depicted in C80 of the exemplary processes illustrated in FIG. 2A through FIG. 2D, in accordance with embodiments of the present invention;

FIG. 2-90A through FIG. 2-90C are flow charts further detailing embodiments depicted in C70 of the exemplary processes illustrated in FIG. 2A through FIG. 2D, in accordance with embodiments of the present invention;

FIG. 2-100 is a flow chart further detailing embodiments depicted in C100 of the exemplary processes illustrated in FIG. 2A through FIG. 2D, in accordance with embodiments of the present invention;

FIG. 3A-1 through FIG. 3A-3 are flow charts of the exemplary process depicted in FIG. 3A from the perspective of an issuer administrator and a fund administrator, in accordance with embodiments of the present invention;

FIG. 3B-1 through FIG. 3B-2 are flow charts of the exemplary process depicted in FIG. 3B from the perspective of an issuer administrator and a fund administrator, in accordance with embodiments of the present invention;

FIG. 3B-3 is a flow chart of embodiments of the exemplary process depicted in FIG. 3A through FIG. 3C, in accordance with embodiments of the present invention;

FIG. 3C-1 through FIG. 3C-2 are flow charts of the exemplary process depicted in FIG. 3C from the perspective of an issuer administrator and a fund administrator, in accordance with embodiments of the present invention;

FIG. 4A-1 through FIG. 4A-2 are flow charts of the exemplary process depicted in FIG. 4A from the perspective of an issuer administrator and a fund administrator, in accordance with embodiments of the present invention;

FIG. 4B-1 through FIG. 4B-3 are flow charts of the exemplary process depicted in FIG. 4B from the perspective of an issuer administrator and a fund administrator, in accordance with embodiments of the present invention;

FIG. 5-20A through FIG. 5-20E are flow charts further detailing embodiments depicted in R20 of the exemplary processes illustrated in FIG. 5A through FIG. 5E, in accordance with embodiments of the present invention;

FIG. 5-30 is a flow chart further detailing embodiments depicted in R30 of the exemplary processes illustrated in FIG. 5A through FIG. 5E, in accordance with embodiments of the present invention;

FIG. 5-40A-1 through FIG. 5-40A-2 are flow charts further detailing embodiments depicted in R40 of the exemplary processes illustrated in FIG. 5A through FIG. 5E, in accordance with embodiments of the present invention;

FIG. 5-50A is a flow chart further detailing embodiments depicted in R50 of the exemplary processes illustrated in FIG. 5A through FIG. 5E, in accordance with embodiments of the present invention;

FIG. 5-50B is a flow chart further detailing embodiments associated with a portion of R50 of the exemplary processes illustrated in FIG. 5A through FIG. 5E, in accordance with embodiments of the present invention FIG. 5-50C is a flow chart further detailing embodiments depicted in R50-5 of the exemplary processes illustrated in FIG. 5A through FIG. 5E, in accordance with embodiments of the present invention;

FIG. 5-50D is a flow chart further detailing embodiments depicted in R50-6 of the exemplary processes illustrated in FIG. 5A through FIG. 5E, in accordance with embodiments of the present invention;

FIG. 5-50E is a flow chart further detailing embodiments depicted in R50A of the exemplary processes illustrated in FIG. 5A through FIG. 5E, in accordance with embodiments of the present invention;

FIG. 5-50F is a flow chart further detailing embodiments described in connection with R50 of the exemplary processes illustrated in FIG. 5A through FIG. 5E, in accordance with embodiments of the present invention;

FIG. 5-60A is a flow chart further detailing embodiments depicted in R60 of the exemplary processes illustrated in FIG. 5A through FIG. 5E, in accordance with embodiments of the present invention;

FIG. 5-60B is a flow chart further detailing embodiments depicted in R60 of the exemplary processes illustrated in FIG. 5A through FIG. 5E, in accordance with embodiments of the present invention;

FIG. 7D is an exemplary creation order in accordance with exemplary embodiments of the present invention;

FIG. 7E is an exemplary redemption order in accordance with exemplary embodiments of the present invention; and FIG. 8A and FIG. 8B are flow charts illustrating exemplary processes for creating shares in a fund in accordance with exemplary embodiments of the present invention.

DETAILED DESCRIPTION

Exchange-Traded Funds ("ETF")

Figures 1, 1A:
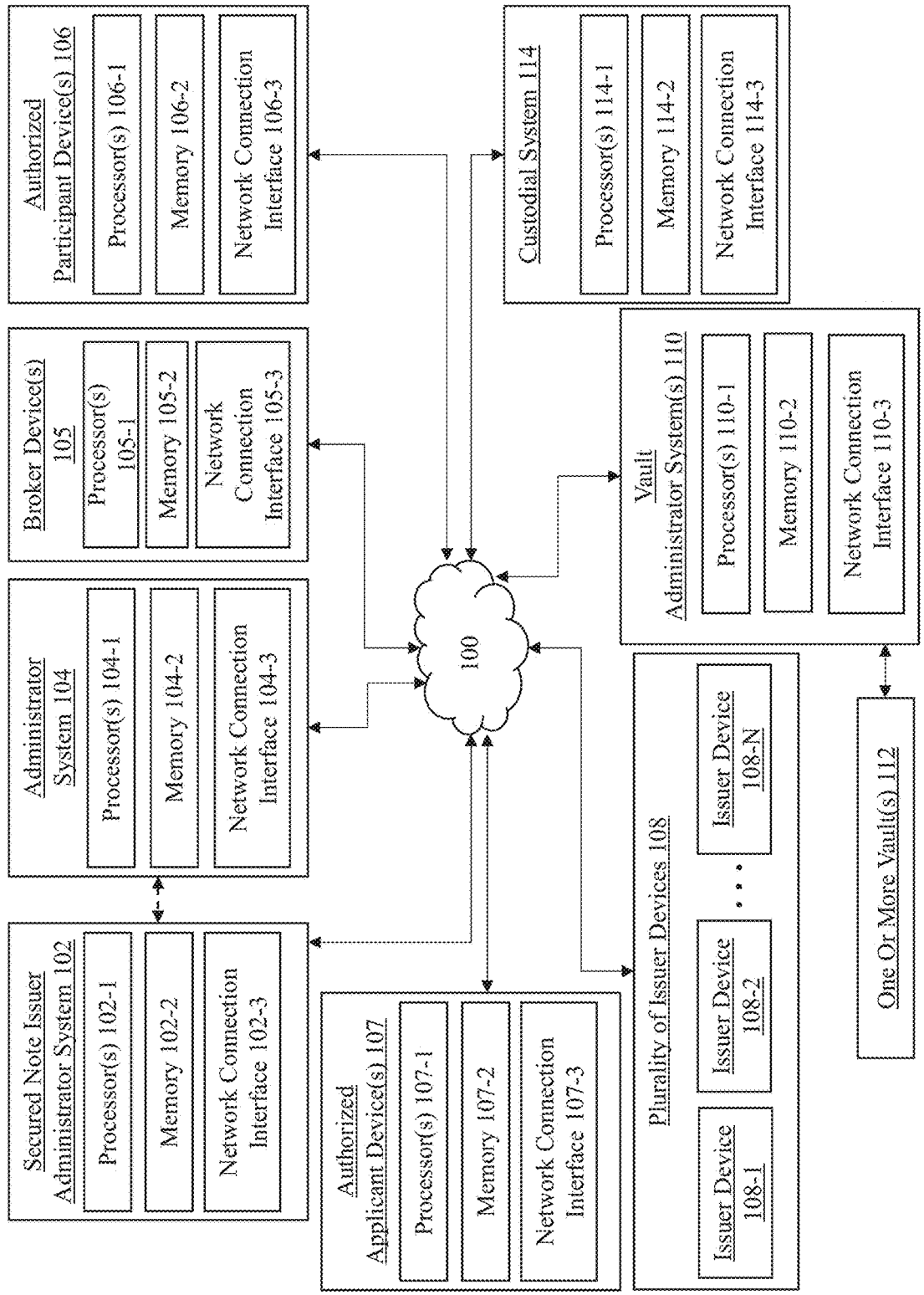
FIG. 1A-1 is a schematic diagram of an exemplary system for operating a fund in accordance with exemplary embodiments of the present invention.

In embodiments, an exchange traded fund ("ETF") can be provided to track one or more precious metals, such as gold, silver, platinum, rhodium and/or palladium, to name a few. In embodiments the ETF may be a legal entity established under the laws of a state of the United States or another territory that continuously issues and/or redeems its shares in exchange for one or more secured notes backed by one or more precious metals. In embodiments, the ETF may issue equity securities which it may register with the US Securities and Exchange Commission. In embodiments the ETF may list the equity securities for trading in the secondary market at intraday prices on a stock exchange. In embodiments, each issued share of an ETF may represent a ratable undivided interest in its underlying portfolio of assets (e.g. secured notes backed by precious metal). In embodiments, shares of the ETF may be created in large blocks or lot sizes, such as creation units. In embodiments, large market participants may be authorized participants ("APs") who may obtain creation units in exchange for a deposit of a specified amount of assets into the ETF's portfolio. In embodiments, APs may hold or sell into the secondary market the individual shares comprising the creation units issued.

In embodiments, an AP can be a person or entity who is a registered broker-dealer or other securities market participant such as a bank or other financial institution which is not required to register as a broker-dealer to engage in securities transactions, is a participant in DTC (depository trust company), has entered into an Authorized Participant Agreement with the trustee and the sponsor of the ETF and/or has established an Authorized Participant Account. In embodiments, only APs may place orders to create or redeem shares. For example, a basket of shares can be a block of 10,000 shares, 20,000 shares, 30,000 shares, 40,000 shares, 50,000 shares, 75,000 shares, 100,000 shares, and/or some other denomination of shares, to name a few.

In embodiments, an Authorized Participant Agreement may be an agreement entered into by an AP, a sponsor, an issuer, an administrator, a platform, and/or a trustee which provides the procedures for the creation and redemption of baskets of shares and for the delivery of the precious metal and/or secured notes required for such creations and redemptions.

In embodiments, a system for operating one or more ETF's (e.g. a fund) may include one or more of the following: (1) an administrator of the fund (e.g. Administrator System 104); (2) issuers of secured notes (e.g. plurality of issuer systems 108); (3) an administrator of the issuers (e.g. secured note issuer administrator system 102); (4) authorized participants of the fund (e.g. authorized participant device(s) 106); (5) authorized applicants of the issuers of secured notes (e.g. authorized applicant device(s) 107); (6) one or more vaults (e.g. vault 112); (7) one or more administrators of the vault (e.g. vault administrator system 110); (8) a custodial system (e.g. custodial system 114); (9) one or more secured note transfer agents associated with the fund; (10) one or more share transfer agents associated with the fund; and/or (11) one or more precious metals transfer agents associated with the fund, to name a few. In embodiments, the administrator of the fund and the administrator of the issuers may be the same entity (as shown in connection with FIGS. 1A-2 and 1A-3). In embodiments, a single entity may be both an authorized participant of the fund and an authorized applicant of one or more secured note issuers.

In embodiments one or more custodian device(s) associated with custodial system 114 may be associated with one or more transfer agents that interact with the custodian (e.g., custodian of shares of the fund, custodian of secured notes of the fund, and/or a combination thereof). A transfer agent may, for example, transfer shares of the fund on behalf of another entity (share transfer agent), transfer secured notes associated with transferring secured notes backing the shares of the fund on behalf of another entity (secured note transfer agent), and/or transfer precious metals on behalf of another entity (precious metals transfer agent), to name a few (collectively hereinafter "Transfer Agent") A share transfer agent, in embodiments, may be associated with the duties of fund share record keeping, share transfers, share elimination and/or share creation, to name a few. A note transfer agent, embodiments, may be associated with the duties of secured note recordkeeping, secured note transfers, secured note redemption, and/or secured note issuance, to name a few. A precious metals transfer agent, in embodiments, may be associated with the duties of precious metals recordkeeping including precious metal deposits, withdrawals and/or transfers, to name a few. In embodiments, a single entity may be both the custodial system and one or more of the transfer agents (the secured note transfer agents, the precious metal transfer agents, and the share transfer agents). In embodiments, the Transfer Agent(s) may operate as an agent of the Fund. In embodiments, one or more Transfer Agents may interact with the vault administrator system 110 and/or the custodial system 114 (e.g., via one or more custodian devices associated with custodians) on behalf of one or more of the following: administrator system 104, the secured note issuer administrator system 102, one or more issuers associated with the plurality of issuer systems 108, the authorized participants associated with the authorized participant device(s) 106, broker(s) associated with the broker device(s) 105, authorized applicants associated with the authorized applicant device(s) 107, and/or the vault administrator system 110. In embodiments, Transfer Agents may, for each entity the transfer agent(s) represent, maintain records of the shares of the fund, secured notes, fiat, bonds and/or other securities and how such shares, notes, bonds and/or other securities are held. In embodiments, the records may be obtained by one or more of the following: the owner of the asset in certificate form, by the company in book-entry form, and/or by the owner's brokerage firm in street name, to name a few. In embodiments, Transfer Agents maintain records of indicating, for each entity the transfer agent(s) represent, an amount of shares of the fund, secured notes, fiat, bonds and/or other securities each entity owns and/or utilized in part or in whole to facilitate the creation, transfer, or elimination of shares of the fund, secured notes, bonds and/or other securities.

The fund, in embodiments, may be a fund where the shares of the fund are backed by securities collateralized by precious metals. For example, the shares of the fund may be backed by secured notes (e.g. secured notes or other debt securities) collateralized by gold held in vault 112. In embodiments, the securities may be secured notes backed by one or more precious metals. The fund, in embodiments, may be a fund where the shares of the fund are backed by precious metals and securities collateralized by precious metals. The combination of precious metals and securities collateralized by precious metals may adhere (e.g., in accordance with one or more diversifications rules) to a predetermined breakdown. For example, the predetermined breakdown may be one or more of the following: (1) 49% precious metal, 51% securities collateralized by precious metal; (2) 25% precious metal, 75% securities collateralized by precious metal; (3) 5% precious metal, 95% securities collateralized by precious metal; and/or (4) less than 50% precious metal, greater than 50% securities collateralized by precious metal, to name a few. In embodiments, the fund may include shares backed by (and/or purchased in exchange for) one or more of the following: securities collateralized by precious metals, precious metals, fiat, securities associated with precious metals (e.g., futures, convertible futures, to name a few), and/or a combination thereof, to name a few. In embodiments, as used throughout this disclosure, secured notes may refer to securities constituted in the form of any precious metal backed security that is secured, collateralized, linked to, or backed by precious metals. For example, secured notes could be constituted in the form of secured gold-linked securities, gold-linked certificates or gold receipts, to name a few; the scope of the term secured note as used through the present disclosure is not intended to be limited to securities the name of which includes the term note. In embodiments, as used throughout this disclosure, gold can include gold bullion such as Commodity Exchange, Inc. (COMEX) gold bars and/or London Good Delivery gold bars that are individually identified and tracked, and/or gold receipts representing an interest in an unallocated amount of physical gold. For exemplary purposes, below is a table describing exemplary responsibilities for the system for operating a fund. In embodiments, the fund may include shares backed by securities tracking the price of one or more of a set of precious metals, any other security, fiat, and/or precious metals to name a few.

TABLE 1

Example Responsibilities for System in Accordance with One Or More Embodiments

| Entity or System | Responsibility |
|---|---|
| Administrator of the Fund | Shares of the Fund |
| Administrator of the Issuers | The Issuers and Diversification Thereof |
| Issuers of Secured Notes | Creating and Redeeming Secured Notes for the Fund |
| Brokers | Acting as an Intermediary Between the Administrator(s) (i.e., Administrator of the Fund and/or Administrator of the Issuers) and the Authorized Participants and/or Market Makers |
| Authorized Participants | Requesting In-Kind Creation and Redemption of Shares of the Fund |
| Market Markers | Requesting In-Kind Creation and Redemption of Shares of the Fund through one or more Authorized Participants |

TABLE 1-continued

Example Responsibilities for System in Accordance with One Or More Embodiments

| Entity or System | Responsibility |
|---|---|
| Authorized Applicants | Requesting In-Kind Creation and Redemption of Secured Notes |
| Vault(s) | Holding Precious Metal Backing the Secured Notes |
| Administrator(s) of the Vault(s) | The Vault(s) |
| Custodial System(s) | Holding Shares in Custody for the Fund and/or Holding Secured Notes in Custody for the Fund |
| Share Transfer Agents | Record keeping of shares of the Fund including, share transfers, share elimination, and/or share creation |
| Secured Note Transfer Agents | Record keeping of secured notes including secured note transfers, secured note issuance, and/or secured note redemption |
| Precious Metals Transfer Agent | Record keeping of precious metals including precious metals transfer, deposit and/or withdrawal |

The administrator of the fund (e.g. administrator system 104) and/or the administrator of the issuers (e.g. secured note issuer administrator system 102) (collectively "Administrator"), in embodiments, may: (1) manage one or more funds (as illustrated in connection with FIGS. 1E-1, 1E-2, and 1E-3); (2) oversee issuers of secured notes for the one or more funds; (3) record deposits and/or withdrawals of precious metal in exchange for secured notes; (4) receive, process and/or execute orders and/or requests from authorized participants; (5) communicate with a custodial system; and/or (6) communicate with a vault via a vault administrator. In embodiments multiple vaults may be used and the administrator may be in contact with a vault administrator associated with each of the vaults. In embodiments, the one or more funds may be diversified by the Administrator at least in part by adhering to sets of rules (e.g. diversification rules) in accordance with one or more diversification algorithms. The sets of rules, for example may account for insurance limits and/or logistical limits (e.g. geographical limitations, security limitations, technological limitations, and/or a combination thereof, to name a few), to name a few. The diversification of the fund, in embodiments, may prevent an issuer from issuing too many/few secured notes and/or prevent an issuer from issuing too many/few secured notes collateralized by precious metals in specific vaults. The diversification rules and/or diversification algorithms may be adhered to by the Administrator, in embodiments, by updating and storing diversification information associated with the fund and/or issuers. The diversification information, in embodiments, may be updated when one or more of the following occurs: issuers are on-boarded; issuers are off-boarded; shares are created; shares are purchased; and/or shares are redeemed, to name a few. The diversification rules and/or diversification algorithms, in embodiments, may be registered and/or published by the Administrator. For example, when the fund is created, the Administrator may publish its diversification information. As another example, the Administrator may publish its diversification rules when diversification information is updated in accordance with diversification rules and/or diversification algorithms.

In embodiments, a fund may be formed by creating shares for authorized participants ("APs") and on-boarding issuers of secured notes enabling the purchase of shares backed by said secured notes. In embodiments, shares may be created (which is described in more detail below in connection with FIGS. 2A-2D, the description of which applying herein) when an authorized participant (e.g. an authorized participant associated with an authorized participant device(s) 106) ("AP") places an order with the Administrator. The order, which may be verified, registered, and/or confirmed by the Administrator upon receipt, may be an order to create a first amount of shares (e.g. shares in the fund) for a second amount of precious metal (e.g. gold, silver, platinum, to name a few).

In embodiments, upon receipt of the verified, registered and/or confirmed order, the Administrator may generate and send a message to the AP requesting that the AP deposit the second amount of precious metal into one or more specific accounts at the vault(s). In embodiments, the message may include settlement instructions which may include vault deposit account information associated with the fund. The deposit may be confirmed by the vault administrator sending a confirmation message to the Administrator which confirms the deposit of the second amount of precious metal. The confirmed deposit, in embodiments, may be registered by the Administrator 102/104, noting that the second amount of precious metal is associated with the AP.

To enable the issuers to issue secured notes backed by the second amount of precious metal in accordance with the diversification rules, the Administrator 102/104, in embodiments, may diversify the deposit of the second amount of precious metal among one or more issuers of the secured notes. To account for the second amount of precious metal, the Administrator, in embodiments, updates its diversification information to include the deposit of the second amount of precious metal. The updated diversification information may be used, in part or in whole, to generate settlement instructions for the vault administrator. The settlement instructions, in embodiments, may diversify the deposit of the second amount of precious metal to prevent any one issuer of a plurality of issuers of secured notes for the fund from issuing too many and/or issuing too few secured notes. Because, in this example, the secured notes are backed (i.e., secured) by precious metal, if the second amount of precious metal is not divided up in accordance with the Administrator's diversification rules and/or algorithms, one or more issuers may be able to issue too many and/or issue too few secured notes and/or issue too many/few secured notes collateralized by precious metals in specific vaults. The generated diversification instructions, in embodiments, may be sent to one or more vault administrators, which may execute the instructions and send confirmation of the executed instructions to the Administrator 102/104. The Administrator 102/104 may register the new deposits made as a result of the settlement instructions, accounting for the portion or portions of the second amount of precious metal deposited in one or more vault issuer accounts (vault issuer accounts, may be associated with one or more issuer accounts held with custody system 114). In embodiments, the new deposits may be made at the vault using accounts held at custodial system 114.

In embodiments, the settlement instructions may account for the diversification of multiple types of precious metal. For example, the settlement instructions may include instructions to transfer a portion of a third amount of precious of a first precious metal (e.g., gold) and a portion of a fourth amount of a second precious metal (e.g., silver) to one or more accounts (e.g., a first set of custody accounts) in accordance with the updated diversification information (and/or the order diversification information)

Once the second amount of precious metal has been deposited into one or more vault accounts, the Administrator 102/104, in embodiments, may generate secured note specifications in accordance with the diversification rules and/or algorithms. The secured note specifications, in embodiments, may be used to create secured notes backed by the second amount of precious metal. To create secured notes backed by the second amount of precious metal, in embodiments, the Administrator may generate a creation request including the generated secured note specifications. The generated creation request, in embodiments, may be sent to the issuers for authorization to create the secured notes. The authorization, in embodiments, may be received by the Administrator, from one or more of the issuers, in response to the creation request.

In embodiments, notes may be secured by a specific deposit of a precious metal, for example, specific bullion. In embodiments, notes or groups of notes may be secured by multiple specific deposits of precious metal, for example groups of specific bullion. In embodiments, notes may be secured by one or more precious metal accounts; precious metals accounts may be of the allocated or unallocated kind to name a few. In embodiments, the precious metal associated with one or more precious metal accounts, a specific precious metal deposit or a group of precious metal deposits may in embodiments be defined as fungible. Precious metals defined as fungible may be switched as collateral of the notes without affecting the notes' value or in any way invalidating or modifying the notes.

With the authorization to create the new secured notes, in embodiments, the Administrator may create the new secured notes in each respective fund issuer account and register the second amount of precious metal as "pledged"—which may indicate that the second amount of precious metal is being utilized to collateralize secured notes. Once created, the new secured notes may be transferred from each of the respective fund issuer accounts into a fund AP account associated with the AP who placed the order. The new secured notes, in embodiments, may be requested to be transferred, by the Administrator from the fund AP account to the fund Administrator account. In return, the Administrator may transfer the first amount of shares from the fund Administrator account to the fund AP account. In embodiments, the first amount of shares may be created when the Administrator receives authorization to create the secured notes that will back the first amount of shares. In embodiments, the first amount of shares may be created when the Administrator receives the secured notes backing the first amount of shares.

The secured notes, in embodiments, may be issued by one or more on-boarded issuers. In embodiments, an issuer may be on-boarded (which is described in more detail below in connection with FIGS. 3A-3C, the description of which applying herein) by registering with the Administrator. Once the Administrator receives a registration request from an issuer, in embodiments, the Administrator may instruct the issuer to create an account with one or more vaults (or provide the issuer's vault account information if the issuer has already created one or more vault accounts) and provide secured note registration information. The issuer, if it has not already done so, may, in embodiments, create an account with one or more vaults (e.g. vault 112) through one or more administrators of the vault(s) (e.g., vault administrator system 110). In embodiments, the issuer may have accounts in multiple vaults and may spread deposits among the multiple vaults.

In embodiments, the issuer may generate one or more messages including the issuer's vault account information and secured note registration information. The generated one or more messages may, in embodiments, be sent by a device associated with the issuer to the Administrator. During the on-boarding process, in embodiments, the Administrator may be updating its diversification information in accordance with one or more diversification rules and/or diversification algorithms. The Administrator, by updating its diversification information in accordance with its diversification rules, and/or algorithms, may prevent an issuer from issuing too few/many secured notes and/or prevent an issuer from issuing too few/many secured notes collateralized by precious metals in specific vaults. Once on-boarded, in embodiments, the issuer may issuer secured notes for the fund.

Continuing the above example, the AP may, in embodiments, want to redeem the first amount of shares for the second amount of precious metal. In embodiments, shares may be redeemed (which is described in more detail below in connection with FIGS. 5A-5D, the description of which applying herein) by the AP placing a second order with the Administrator. The second order, which may be verified, registered, and/or confirmed by the Administrator upon receipt, may be an order to redeem the first amount of shares for the second amount of precious metal.

In embodiments, upon receipt of the verified, registered and/or confirmed second order, the Administrator may generate secured note specifications associated with the first amount of shares in accordance with the diversification rules and/or algorithms. The secured note specifications, in embodiments, may be used to redeem the secured notes associated with the first amount of shares. Utilizing a portion or all of the secured note specifications, the Administrator may identify secured notes backing the first amount of shares for transfer from the fund Administrator account to the fund AP account. The Administrator, in embodiments, may then generate a redemption request including the secured note specifications to identify the relevant secured notes. The redemption request, which may include the generated secured note specifications, may be sent to the issuers for authorization to redeem the appropriate secured notes associated with the first amount of shares. The authorization, in embodiments, may be received by the Administrator, from one or more of the issuers, in response to the redemption request. In embodiments, the Administrator may not need authorization to redeem the secured notes associated with the first amount of shares and, alternative to requesting authorization, the Administrator may send a notification of redemption, including the secured note specifications, to the issuers.

The Administrator, in embodiments, may transfer the secured notes associated with the first amount of shares from the fund Administrator account, into respective fund issuer account(s). Once the secured notes are transferred into respective fund issuer account(s), in embodiments, the Administrator may register the second amount of precious metal as "non-pledged"—which may indicate that the second amount of precious metal is not being utilized to collateralize secured notes.

The second amount of precious metal—now "non-pledged"—in embodiments, may be transferred from the respective issuer vault accounts to the AP vault account. To effectuate the transfer, in embodiments, the Administrator may generate transfer instructions to transfer the second amount of precious metal from the respective issuer vault accounts to the AP vault account. The generated transfer instructions, in embodiments, may be sent from the Administrator, via the administrator computer system, to one or more vault administrators via the associated vault administrator computer system(s), resulting in the vault administrator(s) or vault administrator computer system(s) executing the transfer instructions. The transfer may be confirmed by the vault administrator(s) or vault administrator computer system(s) sending a confirmation message to the Administrator or administrator computer system that confirms the transfer of the second amount of precious metal to the vault AP account. The confirmed transfer, in embodiments, may be registered by the Administrator, noting that the second amount of precious metal has been withdrawn from the respective note issuer accounts.

The Administrator, in embodiments, may complete the redemption of the first amount of shares by generating a request to delete the first amount of shares. The generated request may be sent to a custodial system—which holds the shares of the fund in custody. In response to receiving the request, the custodial system may delete the first amount of shares and send a confirmation message to the Administrator or administrator computer system confirming the deletion of the first amount of shares.

An issuer, in embodiments, may want to be off-boarded or removed from its relationship with the fund. In embodiments, an issuer may be off-boarded (which is described in more detail below in connection with FIG. 4A through FIG. 4B, the description of which applying herein) by sending a request to the Administrator or administrator computer system. The request, in embodiments, may be to de-register as an issuer from the fund.

The request, which may be verified and/or confirmed, may cause the Administrator to determine how to redistribute the secured notes and precious metal in accordance with the diversification rules and/or algorithms. In embodiments, the Administrator may determine a secured note balance associated with the issuer and/or a precious metal balance associated with the issuer. The secured note balance and/or precious metal balance may be redistributed among the remaining issuers in accordance with the diversification rules and/or algorithms by the Administrator. In accordance with the diversification rules and/or algorithms, the Administrator may generate redistribution requirements for the secured note balance and/or precious metal balance. The Administrator, in embodiments, may update and/or publish its diversification information, accounting for the impending off-boarding of the issuer.

The redistribution requirements, in embodiments, may be used, in-part or in-whole, by the Administrator to transfer the secured note balance associated with the issuer to one or more remaining issuer accounts in accordance with the diversification rules and/or algorithms. Furthermore, the redistribution requirements, in embodiments, may be used, in-part or in-whole, by the Administrator to generate transfer instructions to transfer the precious metal balance associated with the issuer to one or more remaining issuer vault accounts in accordance with the diversification rules and/or algorithms. In embodiments, as discussed below in connection with FIG. 2A through FIG. 2E and FIG. 5A through FIG. 5E (the descriptions of which applying herein), the redistribution requirements may be used, in-part or in-whole by the Administrator to generate transfer instructions to transfer a precious metal balance associated with the issuer (and/or Authorized Applicant, Authorized Participant, Broker, and/or Market Maker) to one or more vault account{s} associated with one of the other parties (e.g., vault accounts associated with one or more of the following the Issuer, Authorized Applicant, Authorized Participant, Broker, and/or Market Maker) in accordance with the diversification rules and/or algorithms.

To effectuate the transfer of the precious metal balance, in embodiments, the transfer instructions may be sent to the vault administrator, resulting in the vault administrator executing the transfer instructions. The transfer may be confirmed by the vault administrator sending a confirmation message to the Administrator that confirms the transfer of the precious metal balance associated with the issuer to one or more remaining issuer vault accounts. The confirmed transfer, in embodiments, may be registered by the Administrator, noting that the redistributed balance of precious metals is "pledged" for each respective issuer fund account.

Fund System

Figures 1, 1A, 2:
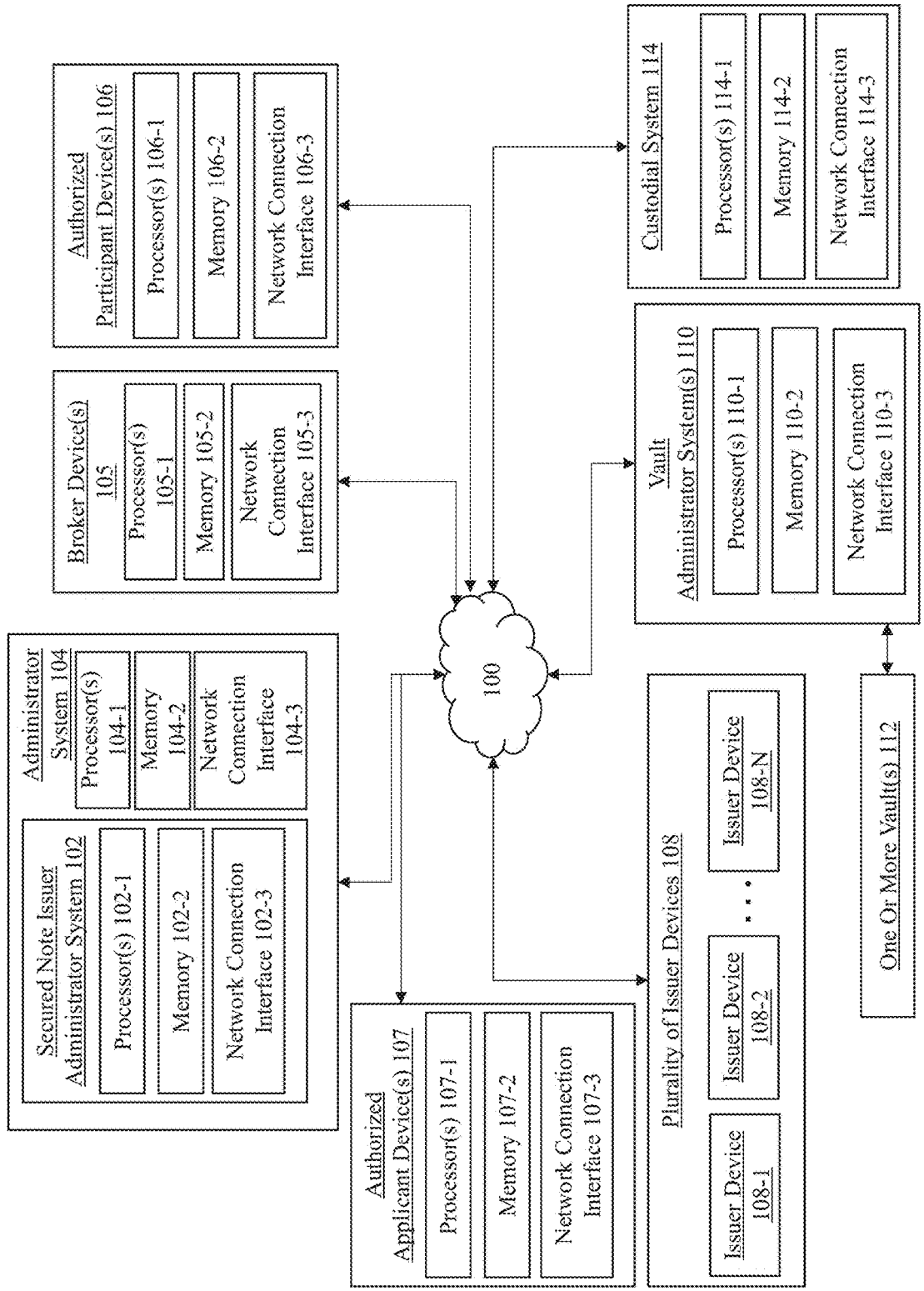

Referring to FIG. 1A-1, in embodiments, a system for operating an ETF may include: a secured note issuer administrator system 102, an administrator system 104, one or more broker device(s) 105, one or more authorized participant device(s) 106, authorized applicant device(s) 107, a plurality of issuer systems 108, a vault administrator system 110 associated with a vault 112, and/or a custodial system 114, to name a few. In embodiments, the secured note issuer administrator system 102, administrator system 104, one or more authorized participant devices 106, one or more authorized applicant devices 107, plurality of issuer systems 108, vault administrator system 110 and/or custodial system 114 may communicate via network 100. In embodiments, multiple vaults 112 may be used in which case multiple vault administrator systems may communicate via network 100. In embodiments, as shown in FIG. 1A-2, the administrator system 104 may include the secured note issuer administrator system 102. In embodiments, as shown in FIG. 1A-3, the secured note issuer administrator system 102 may include the administrator system. In embodiments, more than one custodian system 114 may be used and may communicate via the network 100. In embodiments, a custodian system 114 may be used to hold ETF shares while another custodian system 114 may be used to hold secured notes associated with the ETF.

In embodiments, one or more of the plurality of issuers may include one or more affiliated entities. For example, one or more affiliated entities related with each secured note issuer of the plurality of issuers. In another example, affiliated entities are related to groups of secured note issuers and the groups may be non-overlapping. In embodiments the one or more affiliated entities may be responsible for establishing, maintaining, promoting, marketing, and/or administering the issuers (e.g., in combination with and/or instead of the secured note issuer administrator system 102). In some embodiments which an affiliated entity related to an issuer is performing responsibilities such as (but not limited to) establishing, maintaining and/or administering the issuers, the respective issuer system (and/or plurality of issuer systems 108) may be understood to mean the affiliated entities computer system (and/or plurality of affiliated entities computer system).

The secured note issuer administrator system 102, administrator system 104, one or more authorized participant devices 106, plurality of issuer systems 108, vault administrator system(s) 110, and/or custodial system(s) 114, may, in embodiments, correspond to and/or operate or be embodied in any suitable type of electronic device including, but not limited to, desktop computers, mobile computers (e.g., laptops, ultrabooks), mobile phones, portable computing devices, such as smart phones, tablets and phablets, televisions, set top boxes, smart televisions, personal display devices, large scale display devices (e.g., billboards, street signs, etc.), personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), smart security systems, and/or smart accessories (e.g., light bulbs, light switches, electrical switches, etc.), to name a few. In some embodiments, the secured note issuer administrator system 102, administrator system 104, one or more authorized participant device(s) 106, authorized applicant device(s) 107, plurality of issuer systems 108, vault administrator system(s) 110, and/or custodial system(s) 114 may be relatively simple or basic in structure such that no, or a minimal number of, mechanical input option(s) (e.g., keyboard, mouse, track pad) or touch input(s) (e.g., touch screen, buttons) are included. For example, the secured note issuer administrator system 102 may be able to receive and output audio, and may include power, processing capabilities, storage/memory capabilities, and communication capabilities. However, in other embodiments, the secured note issuer administrator system 102, administrator system 104, one or more authorized participant devices 106, plurality of issuer systems 108, vault administrator system(s) 110, and/or custodial system(s) 114 may include one or more components for receiving mechanical inputs or touch inputs, such as a touch screen and/or one or more buttons.

In embodiments, the secured note issuer administrator system 102 may be an administrator of issuers of secured notes (e.g. issuers associated with the plurality of issuer systems 108). In embodiments, the secured note issuer administrator system 102 may include one or more processor(s) 102-1, memory 102-2 and/or network connection interface 102-3, to name a few. The one or more processor(s) 102-1 (hereinafter "processor 102") may include any suitable processing circuitry capable of controlling operations and functionality of the secured note issuer administrator system 102, as well as facilitating communications between various components within the secured note issuer administrator system 102. In some embodiments, the processor 102-1 may include a central processing unit ("CPU"), a graphic processing unit ("GPU"), one or more microprocessors, a digital signal processor, or any other type of processor, or any combination thereof. In some embodiments, the functionality of the processor 102-1 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each processing unit may include its own local memory, which may store program systems, program data, and/or one or more operating systems. However, the processor 102-1 may run an operating system ("OS") for the secured note issuer administrator system 102, and/or one or more firmware applications, media applications, and/or applications resident thereon. In some embodiments, the processor 102-1 may run a local client script for reading and rendering content received from one or more websites. For example, the processor 102-1 may run a local JavaScript client for rendering HTML or XHTML content received from a particular URL accessed by the secured note issuer administrator system 102.

As noted above, the secured note issuer administrator system 102 may include memory 102-2. Memory 102-2 may include one or more types of storage mediums such as any volatile or non-volatile memory, or any removable or non-removable memory implemented in any suitable manner to store data for the secured note issuer administrator system 102. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 102-2 may be implemented as computer-readable storage media ("CRSM"), which may be any available physical media accessible by the processor 102-1 to execute one or more instructions stored within memory 102-2. In some embodiments, one or more applications may be run by the processor 102-1, and may be stored in memory 102-2.

The secured note issuer administrator system 102, in embodiments, may utilize its network connection interface 102-3 to communicate over network 100.

Figures 1, 1A, 2, 3:
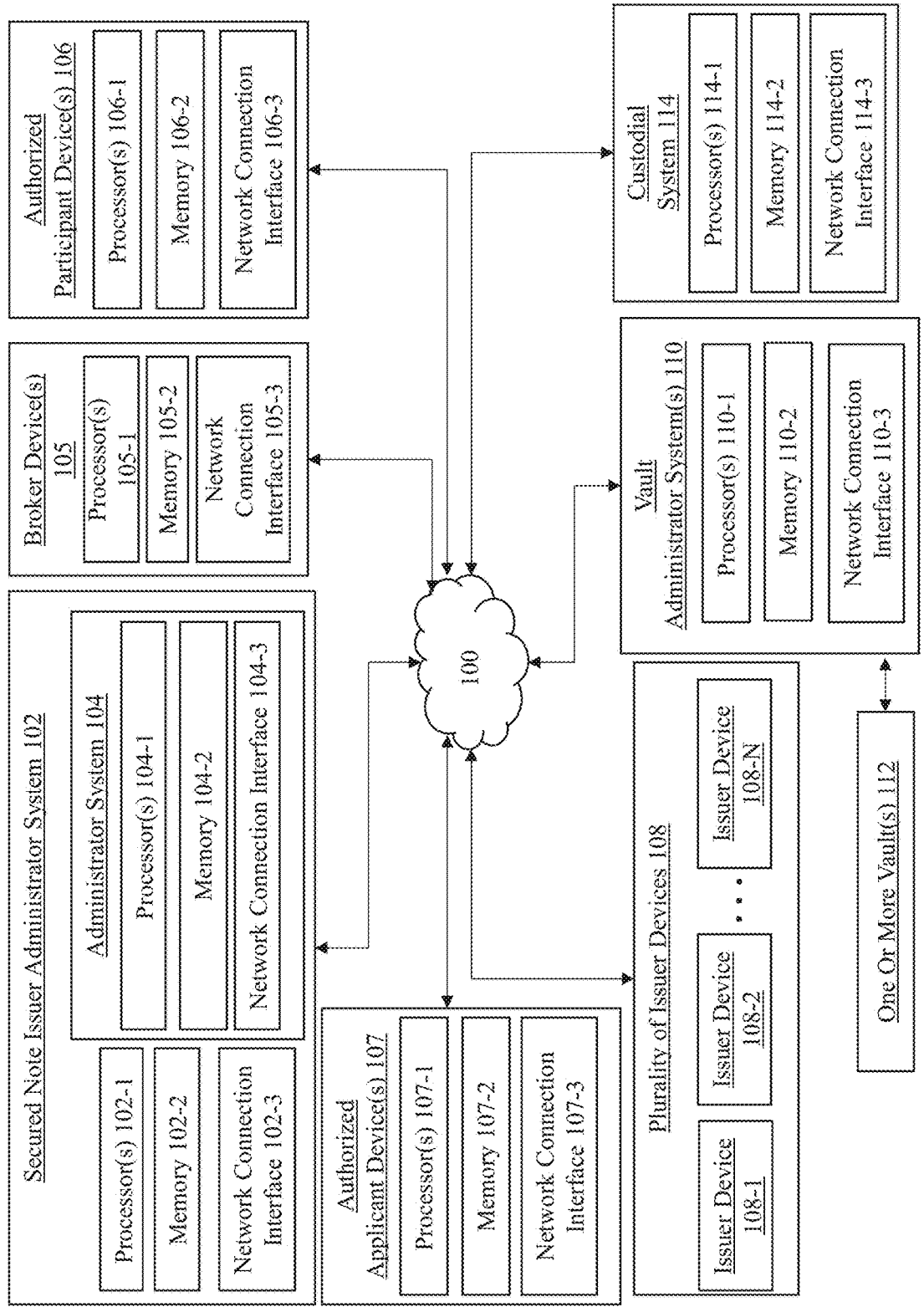
Figures 1, 1B, 2:
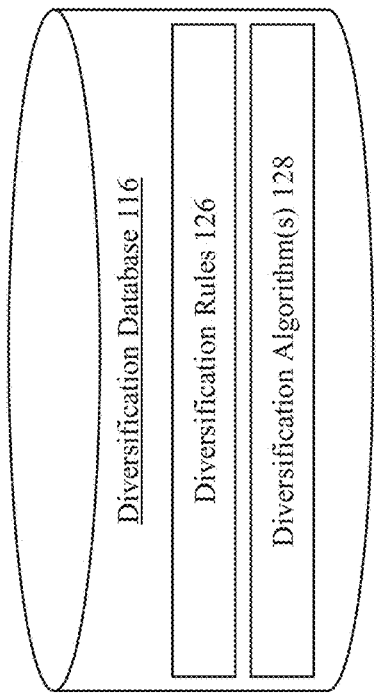
Figures 1, 1B, 2, 3:
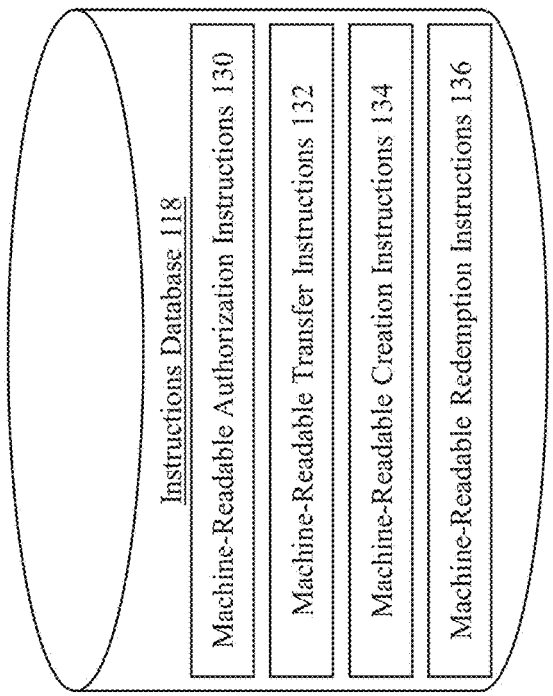
Figures 1, 1B:
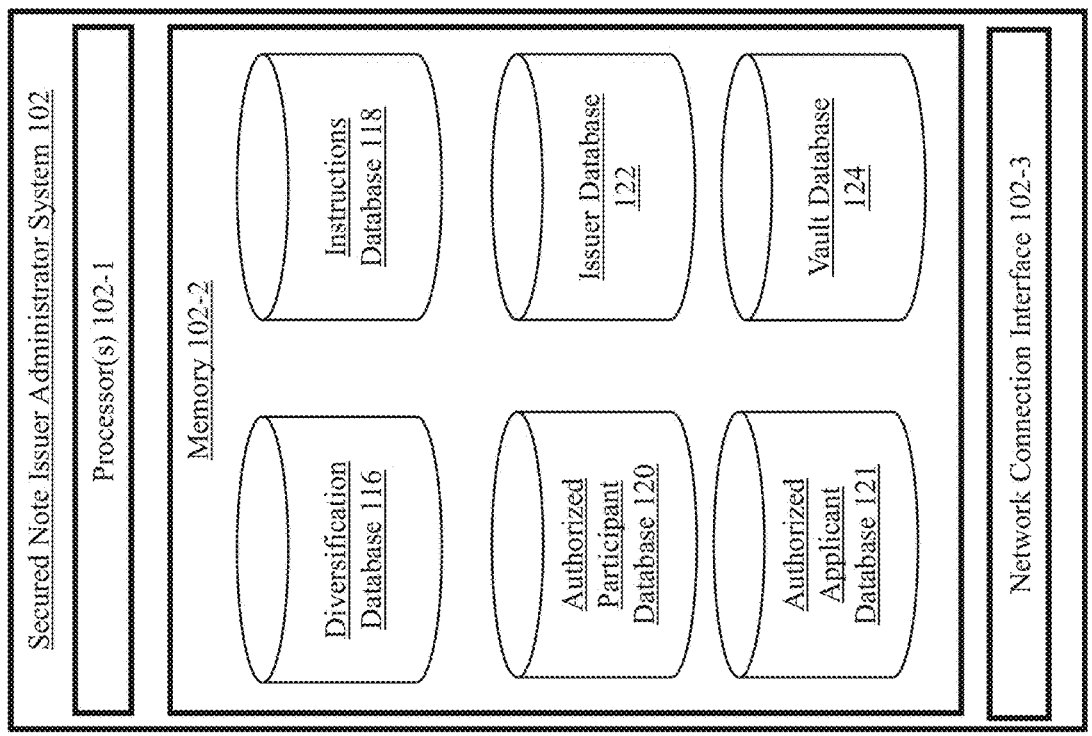

Referring to FIG. 1B-1, the secured note issuer administrator system 102, in embodiments, may include processor(s) 102-1, memory 102-2, and/or network connection interface 102-3. In embodiments, memory 102-2 may include one or more of the following: diversification database 116, instructions database 118, authorized participant database 120, broker database, authorized applicant database 121, issuer database 122, and/or vault database 124, to name a few. Each of the descriptions of the data fields stored (e.g., account information 138, Account information 144, broker account information, to name a few) may be similar, the descriptions of each applying herein.

Figures 1, 1B, 2, 3, 4, 5, 6:
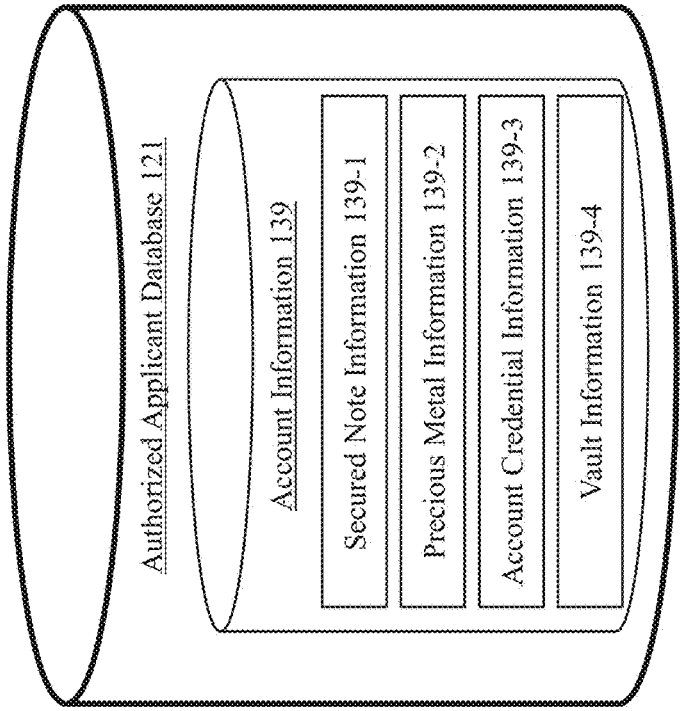
Figures 1, 1B, 2, 3, 4, 5, 6, 7:
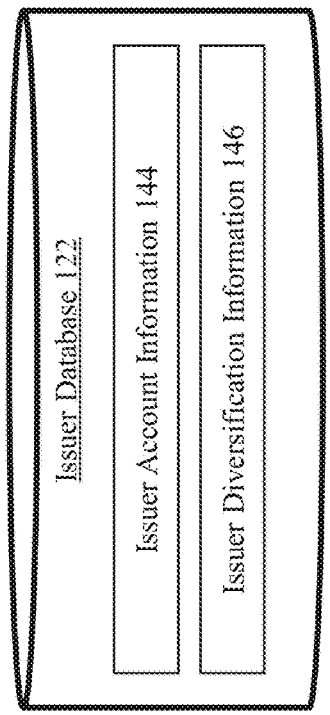
Figures 1, 1B, 2, 3, 4:
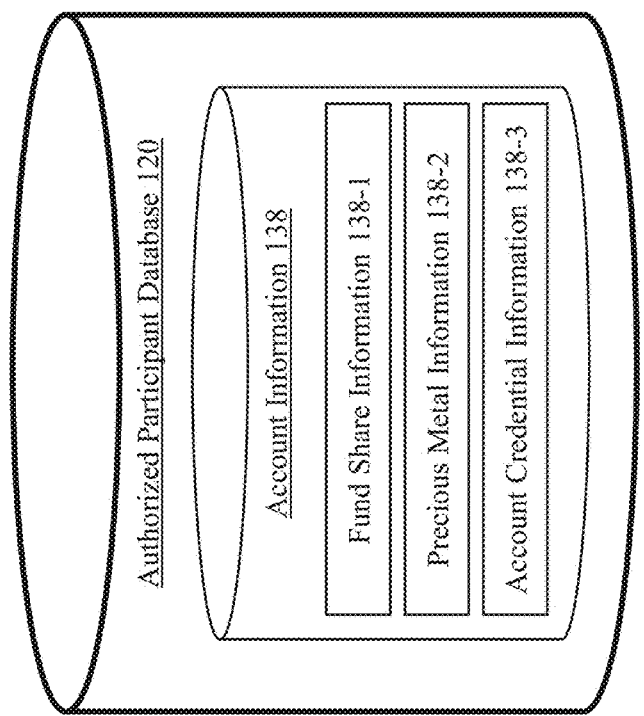
Figures 1, 1B, 2, 3, 4, 5:
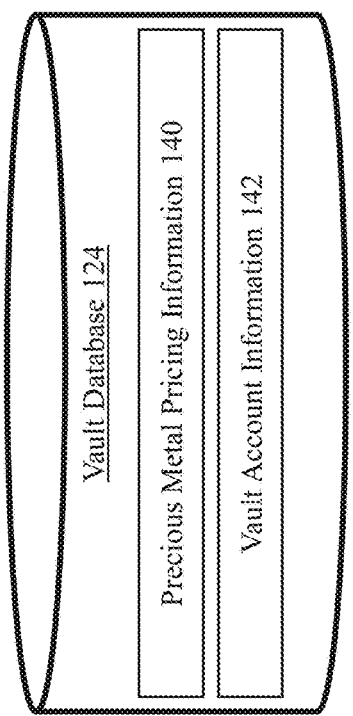
Figure 1D:
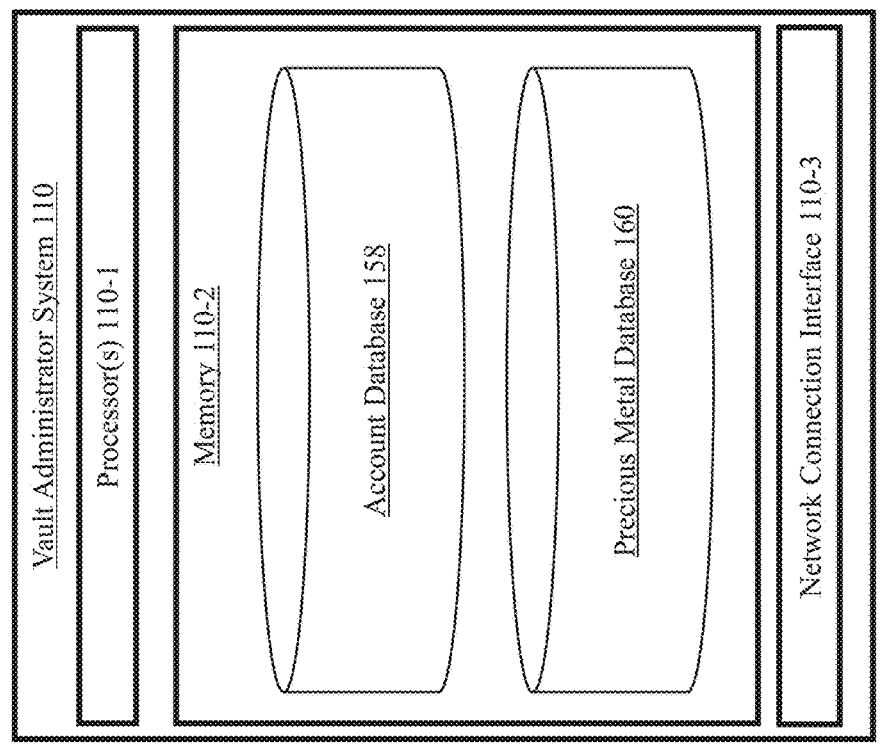
FIG. 1D is a block diagram of an exemplary vault administrator system in accordance with exemplary embodiments of the present invention.
Figure 1C:
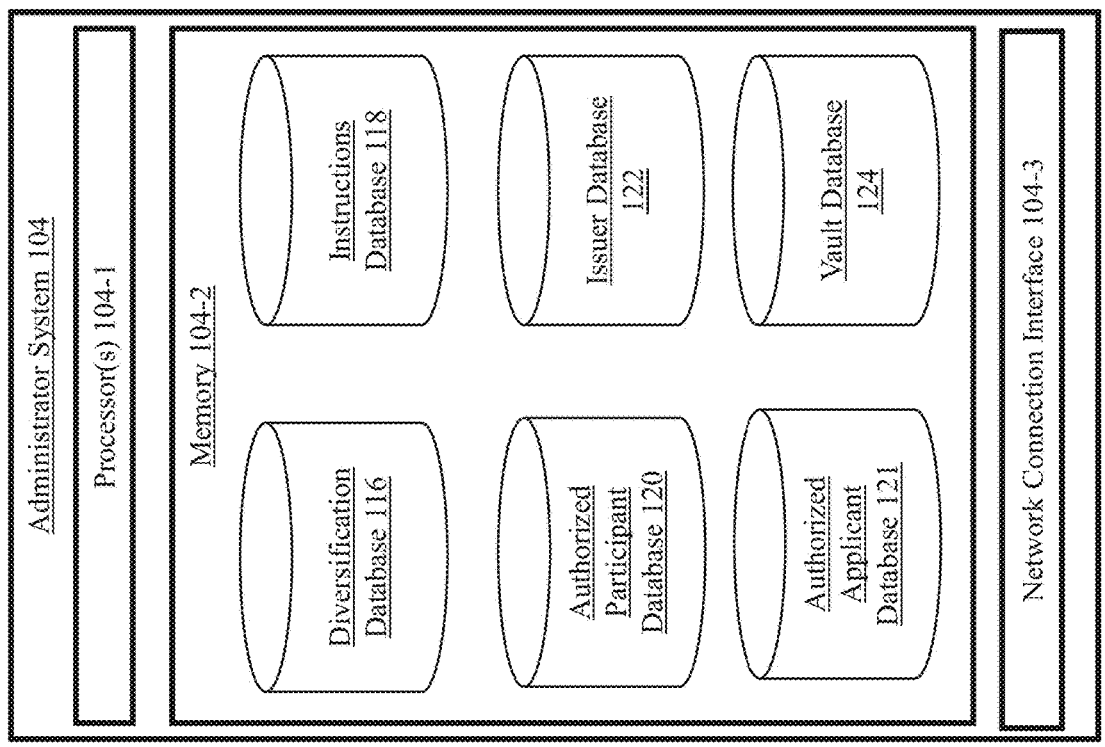
FIG. 1C is a block diagram of an exemplary administrator system in accordance with exemplary embodiments of the present invention.

In embodiments, as shown in FIG. 1C, memory 104-2 of administrator system 104 may include one or more of the following: diversification database 116, instructions database 118, authorized participant database 120, authorized applicant database 121, issuer database 122, and/or vault database 124, to name a few.

Referring to FIG. 1B-2, the diversification database 116 may include one or more of the following: diversification rules 126, and/or diversification algorithms 128, to name a few.

The diversification rules 126, in embodiments, may be rules and/or sets of rules that are designed for the diversification of the fund, the shares of the fund, secured notes, and/or issuers of the secured notes. In embodiments, the diversification rules may limit the amount of secured notes an issuer may issue and/or the amount of secured notes an issuer may issue that are collateralized by precious metals in specific vaults. The limitation, in embodiments, may be expressed in the form of a percentage and/or number. For example, the diversification rules 126 may limit an issuer's percentage of secured notes to 25%. In other words, continuing the example, any one issuer of a plurality of issuers may not be able to issue more than 25% of the secured notes backing the shares of the fund. As another example, the diversification rules 126 may limit an issuer's number of secured notes to 100 secured notes—limiting the amount of secured notes any one issuer can issue to 100 secured notes. As another example, the diversification rules 126 may limit an issuer's amount of secured notes collateralized by precious metals in any single vault 112 to $1 billion USD—limiting the U.S. dollar value of precious metals in the vault 112 that the issuer can use to secured notes issued by it to $1 billion USD. The diversification rules 126, in embodiments, may provide a floor, requiring any one issuer to issue a minimum percentage and/or number of secured notes. In embodiments, the diversification rules 126 may provide a range or ranges including a floor and a ceiling (e.g. a lower and upper threshold). In embodiments, the diversification rules 126 may account for one or more factors associated with the plurality of issuers. For example, the diversification rules 126 may account for, and the diversification of the fund may be based on, one or more of the following for each issuer of the plurality of issuers: a tangible common equity ratio associated with the respective issuer (and/or as compared to one or more of the plurality of issuers); a tangible common equity ratio associated with one or more owners or sponsors of the respective issuer; a capitalization rate associated with the respective issuer (and/or as compared to one or more of the plurality of issuers); a capitalization rate associated with one or more owners or sponsors of the respective issuer; a current portfolio of assets corresponding to the fund associated with the respective issuer (and/or as compared to one or more of the plurality of issuers); a current portfolio of assets associated with one or more owners or sponsors of the respective issuer; a country of origin associated with the respective issuer (and/or as compared to one or more of the plurality of issuers); a country of origin associated with one or more owners or sponsors of the respective issuer; a credit quality associated with the respective issuer (and/or as compared to one or more of the plurality of issuers); a credit quality associated with one or more owners or sponsors of the respective issuer; a credit score associated with the respective issuer (and/or as compared to one or more of the plurality of issuers); a credit score associated with one or more owners or sponsors of the respective issuer; owner and/or sponsor information (e.g., information sufficient to identify the owner and/or sponsor of the respective issuer) associated with the respective issuer (and/or as compared to one or more of the plurality of issuers); duration remaining associated with secured notes associated with the issuer; maturity dates of the secured notes associated with the issuers; and/or a combination thereof. The diversification rules 126, in embodiments, may account for one or more factors associated with the notes of the plurality of issuers. In embodiments, the diversification rules 126 may account for (and/or the diversification of the fund may be based on) one or more factors, such as the different maturities of the secured notes issued by the plurality of issuers. In embodiments, the one or more factors may include one or more of the following: a maturity of the secured notes; a potential cost (e.g., discount) of the secured notes (e.g., as compared to one or more second secured notes issued by a different fund); a credit rating of the secured note; a credit rating of a note issuance program associated with the secured notes; approximate denomination of the secured note (e.g., 1/10th of an ounce of precious metal vs. 1/100th of an ounce of precious metal); an amount of tranches issued for one or more subsets of the secured notes; an average cost bases of the precious metals backing the secured notes; a specific cost bases of the precious metals backing the secured notes; and/or a combination thereof, to name a few. In embodiments, the diversification rules 126 may account for one or more factors (e.g., similar to the factors described above with regards to the plurality of issuers and associated secured notes) associated with one or more of the following: the plurality of issuers, one or more of the secured notes associated with the plurality of issuers, the entity (e.g., AP, Broker, MM, AA, Transfer Agent) associated with the order, the Administrator 102/104, the custodian(s) associated with the order, the vault(s) associated with the order, and/or a combination thereof.

In embodiments, the factors described above may be analyzed (e.g., by the Administrator System 104, the Secured Note Administrator System 102). The analysis of the factors, in embodiments, may cause the Administrator 102/104 to accept secured notes (e.g., as part of an order), decline secured notes (e.g., as part of an order), and/or update the diversification information (e.g., with regards to secured notes from the secondary market, with regards to note issuance instructions, and/or with regards to secured note redemption instructions, to name a few), to name a few. For example, the diversification rules 126 may limit the maturity date for incoming secured notes from secondary sources such that secured notes with a maturity date outside a predetermined range (and/or beyond a threshold, within a threshold, to name a few) are declined by the Administrator 102/104.

Diversification algorithms 128, in embodiments, may include one or more diversification algorithms. A diversification algorithm, for example, may be designed such that each issuer maintains a percentage and/or amount of issued secured notes and/or amount of secured notes collateralized by precious metals in any specific vault. For exemplary purposes, an exemplary diversification formula is provided below:

$$\sum_{N=1}^{M}\sum_{k=1}^{V_N} D_{N,k}(A_N(G)) = G \quad \text{Equation 1: Exemplary Formula}$$

In embodiments, the diversification rules 126 may reflect a diversification algorithm (e.g., diversification algorithms 128) which applies a round robin type of diversification. In embodiments, a round robin based diversification algorithm may, for example, include or use one or more ordered lists of issuers (e.g., a master list including the plurality of issuers, one or more lists of issuers of the plurality of issuers, and/or a combination thereof) and/or an index of issuers into the list by one or more orders of issuers. In embodiments, the index may be a set of numbers corresponding to a set of issuers from the one or more ordered lists. In embodiments, the index may be updated by the Administrator 102/104 such that when a predetermined amount of index updates occur, the index may repeat the same sequence of sets of numbers it previously generated. In embodiments, for example, the sequence of sets of number used to allocate notes between issuers is periodic. For example, if there are five issuers numbered 1, 2, 3, 4, 5 and the set of numbers has only one number and the number is always increased until it reaches the end of the list of issuers and then restarts from the index of the first issuer, the sequence of set of numbers generated by the diversification algorithm will be [1], [2], [3], [4], [5], [1], [2], [3], [4], [5], [1], [2], [3], [4], [5] . . . . Continuing the example, this sequence may represent that a first order for shares is associated with issuer 1, the second order is associated with issuer 2, the third order is associated with issuer 3 and so forth. The round robin algorithm, in embodiments, may be combined with one or more weighting vectors such that the index is combined with or associated with the weighting vectors. For example, if the weighting vector is [0.25, 0.5, 0.25] and the index provides the number sequence [2,3,4] a quarter of the order goes to issuer 2, half of the order to issuer 3 and a quarter of the order to issuer 4. Exemplary pseudocode representing an exemplary diversification algorithm (e.g., diversification algorithms 128) in accordance with embodiments of the present invention is listed below under "Diversification Pseudocode Example."

| Diversification Pseudocode Example |
| --- |

```
import functools
import itertools
from operator import itemgetter, attrgetter
from typing import Dict, List, Optional
from entities import ETFOrder
from rule import StrictRule
"""
(c) Copyright 2020 SolidusLink AG
"""
class Diversification:
    """
    Diversification algorithm and helper functions implementing a dynamic
    diversification algorithm wherein the diversification rules consist of one
    or more strict rules.
    """
    @staticmethod
    def dynamic_diversification(strict_rules: List[StrictRule],
            creation_orders: List[ETFOrder],
            redemption_orders: List[ETFOrder],
            target_distribution: Dict[str, float],
            current_portfolio: Dict[str, int]):
        """
        Calculate how a set of creation and redemption orders can be
        distributed and potentially split among a set of issuers, given:
        1) the current portfolio
        2) a target distribution
        3) a set of rules that must hold true for the final portfolio.
        The algorithm makes a best effort order placement where the strict
        rule must be upheld and where the distribution deviation for all
        issuers should be fair on a relative basis.
        Orders are paired to issuers in the following way:
        - A list is created of all orders sorted from largest to smallest quantity
          (regardless of create or redeem).
        - The largest order is picked. If it is a creation order then assign it to
          the issuer having the largest 'undershoot' deviation from the target
          distribution taking all proposed orders so far into account and
          checking that such an assignment doesn't violate the strict rule max
          weighting. If it does violate the max weighting, try the next order
          in the sorted list of orders. If the order is a redeem order, pair it to
          the issuer with the largest 'overshoot' deviation from the target
          distribution.
        If there is no way to distribute orders to one issuer such that the strict
        rules are upheld, the largest order by quantity is split in two and the
        process is retried until a successful distribution has been achieved
        (with a max retry count).
        :param strict_rules: a set of strict rule to use when verifying
            diversification
        :param creation_orders: list of creation orders
        :param redemption_orders: list of redemption orders
        :param target_distribution: the target asset distribution
        :param current_portfolio: current portfolio of assets across all issuers
        :return: list of orders to be interpreted as settlement instructions
        """
        # create sorted lists of orders in decreasing quantity
        sorted_creation_orders = sorted(creation_orders,
            key=attrgetter('quantity'), reverse=True)
        sorted_redemption_orders = sorted(redemption_orders,
            key=attrgetter('quantity'), reverse=True)
        sorted_all_orders = sorted((sorted_creation_orders +
            sorted_redemption_orders), key=attrgetter('quantity'),
            reverse=True)
        # try max_retries times to assign orders to issuers in a way that either
        #   is validated by the diversification
        # rules or if not split one of the orders into two orders and retry
        max_retries: int = 99
        for retry_count in range(max_retries + 1):
            orders_per_issuer: Dict[str, List[ETFOrder]] = {name: [ ] for name
                in target_distribution.keys( )}
            # process all orders, from largest quantity to smallest quantity
            candidate_name: Optional[str] = None
            for order in sorted_all_orders:
                distribution_diff = { }
                projected_distribution: Dict[str, float] =
                    Diversification.get_projected_distribution(current_portfolio,
                        orders_per_issuer)
                # calculate diff between the distribution resulting from planned
                # orders and the target distribution (this assumes the target
                # distribution is valid according to the diversification rules)
                for issuer_name, issuer_weight in target_distribution.items( ):
                    distribution_diff[issuer_name] =
                        projected_distribution.get(issuer_name, 0) - issuer_weight
                # find a candidate issuer to use as follows:
                # * for buy orders, it's the issuer in the distribution_diff with the
                #   lowest value (it is far from the current distribution in an
                #   'undershoot' way)
                # * for sell order it's the issuer in the distribution_diff with the
                #   highest value
                candidates = [(k, v) for (k, v) in distribution_diff.items( )]
                candidates.sort(key=itemgetter(1))
                if order.get_order_kind( ) == 'buy':
                    candidate_name = candidates[0][0]
                elif order.get_order_kind( ) == 'sell':
                    candidate_name = candidates[-1][0]
                else:
                    raise Exception
                orders_per_issuer[candidate_name].append(order)
            # when the diversification rules are verified the iteration can stop
            if Diversification.verify_diversification_rules(strict_rules,
                    orders_per_issuer,
                    current_portfolio):
                break;
            # abort if there have been too many retries
            elif retry_count > max_retries:
                raise RuntimeError('too many retries')
            # diversification rules are not validated, try to split the largest order
            # by absolute size
            else:
                tmp_order = sorted_all_orders[0]
                sorted_all_orders = sorted_all_orders[1:]
                new_orders = tmp_order.split( )
                sorted_all_orders. append(new_orders[0])
                sorted_all_orders.append(new_orders[1])
                sorted_all_orders.sort(key=attrgetter('quantity'), reverse=True)
        # update current portfolio
        portfolio_diff: Dict[str, int] = dict( )
        for issuer_id in current_portfolio.keys( ):
            portfolio_diff[issuer_id] = 0
        for issuer_id, orders in orders_per_issuer.items( ):
            for order in orders:
                portfolio_diff[issuer_id] = portfolio_diff.get(issuer_id, 0) +
                    order.get_quantity_with_sign( )
        # flatten to a simple list
        updated_split_orders: List[ETFOrder] =
            list(itertools.chain.from_iterable(orders_per_issuer.values()))
        return portfolio_diff, updated_split_orders
    @staticmethod
    def verify_diversification_rules(strict_rules: List[StrictRule],
            orders_per_issuer: Dict[str, List[ETFOrder]],
            current_portfolio: Dict[str, int]) -> bool:
        """
        Verify diversification rules are upheld by joining current portfolio
        with a map of additional quantities verifying resulting distribution of
        assets with the diversification rules.
        :param current_portfolio: current portfolio
        :param strict_rules: strict rules to use when verifying the
            diversification. Rules are potentially wide ranging, and could
            include, but are not limited to, verifying implications such as:
            ensuring that the insurance limits of a specific vault are not
            exceeded, ensuring that no more than a certain quantity of metal is
            stored in a certain jurisdiction, or ensuring that no less than a
            certain percentage of the portfolio are held through a specific
            issuer or set of issuers.
        :param orders_per_issuer: list of orders per issuer
        :return: True if the distribution of current_portfolio and
            issuer_quantities combined is verified by the diversification rules,
            otherwise False.
        """
        # sum current portfolio with issuer quantities
        proposed_additional_portfolio: Dict[str, int] =
            ETFOrder.sum_groups_net(orders_per_issuer)
        portfolio_to_verify = {name: value for (name, value) in
            current_portfolio.items( )}
        for name, value in proposed_additional_portfolio.items( ):
            portfolio_to_verify[name] = current_portfolio.get(name, 0) + value
        # verify the strict rule, more rule verification may be added here.
```

| Diversification Pseudocode Example |
| --- |
| ```
    return functools.reduce(lambda a, b: a and b,
            [strict_rule.verify(portfolio_to_verify) for strict_rule
                in strict_rules])
@staticmethod
def get_projected_distribution(current_portfolio: Dict[str, int], orders:
        Dict) -> Dict:
    """
    Calculate projected distribution after orders are applied to current
    portfolio
    :param current_portfolio: current portfolio
    :param orders: list of orders that will change the portfolio
    :return: projected distribution after orders applied to current portfolio
    """
    _changes = { }
    for order_id, order in orders.items( ):
        _changes[order_id] = ETFOrder.sum_net(order)
    total: int = Diversification.get_portfolio_sum(current_portfolio)
    for v in _changes.values( ):
        total += v
    # if there is no total at all
    if abs(total) < 0.00005:
        return {name: 0.0 for (name, q) in current_portfolio.items( )}
    else:
        return {name: (q + _changes.get(name, 0)) / total for (name, q) in
            current_portfolio.items( )}
@staticmethod
def get_portfolio_sum(current_portfolio: Dict[str, int]) -> int:
    """
    Sum portfolio
    :param current_portfolio: current portfolio
    :return: sum of current portfolio
    """
    total: int = 0
    for name, q in current_portfolio.items( ):
        total += q
    return total
``` |

In embodiments the diversification rules 126 and/or diversification algorithms 128 may be based on and/or generated by the secured note issuer administrator system 102 and/or the administrator system 104. In embodiments, the diversification rules 126 and/or diversification algorithms 128 may be based on one or more of the following: the number of issuers, the amount of precious metal associated with the fund shares, the amount of fund shares, the amount of secured notes, and/or the amount of authorized participants, to name a few. A person of ordinary skill understands that, due to the ever-changing landscape of statutes, regulations, issuers, precious metal (and the price(s) associated therewith), funds, and/or ETFs, a diversification algorithm may be revised, replaced, and/or be a part of an additional diversification algorithm.

In embodiments, an amount G of precious metals associated with an ETF share creation request may be diversified across N issuers using a diversification algorithm as follows.

Based on all or any of a) the current composition of the fund (that is, the relative holdings of assets from each issuer in the fund), b) a set of diversification rules (such as "the number of notes of any one issuer must not exceed 25% of the total of the fund"), c) a set of composition-change targets (for example to facilitate on-boarding or off-boarding of issuers or any other desired change of composition), d) historic trading volume in the primary market of the ETF, e) historic trading volume in the secondary market of the ETF, f) executed-yet-not-settled trades in the primary market of preceding trading days, a vector w of N weights (one for each issuer) is constructed using a diversification algorithm such that:

$$\sum_{j=1}^{N} w_j = 1 \qquad (i)$$

where $0 \leq w_j < 1$ (ii) $w_j \cdot G := I_j$ (the allotment of precious metals for the j-th of the N issuers)

In embodiments, each such issuer's allotment $I_j$ (deposit amount) may then be partitioned into a variable number $V_j$ of deposits of precious metal into different vaults that the j-th issuer has relations. In embodiments, the exact value $D_{N,k}$ of each deposit may depend on the preferences of the issuer. In embodiments, the exact value $D_{N,k}$ of each deposit may depend on the administrator computer system or the secured note issuer administrator computer system. The preferences of the issuer (or administrator computer system or the secured note issuer administrator computer system) may be defined through an algorithm which may be updated on a semi-regular basis, regular basis, in real-time, in substantially real-time, and/or upon request, to name a few. In embodiments, the algorithm must ensure that the following formula holds:

$$\sum_{k=1}^{V_j} D_{N,k} = I_j$$

Referring to FIG. 1B-3, the instructions database 118 may include one or more of the following: machine-readable authorization instructions 130, machine-readable transfer instructions 132, machine-readable creation instructions 134, and/or machine-readable redemption instructions 136. In embodiments, the machine-readable authorization instructions 130 may refer to and/or define conditions under which orders and/or requests are authorized. In embodiments, the machine-readable transfer instructions 132 may refer to and/or define conditions under which transfers of secured notes, fund shares, and/or precious metal are authorized. In embodiments, the machine-readable creation instructions 134 may refer to and/or define conditions under which secured notes and/or shares of the fund backed by the secured notes are created. In embodiments, the machine-readable redemption instructions 136 may refer to and/or define conditions under which shares of the fund backed by secured notes may be redeemed.

Referring to FIG. 1B-4, the authorized participant database 120 may include account information 138 which may include one or more of the following: fund share information 138-1, precious metal information 138-2, and/or account credential information 138-3, to name a few. The account information 138, in embodiments, may include information regarding each authorized participant associated with the fund. For example, the fund share information 138-1, in embodiments, may include each account associated with each authorized participant (e.g., authorized participant vault account information and/or authorized participant custodial account information, to name a few) In embodiments, as another example, the fund share information 138-1 may include, for each authorized participant associated with the fund, the amount of shares purchased and/or ordered. As another example, the precious metal information 138-2, may include information regarding the precious metal and/or secured notes associated with the shares of the fund purchased and/or ordered by each authorized participant. As yet another example, in embodiments, account credential information 138-3 may include account credentials for each fund authorized participant account associated with the fund. For example, the account credential information 138-3 may include one or more of the following: a username and password combination; biometric data associated with the authorized participant; personally identifiable information ("PII") associated with the authorized participant; a phone number associated with the authorized participant; a social security number associated with the authorized participant; an e-mail address associated with the authorized participant; a unique identifier associated with the authorized participant and issued by an administrator of the authorized participant; and/or a unique identifier associated with the authorized participant, to name a few.

Referring to FIG. 1B-6, the authorized applicant database 121 may include account information 139 which may include one or more of the following: secured note information 139-1, precious metal information 139-2, account credential information 139-3, and/or vault information 139-4, to name a few. The account information 139, in embodiments, may include information regarding each authorized applicant associated with each issuer of secured notes for the fund. For example, the secured note information 139-1 may include the amount of secured notes issued and/or redeemed for each authorized applicant for each issuer of secured notes for the fund. As another example, the precious metal information 139-2, may include information regarding each authorized applicant's precious metal quality, quantity, and/or location, to name a few. In embodiments, the precious metal information 139-2 may include numeric and/or alphanumeric indicators (e.g. bar numbers) associated with precious metal owned by an authorized applicant. The account credential information 139-3, in embodiments, may include account credentials for each fund authorized applicant account associated with each issuer of secured notes for the fund. The account credential information 139-3 described herein may be similar to the account credential information 138-3 described above in connection with FIG. 1B-4, the description of which applying herein. In embodiments, the vault information 139-4 may include information associated with one or more vaults in custody of gold owned by authorized applicants (e.g. the location of the vault(s), the size of the vault(s), contact information for the vaults(s), to name a few).

Referring to FIG. 1B-5, the vault database 124 may include one or more of the following: precious metal pricing information 140 and/or vault account information 142, to name a few. In embodiments, the vault database 124 may include ownership interest in precious metal and/or the respective number and fraction (and/or percentage) of units of a precious metal owned. Precious metal pricing information 140, in embodiments, may include historical pricing and/or current pricing of one or more precious metals. In embodiments, the historical and/or current pricing may be for the precious metals being stored by the vault or vaults associated with the vault administrator system 110 and/or the fund. The current pricing, in embodiments, may be updated by on a semi-regular basis, regular basis, in real-time, in substantially real-time, and/or upon request for issuer on-boarding, issuer off-boarding, redemption of shares of the fund and/or purchase of shares of the fund, to name a few. In embodiments, precious metal pricing information may include and/or indicate one or more of the following: the value of the precious metal in fiat, the value of the precious metal in shares, the first amount of precious metal, and/or the ratio of shares to precious metal associated with the fund, to name a few. The vault account information 142, may include account information associated with the plurality of issuer systems 108, the administrator system 104, the secured note issuer administrator system 102, the authorized participant device(s) 106, and/or the custodial system 114, to name a few. The vault account information 142, in embodiments, may include vault account credential information and the precious metal type and/or amount associated with each vault account.

Referring to FIG. 1B-7, the issuer database 122 may include one or more of the following: issuer account information 144 and/or issuer diversification information 146, to name a few. The issuer account information 144, in embodiments, may include one or more of the following: vault account information for each issuer, secured note registration information for each issuer, and/or issuer account credential information, to name a few. The issuer account credential information, in embodiments may include may include one or more of the following: a username and password combination; biometric data associated with the authorized participant; personally identifiable information ("PII") associated with the issuer; a phone number associated with the authorized participant; a taxpayer identification number associated with the authorized participant; an e-mail address associated with the authorized participant; a unique identifier associated with the authorized participant and issued by an administrator of the authorized participant; and/or a unique identifier associated with the authorized participant, to name a few.

In embodiments, memory 102-2 and/or memory 104-2 may include broker account information, which, in embodiments, may include one or more of the following: vault account information for each Broker (e.g., information associated with precious metal associated with a respective Broker), secured note registration information for each Broker, and/or broker account credential information (which may be similar to the issuer account credential information described above, the description of which applying herein), to name a few.

In embodiments, memory 102-2 and/or memory 104-2 may include market maker account information, which, in embodiments, may include one or more of the following: vault account information for each market maker (e.g., information associated with precious metal associated with a respective market maker), secured note registration information for each market maker, and/or market maker account credential information (which may be similar to the issuer account credential information described above, the description of which applying herein), to name a few.

In embodiments, the diversification database 116 may be stored on one or more of the following: memory 102-2, memory 102-4, memory 105-2 (memory of one or more broker device(s) 105), memory 106-2 (memory of one or more authorized participant device(s) 106), memory 107-2 (memory of one or more authorized applicant device(s) 107), memory associated with one or more of the plurality of issuer device(s) 108, memory associated with one or more market maker device(s) 160, and/or a combination thereof, to name a few.

The issuer diversification information 146 may include diversification information for the plurality of issuer systems 108. In embodiments, the diversification information may track the diversification of the fund or the holdings of the fund. The diversification requirements of the fund, in embodiments, may prevent an issuer from issuing too many/few secured notes and/or prevent an issuer from issuing too many/few secured notes collateralized by precious metals in any specific vault. The diversification rules and/or diversification algorithms may be adhered to by the Administrator, in embodiments, by updating and storing diversification information associated with the fund and/or issuers. The diversification information, in embodiments, may be updated when one or more of the following occurs: issuers are on-boarded; issuers are off-boarded; shares are created; shares are purchased; and/or shares are redeemed, to name a few. In embodiments, the diversification rules and/or diversification algorithms, may be registered and/or published by the administrator system 104 and/or by or to the secured note issuer administrator system 102. In embodiments, the diversification rules and/or diversification algorithms may be determined by the administrator system 104 and/or the secured note issuer administrator system 102. In embodiments, diversification rules and/or diversification algorithms may be revised or updated by the administrator system 104 and/or the secured note issuer administrator system 102.

Referring to FIG. 1D, the vault administrator system 110 may include one or more of the following: processor(s) 100-1, memory 110-2, and/or network connection interface 110-3, to name a few. Memory 110-2, in embodiments, may include account database 158 and/or precious metal database 160, to name a few. In embodiments, the account database 158 may include account information associated with the plurality of issuer systems 108, the administrator system 104, the secured note issuer administrator system 102, the authorized participant device(s) 106, and/or the custodial system 114, to name a few. The account database 158, in embodiments, may include vault account credential information for each account. In embodiments, the precious metal database 160 may include one or more of the following: the type of precious metal stored in one or more vaults associated with the vault administrator system 110, the amount of precious metal stored in one or more vaults associated with the vault administrator system 110, the historical pricing of the precious metal stored in one or more vaults associated with the vault administrator system 110; and/or the current pricing of precious metal stored in one or more vaults associated with the vault administrator system 110, to name a few.

Referring back to FIG. 1A-1, in embodiments, the administrator system 104 may be an administrator of a fund and/or an ETF. In embodiments, the administrator system 104 may include one or more processor(s) 104-1, memory 104-2 and/or network connection interface 104-3, to name a few. In embodiments, the one or more processor(s) 104-1, memory 104-2 and/or network connection interface 104-3, may be respectively similar to the processor 102-1, memory 102-2 and/or network connection interface 102-3, described above, the description of which applying herein. In embodiments, the administrator system 104 may be operatively connected to the secured note issuer administrator system 102. In embodiments, the administrator system 104 may include the secured note issuer administrator system 102 or vice versa. In embodiments, as used throughout this disclosure, "the fund" may refer to one or more funds.

In embodiments, the broker device(s) 105 may include one or more devices associated with one or more brokers and/or broker-dealers ("Brokers") associated with the fund. In embodiments, the one or more Brokers may act as an intermediary between the fund (and/or the Administrator 102 and/or 104) and one or more of the following: authorized participants, authorized applicants, market makers, issuers, and/or a combination thereof, to name a few. In embodiments, the broker device(s) 105 may each include one or more processor(s) 105-1, memory 105-2 and/or network connection interface 105-3, to name a few. In embodiments, the one or more processor(s) 105-1, memory 105-2 and/or network connection interface 105-3, may be respectively similar to the processor 102-1, memory 102-2 and/or network connection interface 102-3, described above, the description of each respectively applying herein.

In embodiments, the authorized participant device(s) 106 may include one or more devices associated with one or more authorized participants of the fund and/or ETF. In embodiments, the authorized participant device(s) 106 may each include one or more processor(s) 106-1, memory 106-2 and/or network connection interface 106-3, to name a few. In embodiments, the one or more processor(s) 106-1, memory 106-2 and/or network connection interface 106-3, may be respectively similar to the processor 102-1, memory 102-2 and/or network connection interface 102-3, described above, the description of which applying herein.

In embodiments, the plurality of issuer systems 108 may include a plurality of devices, each of the devices being associated with an issuer of an ETF. In embodiments, the plurality of issuer systems 108 may include one or more issuer devices and/or one or more issuer systems. The plurality of issuer systems 108 may include a first issuer device 108-1, a second issuer device 108-2 . . . N issuer devices 108-N. Each of the issuer devices may, in embodiments, be associated with one or more of issuers.

In embodiments, the authorized applicant device(s) 107 may include one or more devices associated with one or more authorized applicants associated with one or more issuers of secured notes for the fund and/or ETF. In embodiments, the authorized applicant device(s) 107 may each include one or more processor(s) 107-1, memory 107-2 and/or network connection interface 107-3, to name a few. In embodiments, the one or more processor(s) 107-1, memory 107-2 and/or network connection interface 107-3, may be respectively similar to the processor 102-1, memory 102-2 and/or network connection interface 102-3, described above, the description of which applying herein.

In embodiments, the vault administrator system 110 may be an administrator system of the vault 112. The vault 112 may be one or more vaults which may be in different locations globally. The vault administrator system 110, in embodiments, may be an entity that is a custodian of one or more assets, including, but not limited to, one or more precious metals. The vault administrator system 110, in embodiments may include one or more processor(s) 110-1, memory 110-2 and/or network connection interface 110-3, to name a few. In embodiments, the one or more processor(s) 110-1, memory 110-2 and/or network connection interface 110-3, may be respectively similar to the processor 102-1, memory 102-2 and/or network connection interface 102-3, described above, the description of which applying herein.

In embodiments, the custodial system 114 may be a system that holds the shares of the fund and/or secured notes of the fund backing the shares in custody for one or more of the following: administrator system 104, the secured note issuer administrator system 102, the plurality of issuer systems 108, the authorized participants associated with the authorized participant device(s) 106, broker(s) associated with the broker device(s) 105, authorized applicants associated with the authorized applicant device(s) 107, and/or the vault administrator system 110. In embodiments, the custodial system 114 may include one or more processor(s) 114-1, memory 114-2 and/or network connection interface 114-3, to name a few. In embodiments, the one or more processor(s) 114-1, memory 114-2 and/or network connection interface 114-3, may be respectively similar to the processor 102-1, memory 102-2 and/or network connection interface 102-3, described above, the description of which applying herein. The custodial company may provide custodial services for the ETF, for example, holding shares.

The secured note issuer administrator system 102, administrator system 104, one or more authorized participant devices 106, plurality of issuer systems 108, vault administrator system 110, and/or custody company system 114, in embodiments, may communicate (e.g. transfer data, receive data, etc.) over the network 100, such as the Internet via each respective network connection interface (e.g., network connection interface 102-3, network connection interface 104-3, network connection interface 106-3, network connection interface 110-3, network connection interface 114-3). For example, the network 100 (which may be one or more networks) may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between secured note issuer administrator system 102, administrator system 104, one or more authorized participant devices 106, plurality of issuer systems 108, one or more vault administrator systems 110, and/or custodial system 114. In some embodiments, secured note issuer administrator system 102, administrator system 104, one or more authorized participant devices 106, plurality of issuer systems 108, one or more vault administrator systems 110, and/or custodial system 114 may communicate with one another via a web browser using HTTP. Various additional communication protocols may be used to facilitate communications between secured note issuer administrator system 102, administrator system 104, one or more authorized participant devices 106, plurality of issuer systems 108, vault administrator system 110, and/or custodial system 114, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS136/TDMA, iDen, LTE or any other suitable cellular network protocol), infrared, BitTorrent, FTP, RTP, RTSP, SSH, and/or VOIP.

As described above in connection with FIGS. 1A-1-1A-3, in embodiments, a system for operating an ETF may include at least a secured note issuer administrator system 102, an administrator system 104, one or more authorized participant device(s) 106, authorized applicant device(s) 107, and/or a plurality of issuer systems 108. In embodiments, referring to FIG. 1E, authorized participants associated with the one or more authorized participant device(s) 106 may receive one or more Ask(s) 162 (e.g., a bid, offer, to name a few) provided by one or more market makers. A market maker, as used herein, may be an entity (e.g. a firm, company, secured note issuer administrator system 102, and/or an administrator system 104, to name a few) and/or an individual or individuals, to name a few.

Figure 1E:
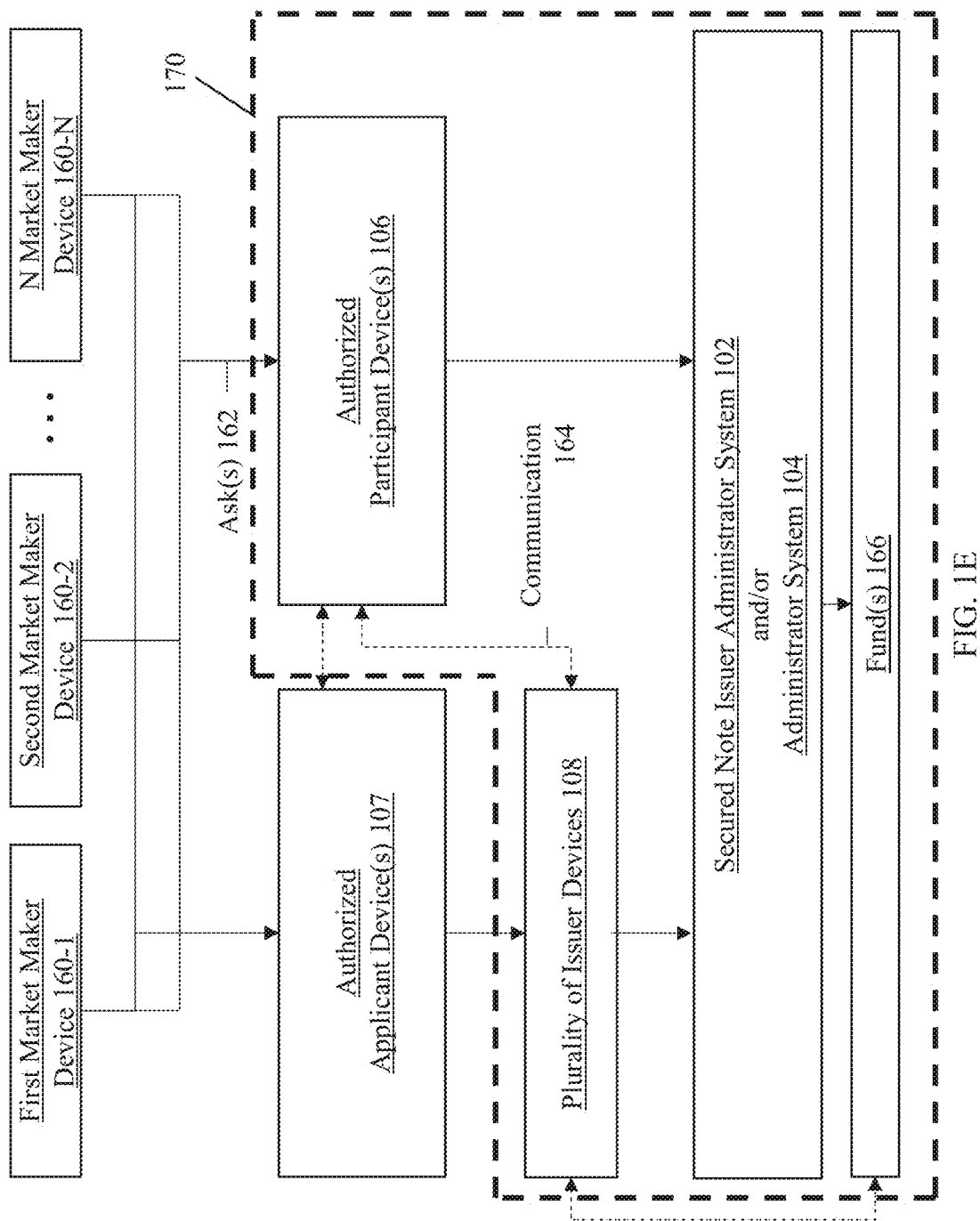
FIG. 1E is a schematic diagram of an exemplary system for operating a fund in accordance with exemplary embodiments of the present invention.
Figures 1, 1E:
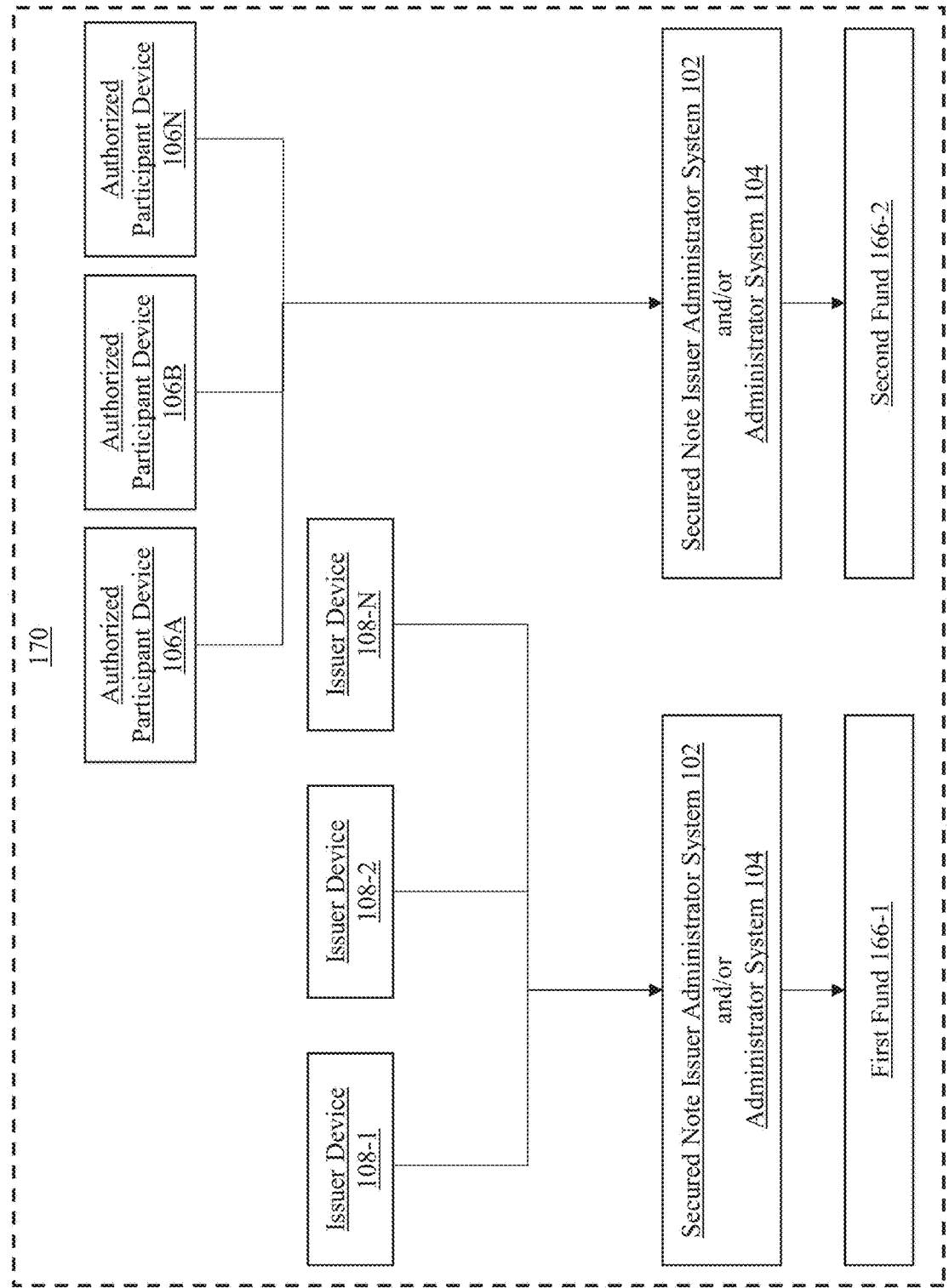
Figures 1, 1E, 2:
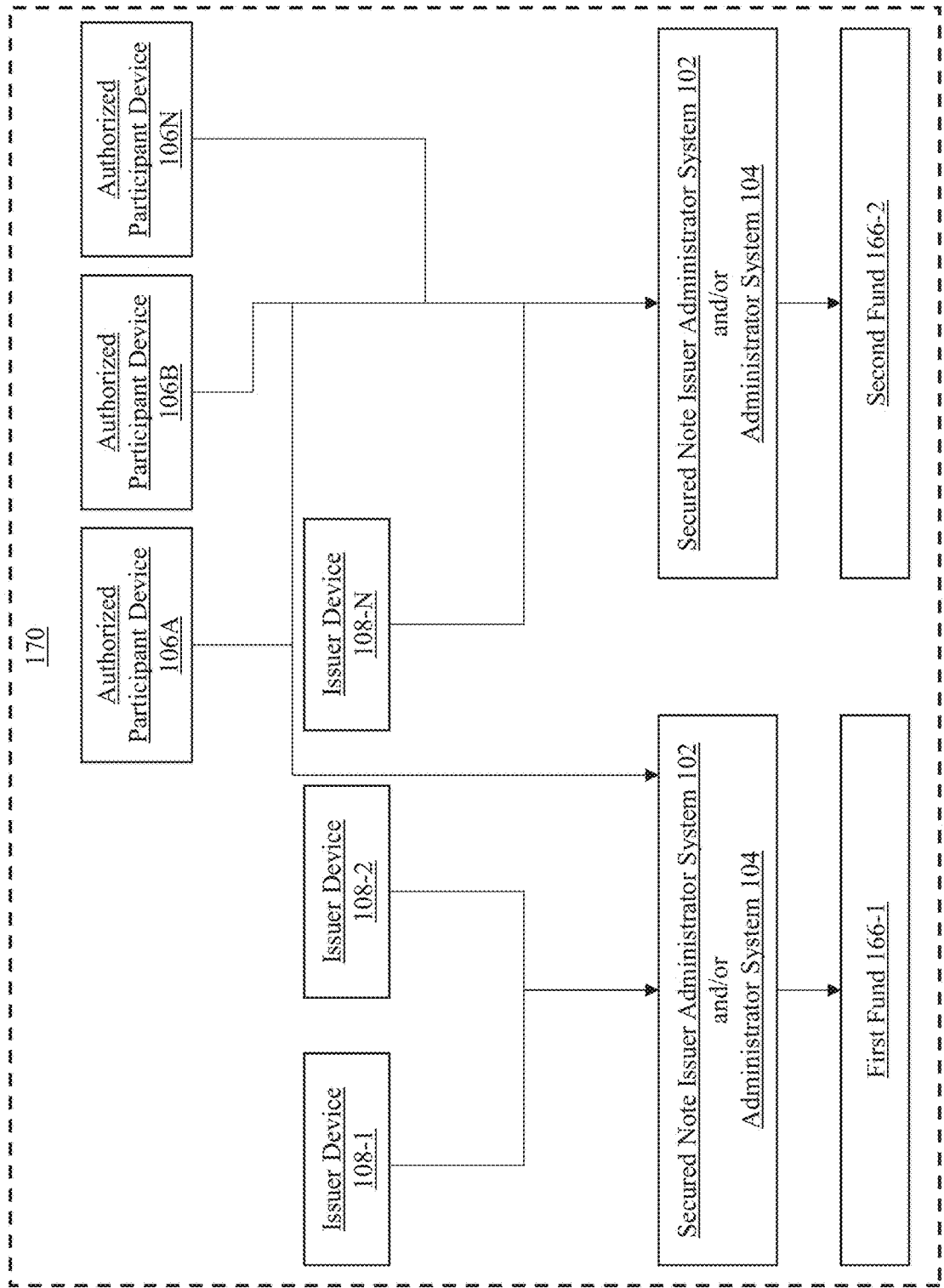
Figures 1, 1E, 2, 3:
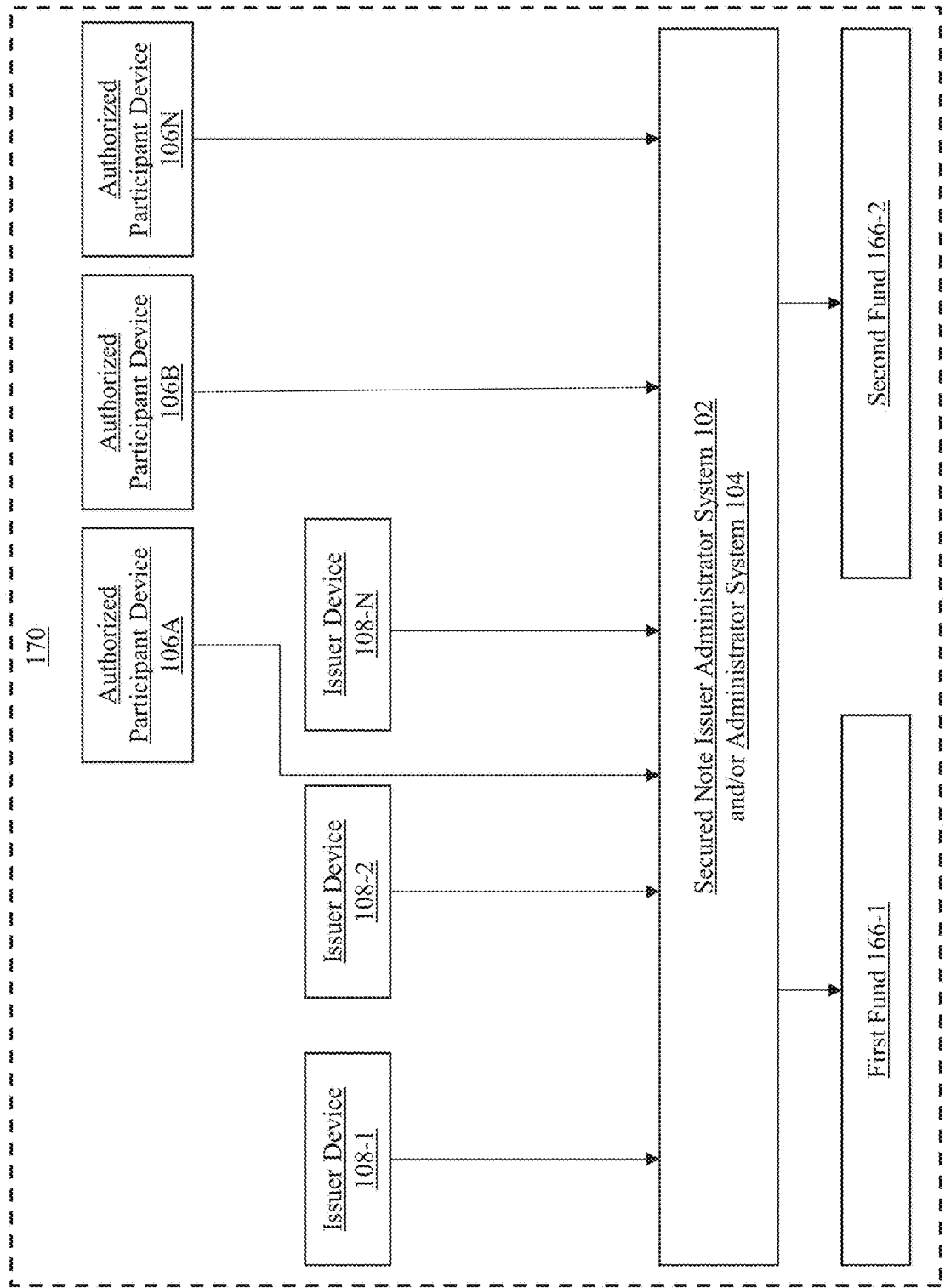
Figures 1, 1E, 2, 3, 4:
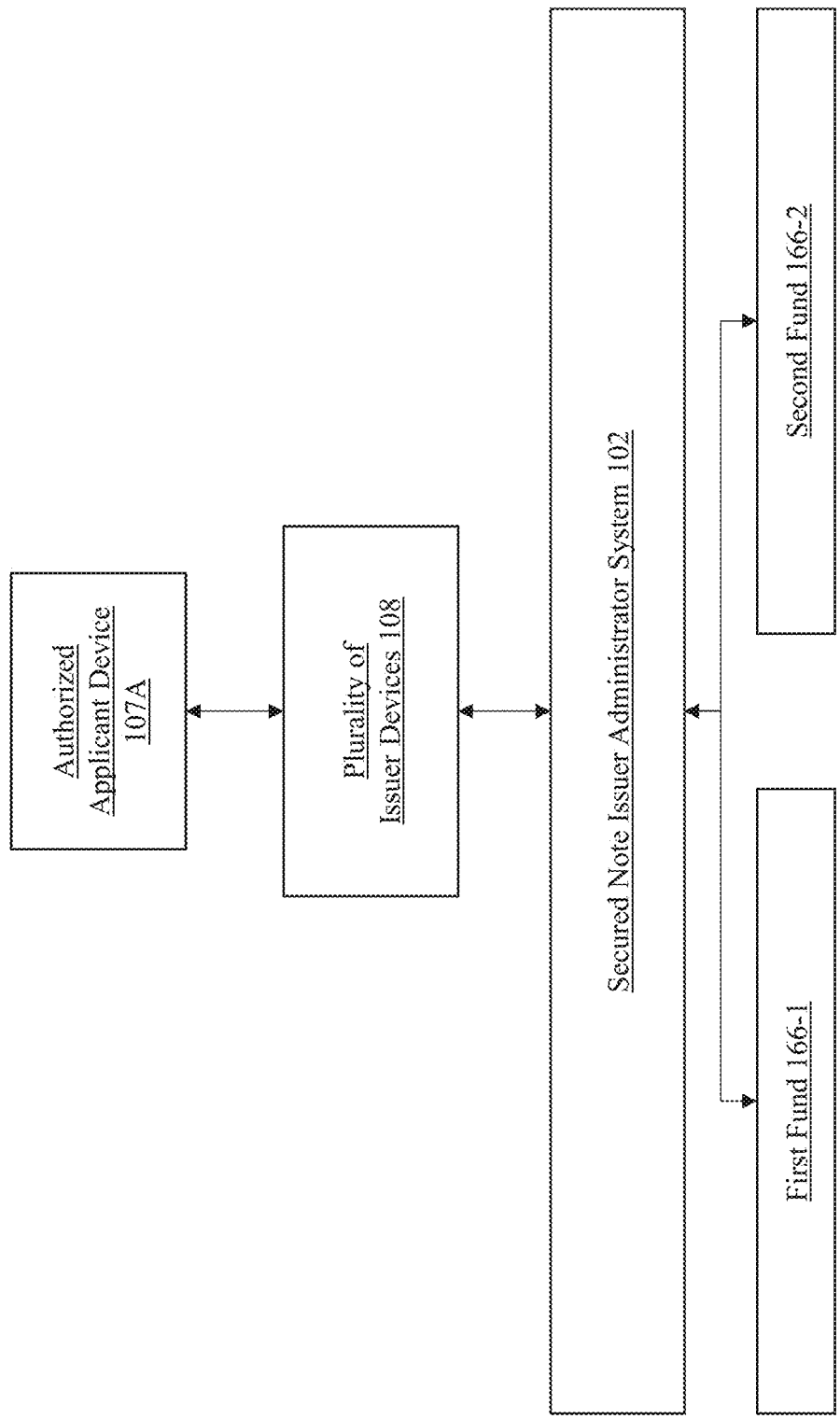
Figures 1, 1E, 2, 3, 4, 5:
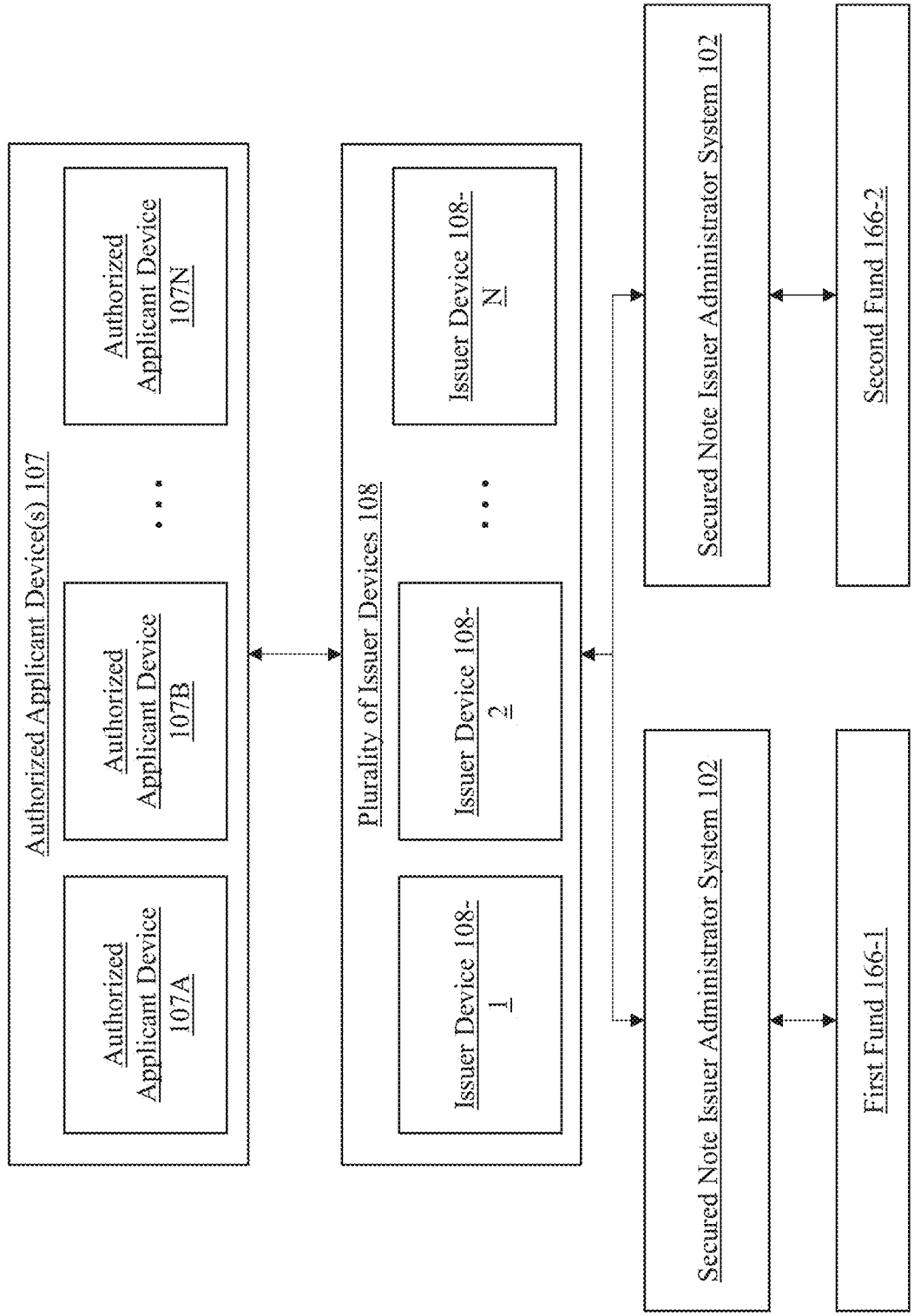

As illustrated in FIG. 1E, a plurality of market makers associated with a plurality of market marker devices (Market Maker Device(s) 160-1, 160-2 . . . 160-N) generates and sends one or more Ask(s) 162 to the one or more authorized participant device(s) 106 associated with one or more authorized participants of the one or more fund(s) 166. The authorized participant device(s) 106, in embodiments, may then transmit the one or more Ask(s) 162 from the plurality of market maker devices to one or more Fund(s) 166 either directly and/or via an administrator (e.g. Administrator System 104 and/or Secured Note Issuer Administrator System 102). In embodiments, as described below, each Ask 162 (e.g. order) may require and/or result in one or more of the following: a deposit of gold, a deposit of secured notes, creation of secured notes, creation of fund shares, and/or diversification of the shares of fund(s) 166 (e.g. by one or more of the fund, administrators, issuer devices, authorized participant devices, and/or authorized participant devise via communication 164, to name a few), to name a few. In embodiments, as illustrated in connection with FIG. 1E, the one or more authorized applicant device(s) 107 may be in communication (e.g., via network 100) with one or more Market Maker Device(s) (160-1, 160-2 . . . 160-N). Similarly, one or more authorized applicant device(s) 107 may be in communication with one or more authorized participant devices 106 (e.g., via network 100). In embodiments, the one or more authorized participant device(s) 106, authorized applicant device(s) 107, one or more of the plurality of issuer systems 108, and/or one or more market maker devices 160 may each be in communication with one or more of the following: one or more broker device(s) 105, administrator system 104, secured note administrator system 102, one or more share transfer agents, one or more secured note transfer agents, one or more custodians associated with custodial system 114, custodial system 114, vault administrator system 110, one or more authorized participant device(s) 106, authorized applicant device(s) 107, one or more of the plurality of issuer systems 108, and/or one or more market maker devices 160).

In embodiments, the fund(s) 166 may be one fund (e.g. an ETF) and the authorized participant device(s) 106 may be one authorized participant device associated with one authorized participant. The authorized participant, in embodiments, may be required to transfer precious metal and/or secured notes (e.g. a secured gold note) to receive shares of the fund and/or to be on-boarded by the fund. For example, to receive 1 share of the fund, the authorized participant may be required to deposit 4 ounces of gold into a vault (e.g. vault 112). Once the deposit is made, continuing the example, one or more issuer devices (e.g. the plurality of issuer devices 108) associated with one or more issuers of secured notes may confirm receipt of the deposit and corresponding authorized participant. Upon confirming receipt of the deposit of four ounces of gold, continuing the example, the one or more issuer devices may issue one or more secured notes to the corresponding authorized participant. The authorized participant, finishing the example, may exchange the issued secured notes of four ounces of gold for 1 share of the fund with the fund. As another example, to receive 1 share of the fund, the authorized participant may exchange secured notes representing four ounces of gold for one share of the fund. Continuing the example, the authorized participant may obtain (e.g. via selling, buying, trading, and/or a combination thereof, to name a few) the required secured notes from one or more authorized applicants (e.g. associated with authorized applicant device(s) 107) of one or more issuers of secured notes associated with the fund. The authorized participant, as with the previous example, may exchange the issued secured notes of four ounces of gold for 1 share of the fund. In embodiments, a market maker may obtain (e.g. via selling, buying, trading, and/or a combination thereof, to name a few) the required secured notes from one or more authorized applicants (e.g., associated with authorized applicant device(s) 107). The market maker, as with the previous examples, may exchange the issued secured notes of four ounces of gold for 1 share of the fund.

As shown in FIGS. 1E-4 and 1E-5, in embodiments, the fund(s) 166 (e.g. the first fund 166-1 and/or the second fund 166-2) may be associated with one or more issuers of secured notes who each may be associated with one or more authorized applicant. Each authorized applicant device(s) 107—first authorized applicant device 107A, second authorized applicant device 107B . . . N Authorized Applicant Device 107N—in embodiments, is associated with one or more of the plurality of issuer devices 108. Each issuer of secured notes of the one or more issuers of secured notes may, in embodiments, be associated with one or more funds. In embodiments, each authorized applicant may be associated with one or more funds. Each authorized participant, in embodiments, may be associated with one or more funds. In embodiments, a fund may be associated with one or more issuers of secured notes, one or more authorized participants, one or more authorized applicants, and/or one or more market makers, to name a few.

In embodiments, the fund(s) 166, as shown in FIGS. 1E-1 through FIG. 1E-5, may refer to more than one fund. For the purposes of clarity, only two funds—the first fund 166-1 and the second fund 166-2—are illustrated. However, fund(s) may refer to 1 fund, 2, funds, 5 funds, 10 funds, 100 funds, to name a few. In embodiments, Fund(s) 166 may be similar to the fund and/or ETF described throughout this disclosure, the description of which applying herein Referring to FIG. 1E-1, reference numeral 170, each issuer device may be associated with the same fund—the first fund 166-1—without overlap. Similarly, in embodiments, each authorized participant device may be associated with the same fund—the second fund 166-2—without overlap. In embodiments, the authorized participant devices and/or the issuer devices may overlap between funds. For example, referring to FIG. 1E-3, the first authorized participant device 106A overlaps between the first fund 166-1 and the second fund 166-2 (e.g. a partial overlap between funds). As another example, referring to FIG. 1E-4, each authorized participant device (first authorized participant device 106A, second authorized participant device 106B, Nth authorized participant device 106N) and each issuer device (issuer device 108-1, 108-2, 108-N) may overlap between the first fund 166-1 and the second fund 166-2 (e.g. a complete overlap). In embodiments, Fund(s) 166 may be similar to the fund and/or ETF described throughout this disclosure, the description of which applying herein.

Creating Fund Shares

An administrator (e.g., secured note issuer administrator system 102 and/or administrator system 104) may create one or more shares of one or more funds backed by secured notes. For example, referring to FIG. 2A, creating shares for a fund backed by secured notes may begin at step C10 where diversification rules associated with a diversification algorithm for diversifying a fund are published and registered. In embodiments, the secured note issuer administrator system 102 and/or administrator system 104 (hereinafter "Administrator 102/104") may publish and register diversification rules for a diversification algorithm associated with a first set of issuers. For example, referring to FIG. 2-10, the administrator system 104, at step S202A, may publish issuer diversification rules for the plurality of issuers of secured notes backing the shares for the fund. The published rules, in embodiments, at step S202B, may be obtained and/or registered by the secured note issuer administrator system 102. The diversification rules, in embodiments, may be published and/or registered by one or more of the following: administrator system 104, secured note administrator system 102, broker device(s) 105, AP Device(s) 106, AA Device(s) 107, custodial system 114, vault administrator system 110, and/or one or more of the plurality of issuer devices 108, and/or a combination thereof. In embodiments, the diversification rules may only be accessible by the administrator system 104, secured note administrator system 102, and/or the broker device(s) 105, to name a few. In such embodiments, for example, the one or more Brokers associated with the broker device(s) 105 may distribute the diversification rules and/or make the diversification rules accessible to one or more of the following: AP Device(s) 106, AA Device(s) 107, and/or MM Device(s) 160, to name a few. In embodiments, the diversification rules may be similar to the first set of rules described below in connection with FIG. 6A through FIG. 6D, the description applying herein. In embodiments, the diversification rules may be similar to the diversification rules 126 described above in connection with FIG. 1B-2, the description of which applying herein. In embodiments, the Administrator 102/104 may publish the diversification rules publicly, semi-privately, and/or privately.

The diversification rules, in embodiments, may be rules that are based on one or more diversification algorithm(s) and/or designed for: (a) diversifying ownership interest in secured notes; (b) diversifying ownership interest in collateral associated with the funds; and/or (c) a combination thereof, to name a few. In embodiments, the diversification rules may include parameters based on one or more diversification algorithms. For example, if one or more of the diversification algorithms is designed to limit ownership interest in secured notes to less than 30%, a diversification rule may include a 30% limit on ownership interest in secured notes. In embodiments the diversification rules may be based on and/or generated by the Administrator 102/104, based on one or more of the following parameters: the number of issuers, the percentage ownership interest in secured notes, the amount of secured notes owned, the amount of ownership in collateral associated with the funds, the percentage of ownership interest in secured notes, the amount of APs, the amount of AA's, the amount of MMs; the amount of precious metal associated with the fund shares, the amount of fund shares, the amount of secured notes, the amount of authorized participants, and/or a combination thereof, to name a few. Diversification rules may include, in embodiments, parameters based on vault operational constraints such as how quickly the balance in a precious metals unallocated account can be allocated to specific precious metal bullion, how quickly precious metals can be moved from one account to another, storage cost optimization, insurance limits, and/or a combination thereof, to name a few.

The diversification algorithm, in embodiments, may be diversification algorithms 128, as described below in connection with FIG. 5A-1, the description of which applying herein. A person of ordinary skill understands that, due to the ever-changing landscape of statutes, regulations, issuers, precious metal markets (and the price(s) associated therewith), and/or ETFs, a diversification algorithm may be revised, replaced, and/or be a part of an additional diversification algorithm.

In embodiments, the diversification rules may be stored in memory (e.g. memory 102-2, and/or memory 104-2, to name a few) and/or a memory device. The diversification rules, in embodiments, may be accessible by the Administrator 102/104. For example, the diversification rules may be stored on a memory device operatively connected to the Administrator 102/104. As another example, the diversification rules may be stored on memory of the Administrator 102/104. In embodiments, the diversification rules may be stored in memory of and/or generated by one or more of the following: one or more issuer systems of the first set of issuer device(s) 108, one or more authorized participant devices 106 associated with one or more authorized participants, one or more broker devices 105 associated with one or more Brokers, one or more vault administrator systems 110, and/or one or more custodial systems 114 associated with one or more custody companies that hold shares of the ETF (or the fund) in custody, to name a few.

In embodiments, the Administrator 102/104 may publish (e.g., publicly, privately, and/or semi-privately) share price information indicating an amount of precious metal corresponding to an amount of shares in the fund (e.g., 1 share=1 ounce). The Administrator 102/104 may, in embodiments, publish relative strength index information associated with the shares of the fund. In embodiments, the share price information may include one or more of the following: an amount of precious metal corresponding to an amount of shares in the fund, relative strength index information associated with the shares of the fund, and/or diversification information associated with a first set of issuers (e.g., one or more issuers of the plurality of issuers associated with the plurality of issuer devices), to name a few. The share price information, in embodiments, may be published prior to C20.

Figure 7A:
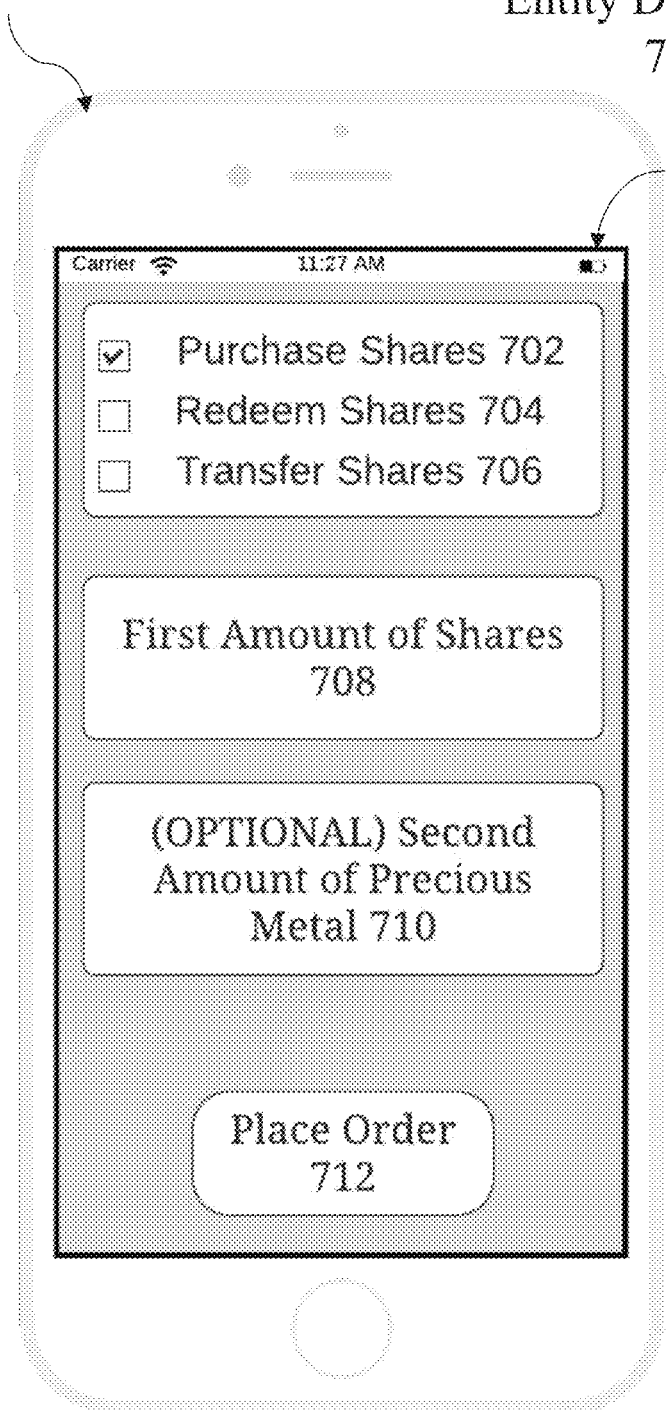
FIG. 7A through FIG. 7C are exemplary graphical user interfaces in accordance with exemplary embodiments of the present invention.

Referring back to FIG. 2A, in embodiments, the process for creating fund shares backed by secured notes may continue with step C20. At step C20, in embodiments, the Administrator 102/104 may obtain an order for a first amount of shares in the fund for a second amount of precious metal. In embodiments, Administrator 102/104 may obtain one or more orders from one or more sources (e.g., sources including, but not limited to one or more entities associated with one or more entity devices which may include one or more of the following: AP Device(s) 106, broker device(s) 105, MM Device(s) 160, AA Device(s) 107, and/or a combination thereof, to name a few). Each of those orders may be for an amount of shares in exchange for an amount of precious metal. In embodiments, one source device associated with a source (e.g., entity 1000) may generate and send an order to Administrator 102/104. For example, referring to FIG. 7A, entity 1000 may order a first amount of shares using entity device 700-1 (which may be similar to one or more of the following: Broker Device(s) 105, AP Device(s) 106, MM Device(s) 160, and/or AA Devices 107, to name a few, described above in connection with FIG. 1A-1 through FIG. 1E-5, the descriptions of which applying herein). Continuing the example, the entity device display 700-1A may display one or more of the following: purchase shares 702 option, redemption shares 704 option, transfer shares 706 option, the amount of shares associated with the order (e.g., First Amount of Shares 708), the amount of precious metal associated with the order (e.g., optional Second Amount of Precious Metal 710), and/or an option to place the order or transfer request (e.g., Place Order 712 option), to name a few. For the purposes of this example, in embodiments, entity 1000 may place an order to purchase the First Amount of Shares 708 for the second amount of Precious Metal 710 by selecting Place Order 712. Continuing the example, the order may be sent by entity device 700-1 to Administrator 102/104 via network 100. The order, in embodiments, may include metadata sufficient to identify the entity placing the order (e.g., an entity identification, time stamp, to name a few). The order, in embodiments and continuing the example, may be received by the Administrator 102/104. In embodiments, once the order is received, Administrator 102/104 may authenticate the order (e.g., determine the order originated from a device associated with the entity 1000) and verify the order (e.g., identify one or more accounts associated with the entity 1000 and/or determine whether the identified accounts include sufficient funds for the order). The Administrator 102/104, in embodiments, may confirm that the shares associated with the order (e.g., the first amount of shares) are available for issuance. In embodiments, the Administrator 102/104 may confirm that the first amount of shares have been previously issued and are currently unassigned. In embodiments, the received order and one or more pieces of information associated with the authentication and/or verification of the order, may be combined and saved in memory accessible by the Administrator 102/104. For example, referring to FIG. 7D, the Administrator 102/104 may generate Example Creation Order 722 based on an order received from an entity (e.g., entity 1000). As illustrated in FIG. 7D, the generated Example Creation Order 722 may include one or more of the following: Entity Identification 722-1 (e.g., Account Information 138, Entity Account Information, Broker Account Information, Issuer Account Information 144, and/or Market Maker Account Information, to name a few), Fund Identification 722-2 (e.g., alphanumeric and/or symbol identifier associated with the fund), Date of Order 722-3 (e.g., the date the order was started, the date the order was sent, and/or the date of the last published diversification rules and/or algorithm, to name a few), Time of Order 711-4 (e.g., the time the order was started, the time the order was sent, and/or the time of the last published diversification rules and/or algorithm, to name a few), Entity Vault Account information 722-5 (e.g., the one or more accounts associated with entity 1000 at one or more vaults 112), Entity Custodian Account Information 722-6 (e.g., the one or more accounts associated with entity 1000 at one or more custodial system(s) 114), DTC Participant Identification Information 722-7 (e.g., the DTC participant associated with the entity 1000 and/or the fund), Entity Contact Information 722-8 (e.g., email address, telephone number, facsimile number, address, and/or a combination thereof, to name a few), Fund Ticker 722-9 (e.g., the ticker associated with the fund), Creation of shares 722-10 (e.g., the amount of shares associated with the example creation order 722), Redemption of shares 722-11 (e.g., the amount of shares associated with the example redemption order 724), Amount of Precious Metal 722-12 (e.g., the amount of precious metal associated with the example creation order 722), and/Order Identification 722-13 (e.g., an alphanumeric and/or symbol identifier associated with the example creation order 722), to name a few.

In embodiments, the order may be an order for a first amount of shares in exchange for a third amount of a first precious metal (e.g., gold) and a fourth amount of a second precious metal (e.g., platinum). In such embodiments, the Administrator 102/104 may verify order by confirming that the combined value of the third amount of the first precious metal and the fourth amount of the second precious metal is the first amount of shares. In embodiments, one or more orders may be for the amount of shares in exchange for one or more of the following: an amount of notes purchased from one or more issuers (e.g., privately and/or on a secondary market); an amount of fiat; an amount of precious metal; and/or a combination thereof, to name a few. For example, an order may be placed for a first amount of shares in exchange for the following: a second amount of notes purchased from one or more issuers and up to a third amount of fiat. In embodiments, an entity (e.g., Entity 1000) may order an amount of shares in exchange for, at least, an amount of fiat. In embodiments, entity 1000 may refer to one or more of the following, the descriptions of each, applying herein: authorized applicant device(s) 107, authorized participant device(s) 106, plurality of issuer systems 108, market maker device(s) 160, and/or a combination thereof. The order, for example, may list a specific amount of fiat and/or an amount of fiat the entity 1000 would like to spend (e.g., a maximum amount)—the remaining value being made up with an amount of precious metal. In embodiments, the Administrator 102/104 may need to update the diversification information (e.g., as described in accordance with C60) to determine the amount of fiat the entity 1000 may utilize in its order. Once determined, the Administrator 102/104 may generate and send a message to the entity 1000, notifying the entity 1000 of the amount of fiat the first order will include (and/or giving the entity 1000 an option to cancel the order). In embodiments, one or more of the secured notes backing the shares of the fund may be issued by one or more third-party issuers (e.g., not an issuer associated with the plurality of issuer devices 108).

Referring to FIG. 2-20C, at step C20-1, the Administrator 102/104 (and/or AP device(s) 106, AA Device(s) 107, MM Device(s) 160, broker device(s) 105) may obtain one or more orders, including at least one of the following: (1) a first order for an amount of shares for a first amount of precious metal (e.g., the order described in connection with C20); (2) a second order for an amount of shares for a combination of a second amount of precious metal and a first amount of secured notes from a secondary market (e.g., not purchased through an issuer, Broker, and/or AP of the fund); (3) a third order for an amount of shares for a third amount of precious metal and a first amount of fiat; and/or (4) a fourth order for an amount of shares for a second amount of fiat and a second amount of secured notes from a secondary market. In embodiments, where the entity 1000 (e.g., an authorized applicant, authorized participant) and/or fund accepts or offers fiat in lieu of and/or in combination with precious metal, the entity 1000 and/or fund may execute one or more transactions in the financial markets for the purpose of hedging its precious metals exposure. For example, such transactions may include buying or selling contracts for the future delivery of precious metals on an exchange (such as COMEX gold futures contracts). As another example, such transactions may include or buying or selling put or call options on precious metals that provide for an optional future purchase or sale of precious metals at a specific price.

In embodiments, the order for a first amount may be in exchange for consideration in addition to or in lieu of precious metal. For example, referring to FIG. 2-20D, at C20-2 the Administrator 102/104 may obtain an order for one or more of the following: an amount of precious metal; an amount of secured notes from a secondary market; an amount of fiat; and/or a combination thereof.

In embodiments, the Administrator 102/104 may obtain the order by generating and publishing an offering. For example, referring to FIG. 2-20E, at C20-3, the Administrator 102/104 may generate and publish a first offering for a first amount of shares. The first offering, in embodiments, may include one or more requests of the following in exchange for the first amount of shares: an amount of precious metal; an amount of secured notes from a secondary market; and/or a combination thereof, to name a few. The first offering, in embodiments, may be published by the Administrator 102/104 via a third party (e.g., one or more Brokers associated with one or more broker device(s) 105). The third party (and/or third parties), in embodiments, may generate and send orders to the Administrator 102/104 based on orders associated with the published first offering. In embodiments, the first offering may include a plurality of offers for a plurality of different amounts of shares in exchange for one or more amounts of one or more of the following: precious metal; secured notes from a secondary market; fiat; and/or a combination thereof. In embodiments, the published first offering may account for different amounts of shares in the fund. For example, the Administrator 102/104 may, in embodiments, generate the first offering by first updating the diversification information to account for one or more orders from the first offering. The diversification rules, in embodiments, may allow for the following offering: OFFERING 1—(A) OPTION A: Receive 0 to 10 shares in exchange for depositing an amount of precious metal in a first account at the vault 112; (B) OPTION B: Receive 11 to 20 shares in exchange for depositing a first half of the amount of precious metal in a first account at the vault 112 and a second half of the amount of precious mental in a second account at the vault 112; (C) OPTION C: Receive 20 to 30 shares in exchange for depositing a first third of the amount of precious metal in a first account at the vault 112, a second third of the amount of precious mental in a second account at the vault 112, and a third of the amount of precious metal in a third account at the vault 112. In embodiments, the deposits of precious metal and/or secured notes and/or fiat in exchange for the first amount of shares may affect the diversification of the fund. For example, a larger order may require more accounts to diversify the deposit of precious metal as opposed to a smaller order, which may only require one account.

Referring back to FIG. 2-20A, in embodiments, C20 may begin with step S204. At step S204, in embodiments, an entity (e.g., entity 1000) generates the order for the creation of the first amount of shares in the fund for the second amount of precious metal. For example, the authorized participant device 106 may generate and send an order for the creation of a first amount of shares for a second amount of precious metal. In embodiments, the order may include one or more of the following: identification information associated with the entity; the first amount of shares; the second amount of precious metal; and/or a price associated with the first number of shares, to name a few. The identification information, in embodiments, may include one or more of the following: a username and password combination; biometric data associated with the entity 1000; personally identifiable information ("PII") associated with the entity 1000; a phone number associated with the entity 1000; a taxpayer identification number associated with the entity 1000; an e-mail address associated with the entity 1000; a unique identifier associated with the entity 1000 and issued by an administrator of the entity 1000; and/or a unique identifier associated with the entity 1000, to name a few. The message, in embodiments at step S205, is sent from the entity 1000 to Administrator 102/104 via network 100.

In embodiments, referring to FIG. 2-20B, the order may be generated based on asks from one or more market makers. For example, at step S204-1A, one or more market maker device(s) 160 may generate one or more asks for the fund. For example, a Market Maker (MM) shows a bid and ask price with a quote of $100 USD. This means, in embodiments, that the MM is willing to buy shares from the fund for $100 USD. In embodiments, the ask may be a spread. For example, the MM may show a bid and ask price with a quote of $100-$110. This means, in embodiments, that the MM is willing to both buy fund shares for $100 and sell fund shares at $110. The exemplary spread of ten dollars may represent a potential profit per share traded to and/or from the market maker. In embodiments, the one or more asks may include an order for an amount of shares for: precious metal, secured notes from the secondary market; fiat; and/or a combination thereof, to name a few.

Referring to FIG. 2-20B, the one or more market maker device(s) 160 may send the one or more asks to one or more authorized participant device(s) via network 100. The one or more authorized participant device(s) 106, in embodiments, may receive the one or more asks (at step S204-C) and generate the order based on at least the one or more asks (at step S204-1D). In embodiments, the one or more authorized participant devices may receive multiple asks from multiple different market maker device(s) 160. In embodiments, step S204-1 may be an alternative to step S204.

Referring back to FIG. 2-20A, in embodiments, C20 continues with step S206 where the Administrator 102/104, receives the order. Continuing, in embodiments, at step S207, the Administrator 102/104 may register the order for the creation of the first amount of shares. In embodiments, the Administrator 102/104 receives the order from the authorized participant device 106 via network 100 and registers the order. In embodiments the order may be registered using an electronic ledger entry. The electronic ledger entry, in embodiments may be stored in memory (e.g. memory 102-2, and/or memory 104-2, to name a few) and/or a memory device accessible by the Administrator 102/104.

At step S208, in embodiments, the Administrator 102/104, verifies the order for the creation of the first amount of shares. For example, the administrator system 104 may verify the order. The order may be verified by: confirming the identity of the authorized participant associated with the authorized participant device 106; determining the second amount of precious metal associated with the first amount of shares; comparing the determined second amount to the received second amount; and/or confirming the authorized participant is an authorized participant, to name a few. In embodiments, verifying the order may be similar to processing the first request, which is described below in connection with FIGS. 6A-6D, the description of which applying herein.

Referring back to FIG. 2A, the process of creating shares in a fund in accordance with various embodiments of the present invention may continue with step C30. At C30, the Administrator 102/104 (and/or broker device(s) 105, AP Device(s) 106, AA Device(s) 107) may instruct entity 1000 (and/or a Broker associated with the first order) to initiate a transfer of the second amount of precious metal. For example, an authorized participant through authorized participant device(s) 106 may place an order with Administrator 102/104. The Administrator 102/104, continuing the example, may instruct the authorized participant (e.g., C30) to deposit the second amount of precious metal into an account at vault 112. The account, in embodiments, is an account the Administrator 102/104 has access to. In embodiments, the Administrator 102/104 may not have access to the account at the vault 112. A trusted third-party, for example, may have access to the account at the vault 112. In embodiments, one or more Brokers may act as an intermediary between the entity 1000 and the Administrator 102/104 (e.g., the Administrator instructing the Broker to act instead of the entity 1000). In embodiments, the entity 1000 may refer to one or more Brokers associated with one or more broker device(s) 105. In embodiments, by initiating the transfer of the second amount of precious metal, the entity 1000 is verifying that it has sufficient funds for the order (e.g., the second amount of precious metal offered for the first amount of shares). In embodiments, referring to FIG. 2-30A, the process for creating fund shares backed by secured notes may continue with step S210. At step S210, the Administrator 102/104, in embodiments, generates a first message instructing the entity 1000 to generate a second message (and/or forward the first message), the first message including instructions for the entity 1000 to generate and send first settlement instructions to a vault associated with the vault administrator system. In embodiments, the generated settlement instructions (and/or the execution thereof) may verify the entity 1000 has sufficient funds to make the order. The first message, in embodiments, at step S211, is sent to the entity 1000 by the Administrator 102/104 (e.g., via the administrator system 104, secured note administrator system 102, broker device(s) 105, AP Device(s) 106, AA Device(s) 107, custodial system 114, vault administrator system 110, one or more of the plurality of issuer devices 108, and/or a combination thereof, to name a few.) In embodiments, the entity 1000 may receive the first message (at step S211-1) and, generate and send a message based on the first message to vault administrator system 110 via network 100.

After the order is received, registered, and/or confirmed, the Administrator 102/104, in embodiments, may instruct the authorized participant to deposit the second amount of precious metal into the vault 112 associated with the vault administrator system 110. In embodiments, the first message, may include one or more of the following: amount information, and/or deposit information, to name a few. The amount information, in embodiments, may include and/or indicate one or more of the following: the value of the precious metal, the first amount of precious metal, the number of shares, and/or the ratio of shares to precious metal associated with the fund, to name a few. The deposit information, in embodiments, may include information regarding depositing the first amount of precious metal into a vault associated with the fund. For example, the deposit information may include an administrator account of the Administrator 102/104 associated with the vault 112 and instructions on how the authorized participant associated with the authorized participant device 106 can deposit the second amount of precious metal into the administrator account. The deposit information, in embodiments, may be stored in memory (e.g. memory 102-2, and/or memory 104-2, to name a few) and/or a memory device accessible by the Administrator 102/104.

In embodiments, the deposit information may be stored in memory operatively connected to vault administrator system 110 associated with the vault. For example, the Administrator 102/104 may obtain the deposit information by sending a request to the vault administrator system 110, and, in response to the request, receiving the deposit information from the vault administrator system 110. Once the first message is generated, the Administrator 102/104 may send the first message to the authorized participant device 106.

Referring back to FIG. 2A, in embodiments, the process for creating fund shares backed by secured notes may continue with step C40. At C40, in embodiments, a third amount of shares are generated. The third amount of shares, in embodiments, may be greater than or equal to the first amount of shares. For example, the third amount of shares may account for the order for the first amount of shares and an additional order for shares of the fund.

Referring to FIG. 2-40, in embodiments, C40 may begin with step S212. At step S212, the Administrator 102/104, in embodiments, generate a second message to send to a custodial system (e.g., a depository trust company) associated with one or more custodians associated with the fund, including a request to create the third amount of shares. The second message, in embodiments, at step S212-2, may be sent to the custodial system 114 (receiving the second message at step S212-3). For example, the Administrator 102/104 may generate a first request to generate a third amount of shares in the fund. The first request, once generated, may be transmitted by the Administrator 102/104 to the custodial system 114 via network 100. In embodiments, the first request may be communicated by the Administrator 102/104 to the custodial system 114 via one or more broker device(s) 105. In response to receiving the first request, in embodiments, the custodial system 114 may create the first amount of shares and/or hold the third amount of shares in custody. In embodiments, a share transfer agent may act on behalf of the Administrator 102/104. For example, the Administrator 102/104 may generate a first request to generate a third amount of shares in the fund. The first request, once generated, may be transmitted by the Administrator 102/104 to a share transfer agent associated with a custodial device associated with the custodial system 114 via network 100. In embodiments, the first request may be communicated by the share transfer agent to the custodial system 114 on behalf of the Administrator 102/104. In response to receiving the first request, in embodiments, the custodial system 114 may create the first amount of shares and/or hold the third amount of shares in custody.

Referring back to FIG. 2A, in embodiments, the process for creating fund shares backed by secured notes may continue with step C50. In embodiments, C50 may begin with C51 where the second amount of precious metal is transferred from an account associated with the entity 1000 (e.g., one or more Brokers, one or more APs, one or more AAs, one or more MMs, and/or a combination thereof) to an account associated with one or more administrators associated with the fund (e.g., Administrator 102/104). In embodiments, referring to FIG. 2-50A, the C51 may begin with step S214. In embodiments, at step S214, the entity 1000 (e.g., authorized participant device 106) generates and sends first settlement instructions (which may be referred to as deposit instructions) to the vault administrator system 110. The settlement instructions, in embodiments, may instruct the vault administrator system 110 to transfer the second amount of precious metal from an entity account associated with entity 1000 at the vault 112 to an account associated with the vault of which the Administrator 102/104 has access ("Administrator Account"). This transfer, in embodiments, may verify that the entity 1000 has sufficient funds for the order.

In embodiments, a precious metal transfer agent may act on behalf of the entity 1000. For example, the entity 1000 may receive and send settlement instructions to the precious metal transfer agent—the settlement instructions including instructions to deposit the second amount of precious metal into the first set of custodial accounts. The precious metal transfer agent (which may be associated with a custodial device associated with the custodial system 114 and/or a vault device associated with the vault administrator system 110) may communicate the settlement instructions to the custodian device associated with the custodial system (and/or a vault device associated with the vault administrator system 110). In response to receiving the settlement, in embodiments, the custodial system 114 may effectuate the deposit of the second amount of precious metal.

In embodiments, referring to FIG. 2-50B, step S214 may be substituted with step S214-1. In embodiments, step S214-1 may begin with step S214-1A where one or more authorized participant device(s) 106 (and/or broker device(s) 105) may generate a message instructing one or more market makers (and/or one or more authorized participants) to generate and send the first settlement instructions. The message, at step S214-1B, in embodiments, may be sent by the one or more AP device(s) 106 (and/or broker device(s) 105) to the one or more MM Device(s) 160 (and/or the one or more AP Device(s) 106). At step S214-1C, in embodiments, the one or more market maker device(s) 160 (and/or one or more AP Device(s) 106) receives the message and, at step S214-1D, in embodiments, generates the first settlement instructions. In embodiments, the one or more market maker device(s) 160 (and/or the one or more authorized participant device(s) 106) may send (at step S214-1E) the generated first settlement instructions to the vault administrator system 110 to verify the second amount of precious metal.

The first settlement instructions, in embodiments, at step S215, may be received and executed by the vault administrator system 110 to verify the second amount of precious metal is available for the order. The execution of the first settlement instructions, in embodiments, may result in the transfer of the second amount of precious metal into an account associated with the Administrator 102/104. The transfer of the second amount of precious metal may be instantaneous (e.g., if the second amount of precious metal is already located at vault 112) and/or may take one or more days to execute (e.g., if the second amount of precious metal needs to be moved to the vault 112).

In embodiments, the second amount of precious metal is not completely transferred into the Administrator Account at vault 112. A more detailed description of such embodiments is located in connection with C80-1 of FIG. 2A, the description of which applying herein.

In the event that the second amount of precious metal is transferred into the Administrator Account at vault 112, the vault administrator system 110, in embodiments, may generate and send a confirmation message confirming the transfer of the second amount of precious metal (S216). For example, once the second amount of precious metal is deposited into the Administrator Account, the vault administrator system 110 may generate a first confirmation message indicating that the second amount of precious metal was deposited into the Administrator Account by the authorized participant and/or a third party acting on behalf of the authorized participant (e.g., a Broker). In embodiments, the Administrator Account may be an account owned by the authorized participant over which the Administrator 102/104 has authority. The generated first confirmation message, in embodiments, may be sent to one or more of the following: Administrator 102/104, AP device(s) 106, MM device(s) 107, broker device(s) 105, one or more issuer systems of the plurality of issuer systems 108, and/or the custodial system 114, to name a few.

In embodiments, C50-1 may continue with step S217. At step S217, in embodiments, the Administrator 102/104, receives the confirmation message. In embodiments, the Administrator 102/104 may receive the first confirmation message from the vault administrator system 110 via network 100. In embodiments, once confirmation has been received by the Administrator 102/104, the Administrator 102/104 may verify the confirmation. For example, the Administrator 102/104 may verify the second amount of precious metal, the account that the second amount of precious metal was deposited in, the date and/or time of the deposit, and/or the authorized participant associated with the deposit, to name a few. In embodiments the administrator system 104 may receive the confirmation message and may generate and send a second confirmation message to the secured note issuer administrator system 102.

Referring to FIG. 2-50A, C50-1 may continue with step S218. At step S218, the Administrator 102/104, registers the second amount of precious metal with a fund account associated with the entity (e.g., Broker, AP, AA, M, etc.). In embodiments, the deposit of the second amount of precious metal may be registered in an electronic ledger. In embodiments, the secured note issuer administrator system 102 may register the second amount of precious metal.

Referring back to 2A, in embodiments, C50 may continue with C50-2. At step C50-2, the precious metal may be registered with an account associated with the entity 1000. For example, Administrator 102/104 may register the second amount of precious metal with an account associated with the authorized participant that authorized the transfer of precious metal.

In embodiments, the process for creating fund shares backed by secured notes may continue with C60. In embodiments, C60 may begin with C60-1. At C60-1, in embodiments, the Administrator 102/104 may obtain diversification information associated with diversifying the fund. For example, referring to FIG. 2-60A, at step 220, the Administrator 102/104 obtains first diversification information associated with the plurality of issuers. In embodiments, the administrator system 104 may generate and send a request for the first diversification information to the secured note issuer administrator system 102, which, in embodiments may receive the request. The secured note issuer administrator system 102, responding to the request, in embodiments may obtain the first diversification information, one or more diversification rules, and/or one or more a diversification algorithms associated with diversifying the fund (e.g., diversification algorithms 128). In embodiments the secured note issuer administrator system 102 and/or the administrator system 102 may request authorization and/or access the diversification algorithm(s) and/or diversification rule(s).

Figure 2A:
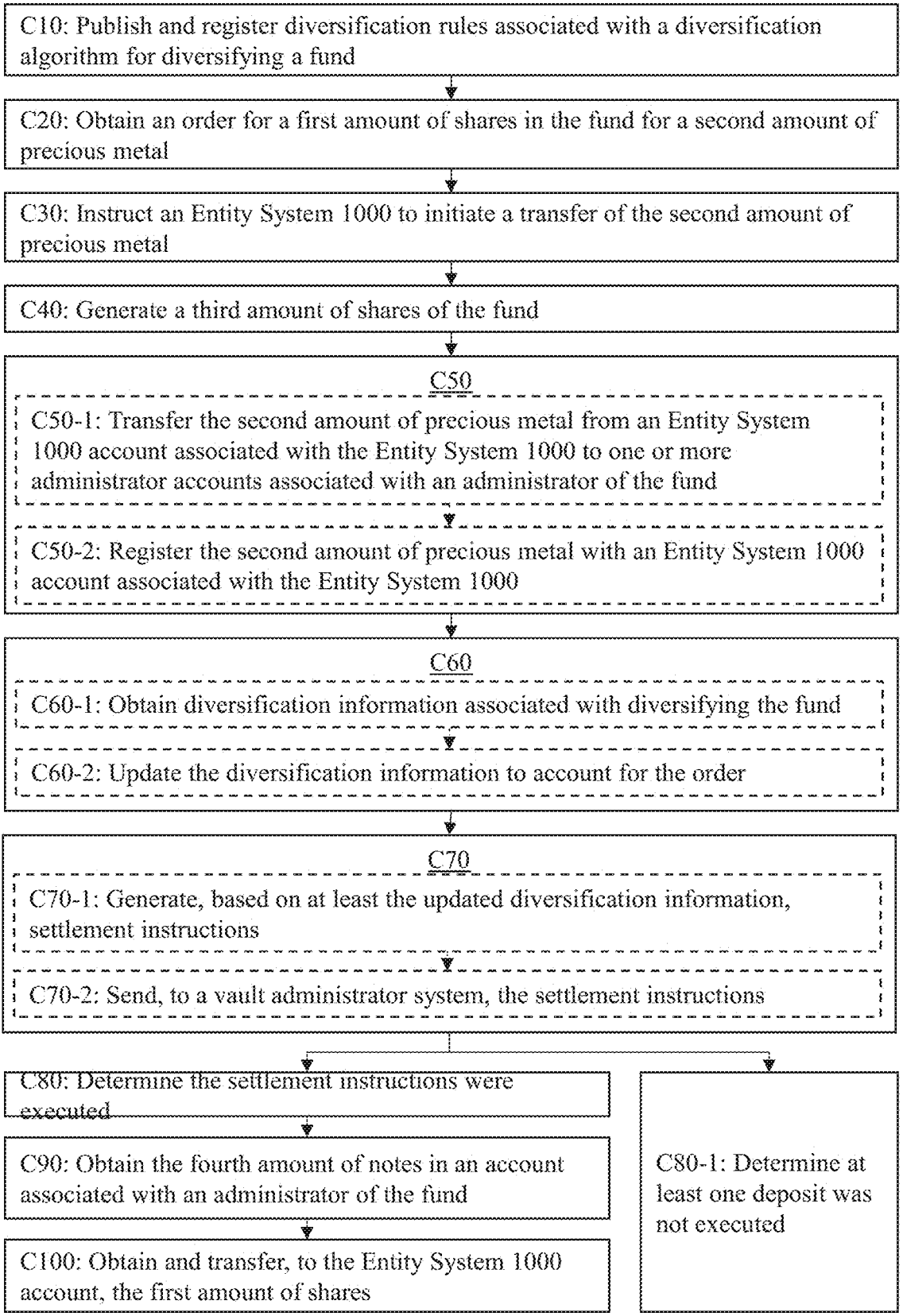
FIG. 2A through FIG. 2D are flow charts illustrating exemplary processes for creating shares in a fund in accordance with exemplary embodiments of the present invention.

In embodiments referring to FIG. 2A, C-60 may continue with C60-2. At C60-2, in embodiments, the Administrator 102/104 may update the diversification information. For example, referring to FIG. 2-60A, at step S222, the first diversification information is updated by generating second diversification information to account for the order in accordance with the diversification algorithm(s) and diversification rule(s). In embodiments, the Administrator 102/104, may generate second diversification information in accordance with the diversification algorithm, the first diversification information, the diversification rules, the first amount of shares, and the second amount of precious metal. In embodiments, the secured note issuer administrator system 102 may generate second diversification information in accordance with the diversification algorithm(s) and/or the diversification rule(s). Continuing the example, the secured note issuer administrator system 102 may send the second diversification information to the administrator system 104. In embodiments, the Administrator System 104 may receive the second diversification information.

Figure 2B:
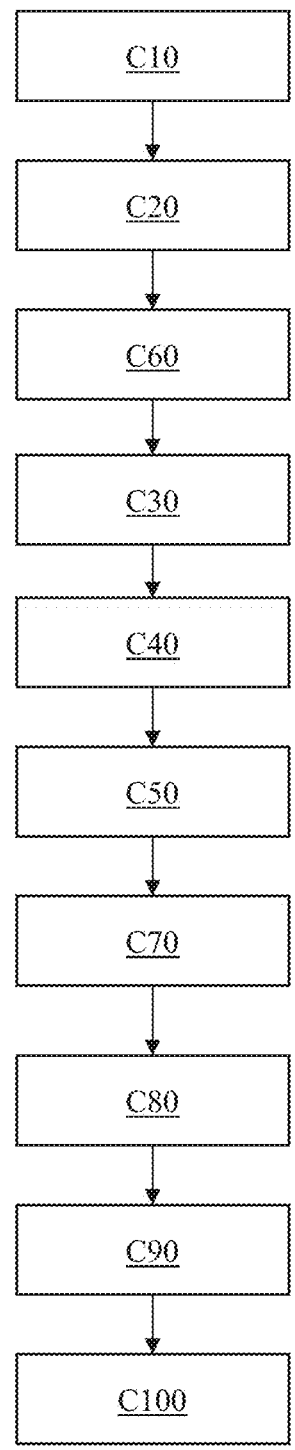
Figure 2C:
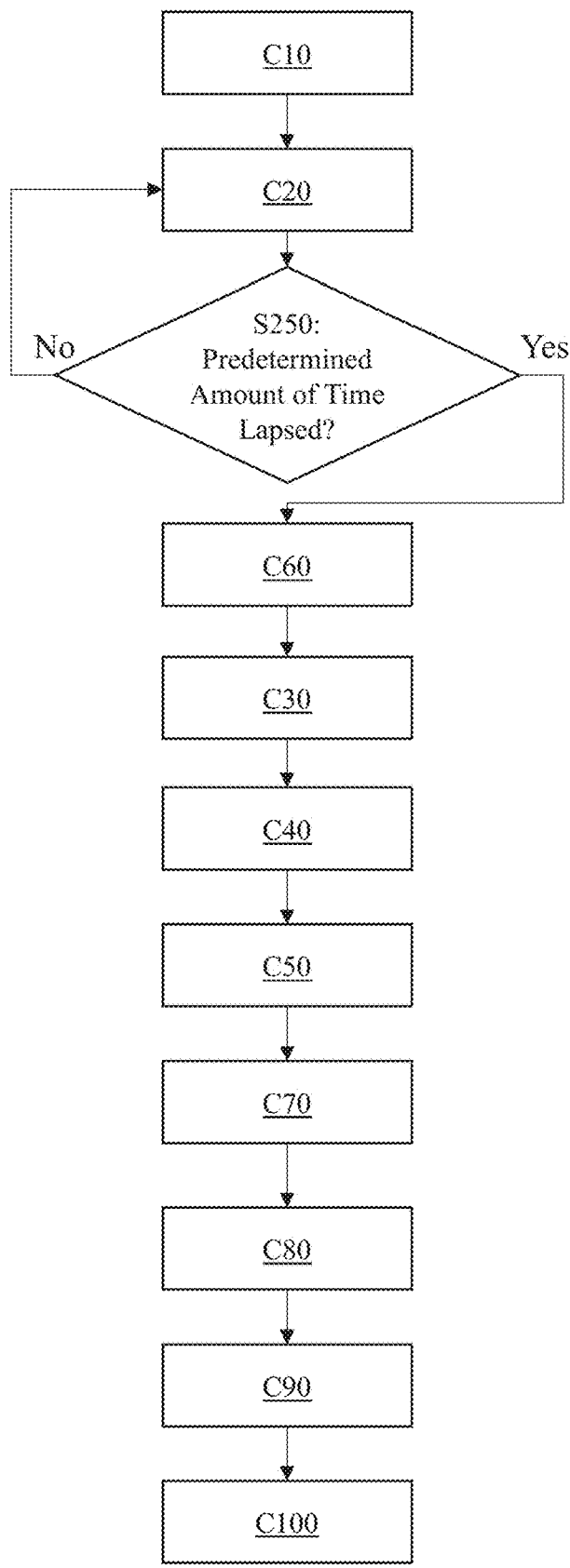
Figure 2D:
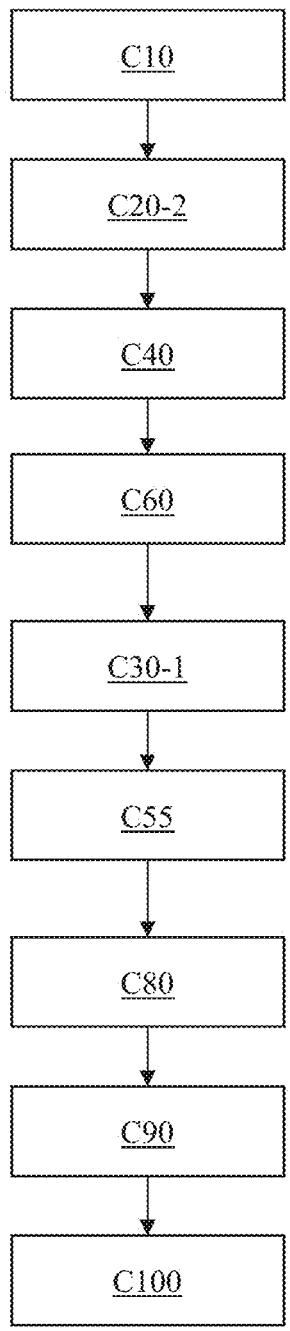
Figures 2, 3, 4, 5, 6, 7, 8, 9, 10:
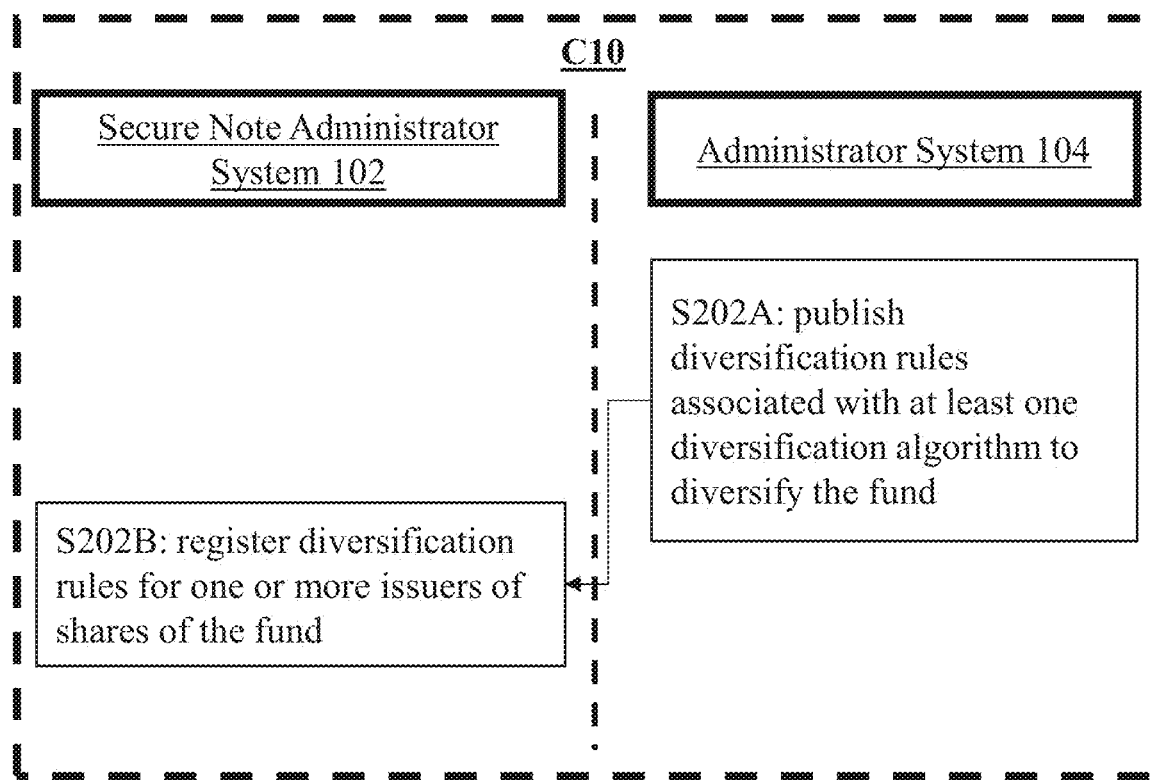
Figures 2, 3, 4, 5, 6, 7, 8, 9, 10, 11, 12, 13, 14, 15, 16, 17, 18, 19, 20, 20A:
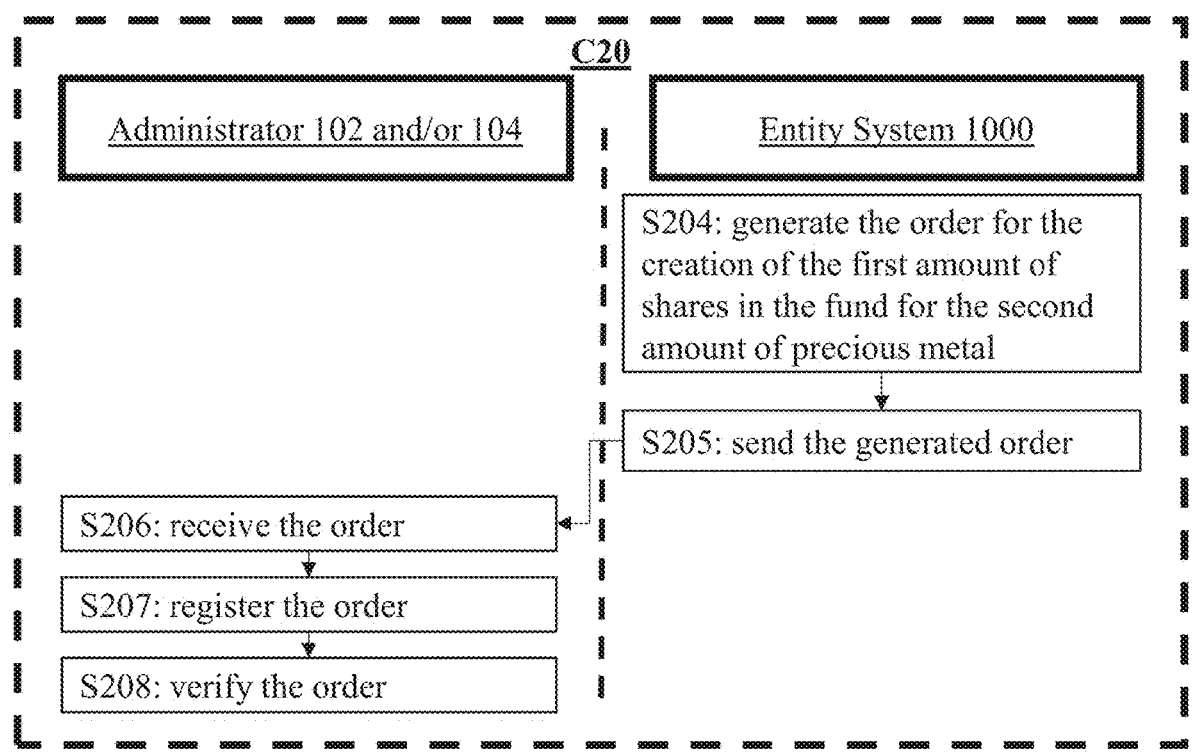
Figures 2, 3, 4, 5, 6, 7, 8, 9, 10, 11, 12, 13, 14, 15, 16, 17, 18, 19, 20, 20B:
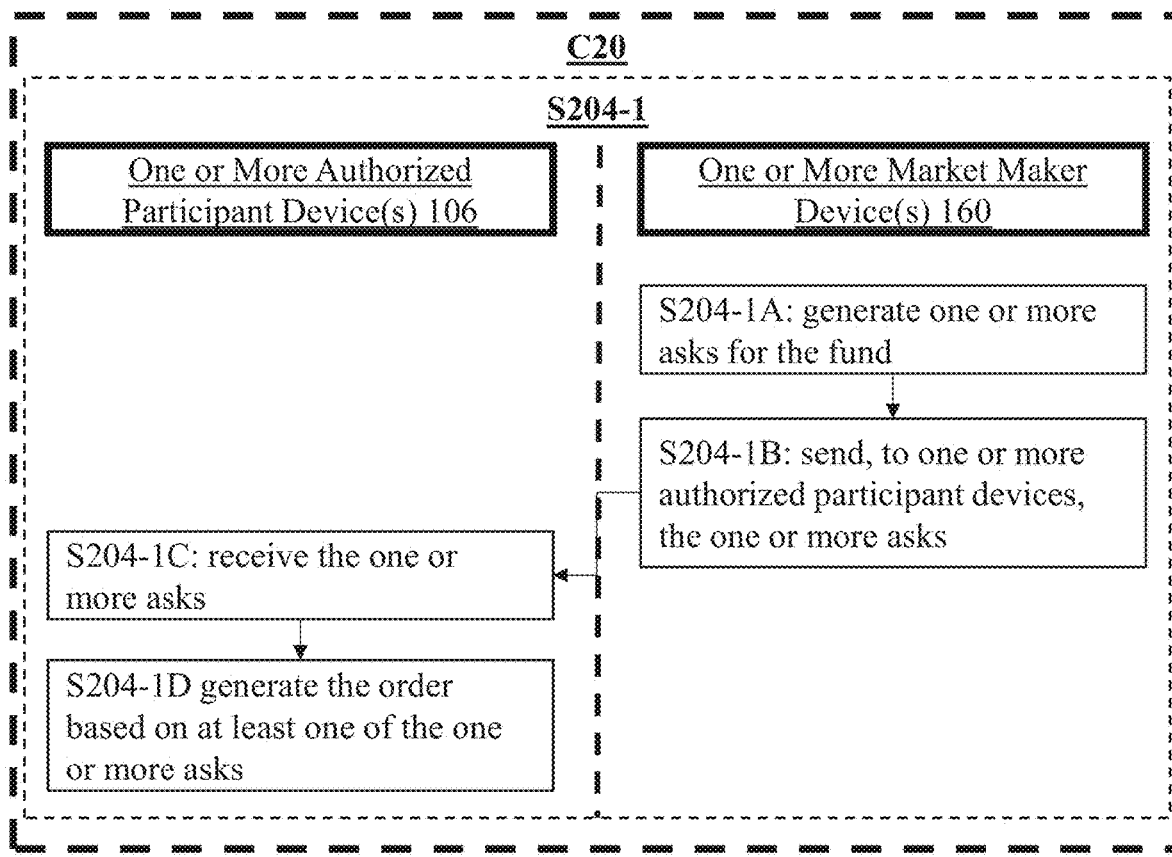
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 30A:
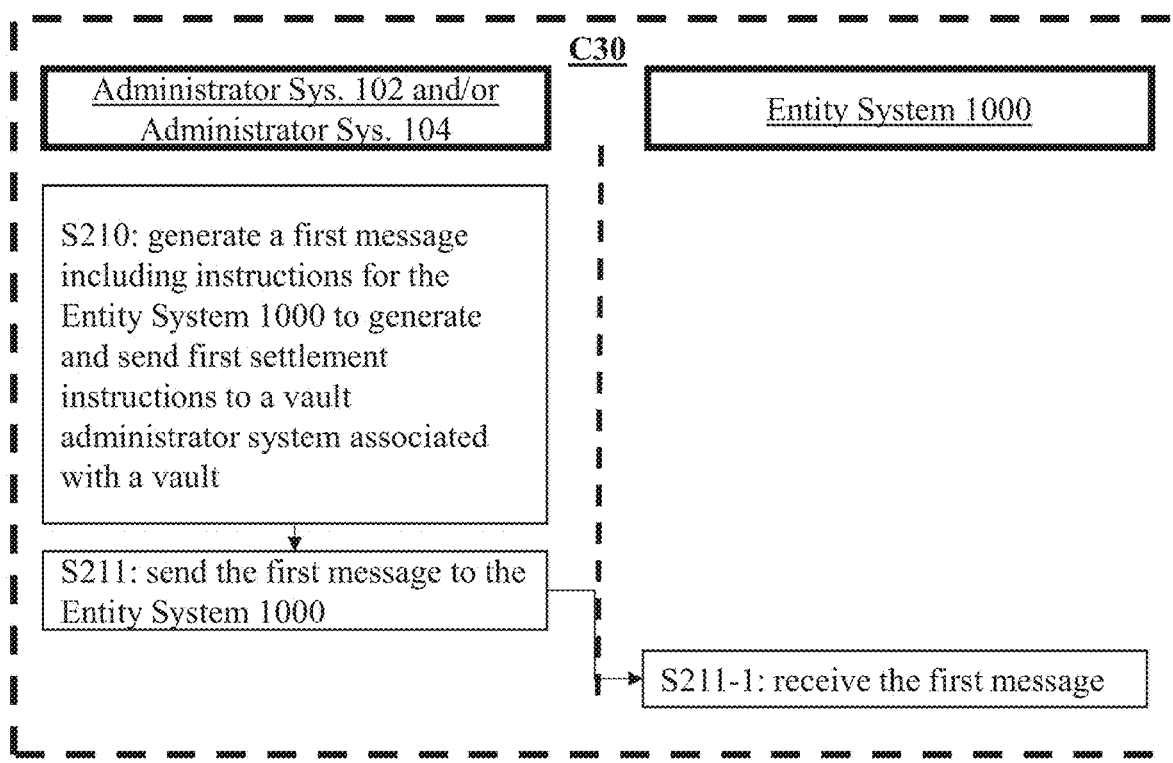
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
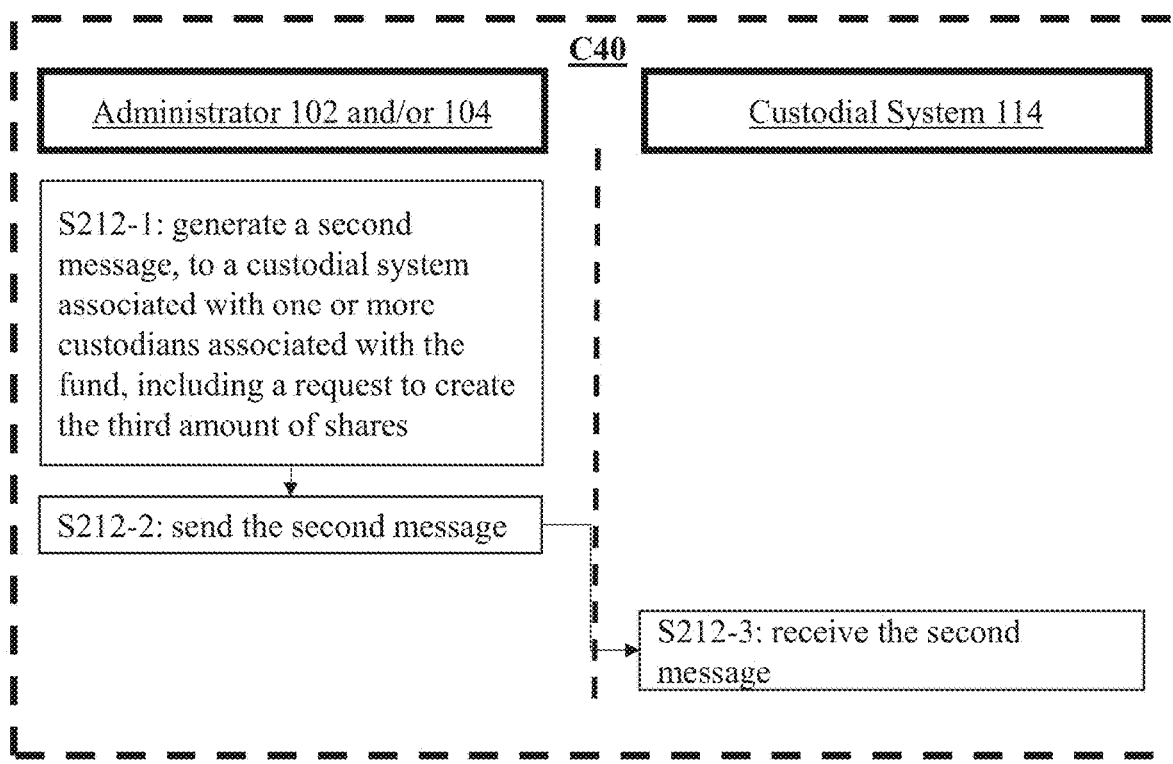
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50A:
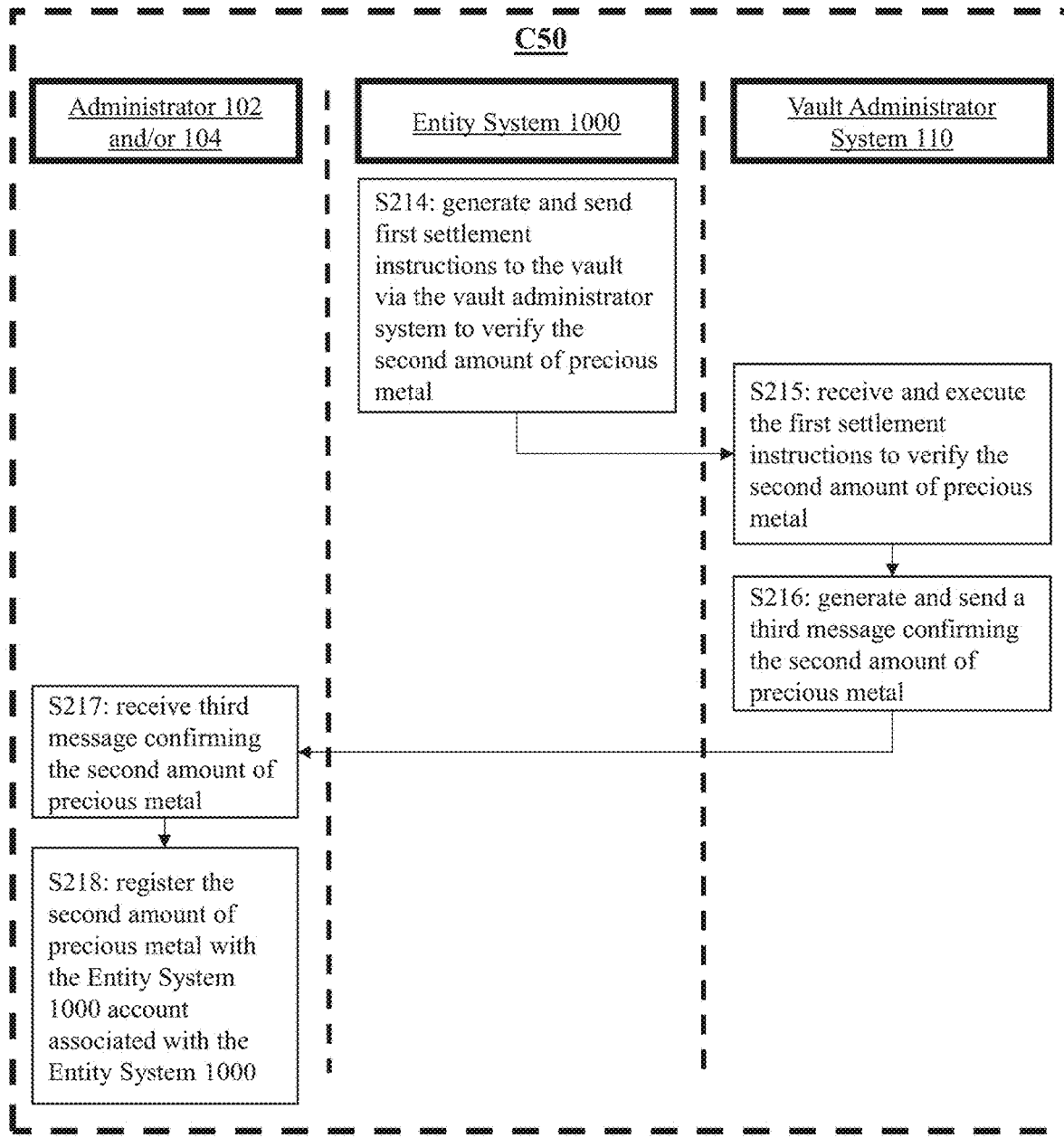
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50B:
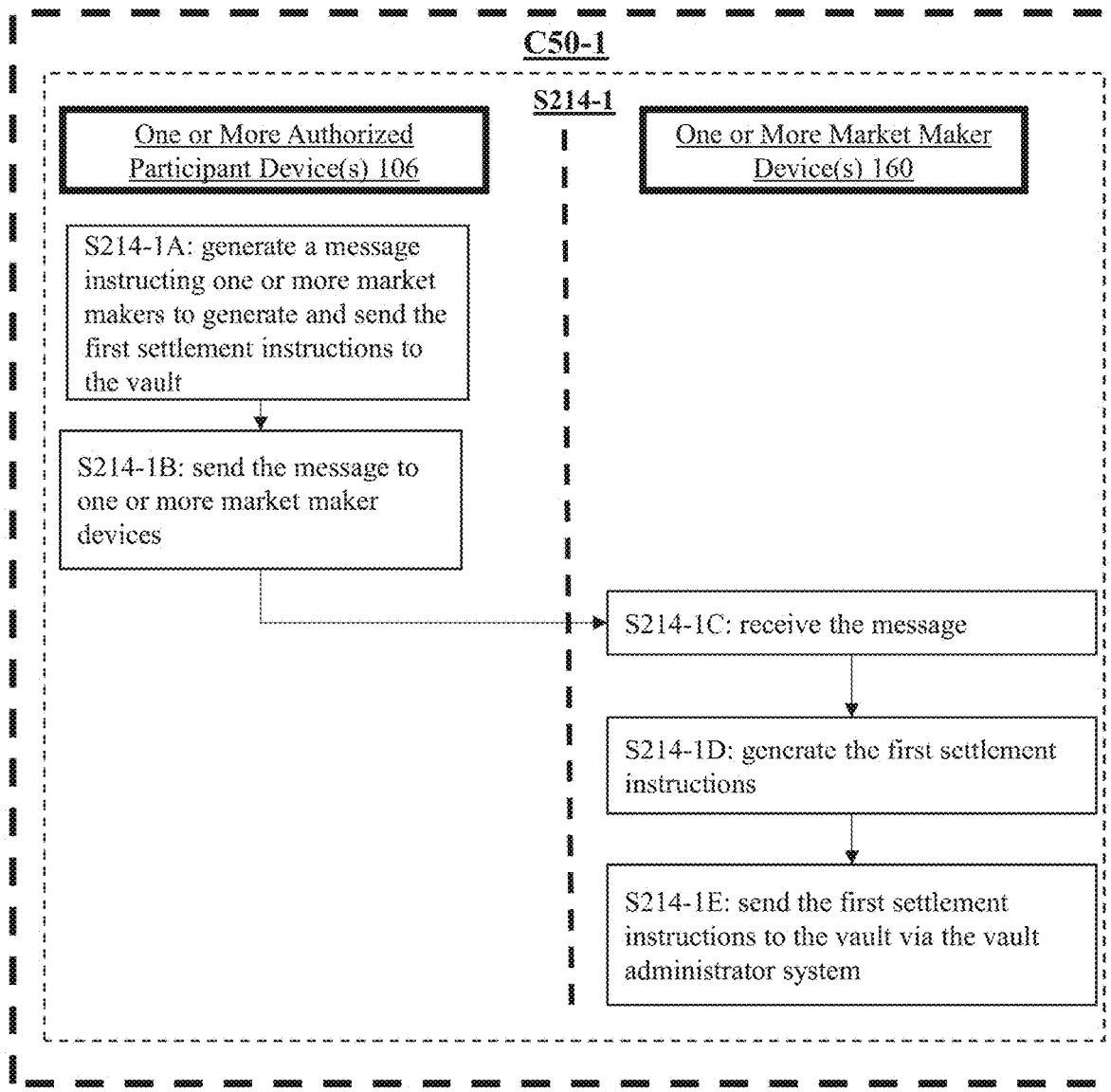
Figures 2, 60A:
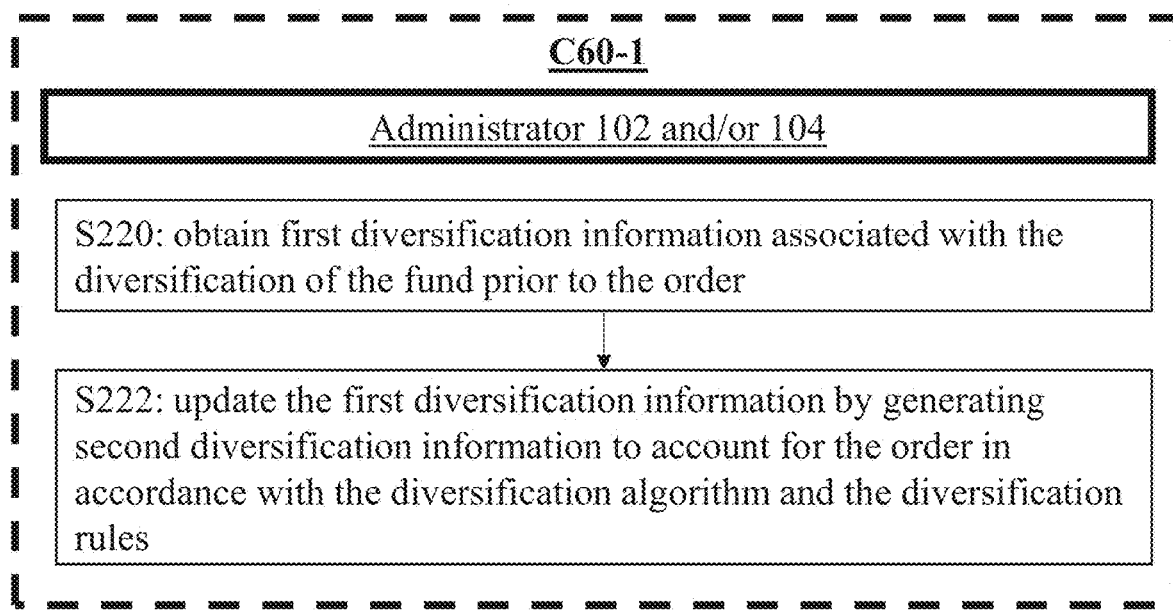
Figures 2, 60B:
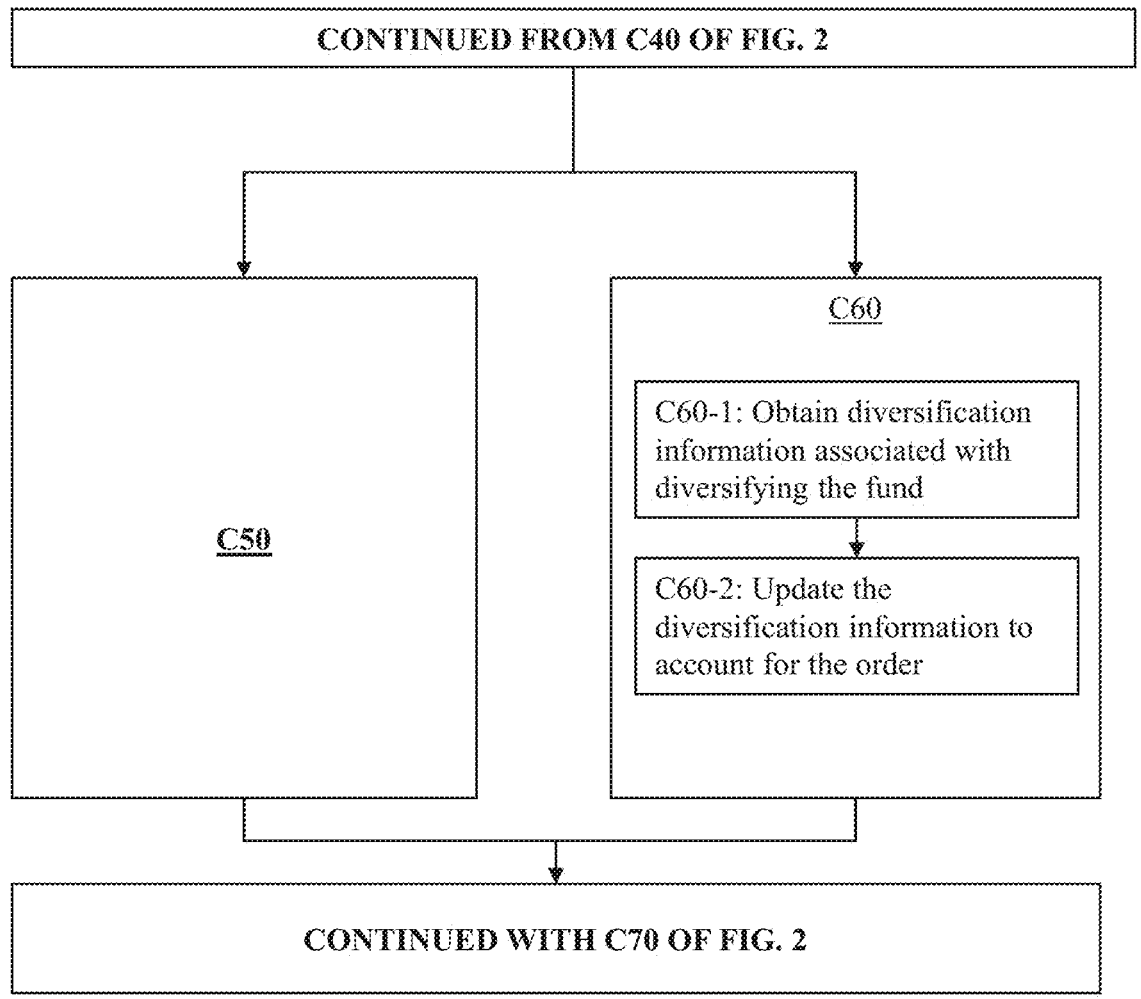

Referring to FIG. 2-60B, in embodiments, C60 may occur before and/or during C50. For example, the Administrator 102/104 may obtain and update the diversification information while the second amount of precious metal is being transferred. In embodiments, the diversification information may be obtained and updated prior to the second amount of precious metal being transferred.

Referring back to FIG. 2A, in embodiments, the process for creating fund shares backed by secured notes may continue with C70. In embodiments, C70 may begin with C70-1. At C70-1, in embodiments, settlement instructions based at least on the updated diversification information are generated. In embodiments, the Administrator 102/104 may generate the settlement instructions to adhere to the order diversification information (e.g., the diversification information associated with the order(s) obtained in C20. For example, the fund may have to distribute the second amount of precious metal among multiple accounts (e.g., administrator, issuer, broker, broker-dealer, to name a few), each account associated with one or more issuers associated with the order obtained in C20, to adhere to the diversification rule(s) and/or diversification algorithm(s). The generated instructions, continuing the example, will instruct the deposit of the second amount of precious metal among each of the multiple accounts. In embodiments, the settlement instructions may include instructions to deposit the second amount of precious metal in one account. The settlement instructions, in embodiments, may be generated by one or more of the following: secured note issuer administrator system 102, administrator system 104, broker device(s) 105, plurality of issuer systems 108, authorized participant device(s) 106, authorized applicant device(s) 107, market maker device(s) 160, and/or a combination thereof, to name a few. In embodiments, C70 may continue with C70-2. At C70-2, in embodiments, the generated settlement instructions are sent to the vault administrator system 110 for execution.

Figures 2, 80A:
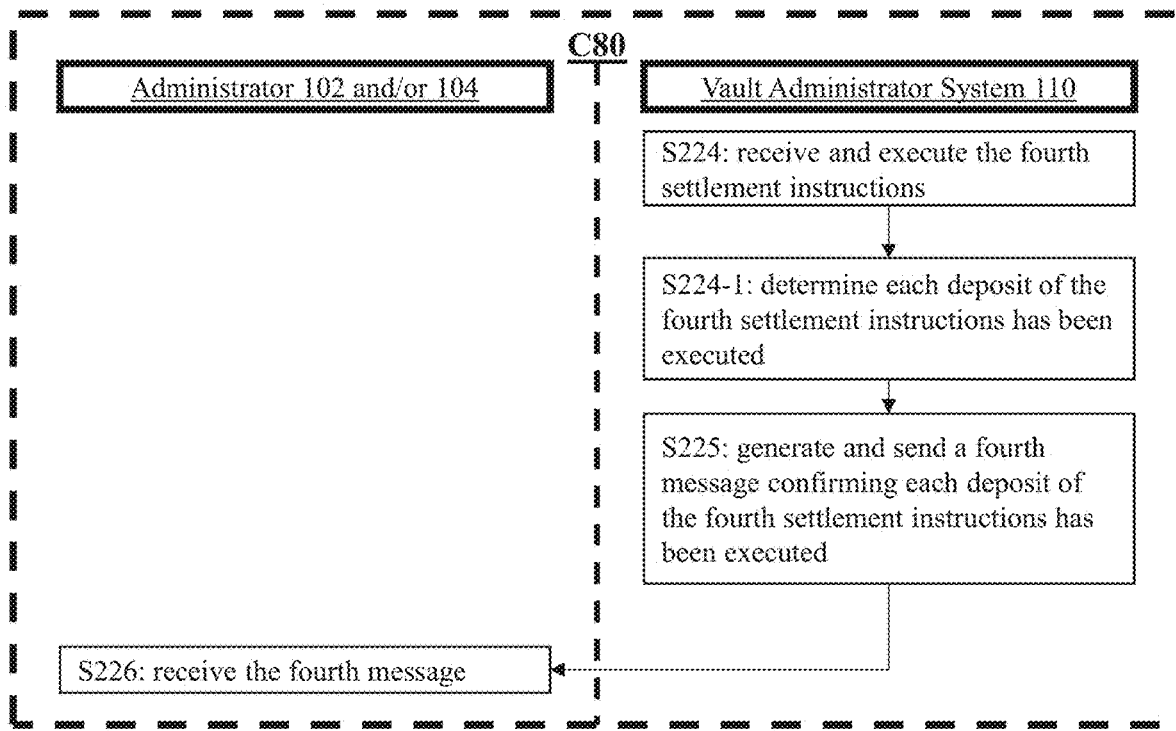

In embodiments, the process for creating fund shares backed by secured notes may continue with C80. In embodiments where the settlement instructions are executed by the vault administrator system, referring to FIG. 2-80A, in embodiments, the generated settlement instructions may have been obtained and executed by the vault administrator system 110 (step S224). The vault administrator may then determine that each deposit associated with the settlement instructions have been executed (step S224-1).

In embodiments, where the settlement instructions have been executed, at step S225, the vault administrator system 110 may generate and send a message confirming each deposit associated with the settlement instructions. The message, in embodiments, may be sent to the Administrator 102/104. In embodiments, the message may be sent to one or more of the following: the secured note issuer administrator system 102, administrator system 104, broker device(s) 105, plurality of issuer systems 108, authorized participant device(s) 106, authorized applicant device(s) 107, market maker device(s) 160, and/or a combination thereof, to name a few. At step S226, in embodiments, the Administrator 102/104 receives the message from the vault administrator system 110.

In embodiments the Administrator 102/104, in embodiments may generate and send, to the vault 112 via the vault administrator system 110 and/or one or more broker device(s) 105, a plurality of second settlement instructions based on the second diversification information. For example, the secured note issuer administrator system 102 may generate the second plurality of settlement instructions based on the second diversification information. In embodiments, the secured note issuer administrator system 102 may send the plurality of second settlement instructions to the administrator system 104. The administrator system 104 may receive the plurality of second settlement instructions and send the plurality of second settlement instructions to the vault 112 via the vault administrator system 110 over network 100. Continuing the example, the vault administrator system 110, may receive and execute the second settlement instructions. Once the instructions have been executed, the vault administrator system 110, in embodiments, may generate and send a second confirmation message to the Administrator 102/104 confirming the execution of each of the plurality of second settlement instructions.

Continuing the example, the Administrator 102/104 receives from the vault administrator system 110, the second confirmation message confirming each of the plurality of second settlement instructions and the execution thereof. In embodiments, the administrator system 104 may receive the second confirmation message from the vault administrator system 110. The administrator system 104 may, in embodiments forward and/or send (and/or generate a third confirmation message and send said confirmation message) the second confirmation message to the secured note issuer administrator system 102 via network 100. In embodiments, the secured note issuer administrator system 102 may receive the second confirmation message. In embodiments, the secured note issuer administrator system 102 may register the second plurality of deposits associated with the plurality of second settlement instructions. In embodiments, the deposits may be registered using an electronic transaction ledger.

In embodiments where the settlement instructions have not been executed, in whole or in part, by the vault administrator system 110 may notify one or more of the following: the Administrator 102/104. broker device(s) 105, plurality of issuer systems 108, authorized participant device(s) 106, authorized applicant device(s) 107, market maker device(s) 160, and/or a combination thereof, to name a few. At step S226, in embodiments, the Administrator 102/104 receives the message from the vault administrator system 110. In embodiments, the vault administrator system 110 may notify each party effected by the failed settlement instructions (e.g., the Broker, issuer, administrator, authorized participant, authorized applicant, and/or market maker effected by the failed settlement instructions). In embodiments, the vault administrator system 110 may only notify the affected parties.

Figures 2, 80B:
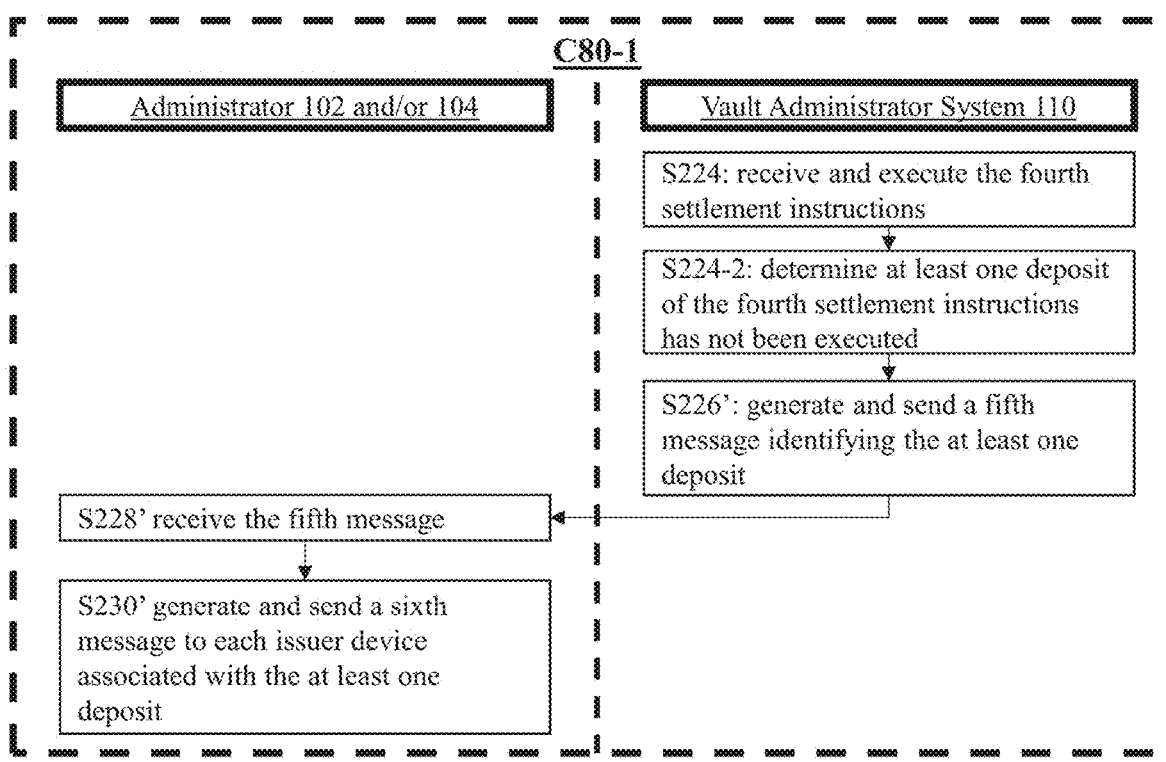

For example, referring to FIG. 2-80B, in embodiments, the generated settlement instructions may have been obtained and executed by the vault administrator system 110 (step S224). At S224-2, in embodiments, the vault administrator system 112 may determine at least one deposit of the fourth settlement instructions has not been executed. In the event at least one deposit of the fourth settlement instructions have not been executed, at step S226', in embodiments, the vault administrator system 110 generates and sends a message identifying the at least one deposit that was not executed. At step S228', in embodiments, the Administrator 102/104 receives the message from the vault administrator system 110. The Administrator 102/104, in embodiments at step S230', may generate and send a message to each issuer device associated with the at least one deposit. Referring back to 2A, if at least one of the deposits has not been executed the process of FIG. 2A may end.

Referring to FIG. 2A, in embodiments, the process of creating shares in a fund may continue with C90. At C90, in embodiments, the fourth amount of secured notes are obtained in an account associated with an administrator of the fund (e.g., Administrator 102/104). The fourth amount of secured notes, in embodiments, may be generated by the Administrator 102/104 (and/or custodial system 114). In embodiments, the Administrator System 102/104, may generate and send, to a first set of secured note issuer devices of the plurality of issuer devices 108, secured note issuance instructions, including note transfer instructions. For example, the Administrator System 102/104 may generate secured note issuance (including an allocation amount) for allocating at least a portion of the second amount of precious metal among one or more issuers of the plurality of issuers by applying Equation 1 (e.g., determining an allocation amount based on the updated diversification information, an updated total amount of precious metal, and/or an updated total of secured notes in view of the order obtained in C20). In embodiments, the allocation amount of the second set of secured note issuer devices is zero. In such embodiments where the allocation amount is zero, no secured note issuance instructions are generated. The secured note issuance instructions, in embodiments, are sent with the allocation amount to the first set of secured note issuer devices of the plurality of issuer devices 108. The secured note issuance instructions and/or the allocation amount for each issuer of the first set of issuers may be stored by the Administrator 102/104. The first set of issuers, in embodiments, may one or more of the plurality of issuers.

In embodiments, a secured note transfer agent may act on behalf of the first set of issuers. For example, the first set of issuers may generate and send (or forward) secured note issuance instructions to the secured note transfer agent associated with a custodial device associated with the custodial system 114 via network 100. In response to receiving the secured note issuance instructions, in embodiments, the custodial system 114 may create the fourth amount of secured notes.

Figures 2, 90A:
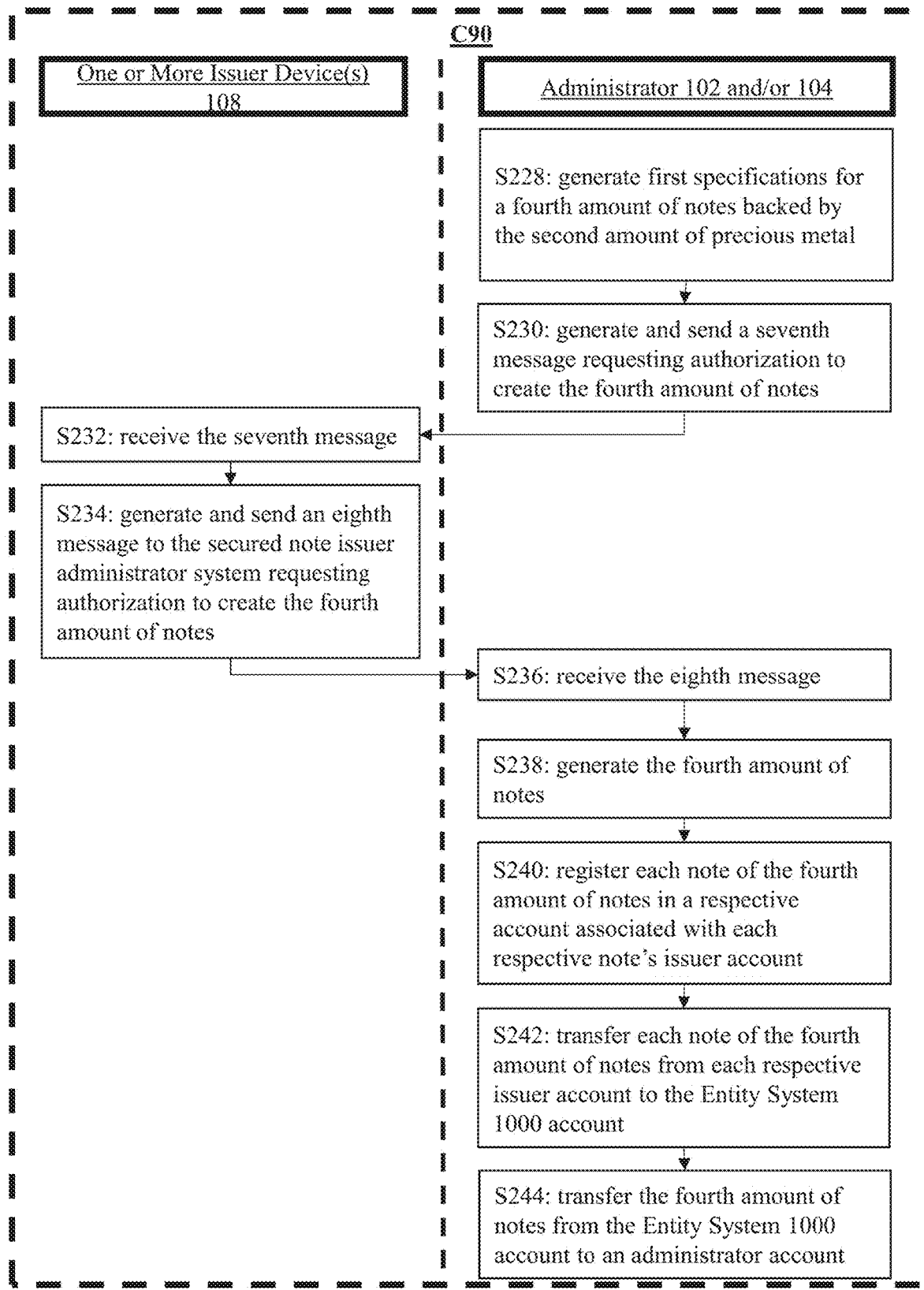

For example, referring to FIG. 2-90A, at step S228, the Administrator 102/104 may generate first specifications for a third amount of secured notes associated with the second amount of precious metal and backing the first amount of shares. In embodiments, the administrator system 104 may generate the request for the first secured note specifications. The administrator system 104, in embodiments may send the generated request for the first specifications to the secured note issuer administrator system 102. The secured note issuer administrator system 102 may receive the request for the first secured note specifications. In embodiments, the secured note issuer administrator system 102 may obtain and/or receive (e.g. from the administrator system 104) the diversification algorithm(s) and/or diversification rule(s) associated with the fund. In embodiments, the secured note issuer administrator system 102 may generate the first secured note specifications in accordance with the diversification algorithm. The secured note issuer administrator system 102, in embodiments, may send the first secured note specifications to the administrator system 104, which, in embodiments, the administrator system 104 may receive.

In embodiments, the Administrator 102/104 may generate and send, to the first set of issuer devices, a second message requesting authorization to create the fourth amount of secured notes associated with the second amount of precious metal. For example, the administrator system 104 may generate and send a message to the plurality of issuer systems.

In embodiments, C90 may continue with step S232. At step S232, the plurality of issuer systems 108 receive the seventh message. In embodiments, at step S234, the plurality of issuer system(s) 108 may generate and send, to the Administrator 102/104, an eighth message authorizing the creation of the fourth amount of secured notes.

The process, in embodiments, may continue with step S236. At step S236, the Administrator 102/104, in embodiments may receive the eighth message. In embodiments, at step S238, the Administrator 102/104, may generate the fourth amount of secured notes. In embodiments, the custodial system 114 may generate the fourth amount of secured notes. In embodiments, the secured notes are generated in paper form. In embodiments, the secured notes are generated in electronic form.

In embodiments, the administrator system 104 may generate a request to create the fourth amount of secured notes for the first set of issuers. The administrator system 104, in embodiments, may send the request to the secured note administrator system 102. In embodiments, the secured note issuer administrator 102 may receive the request. The secured note issuer administrator system 102, in embodiments may generate the fourth amount of secured notes.

C90, in embodiments may continue with step S240. At step S240, the Administrator 102/104, in embodiments may register the fourth amount of notes in respective issuer accounts associated with the plurality of issuers based at least on the second diversification information. For example, the secured note issuer administrator system 102 may register the fourth amount of secured notes with respective issuers of the plurality of issuers based on the second diversification information. In embodiments, the secured note issuer administrator system 102 may generate a confirmation message confirming the generation of the fourth amount of secured notes. The secured note issuer administrator system 102 may, in embodiments, send the confirmation message to the administrator system 102. In embodiments, the administrator system 104 receives the confirmation message.

Figures 2, 90C:
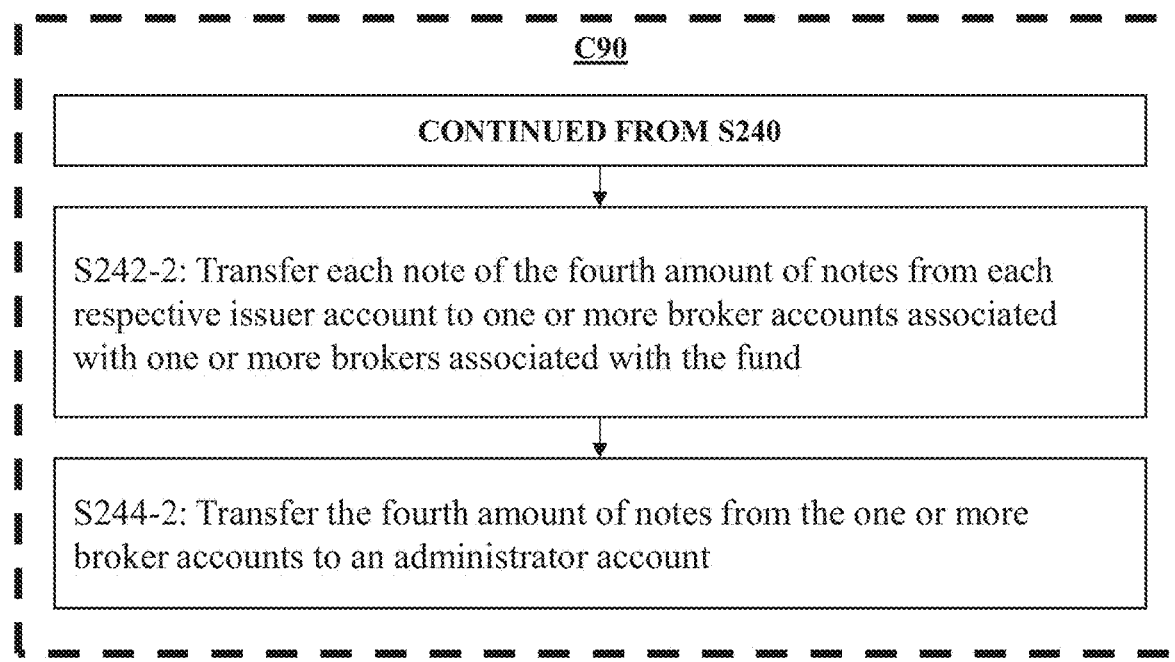

Referring to FIG. 2-90A, in embodiments, the process for creating fund shares backed by secured notes may continue with step S242. At step S242, the Administrator 102/104, in embodiments may transfer the fourth amount of notes from the respective issuer accounts to the authorized participant's account. In embodiments the transfer may be made via an electronic ledger. In embodiments, referring to FIG. 2-90C, steps S242 and S244 may include (and/or may be replaced by) steps S242-2 and S242-2 respectively. At step S242-2, in embodiments, each note may be transferred (e.g., by Administrator 102/104) from each respective issuer account to one or more broker accounts associated with one or more Brokers (e.g., one or more brokers and/or broker-dealers associated with broker device(s) 105) associated with the fund.

Referring back to FIG. 2-90A, in embodiments the transfer of the fourth amount of notes at step S242 may be executed by custodial system 114. In embodiments, the fourth amount of notes may be the first amount of notes. In embodiments the fourth amount of notes may be the first amount of notes less a fee. In embodiments, the first order may include a request for shares in exchange for one or more of the following: an amount of notes from a secondary market; an amount of fiat; an amount of precious metal; and/or a combination thereof, to name a few. For example, referring to FIG. 2-90B, step S242 may be substituted with S242-1 where one or more of the following is transferred: the fourth amount of notes from each respective issuer account to the entity account; fiat associated with the order from an account associated with at least one market maker to the entity account; secured notes from a secondary market, from an account associated with at least one market maker to the entity account; and/or a combination thereof, to name a few.

Referring back to FIG. 2-90A, in embodiments, the administrator system 104, at step S242, may generate a request to transfer the fourth amount of secured notes, from the respective fund issuer accounts to the fund authorized participant account. In embodiments, the administrator system 104 may send the request to the secured note issuer administrator system 102 via network 100. The secured note issuer administrator system 102 may receive the request. In embodiments, the secured note issuer administrator system 102 may transfer the fourth amount of secured notes to the fund authorized participant account. In embodiments, the transfer may be made by custodial system 114. In embodiments, the secured note issuer administrator system 102 may generate an additional confirmation message confirming the transfer of the fourth amount of notes. The secured note issuer administrator system 102, in embodiments, may send the additional confirmation message to the administrator system 104. The administrator system 104 may receive the additional confirmation message from the secured note issuer administrator system 102.

Referring back to FIG. 2-90A, in embodiments, the process of C90 may continue with step S244. At step S244, the Administrator 102/104, in embodiments may transfer the fourth amount of notes from the authorized participant's account to an account associated with the platform system. In embodiments, referring to FIG. 2-90C, step S244-2 may replace and/or be added to step S244. At step S244-2, in embodiments, the fourth amount of notes may be transferred (e.g., by Administrator 102/104) from the one or more broker accounts to an administrator account may transfer each note.

Referring back to FIG. 2-90A, in embodiments, at step S244, the administrator system 104 may generate a request to transfer the fourth amount of secured notes from the fund authorized participant account to the fund administrator account. In embodiments, the administrator system 104 may send the request to the secured note issuer administrator system 102. In embodiments, the secured note issuer administrator system 102 may receive the request, and, may execute the transfer of the fourth amount of secured notes. In embodiments, the transfer may be executed by custodial system 114. In embodiments, the secured note issuer administrator system 102 may generate a confirmation message confirming the transfer of the fourth amount of secured notes. The secured note issuer administrator system 102, in embodiments, may send the confirmation message to the administrator system 104. The administrator system 104 may receive the confirmation message from the secured note issuer administrator system 102.

As described above, in embodiments, the order may include a request for shares in exchange for one or more of the following: an amount of notes from a secondary market; an amount of fiat; an amount of precious metal; and/or a combination thereof, to name a few. For example, referring to FIG. 2-90B, both step S242 and S244 may be substituted with S242-1 and step S244-1 respectively. At step S244-1, in embodiments, one or more of the following transfers occurs: (1) the fourth amount of notes from the entity account to a fourth administrator account; (2) fiat associated with the order from the entity account to a fifth administrator account; (3) secured notes from a secondary market, from the entity account to a sixth administrator account; (4) pre-existing secured notes from a secondary market from the entity account to a seventh administrator account, and/or (5) a combination thereof, to name a few. In embodiments, first, second, third, fourth, fifth, sixth, and/or seventh administrator accounts may be the same account.

Figures 2, 100:
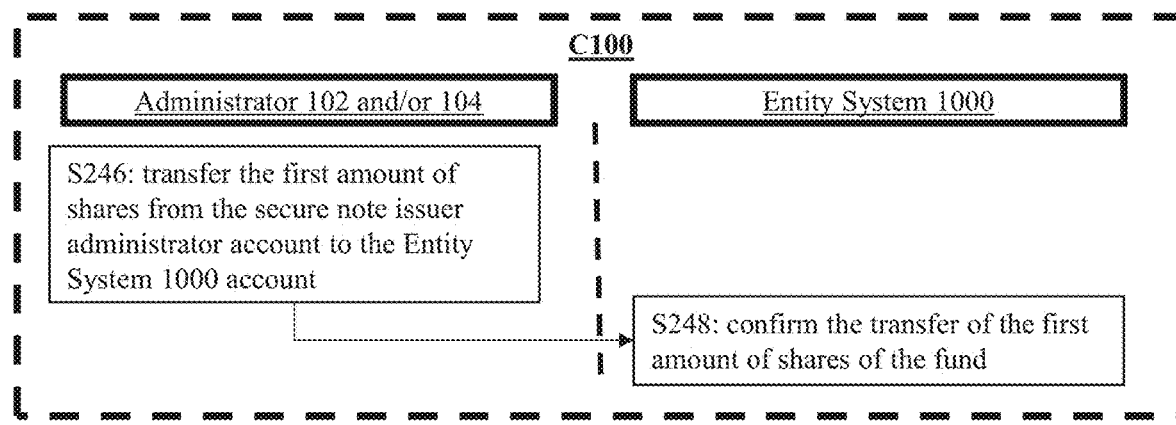

Referring back to FIG. 2A, in embodiments, the process for creating shares may continue with C100. At C100, in embodiments, the first amount of shares are obtained and transferred to the entity account (and/or one or more broker accounts). The first amount of shares, in embodiments, may be transferred to the entity account from one or more broker accounts associated with one or more Brokers associated with one or more broker device(s) 105. In embodiments, referring to FIG. 2-100, C100 may begin with step S246. At step S246, in embodiments, Administrator 102/104 may create and transfer the first amount of shares backed by the third amount of secured notes, from the administrator account (e.g., the fund administrator account, the secured note administrator account, the custodial account, to name a few) to the entity account (e.g., the fund authorized participant account, the market maker account, the authorized applicant account, to name a few). For example, in embodiments, the administrator system 104 may generate a request to create and transfer the first amount of shares backed by the third amount of secured notes to the fund authorized participant account. In embodiments, the administrator system 104 may send the request to the secured note issuer administrator system 102 via network 100. The secured note issuer administrator system 102 may receive the request, and, may effectuate the transfer of the first amount of shares to the fund authorized participant account. In embodiments, the transfer may be executed by the custodial system 114. This exemplary process for creating fund shares backed by secured notes may continue with the confirmation of the transfer of the first amount of shares. One or more of the following, in embodiments, may confirm the transfer of the first amount of shares: administrator system 104, secured note administrator system 102, AP Device(s) 106, AA Device(s) 107, custodial system 114, vault administrator system 110, and/or one or more of the plurality of issuer devices 108, and/or a combination thereof.

In embodiments, the steps of the processes described in connection with FIG. 2A may be rearranged or omitted. For example, referring to FIG. 2B, updating the diversification information (C60) and generating settlement instructions based on the updated diversification information (a portion of C70) may occur prior to the generation of the third amount of shares in C40 (i.e. the steps of the process illustrated in FIG. 2A may be rearranged from C10, C20, C30, C40, C50, C60, C70, C80, C90, C100 to –C10, C20, C60, C30, C40, C50, C70, C80, C90, C100). As shown in FIG. 2B, C30 may be rearranged such the account being verified is the account that the Administrator 102/104 has access. C30 may, in embodiments, verify the execution of the settlement instructions. In embodiments, C30 may be optional.

In embodiments, the steps of the process described in connection with FIG. 2B may be rearranged or omitted. For example, referring to FIG. 2C, the diversification information may not be updated (C60), until, at step S250, a predetermined amount of time has elapsed. If a predetermined amount of time has not elapsed, orders may continue to be obtained at C20. For example, an administrator may update its diversification information every day at 5:00 PM. Continuing the example, C20 may continue until the time reaches 5:00 PM, when step S250 will continue the process to C60 where the diversification information is updated in view of one or more of the orders obtained in step C20.

The predetermined amount of time may refer to a time range, amount, or time of day, to name a few. For example, S250 may determine the predetermined amount of time has elapsed once an amount of time has elapsed from the publication of the diversification rules (e.g., an hour, a day, a week, month, year, etc.). As another example, S250 may determine the predetermined amount of time has elapsed at the close of business (i.e., a time of day). In embodiments, step S250 may determine whether a particular amount of orders and/or orders from particular entities (e.g., AP, AA, Admin, MM, etc.) has occurred before moving to C60. For example, an administrator may obtain orders until 100 orders have been obtained. As another example, an administrator may obtain orders until a certain value of orders have been obtained (e.g., an amount of precious metal, an amount of shares, an amount of fiat, and/or a combination thereof, to name a few).

As noted above, in embodiments, the steps of the processes described in connection with FIG. 2A may be rearranged or omitted. As another example, referring to FIG. 2D, the process for creating shares may include receiving fiat, shares from the secondary market, and/or precious metal in exchange for share of the fund. Continuing the example, an exemplary process may be as follows: C10, C20-2, C40, C60, C30-1, C55, C80, C90, C100. As shown in FIG. 2D, in embodiments, C30 and/or C70 may be omitted. C30 and/or C70, in embodiments and as illustrated in FIG. 2D, may be substituted with C30-1 and/or C55. Referring to FIG. 2-30B, C30-1 may include, in embodiments step S210-1. At step S210-1, in embodiments, a first message may be generated. The first message, in embodiments, may include one or more of the following: (1) first instructions for the entity 1000 to generate and send first settlement instructions to a vault associated with the vault administrator system 112 to verify the entity 1000 has sufficient precious metal for the first order; (2) second instructions for the entity 1000 to generate and send second settlement instructions to verify the entity 1000 has sufficient fiat; and/or (3) third instructions for the entity 1000 to generate and send third settlement instructions to verify the entity 1000 has sufficient notes from the secondary market, to name a few.

Referring back to FIG. 2D, the process for creating shares may continue with C55. C55, referring to FIG. 2-50C, in embodiments, may begin with step S214-2. At step S214-2, in embodiments, first settlement instructions may be generated. The first settlement instructions, in embodiments, may include one or more of the following: (1) a first set of deposits including one or more transfer instructions to transfer precious metal from the entity account to a first administrator account; (2) a second set of deposits including one or more transfer instructions to transfer fiat from the entity account to a second administrator account; and/or (3) a third set of deposits including one or more transfer instructions to transfer secured notes from the entity account to a third administrator account, to name a few.

In embodiments, C55 may continue with step S214-3. At step S214-3, in embodiments, the first settlement instructions are sent, via network 100, to one or more of the following: the vault 112 via the vault administrator 110; a financial institution; and/or a custodian of custodial system 114, to name a few.

FIGS. 2A-2D, 2-10, 2-20A through 2-20E, 2-30, 2-50A through 2-50C, 2-60A through 2-60B, 2-70A through 2-70B, 2-80A through 2-80B and 2-100 may be rearranged or omitted.

Figure 7B:
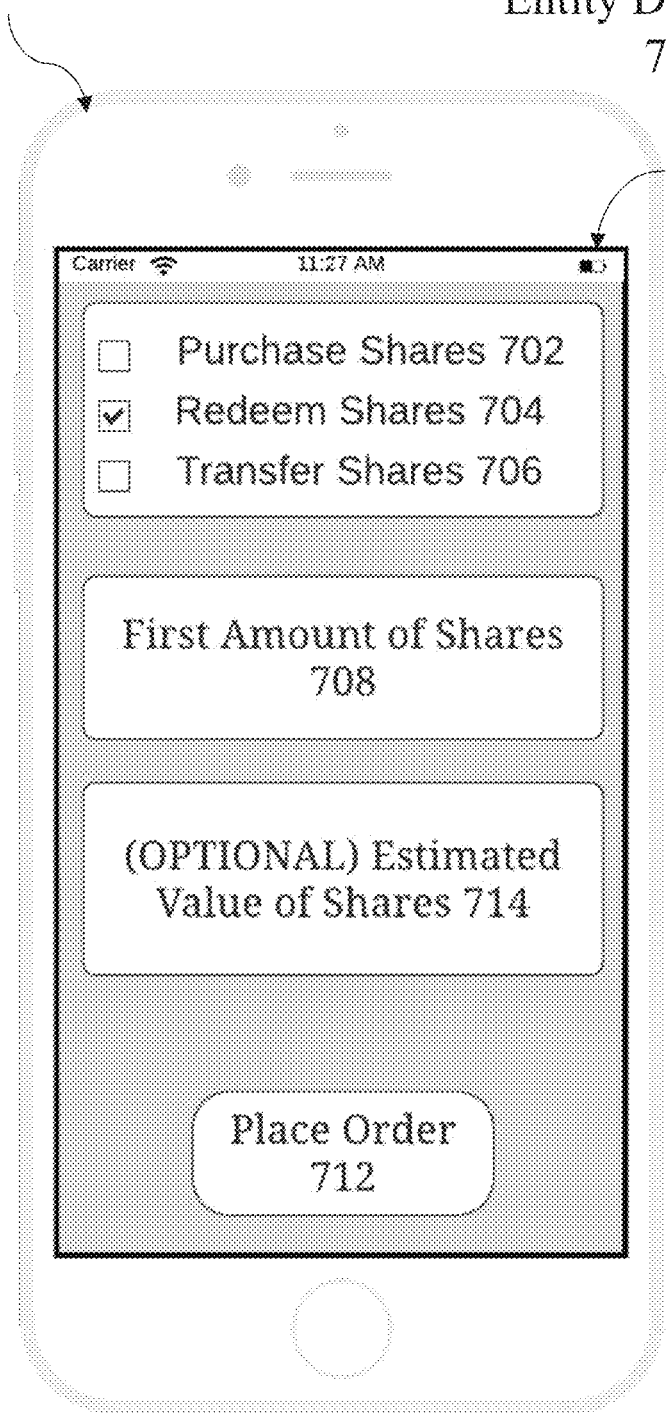
Figure 7C:
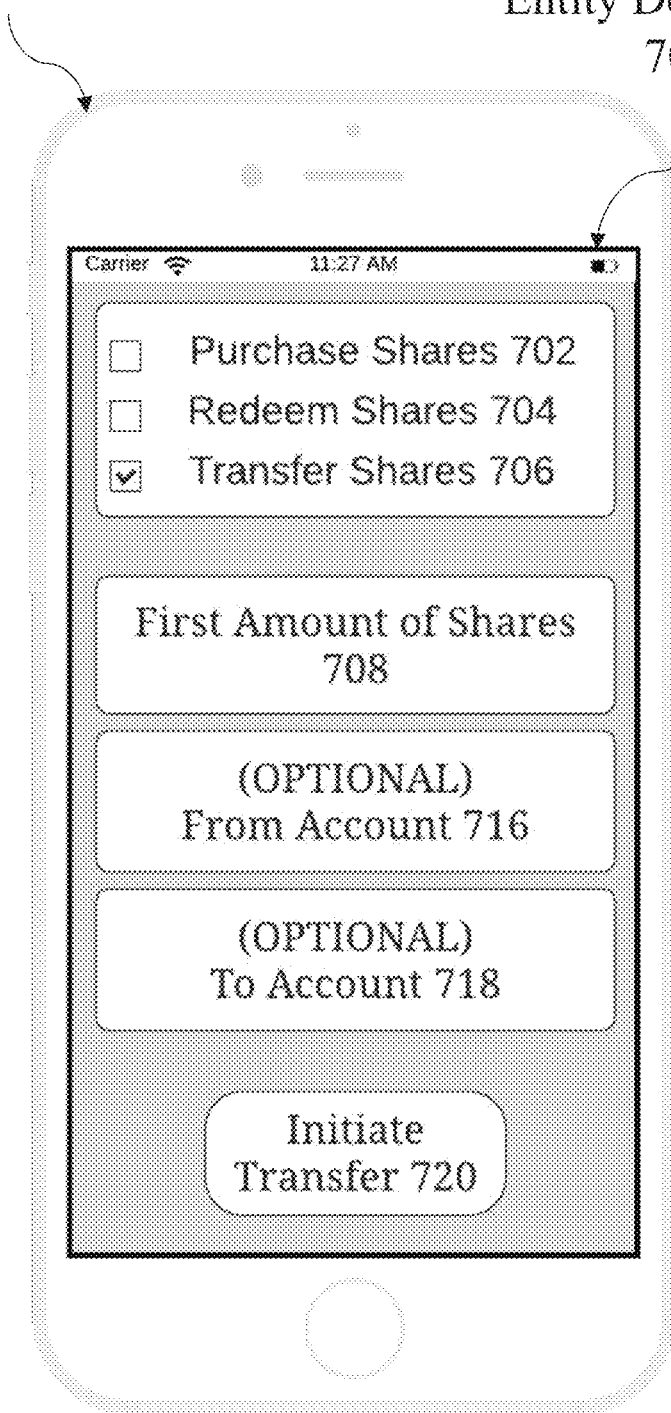

In embodiments, shares of the fund may be transferred (e.g., between accounts associated with the same entity and/or from an account associated with a first entity and an account associated with a second entity, to name a few). For example, referring to FIG. 7C, a device associated with an entity (e.g., entity device 700-3) may transfer one or more shares of the fund. Continuing the example, the entity display device 700-3 may display via the entity device display 700-3A one or more of the following: purchase shares 702 option, redemption shares 704 option, transfer shares 706 option, the amount of shares associated with the request to transfer (e.g., First Amount of Shares 708), the account or accounts where the amount of shares being transferred originate from (e.g., optional from account 716), the destination account or accounts associated with the order (e.g., optional to account 718), and/or an option to place the order or transfer request (e.g., Initiate Transfer 720 option), to name a few. For the purposes of this example, in embodiments, entity 1000 may place a request (and/or order) to transfer the First Amount of Shares 708 valued at the Estimated Value of Shares 714 by selecting Place Order 712. In embodiments, the Administrator 102/104 may receive the request and/or order to transfer shares. In embodiments, the Administrator 102/104 may authenticate, validate, and/or (if authenticated and/or validated) execute the request and/or order to transfer the first amount of shares. The description of authentication and validation of the order may be similar to the description of authentication and validation associated with FIG. 7A, the description of which applying herein.

Figure 8B:
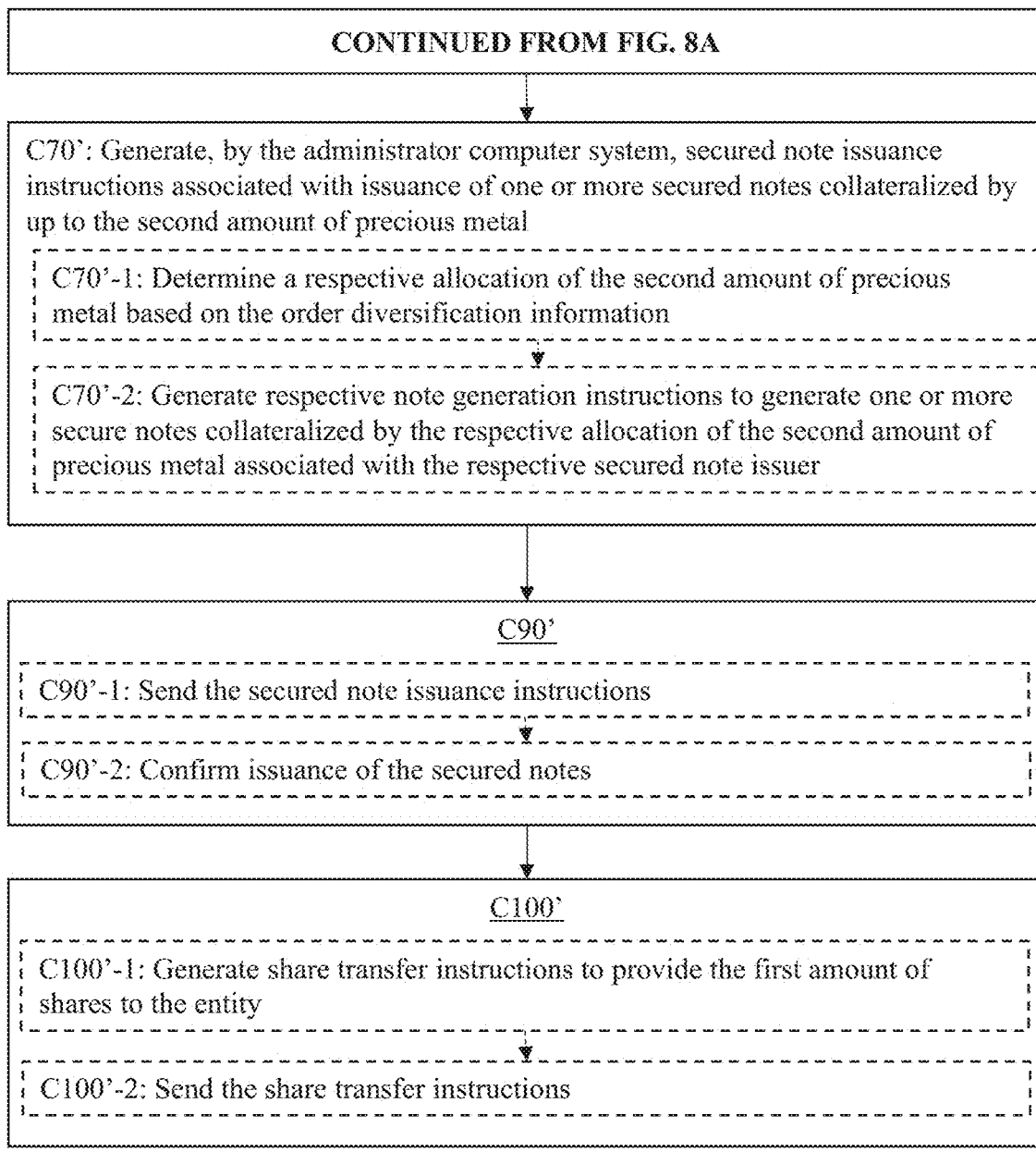

The Administrator 102/104 (administrator system 104 and/or secured note issuer administrator system 102), in embodiments, may create or arrange for creation of or otherwise provide one or more shares of one or more funds backed by secured notes in accordance with FIGS. 8A and 8B. Referring to FIG. 8A, in embodiments, creating shares for a fund backed by secured notes may begin with C20'. In embodiments, as illustrated in connection with FIG. 8A, C20' may begin with step C20'-1. At step C20'-1, in embodiments, the Administrator 102/104 may obtain an order (e.g., the first order) for a first amount of shares in the fund for a second amount of precious metal. The order obtained in step C20' may be similar to the orders obtained in connection with C20 described above in connection with FIG. 2A, the description of which applying herein. C20', in embodiments, may continue with step C20'-2. At step C20'-2, in embodiments, the Administrator 102/104 may verify the obtained order. The order, in embodiments, may be verified by: confirming the identity of the entity associated with the order (e.g., the authorized participant associated with the authorized participant device 106); determining the second amount of precious metal associated with the first amount of shares; comparing the determined second amount (e.g., calculated by the Administrator 102/104 based on the order and/or the value of the first amount of shares) to the received second amount (e.g., the amount of precious metal identified by the order); and/or confirming the authorized participant is an authorized participant of the fund, to name a few. In embodiments, verifying the order may be similar to processing the first request, which is described below in connection with FIG. 6A through FIG. 6D, the description of which applying herein.

The process illustrated in connection with FIG. 8A may continue with step C60'. In embodiments, at step C60' the Administrator 102/104 may update the diversification information associated with the secured notes held by the fund. Step C60', in embodiments, may be similar to step C60, described above in connection with FIGS. 2A-2D, 2-10, 2-20A through 2-20E, 2-30, 2-50A through 2-50C, 2-60A through 2-60B, 2-70A through 2-70B, 2-80A through 2-80B and 2-100, the descriptions of which applying herein.

In embodiments, as illustrated in connection with FIG. 8A, C60' may begin with step C60'-1. At step C60'-1, in embodiments, current diversification information associated with the secured notes held by the fund prior to obtaining the first order may be obtained. For example, the administrator 104 may obtain first diversification information by accessing memory (e.g., memory 104-2), which may store a current version of the diversification information (e.g., the current diversification information). As another example, the administrator 104 may obtain the current diversification information by generating and sending a request for the current diversification information to the secured note issuer administrator system 102, which, in embodiments may receive the request. The secured note issuer administrator system 102, may obtain and send to the administrator 104 the current diversification information (e.g., by accessing memory 102-2) In embodiments, the secured note issuer administrator system 102 and the administrator 104 may be embodied in the same system or device. In embodiments, the current diversification information may be obtained or determined using one or more of the following: one or more diversification rules, and/or one or more a diversification algorithms associated with diversifying the fund (e.g., diversification algorithms 128). In embodiments the secured note issuer administrator system 102 and/or the administrator system 104 may request authorization and/or access the diversification information, diversification algorithm(s), and/or diversification rule(s). The current diversification, in embodiments, may refer to the diversification information calculated and stored prior to obtaining the first order. In embodiments, the current diversification information may refer to the diversification information that was calculated and stored prior to executing the first order.

In embodiments, as illustrated in connection with FIG. 8A, C60' may continue with step C60'-2. At step C60'-2, in embodiments, order diversification information associated with the first order, particularly the second amount of precious metal, may be determined. For example, the administrator 104 (and/or the secured note administrator system 102) may determine how the second amount of precious metal is distributed among the plurality of issuers, in accordance with the diversification rules and/or diversification algorithms. In embodiments, the determination may be based on a round robin type of diversification. The order diversification information, in embodiments, may be similar to the second diversification information described above in connection with FIG. 2A, the description of which applying herein.

In embodiments, as illustrated in connection with FIG. 8A, C60' may continue with step C60'-3. At step C60'-3, in embodiments, the current diversification information may be updated based on the determined order diversification information. For example, the current diversification information is updated by the administrator 104 (and/or the secured note administrator system 102) to include the order diversification information to provide updated diversification information (e.g., generating diversification information to account for the order in accordance with the diversification algorithm(s) and diversification rule(s)). In embodiments, the Administrator 102/104, may generate the updated diversification information may be provided in accordance with the diversification algorithm, the order diversification information, the diversification rules, the first amount of shares, and the second amount of precious metal. In embodiments, the secured note issuer administrator system 102 may generate the updated diversification information in accordance with the diversification algorithm(s) and/or the diversification rule(s). Continuing the example, the secured note issuer administrator system 102 may send the updated current diversification information to the administrator system 104. In embodiments, the administrator 104 may receive the updated current diversification information. As noted above, in embodiments the secured note issuer administrator system 102 may be embodied with the administrator system 104.

In embodiments, as illustrated in connection with FIG. 8A, C60' may continue with step C60'-4. At C60'-4, in embodiments, the updated diversification information may be stored as the current diversification information. For example, the administrator 104 may store the updated diversification information as the current diversification information in memory 104-2. In another example, the administrator 104 may send the updated diversification information to the secured note administrator system 102, which may receive and store the updated current diversification information as the current diversification information (e.g., in memory 102-2). In another example, secured note administrator system 102 may send the updated current diversification information to the administrator 104, which may receive and store the updated current diversification information as the current information (e.g., in memory 104-2).

In embodiments, as illustrated in connection with FIG. 8A, C60' may continue with step C60'-5. At step C60'-5, in embodiments, the order diversification information may be stored. For example, the administrator 104 may store the order diversification information in memory 104-2. As another example, the administrator 104 may send the order diversification information to the secured note administrator system 102, which may receive and store the order diversification information (e.g., in memory 102-2). As another example, secured note administrator system 102 may send the order diversification information to the administrator 104, which may receive and store the order diversification information (e.g., in memory 104-2).

In embodiments, the order diversification information and/or the updated diversification information may identify one or more issuers of the plurality of issuers to receive at least a portion of the second amount of precious metal. In embodiments, the second amount of precious metal may be distributed to one or more custody accounts associated with each of the plurality of issuers.

The process illustrated in connection with FIG. 8A may continue with C50'. In embodiments, C50' may begin with step C50'-1. At step C50'-1, in embodiments, settlement instructions associated with the transferring of the second amount of precious metal to a first set of custody accounts associated with or more vaults may be generated. In embodiments, the settlement instructions may be based on the updated diversification information or the order diversification information. The settlement instructions (which may be similar to the settlement instructions described above, the description of which applying herein), in embodiments, may be instructions generated for an entity (e.g., Entity 1000, one or more AP's, one or more AA's, to name a few) to transfer the second amount of precious metal from one or more accounts associated with the entity to one or more accounts associated with the plurality of issuers (e.g., the issuers associated with the first set of custody accounts). The settlement instructions, in embodiments, may be generated such that the entity, to execute the instructions, may confirm (e.g., digitally sign) and forward the instructions to one or more vaults (e.g., one or more vaults 112), one or more custodial systems (e.g., custodial system 114), and/or one or more vault administrators (e.g., vault administrator system 110). In embodiments, the settlement instructions may include the first set of custody accounts and a message indicating each deposit value (e.g., portion of the second amount of precious metal) and corresponding account of the first set of custody accounts. The settlement instructions, in embodiments, at step C50'-2, may be sent to the entity system 1000 (e.g., via network 100).

The entity system 1000, in embodiments, may receive the settlement instructions. For example, the entity system (e.g., authorized participant device 106) may receive the settlement instructions, authorize the settlement instructions (e.g., via digital signature) and forward the settlement instructions to the vault administrator systems 110 and/or the custodial system 114 via network 100. In embodiments, the settlement instructions may be provided directly to the vault administrator systems 110 and/or custodial system 114. In embodiments, the entity system 1000 may be or may include the authorized participant system or device. As another example, the entity may receive the settlement instructions and, based on the received instructions, may generate and send first settlement instructions (e.g., instructions based on the received settlement instructions) to the vault administrator system 110. The settlement instructions, in embodiments, may instruct the vault administrator system 110 to transfer the second amount of precious metal from one or more accounts associated with the entity to the first set of custodial accounts associated with the vault 112.

In embodiments where the settlement instructions were properly executed, the vault administrator system 110 (and/or custodial system 114) may generate and send a message to the entity 1000 confirming the execution of the instructions. In embodiments where the settlement instructions were not properly executed, the vault administrator system 110 may generate and send a message to the entity indicating the failed execution of settlement instructions (which may be similar to C80-1, described above in connection with FIG. 2A, the description of which applying herein). The confirmation, in embodiments, may be forwarded (and/or another message generated) by the entity to the Administrator 102/104. In embodiments, at step C50-3, the Administrator 102/104 may receive confirmation information indicating receipt of the second amount of precious metal in the first set of custody accounts.

As another example, the Administrator 102/104 may generate the settlement instructions based at least on the current diversification information and/or the order diversification information. Continuing the example, the second amount of precious metal among may be apportioned between multiple accounts (e.g., administrator, one or more issuer accounts, to name a few) to adhere to the diversification rule(s) and/or diversification algorithm(s). The generated instructions, continuing the example, will instruct the deposit of the second amount of precious metal among each of the multiple accounts. In embodiments, the settlement instructions may include instructions to deposit the second amount of precious metal in one account associated with a single secured note issuer. The settlement instructions, in embodiments, may be generated by one or more of the following: secured note issuer administrator system 102, administrator system 104, plurality of issuer systems 108, authorized participant device(s) 106, authorized applicant device(s) 107, market maker device(s) 160, and/or a combination thereof, to name a few.

In embodiments, the process described in connection with FIG. 8A may continue with FIG. 8B. Referring to FIG. 8B, in embodiments, the process may continue with C70'. In embodiments, at step C70', the Administrator 102/104 may generate secured note issuance instructions associated with issuance of one or more secured notes collateralized by up to the second amount of precious metal. In embodiments, a portion of the value of the second amount of precious metal may be reserved for fees. In embodiments, a portion of the second amount of precious metal may remain the administrator vault account to maintain a reserve of precious metal. As illustrated in FIG. 8B, in embodiments, C70' may begin with step C70'-1. At step C70-1, in embodiments, a respective allocation of the second amount of precious metal may be determined based on the order diversification information and/or the updated current diversification information. Continuing C70', in embodiments, at step C70'-2, respective note generation instructions to generate one or more secured notes collateralized by the respective allocation of up to the second amount of precious metal associated with the respective secured note issuer are generated.

The process illustrated in connection with FIG. 8B may continue with C90'. In embodiments, C90' may begin with step C90'-1. At step C90'-1, in embodiments, the generated secured note issuance instructions may be sent to one or more of the following: the secured note issuer system 102, the administrator 104, custodial system 114, and/or entity system 1000, to name a few. For example, the Administrator 102/104 may generate a message to send to the custodial system 114 (e.g., a depository trust company) associated with one or more custodians associated with the fund, including a request to create the first amount of shares. The message may be sent to the custodial system 114. In response to receiving the request, in embodiments, the custodial system 114 may create the first amount of shares and hold the shares in custody. The custodial system 114, in embodiments, may generate and send a confirmation message to the Administrator 102/104, confirming the creation of the first amount of shares. At step C90'-2, in embodiments, the Administrator 102/104 may receive the confirmation message. In embodiments where the shares are not created (in whole or in part), Administrator 102/104 may receive a notice of the failure to create and, in embodiments, notify the affected parties.

The process illustrated in connection with FIG. 8B may continue with C100'. In embodiments, C100' may begin with step C100'-1. At step C100'-1, in embodiments, share transfer instructions to provide the first amount of shares to the entity, which may be the authorized participant (e.g., Entity System 1000) may be generated (e.g., by Administrator 102/104). The share transfer instructions, in embodiments, may, at step C100'-2, may be sent (and/or executed) by the custodial system 114.

In embodiments, the process described in connection with FIG. 8A through FIG. 8B may be similar to the process described above in connection with FIGS. 2A-2D, 2-10, 2-20A through 2-20E, 2-30, 2-50A through 2-50C, 2-60A through 2-60B, 2-70A through 2-70B, 2-80A through 2-80B and 2-100, the descriptions of which applying herein. In embodiments, the steps of the processes illustrated and described in connection with FIG. 8A and FIG. 8B may be rearranged or omitted.

Issuer On-Boarding

Figure 3A:
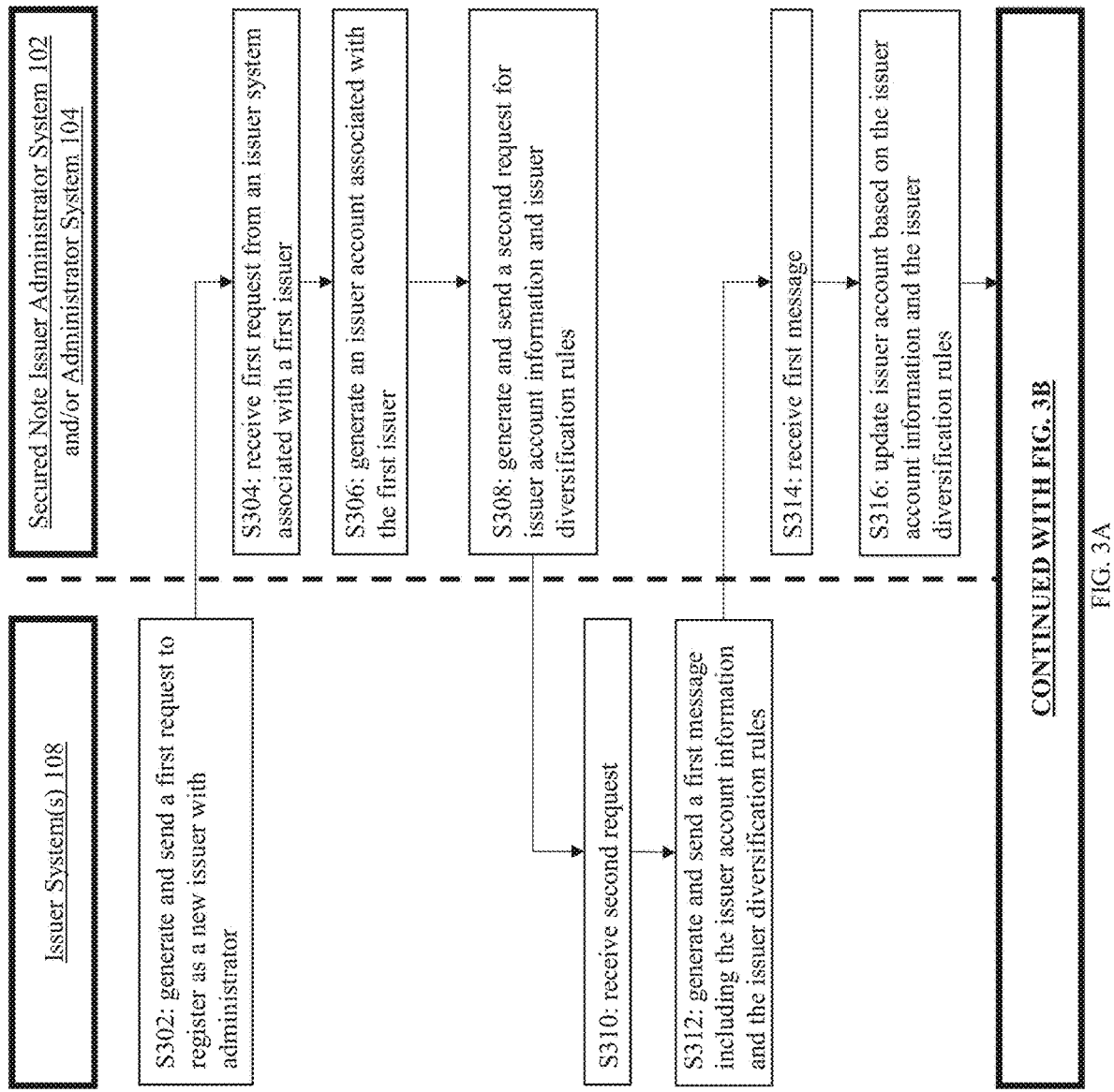
FIG. 3A through FIG. 3C are flow charts of an exemplary process for on-boarding an issuer of secured notes in accordance with exemplary embodiments of the present invention.
Figure 3B:
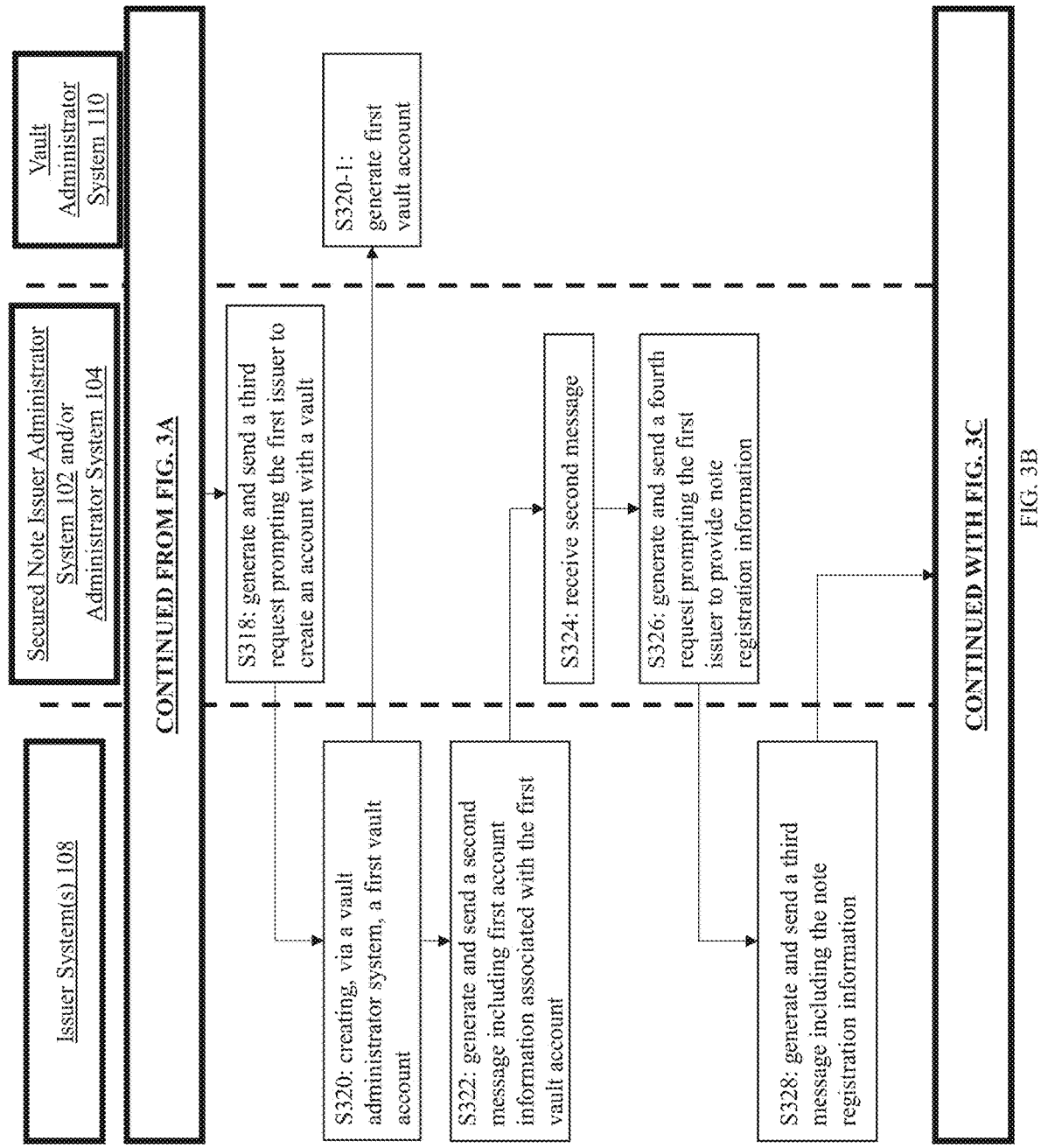
Figure 3C:
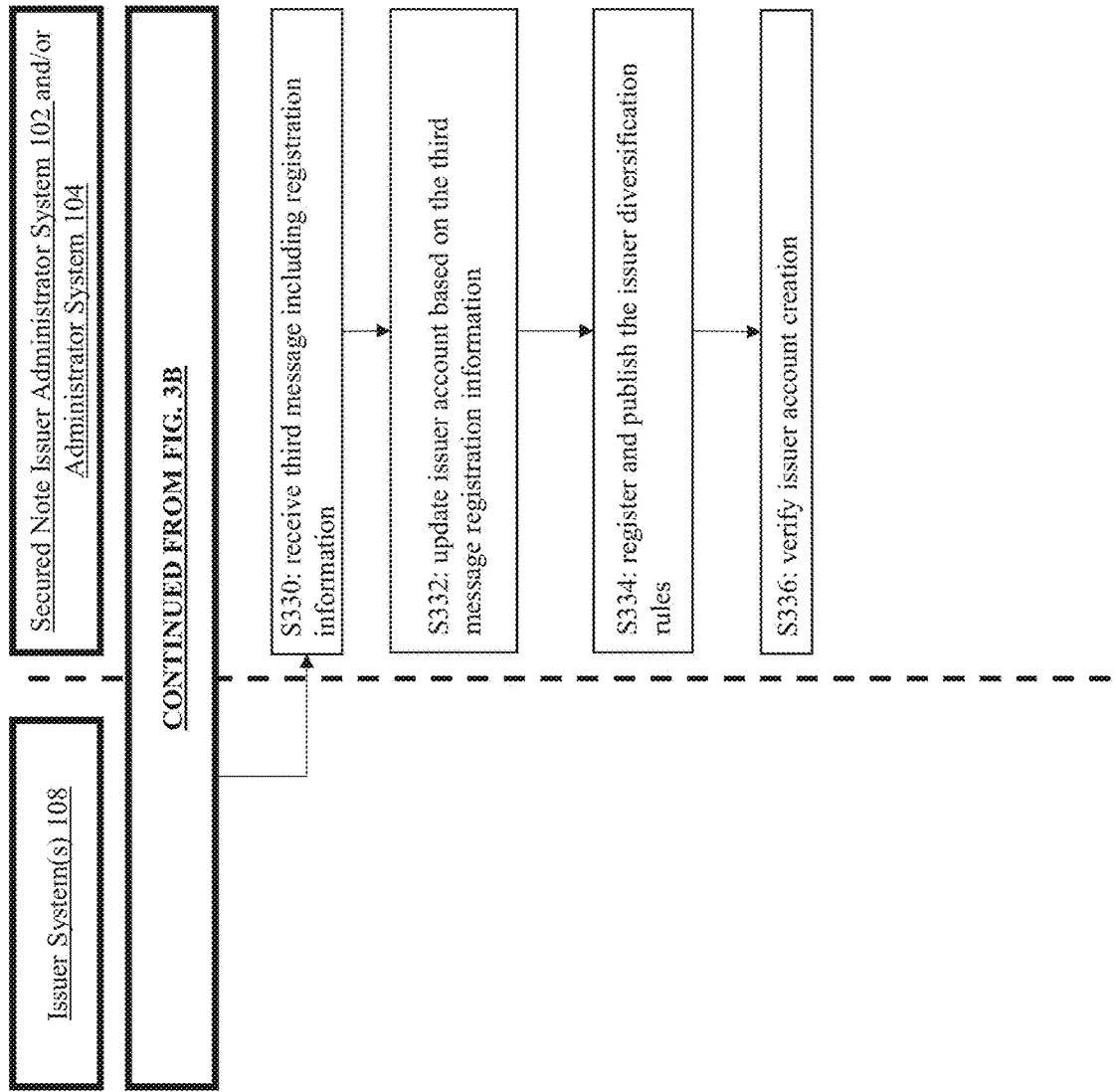
Figures 1, 3A:
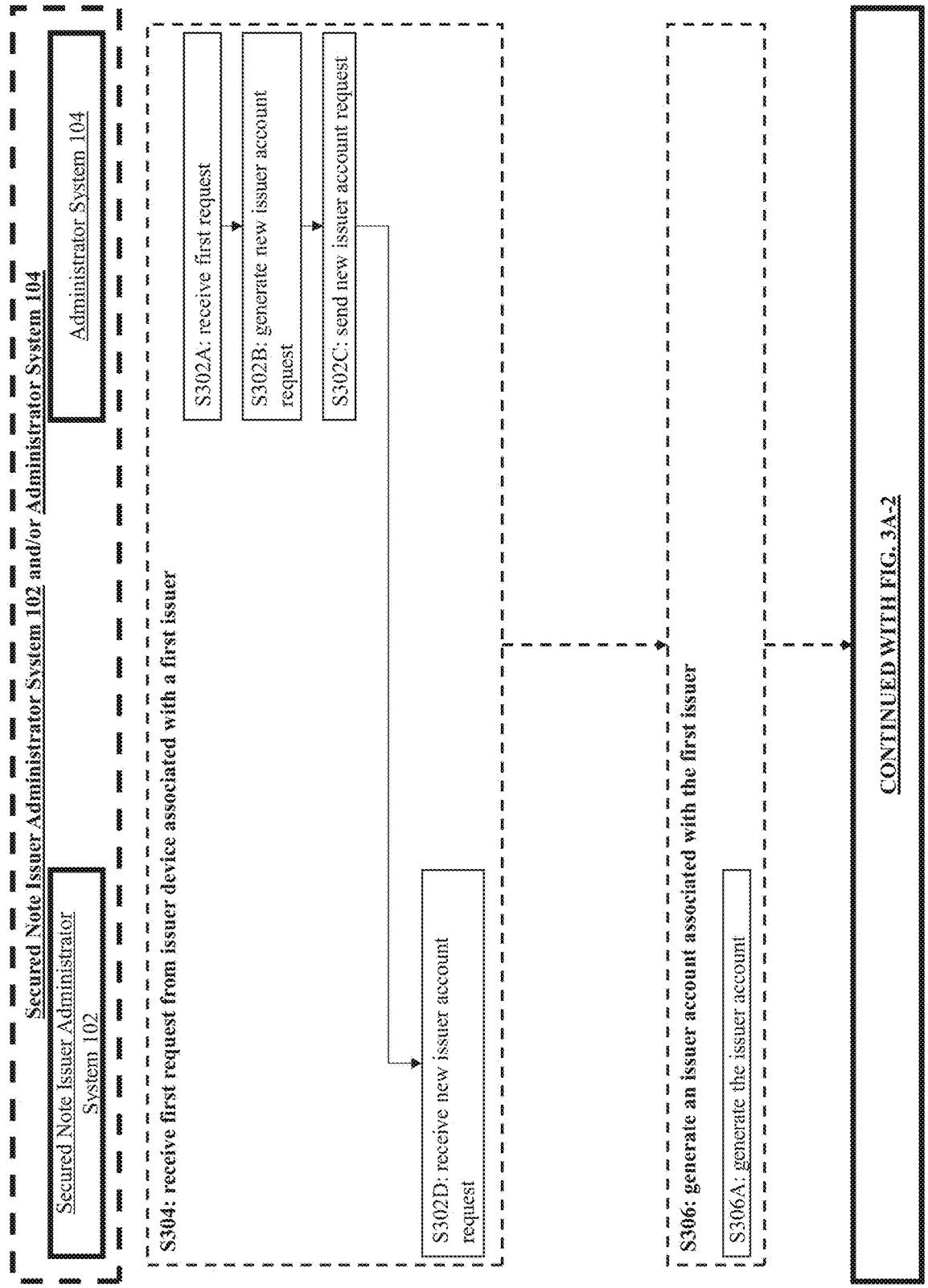
Figures 2, 3A:
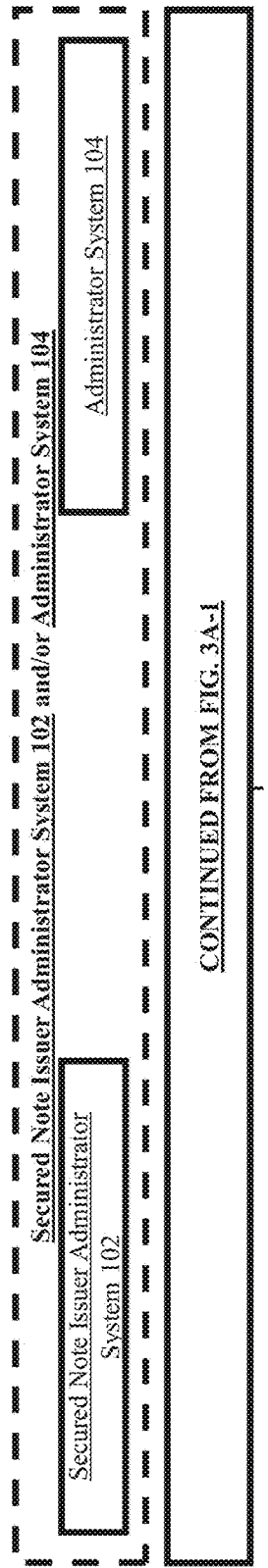
Figures 3, 3A:
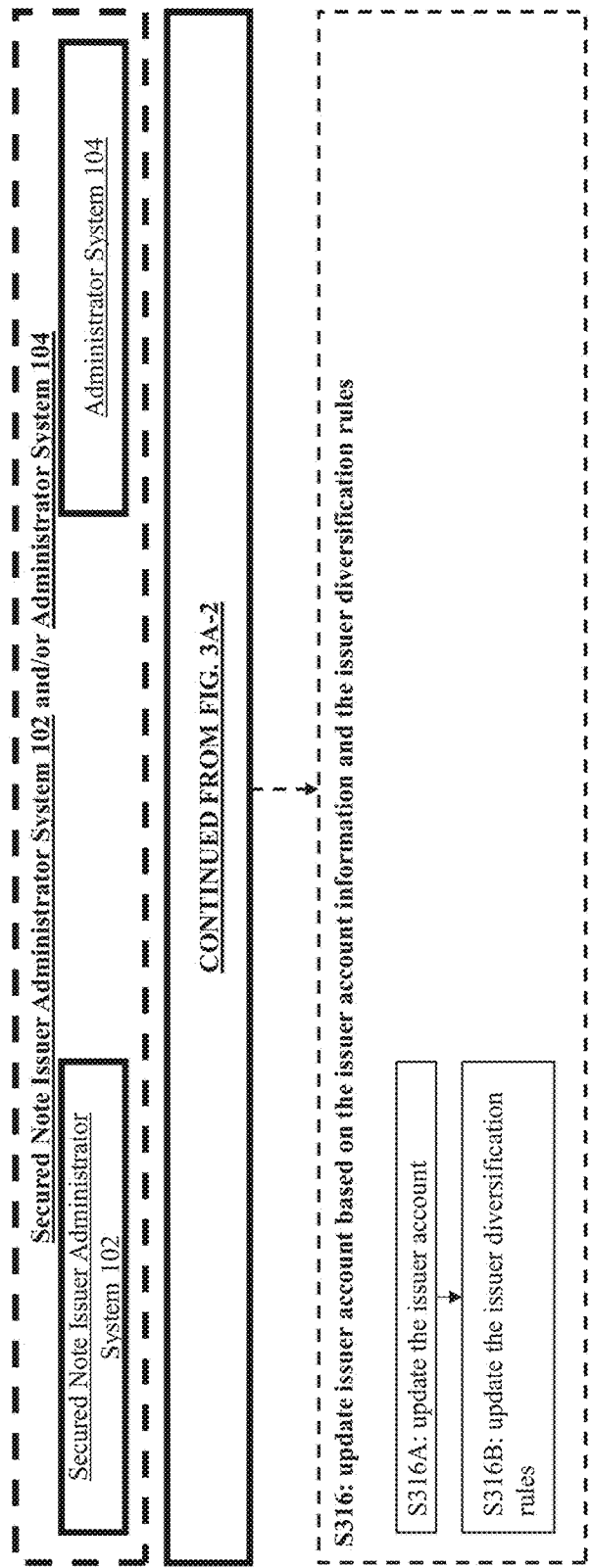
Figures 1, 3B:
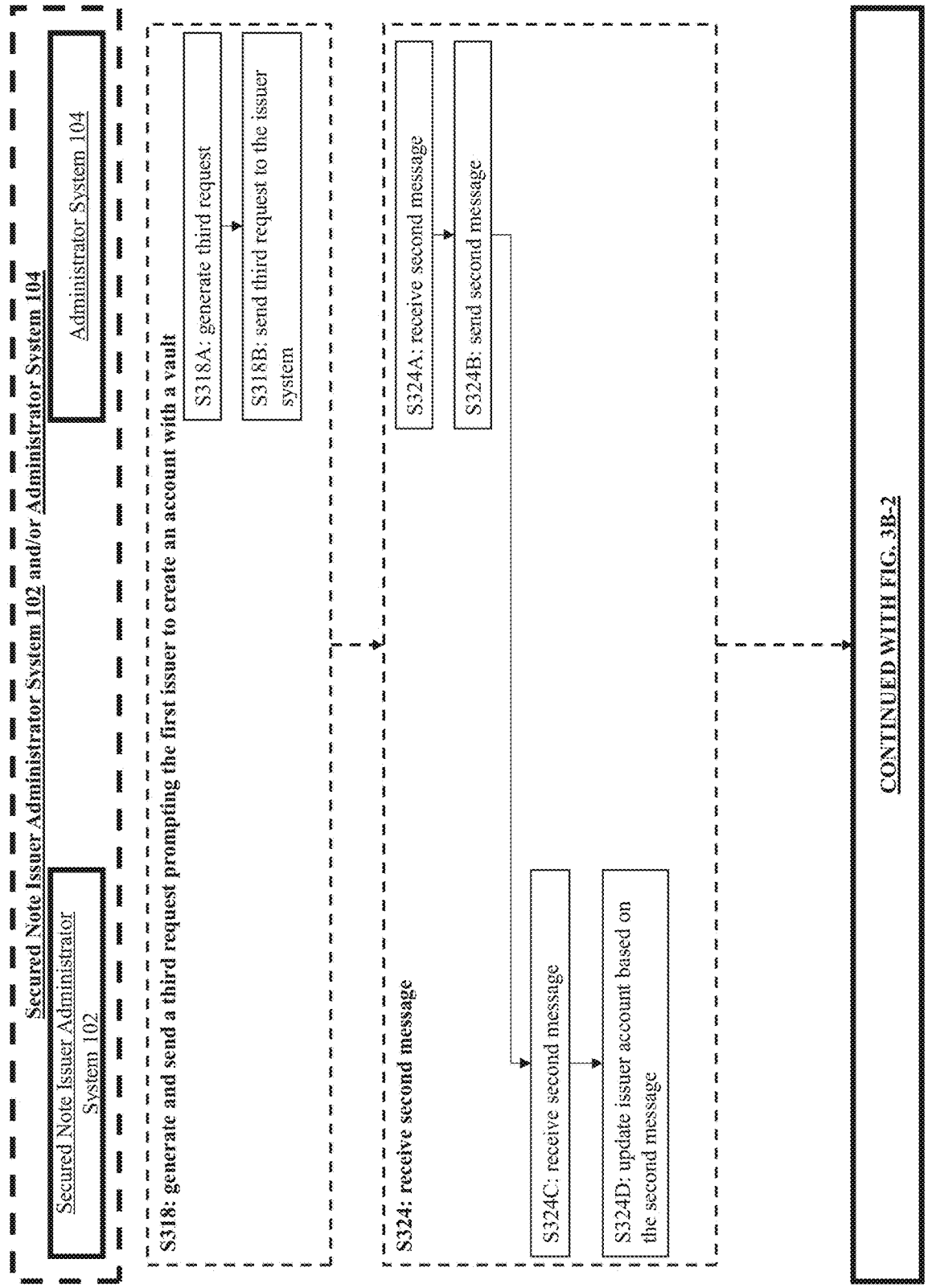
Figures 2, 3B:
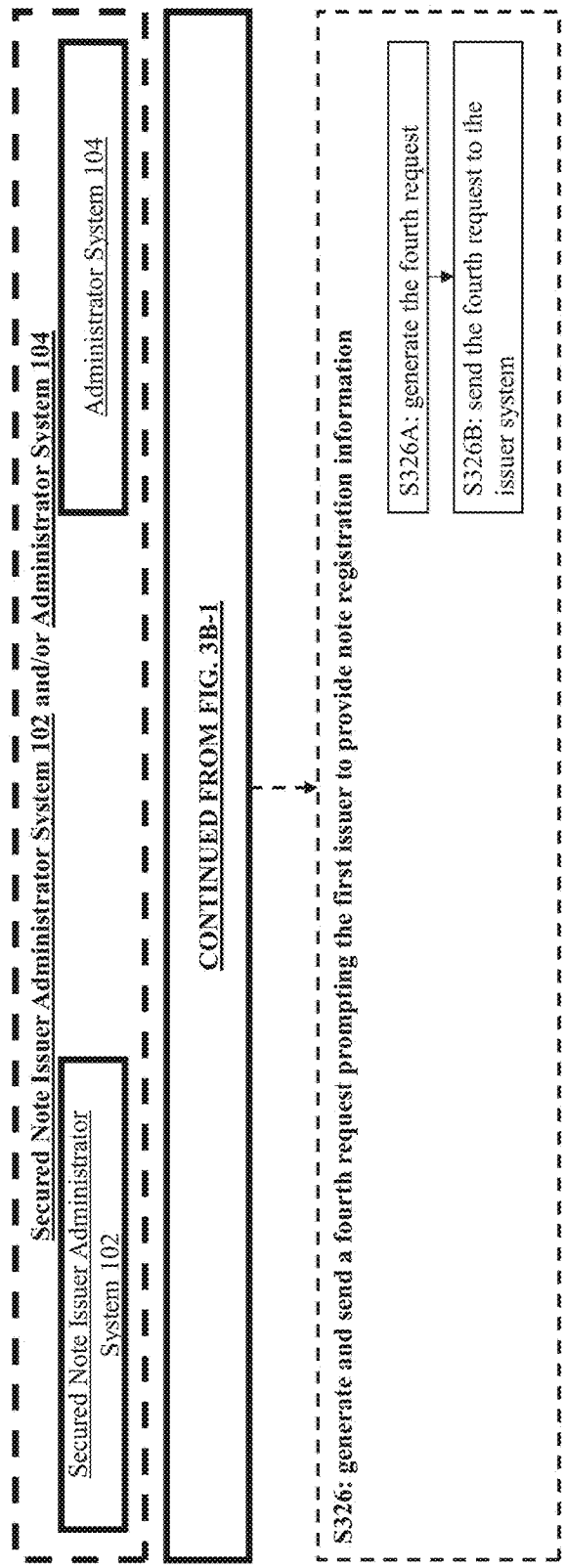
Figures 3, 3B:
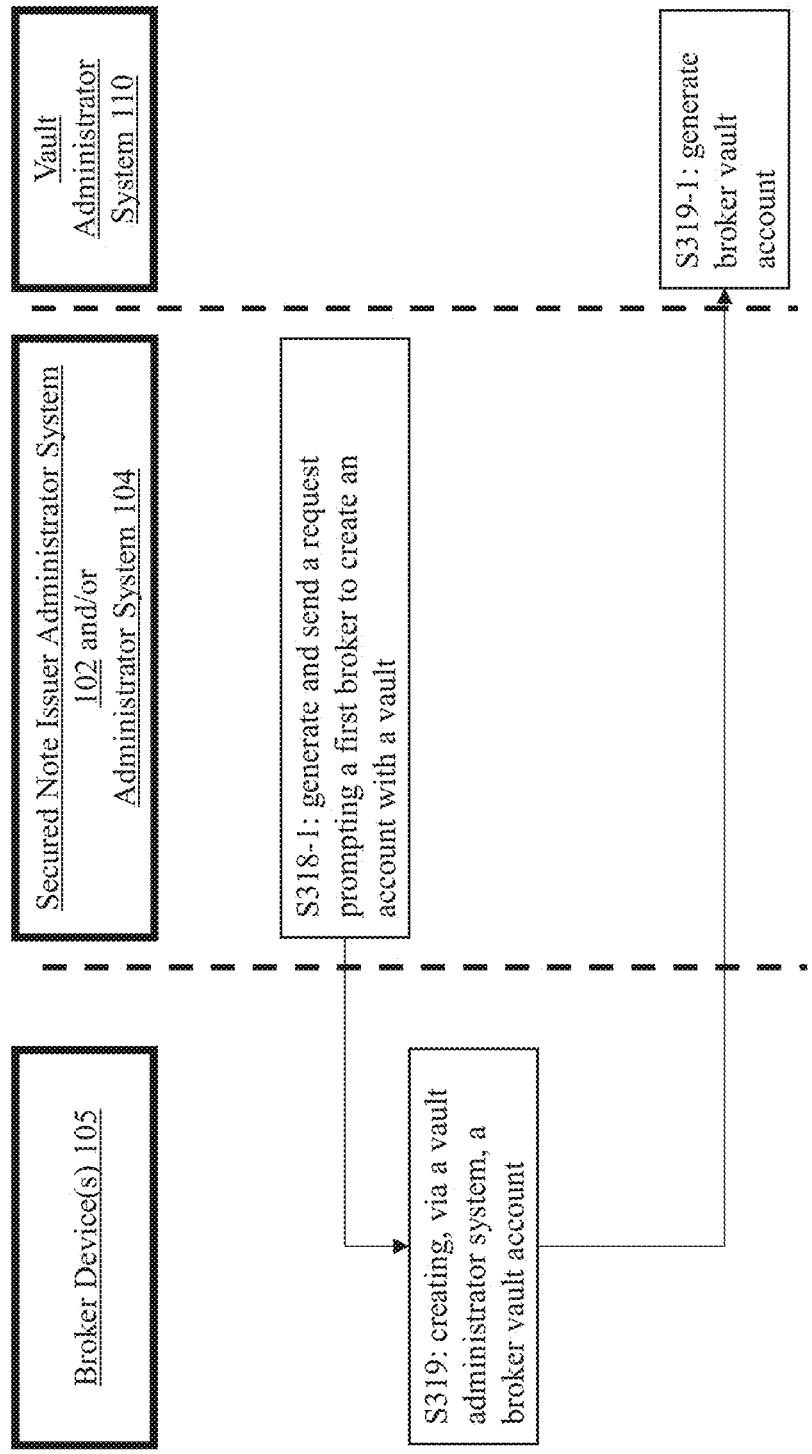
Figures 1, 3C:
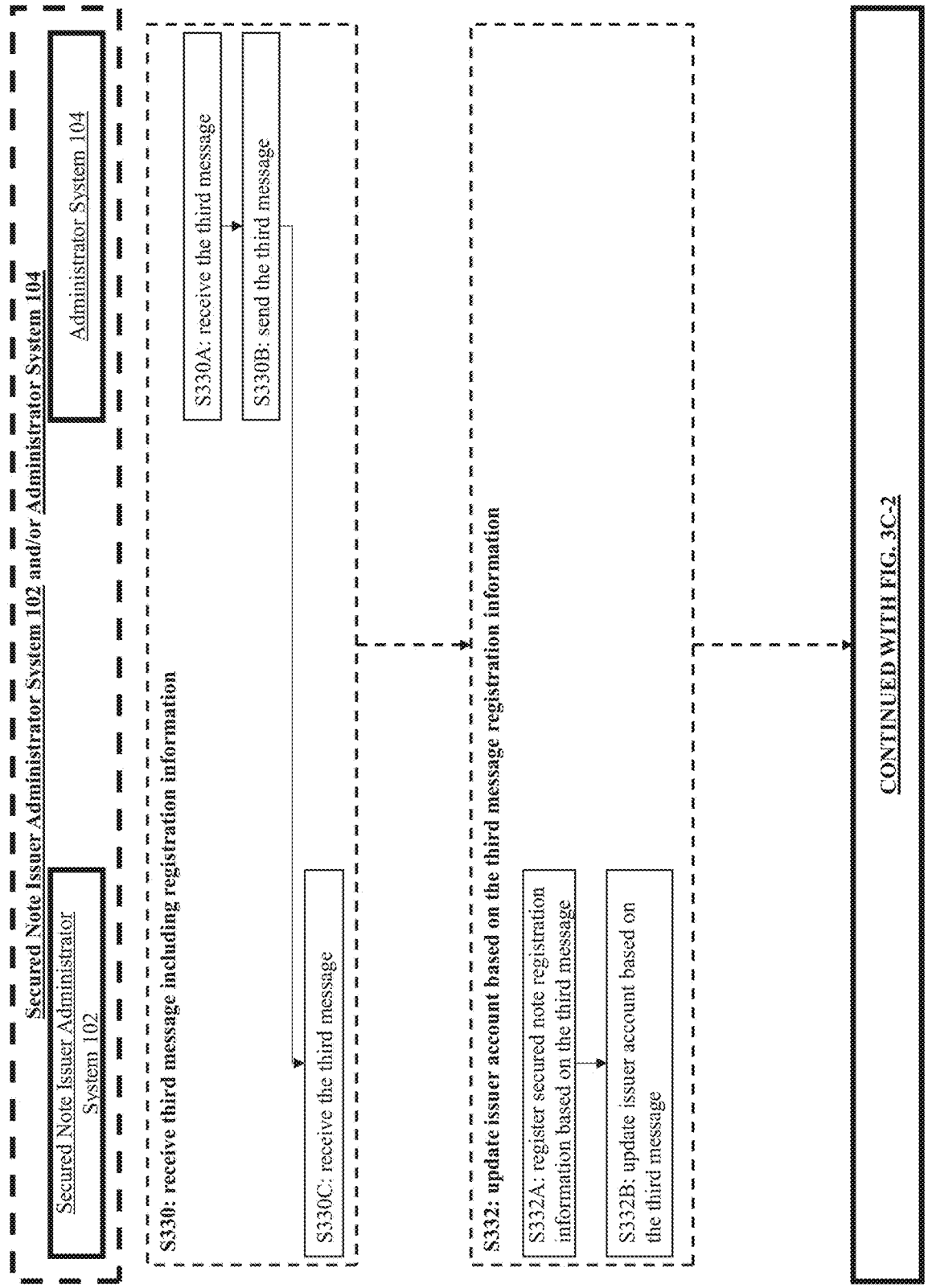
Figures 2, 3C:
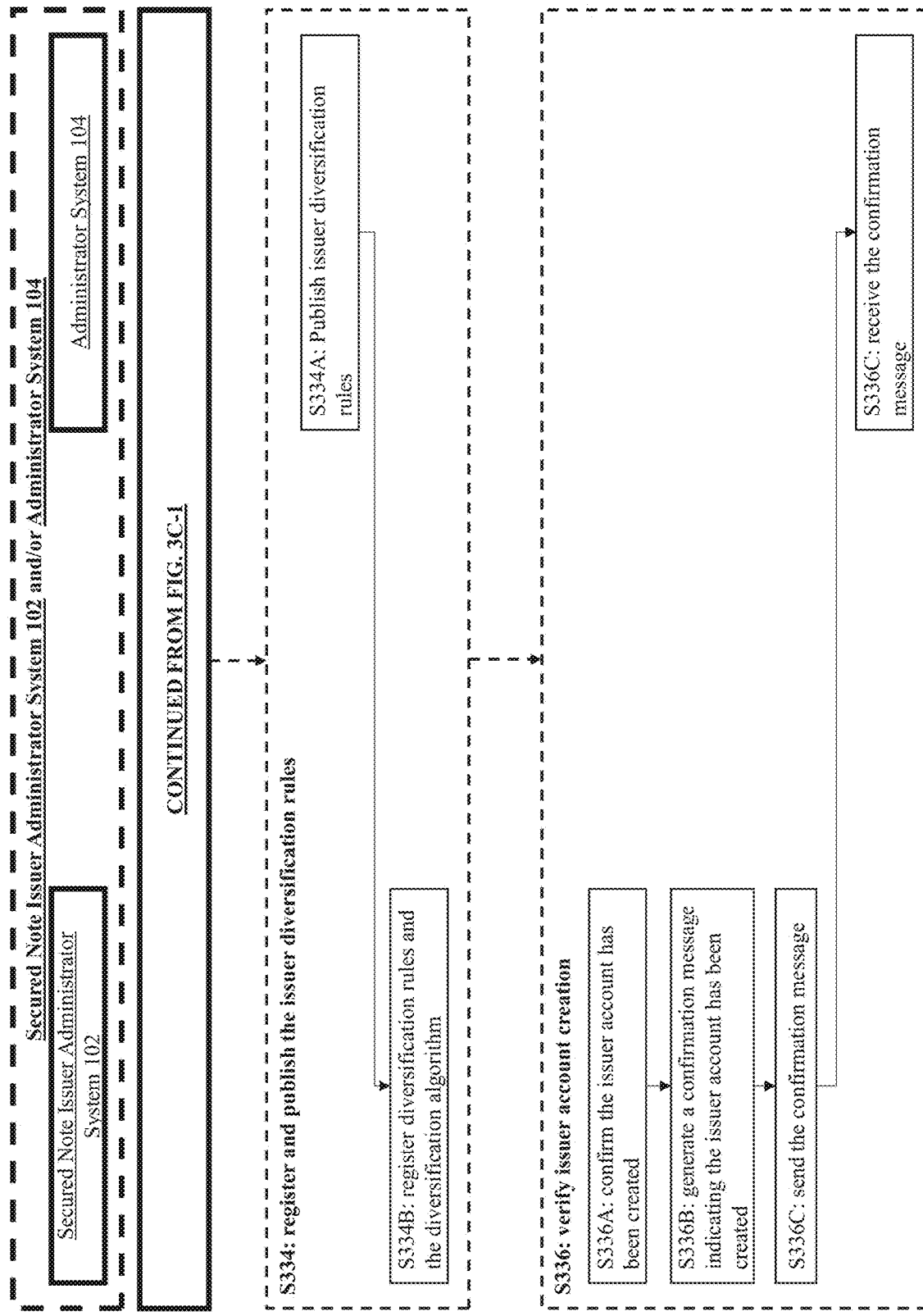

FIGS. 3A-3C are flow charts of an exemplary process for on-boarding an issuer of secured notes in accordance with exemplary embodiments of the present invention. Referring to FIG. 3A, in embodiments, the process for on-boarding an issuer may begin with step S302. At step S302, one or more issuer systems 108 (in embodiments, plurality of issuer device(s) 108 and issuer system 108 may be interchangeable) may generate and send a first request to register as a new issuer with the Administrator 102/104.

In embodiments, the process for on-boarding an issuer may continue with step S304. At step S304, in embodiments, the Administrator 102/104 may receive the first request from the issuer system 108 associated with the issuer. Referring to FIG. 3A-1, in embodiments, at step S304A, the administrator system 104 may receive the first request. At step S304B, in embodiments, the administrator system 104 may generate a new issuer account request. In embodiments, at step S304C the administrator system 104 may send the new issuer account request to the secured note issuer administrator system 102. At step S304, in embodiments, the secured note issuer administrator system 102 may receive the new issuer account request.

Referring to FIG. 3A, in embodiments, the process for on-boarding an issuer may continue with step S306. At step S306, in embodiments, the Administrator 102/104 may generate a fund issuer account associated with the first issuer. Referring to FIG. 3A-1, in embodiments, at step S306A, the secured note issuer administrator system 102 may generate the fund issuer account.

Referring to FIG. 3A, in embodiments, the process for on-boarding an issuer may continue with step S308. At step S308, in embodiments, the Administrator 102/104 may generate and send a second request for issuer account information and issuer diversification rules associated with the issuer. Referring to FIG. 3A-2, in embodiments, at step S308A the secured note issuer administrator system 102 may generate the second request, and, in embodiments, at step S308B, the secured note issuer administrator system 102 may send the second request to the administrator system 104. At step S308C, in embodiments, the administrator system 104 may receive the second request. In embodiments, the administrator system 104 may send the second request to the issuer system 108 via network 100.

Referring to FIG. 3A, in embodiments, the process for on-boarding an issuer may continue with step S310. At step S310, in embodiments, the issuer system 108 may receive the second request. Continuing the process for on-boarding an issuer, at step S312, in embodiments, the issuer system 108 may generate and send a first message including the issuer account information and the issuer diversification rules.

In embodiments, the process for on-boarding an issuer may continue with step S314. At step S314, in embodiments, the Administrator 102/104 may receive the first message. Referring to FIG. 3A-2, in embodiments, at step S314A, the administrator system 104 may receive the first message. In embodiments, at step S314B, the administrator system 104 may forward and/or send (and/or generate an additional message including the first message and sending the first message) the first message to the secured note issuer administrator system 102. At step S314C, in embodiments, the secured note issuer administrator system 102 may receive the first message (and/or the additional message).

Referring to FIG. 3A, in embodiments, the process for on-boarding an issuer may continue with step S316. At step S316, in embodiments, the Administrator 102/104 may update the fund issuer account based on the issuer account information and the issuer diversification rules. Referring to FIG. 3A-3, in embodiments, at step S316A, the secured note issuer administrator system 102 may update the fund issuer account. At step S316B, the secured note issuer administrator system 102 may update the issuer diversification rules in accordance with the diversification rules and diversification algorithms to include the issuer requesting to be on-boarded.

Referring to FIG. 3B, in embodiments, the process for on-boarding an issuer may continue with step S318. At step S318, in embodiments, the Administrator 102/104 may generate and send a third request prompting the first issuer to create one or more accounts with one or more vaults. Referring to FIG. 3B-1, at step S318A, the administrator system 104 may generate the third request. In embodiments, at step S318B, the administrator system 104 may send the third request to the issuer system 108 via network 100. In embodiments, the Administrator 102/104 may on-board one or more Brokers (e.g., brokers and/or broker-dealers) associated with one or more of the broker device(s) (the process of which may be similar to on-boarding issuers described in connection with FIG. 3, the description of which applying herein). For example, referring to FIG. 3B-3, in embodiments, at step S318-1 the Administrator 102/104 may generate and send a request prompting a first broker (e.g., one or more Brokers) associated with a first broker device (e.g., one or more broker device(s) 105) to create an account with a vault (e.g., vault 112). Continuing the example, at step S319, in embodiments, the one or more broker device(s) 105 may create one or more broker vault accounts with the vault 112. In embodiments, the one or more broker device(s) may create the broker vault account by sending a request to create an account to the vault administrator system 110. In embodiments, at step S319-1, the vault administrator system 110 may receive the request and generate the broker vault account. In embodiments, multiple vaults may be used and the administrator may be in contact with a vault administrator associated with each of the vaults and/or require issuers and/or Brokers to create one or more accounts at one or more of the vaults as part of the on-boarding process.

Referring back to FIG. 3B, in embodiments, the process for on-boarding an issuer may continue with step S320. At step S320, in embodiments, the issuer system 108 may create a vault issuer account with vault 112. In embodiments, the issuer system 108 may create the vault issuer account by sending a request to create an account to the vault administrator system 110. In embodiments, at step S320-1, the vault administrator system 110 may receive the request and generate the vault issuer account.

In embodiments, the process for on-boarding an issuer may continue with step S322. At step S322, in embodiments, the issuer system 108 may generate and send a second message, including first account information associated with the vault issuer account (and/or account information associated with the broker vault account) to the Administrator 102/104. In embodiments, multiple vaults may be used and the administrator may be in contact with a vault administrator associated with each of the vaults.

Continuing the process for on-boarding an issuer, in embodiments at step S324, in embodiments, the Administrator 102/104 may receive the second message. Referring to FIG. 3B-1, in embodiments, at step S324A, the administrator system may receive the second message. In embodiments, at step S324B, the administrator system 104 may forward and/or send (and/or generate an additional message including the first message and sending the first message) the second message to the secured note issuer administrator system 102. At step 324C, in embodiments, the secured note issuer administrator system 102 may receive the second message (and/or the additional message). In embodiments, at step S324D, the secured note issuer administrator system 102 may update the fund issuer account based at least on the second message.

Referring to FIG. 3B, in embodiments, the process for on-boarding an issuer may continue with step S326. At step S326, in embodiments, the Administrator 102/104 may generate and send a fourth request prompting the first issuer to provide secured note registration information. Referring to FIG. 3B-2, in embodiments, at step S326A the administrator system 104 may generate the fourth request. At step S326B, in embodiments, the administrator system 104 may send the fourth request to the issuer system 108 via network 100.

Referring to FIG. 3B, in embodiments, the process for on-boarding an issuer may continue with step S326. At step S326, in embodiments, the issuer system 108 may generate and send a third message including the secured note registration information to the Administrator 102/104.

Referring to FIG. 3C, in embodiments, the process for on-boarding an issuer may continue with step S330. At step S330, in embodiments, the Administrator 102/104 may receive the third message including the secured note registration information. Referring to FIG. 3C-1, in embodiments, at step S330A, the administrator system 104 may receive the third message, and, at step S330B, in embodiments, the administrator system 104 may send the third message to the secured note issuer administrator system 102. At step S330C, in embodiments, the secured note issuer administrator system 102 may receive the third message.

Referring to FIG. 3C, in embodiments, the process for on-boarding an issuer may continue with step S332. At step S332, in embodiments, the Administrator 102/104 may update the fund issuer account based on the third message and registration information. Referring to FIG. 3C-1, in embodiments, at step S332A the secured note issuer administrator system 102 may register the secured note registration information based on the third message. At step S332B, in embodiments, the secured note issuer administrator system 102 may update the fund issuer account based on the third message. In embodiments the secured note registration information may be updated by custodial system 114. In embodiments, the fund issuer account may be updated by custodial system 114.

Referring to FIG. 3C, in embodiments, the process for on-boarding an issuer may continue with step S334. At step S334, in embodiments, the Administrator 102/104 may register and publish the issuer diversification rules, including the newly on-boarded issuer. Referring to FIG. 3C-2, in embodiments, at step S334A, the administrator system 104 may publish the issuer diversification rules. At step S334B, in embodiments, the secured note issuer administrator system 102 may register the diversification rules and the diversification algorithm.

Referring to FIG. 3C, in embodiments, the process for on-boarding an issuer may continue with step S334. At step S334, in embodiments, the Administrator 102/104 verify the fund issuer account creation. Referring to FIG. 3C-2, at step S336A, in embodiments, the secured note issuer administrator system 102 may confirm the fund issuer account has been created. At step S336B, in embodiments, the secured note issuer administrator system 102 may generate a confirmation message indicating the fund issuer account has been created. In embodiments, at step S336C, the confirmation message may be sent by the secured note issuer administrator system 102 to the administrator system 104. In embodiments, at step S336D, the administrator system 104 may receive the confirmation message.

In embodiments, the steps of the processes described in connection with FIGS. 3A-3C, 3A-1-3A-3, 3B-1-3B-2, and 3C-1-3C-3 may be rearranged or omitted.

ETF Share Purchasing

As described above, a fund that tracks precious metal pricing while, in general, avoiding holding title to the precious metal may allow one or more authorized participants to purchase shares that track said precious metal pricing. In embodiments, referring to FIG. 6A, a process for purchasing fund shares in accordance with exemplary embodiments of the present invention may begin with step S602. At step S602, in embodiments, an administrator computer system (e.g. administrator computer system 104) may provide a first set of rules. The first set of rules, in embodiments, may be rules that are designed for diversification among a plurality of issuers of the secured notes and among a plurality of vaults collateralizing the secured notes backing the fund shares. In embodiments, the first set of rules may include one or more diversification algorithms. A diversification algorithm, for example, may ensure each issuer maintains a percentage and/or amount of issued secured notes backing the fund shares. In embodiments, the percentage and/or amount of issued secured notes backing the fund shares may refer to a range of percentages and/or amounts. In embodiments, the percentage and/or amount of issued secured notes backing the fund shares may refer to a percentage and/or amount. In embodiments, the percentage and/or amount of issued fund shares may refer to a combination of ranges of percentages and/or amounts and a particular percentage and/or amount. In embodiments the first set of rules may be based on and/or generated by the administrative computer system and/or the secured note issuer administrator computer system based on one or more of the following the number of issuers, the amount of precious metal associated with the secured notes backing the fund shares, the amount of fund shares, the amount of secured notes, and/or the amount of authorized participants, to name a few. A person of ordinary skill understands that, due to the ever-changing landscape of statutes, regulations, issuers, precious metal (and the price(s) associated therewith), and/or ETFs, a diversification algorithm may be revised, replaced, and/or be a part of an additional diversification algorithm.

In embodiments, the first set of rules may be stored in memory (e.g. memory 102-2, and/or memory 104-2, to name a few) and/or a memory device. The first set of rules, in embodiments, may be accessible by the administrative computer system and/or a secured note issuer administrator computer system. For example, the first set of rules may be stored on a memory device operatively connected to the administrative computer system and/or the secured note issuer administrator computer system. As another example, the first set of rules may be stored on memory of the administrative computer system and/or memory of the secured note issuer administrator computer system.

In embodiments, the first set of rules may be stored in memory of and/or generated by one or more of the following: one or more issuer systems of the plurality of issuer systems associated with the plurality of issuers, one or more authorized participant devices associated with one or more authorized participants, one or more vault administrator systems, and/or one or more custodial systems associated with one or more custody companies that hold shares of the ETF (or the fund) in custody, to name a few. In embodiments, one or more issuer systems generates the first set of rules and sends the generated first set of rules to memory operatively connected to the administrative computer system and/or the secured note issuer administrator computer system and/or to the administrative computer system and/or the secured note issuer administrator computer system where the administrative computer system and/or the secured note issuer administrator computer system stores the first set of rules in memory.

In embodiments, the administrative computer system and the secured note issuer administrator computer system may be of the same system. In embodiments, the administrator computer system includes the secured note issuer administrator computer system. In embodiments, the secured note issuer administrator computer system includes the administrator computer system.

In embodiments, the process of purchasing fund shares may continue with step S604. At step S604, in embodiments, the administrator computer system may receive a first request to purchase fund shares. In embodiments, the first request to purchase shares may be received from an authorized participant computer system associated with an authorized participant. A request to purchase shares may include one or more of the following: identification information associated with the authorized participant; a first number of shares to be purchased by the authorized participant; a price associated with the first number of shares; and/or an amount of precious metal associated with the first number of shares, to name a few. The identification information, in embodiments, may include one or more of the following: a username and password combination; biometric data associated with the authorized participant; personally identifiable information ("PII") associated with the authorized participant; a phone number associated with the authorized participant; a social security number associated with the authorized participant; an e-mail address associated with the authorized participant; a unique identifier associated with the authorized participant and issued by an administrator of the authorized participant; and/or a unique identifier associated with the authorized participant, to name a few.

After receiving the request from the authorized participant device, in embodiments, the administrator computer system may process the first request. Processing the first request, in embodiments, may begin at step S604A. At step S604A, the administrator computer system may confirm the identity of the authorized participant. Confirmation of the identity of the authorized participant, in embodiments, may be based on the received identification information. In embodiments, the administrator computer system may confirm the identity of the authorized participant by comparing the received identification information with previously stored identification information associated with the authorized participant. If, for example, the administrator computer system does not confirm the identity of the authorized participant, the administrator computer system may not accept the order. In embodiments, the administrator computer system may confirm the identity of the authorized participant.

Processing the first request, in embodiments, may continue with step S604B. At step S604B, the administrator computer system may determine a first amount of precious metal associated with the first number of shares requested for purchase. The first amount of precious metal may be determined based on a value of the precious metal associated with the first number of shares and/or a ratio of shares to precious metal associated with the ETF. The value, in embodiments, may be obtained via a third-party database, a market associated with the precious metal and/or based on reference to more than one market associated with the precious metal, to name a few. In embodiments, once the value of the precious metal has been obtained and/or determined, the administrator computer system may take the value of the precious metal and calculate, based on the value of the precious metal and the first number of shares and/or the ratio of shares to precious metal, the first amount of precious metal associated with the first number of shares. In embodiments, the first amount of precious metal may be a first amount of a basket of different precious metals.

Processing the first request, in embodiments, may continue with step S604C. At step S604C, the administrator computer system may generate a first response to the first request. The first response, in embodiments, may include one or more of the following: amount information, and/or deposit information, to name a few. The amount information, in embodiments, may include and/or indicate one or more of the following: the value of the precious metal, the first amount of precious metal, the number of shares, and/or the ratio of shares to precious metal associated with the ETF, to name a few.

The deposit information, in embodiments, may include information regarding depositing the first amount of precious metal into a vault associated with the ETF. For example, the deposit information may include an administrator account associated with the vault (e.g. vault 112) and instructions on how the authorized participant can deposit the first amount of precious metal into the administrator account. The deposit information, in embodiments, may be stored in memory (e.g. memory 102-2, and/or memory 104-2, to name a few) and/or a memory device accessible by the administrative computer system and/or the secured note issuer administrator computer system.

In embodiments, the deposit information may be stored in memory operatively connected to a vault administrator system (e.g. vault administrator system 110) associated with the vault. For example, the administrator computer system may obtain the deposit information by sending a request to the vault administrator system, and, in response to the request, receiving the deposit information from the vault administrator system.

Processing the first request, in embodiments, may continue with step S604D. At step S604D, the administrator computer system may send the first response to the authorized participant. In embodiments, the first response may be sent from the administrator computer system to the authorized participant device via network 100. In response to receiving the first response, in embodiments, the authorized participant may deposit the first amount of precious metal into the vault.

Once the first amount of precious metal is deposited, the vault administrator system may generate a first confirmation message indicating that the first amount of precious metal was deposited into the administrator account by the authorized participant and/or a third party acting on behalf of the authorized participant. The generated first confirmation message, in embodiments, may be sent to one or more of the following: the administrator computer system, the secured note issuer administrator computer system, one or more issuer systems of the plurality of issuer systems, and/or the custodial system, to name a few.

At step S606, in embodiments, the administrator computer system may receive confirmation of a deposit of the first amount of precious metal into the vault. For example, the administrator computer system may receive the first confirmation message from the vault administrator system via network 100. In embodiments, once confirmation has been received by the administrator computer system, the administrator computer system may verify the confirmation. For example, the administrator computer system may verify the first amount of precious metal, the account that the first amount of precious metal was deposited in, the date and/or time of the deposit, and/or the authorized participant associated with the deposit, to name a few.

In embodiments, once the deposit of the first amount of precious metal has been confirmed, the administrator computer system may generate a share creation request. The share creation request, in embodiments, may be a request to generate the first number of shares in a fund (the ETF) associated with the administrator computer system. The share creation request, once generated, may be transmitted by the administrator computer system to the custodial system. In response to receiving the share creation request, in embodiments, the custodial system may create the first amount of shares and hold the first amount of shares in custody. Once the first amount of shares have been generated, in embodiments, the custodial system may generate a second confirmation message indicating one or more of the following: confirmation of the creation of the first amount of shares, the first amount of precious metal, the account that the first amount of shares is being held in, the date and/or time of the creation of the first amount of shares, and/or the authorized participant associated with the first amount of shares, to name a few. The second confirmation message, in embodiments, may be sent to one or more of the following: the administrator computer system, the secured note issuer administrator computer system, one or more issuer systems of the plurality of issuer systems, the authorized participant device, and/or vault administrator system, to name a few. In embodiments, the share creation request may be generated prior to and/or during the confirmation and/or verification of the deposit of the first amount of precious metal.

The process for purchasing shares of a fund backed by secured notes, in embodiments, may continue with step S608. At step S608, in embodiments, the administrator computer system may forward the confirmation of the deposit of the first amount of precious metal to the secured note issuer administrator computer system. For example, the administrator computer system may send the first confirmation message to the secured note issuer administrator computer system via network 100. Alternatively, the administrator computer system may generate and send a third confirmation message to the secured note issuer administrator computer system, the third confirmation message indicating one or more of the following: confirmation of the deposit of the first amount of precious metal, verification of the confirmation by the administrator computer system, the first amount of precious metal, the account that the first amount of precious metal was deposited in, the date and/or time of the deposit, and/or the authorized participant associated with the deposit, to name a few.

In embodiments, the process for purchasing shares of a fund backed by secured notes may continue with step S610. At step S610, in embodiments, the administrator computer system may provide diversification of the first amount of precious metal. Diversification, in embodiments, may refer to the diversification of the shares associated with the first amount of precious metal. In embodiments the diversification of the first amount of precious metal may be based on the first set of rules.

A more detailed description of a process for providing diversification of the first amount of precious metal may be illustrated in connection with FIG. 6C. Referring to FIG. 6C, in embodiments, the process for providing diversification may begin with step S610A. At step S610A, in embodiments, the administrator computer system may receive, from the secured note issuer administrator computer system, diversification instructions. To receive the diversification instructions, in embodiments, the administrator computer system may generate and send a second request, to the secured note issuer administrator computer system, requesting the diversification instructions. In response to the request, the secured note issuer administrator computer system may generate the diversification instructions based on a deposit value of the precious metal for each vault account of a plurality of vault accounts for each issuer of the plurality of issuers. In embodiments, the secured note issuer administrator computer system may generate the deposit value.

In embodiments, the deposit value may be determined in accordance with the following formula:

$$\sum_{N=1}^{M}\sum_{k=1}^{V_N} D_{N,k}(A_N(G)) = G \qquad \text{Equation 1: Exemplary Formula}$$

Referring back to Equation 1, the variables are identified as follows: M refers to the number of issuers (e.g. the plurality of issuers); $V_N$ refers to the number of vault accounts for each respective issuer N of the M issuers (e.g. the plurality of vault accounts per issuer); $A_N$ is a function which calculates the diversification allotment for each respective issuer N of the M issuers; G refers to part of the amount of precious metal associated with an ETF share creation request to diversify; $D_{N,k}$ is a function which calculates the deposit value for each respective vault account k of the $V_N$ vault accounts of each respective issuer N of the M issuers. In embodiments, the deposit value of the precious metal for each vault account of each issuer may be provided and/or determined based on the first set of rules. In embodiments, the diversification instructions may be based on a determined deposit value (e.g. the value of the first amount of precious metal) of the first amount of precious metal. In embodiments, G is an Nth amount of precious metal associated with the Kth account (and/or the amount of secured notes associated with the precious metal).

In embodiments, an amount G of precious metals associated with an ETF share creation request may be diversified across N issuers using a diversification algorithm as follows.

Based on all or any of a) the current composition of the fund (that is, the relative holdings of assets from each issuer in the fund), b) a set of diversification rules (such as "the number of notes of any one issuer must not exceed 25% of the total of the fund"), c) a set of composition-change targets (for example to facilitate on-boarding or off-boarding of issuers or any other desired change of composition), d) historic trading volume in the primary market of the ETF, e) historic trading volume in the secondary market of the ETF, f) executed-yet-not-settled trades in the primary market of preceding trading days, a vector w of N weights (one for each issuer) is constructed using a diversification algorithm such that:

$$\sum_{j=1}^{N} w_j = 1$$

where $0 \leq w_j \leq 1$ $w_j \cdot G := I_j$ (the allotment of precious metals for the j-th of the N issuers)

In embodiments, each such issuer's allotment $I_j$ may then be partitioned into a variable number $V_j$ of deposits of precious metal into different vaults that the j-th issuer has relations with. In embodiments, the exact value $D_k$ of each deposit may depend on the preferences of the issuer. In embodiments, the exact value $D_k$ of each deposit may depend on the preferences of the administrator computer system or secured note issuer administrator computer system. The preferences of the issuer (administrator computer system or secured note issuer administrator computer system) may be defined through an algorithm which may be updated on a semi-regular basis, regular basis, in real-time, in substantially real-time, and/or upon request, to name a few. In embodiments, the algorithm must ensure that the following formula holds:

$$\sum_{k=1}^{V_j} D_k = I_j \qquad \text{(iii)}$$

Once generated, the secured note issuer administrator system may send the diversification instructions to the administrator computer system via network 100. In embodiments, the deposit value, or allotment, may be generated by the administrator computer system and sent to the secured note issuer administrator system via network 100.

In embodiments, the process for providing diversification may continue with step S610B. At step S610B, in embodiments, the administrator computer system may send, to the vault administrator system associated with the vault, or vaults, the diversification instructions. In embodiments, once the vault administrator system receives the diversification instructions, the vault administrator system may execute the diversification instructions. In embodiments, multiple vaults may be used by an issuer or the plurality of issuers and instructions may be sent to respective administrator computer systems associated with each of the vaults. The diversification instructions may include instructions to transfer portions of the first amount of precious metal to one or more issuer accounts associated with the vault(s). For example, assuming the first amount of precious metal is 5 ounces of gold and the plurality of issuers includes three issuers, the diversification instructions may instruct the vault administrator system to transfer 2 ounces of gold to a first account associated with a first issuer, 1 ounce of gold to a second account associated with a second issuer, and 2 ounces of gold to a third account associated with a third issuer.

Once the diversification instructions have been executed by the vault administrator system(s) at the vault(s), the vault administrator system(s) may generate a fourth confirmation message indicating the diversification instructions have been executed. In embodiments, the fourth confirmation message may include one or more of the following: receipts of one or more of the transfers, the amount of precious metal in each issuer account, and/or the date and/or time of one or more of the transfers, to name a few. The fourth confirmation message, in embodiments, may be sent to one or more of the following: the administrator computer system, the secured note issuer administrator computer system, one or more issuer systems of the plurality of issuer systems, the authorized participant device, and/or vault administrator system, to name a few.

In embodiments, the process for providing diversification may continue with step S610C. At step S610C, in embodiments, the administrator computer system may receive confirmation that the diversification instructions were implemented at the vault(s). For example, the administrator computer system may receive the fourth confirmation message. In embodiments, once confirmation has been received by the administrator computer system, the administrator computer system may verify the confirmation. For example, the administrator computer system may verify the receipts of one or more of the transfers, the amount of precious metal in each issuer account, and/or the date and/or time of one or more of the transfers, to name a few.

In embodiments, the process for providing diversification may continue with step S610D. At step S610D, in embodiments, the administrator computer system may send, to the secured note issuer administrator system, the confirmation that the diversification instructions were implemented. For example, the administrator computer system may send the fourth confirmation message to the secured note issuer administrator computer system via network 100. Alternatively, the administrator computer system may generate and send a fifth confirmation message to the secured note issuer administrator computer system, the fifth confirmation message including one or more of the following: the receipts of one or more of the transfers, the amount of precious metal in each issuer account, the date and/or time of one or more of the transfers, and/or verification of the confirmation by the administrator computer system, to name a few. In embodiments, once the confirmation is received by the secured note issuer administrator system, the secured note administrator system may record a deposit amount associated with one or more of the plurality of issuers.

Referring back to FIG. 6A, in embodiments, the process for purchasing shares of a fund backed by secured notes may continue with step S612. At step S612, in embodiments, the administrator computer system may provide secured notes corresponding to the first amount of precious metal. A more detailed description of a process for providing secured notes corresponding to the first amount of precious metal may be illustrated in connection with FIG. 6D.

Figure 6A:
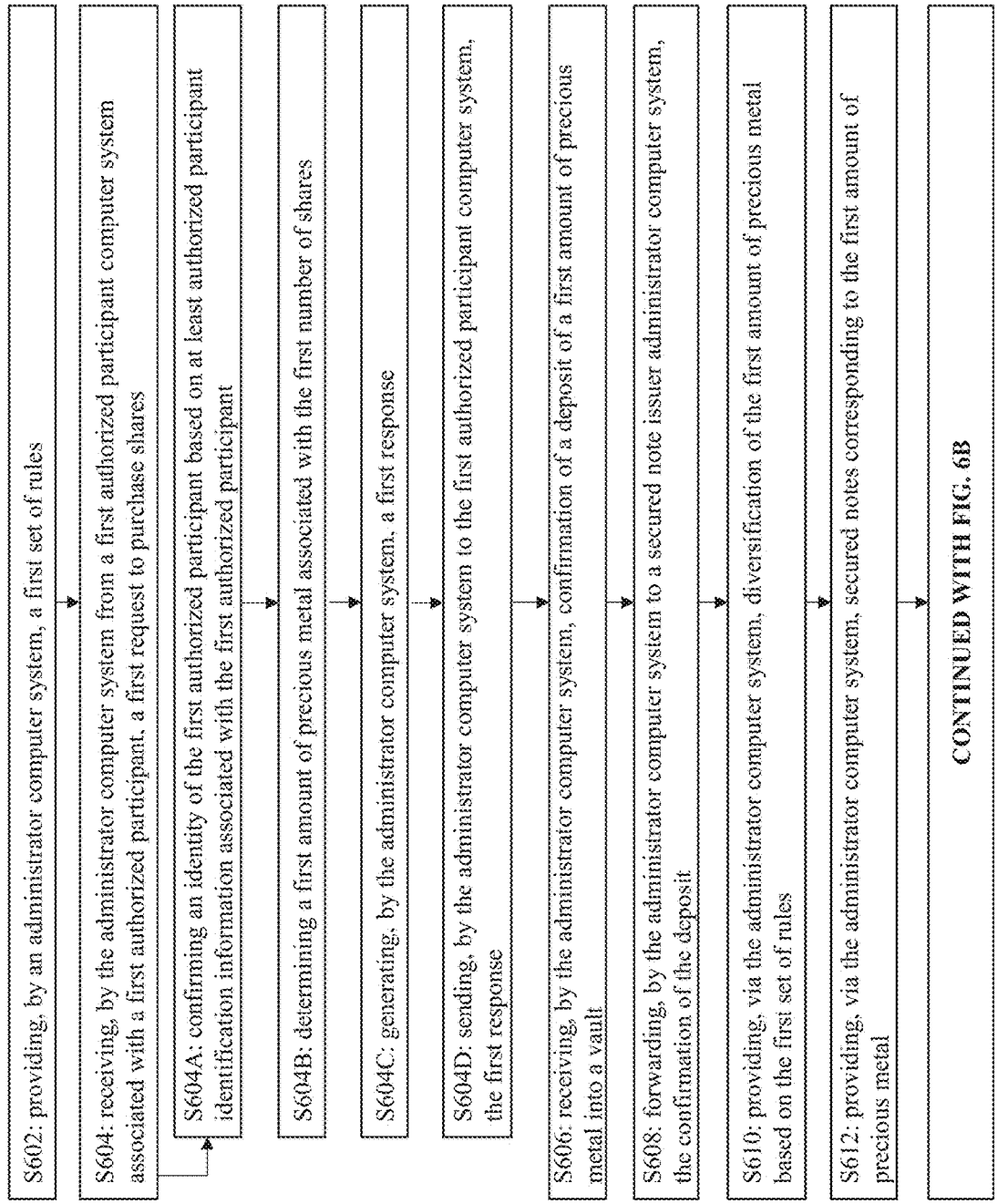
FIG. 6A through FIG. 6B are flow charts of an exemplary process for purchasing shares of a fund in accordance with exemplary embodiments of the present invention.
Figure 6B:
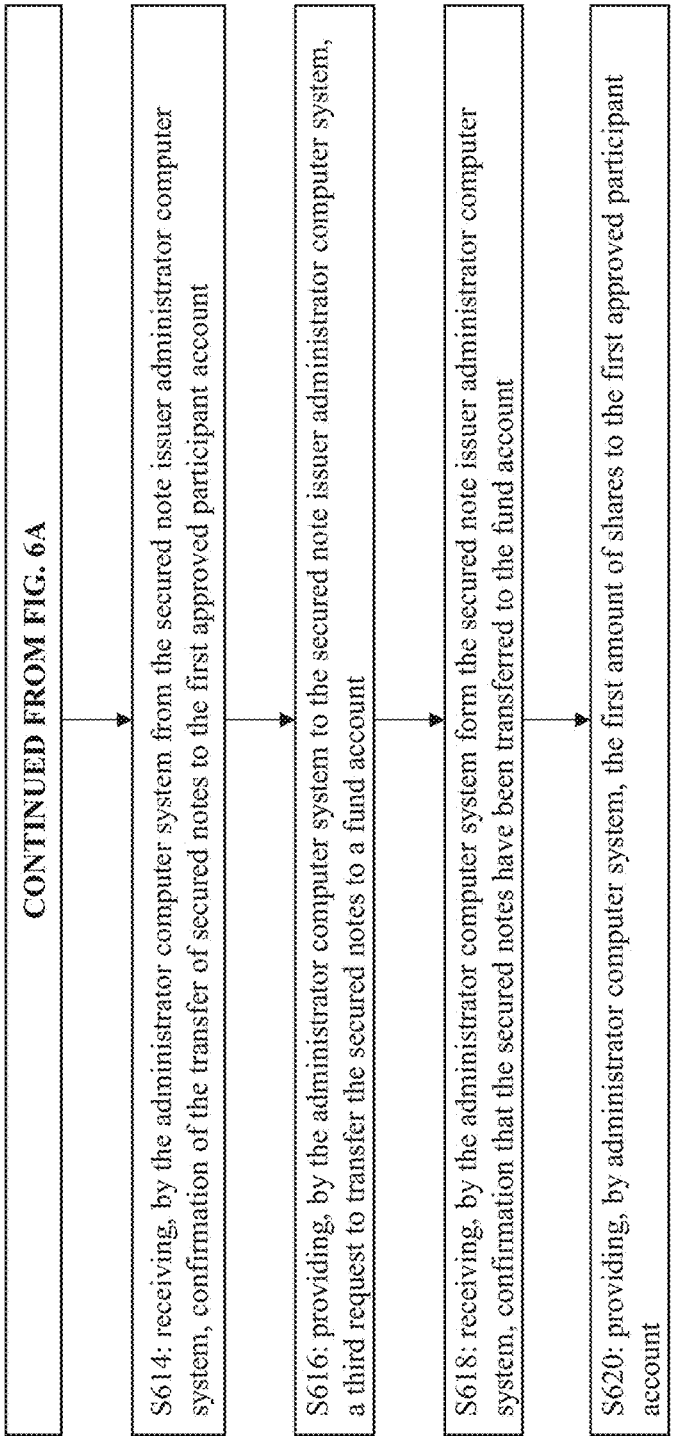
Figure 6C:
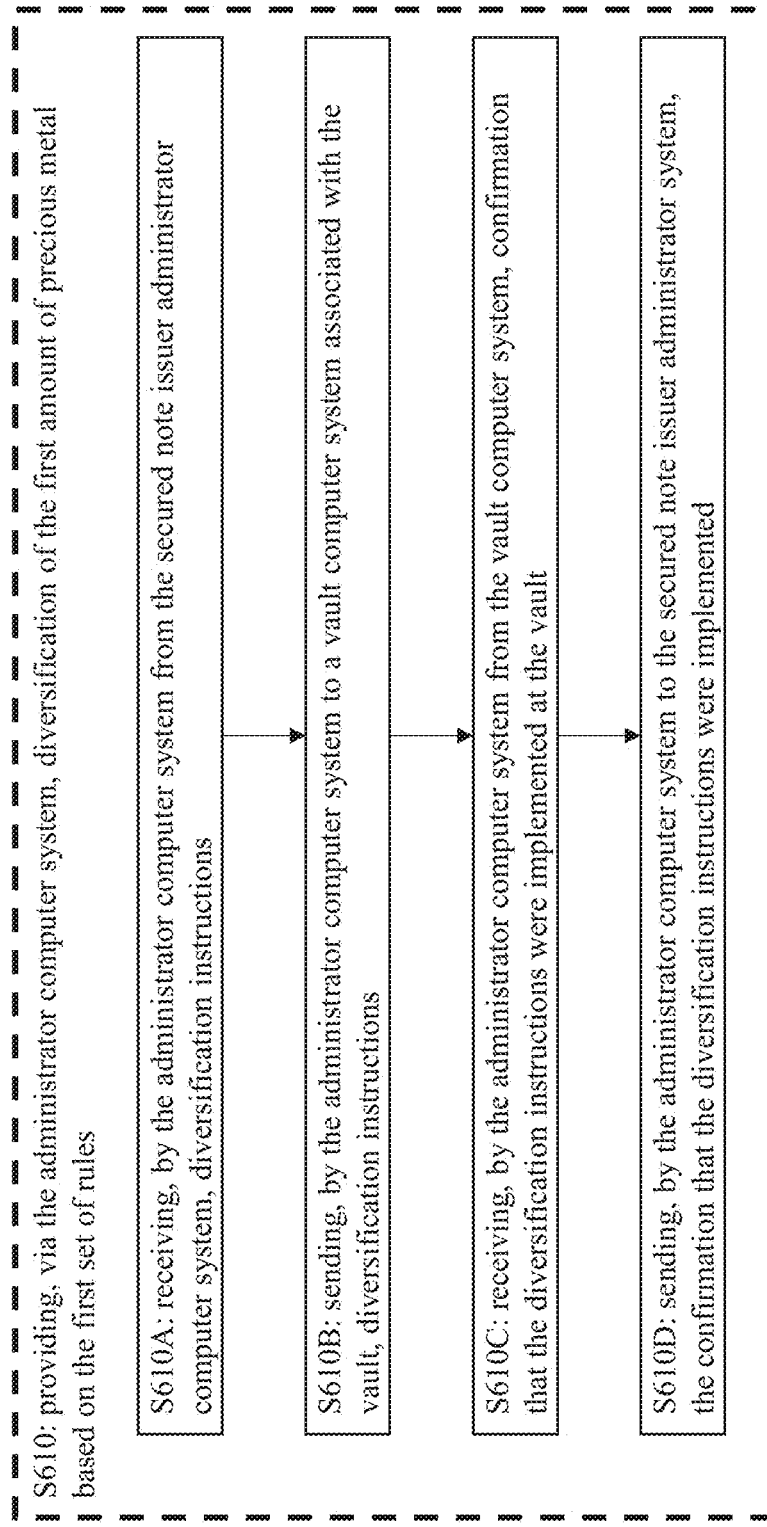
FIG. 6C is an exemplary flow chart of an exemplary process of providing diversification of an amount of precious metal in accordance with exemplary embodiments of the present invention.
Figure 6D:
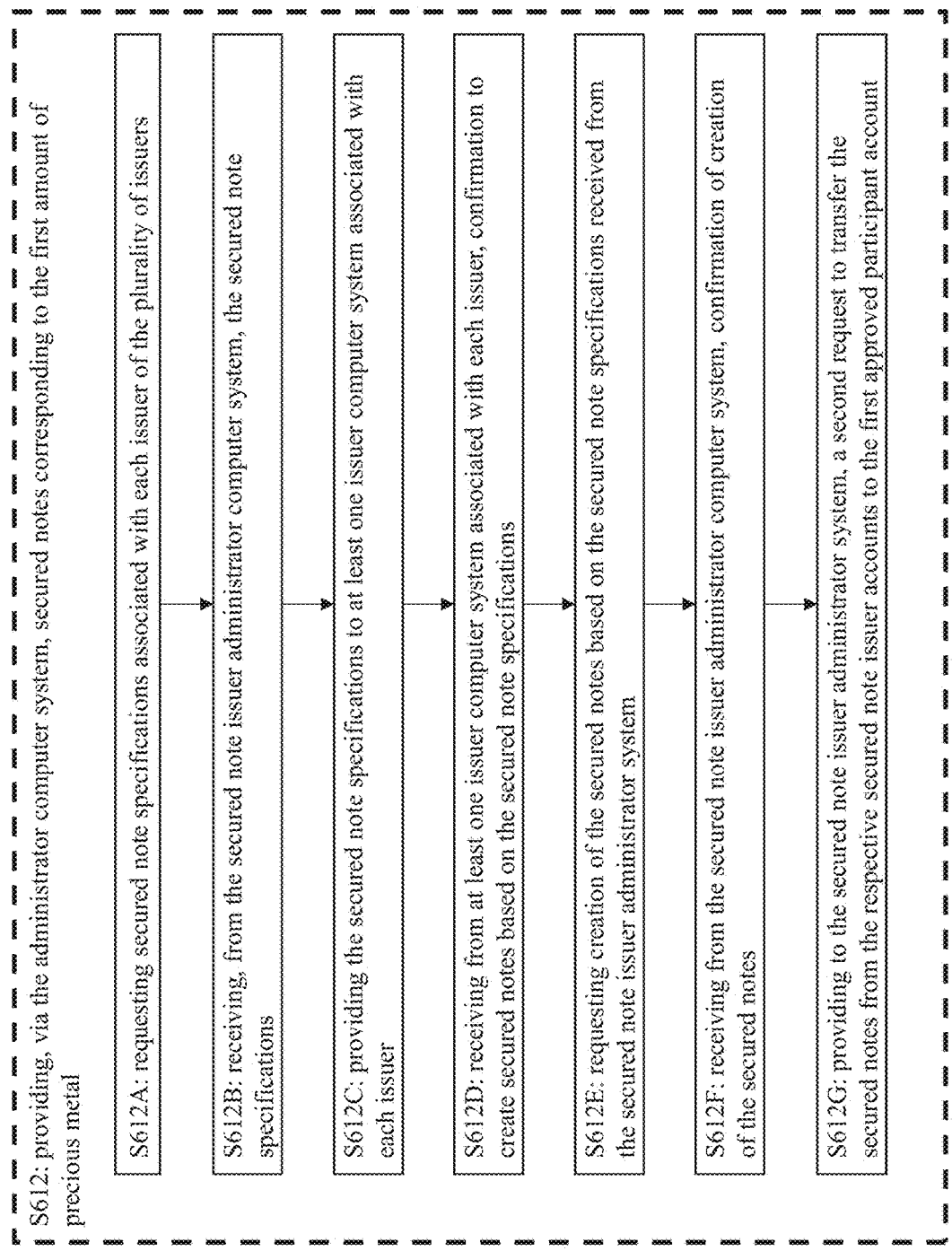
FIG. 6D is an exemplary flow chart of an exemplary process of providing secured notes corresponding to an amount of precious metal in accordance with exemplary embodiments of the present invention.

Referring to FIG. 6D, in embodiments, the process for providing secured notes corresponding to the first amount of precious metal may begin with step S612A. At step S612A, in embodiments, the administrator computer system may request secured note specifications associated with each issuer of the plurality of issuers. The administrator system may request the secured note specifications by generating a message requesting the secured note specifications associated with each issuer of the plurality of issuers. The secured note specifications, in embodiments, may be based on the previously determined deposit value of each issuer. The generated message may, in embodiments, be sent by the administrator system to the secured note issuer administrator computer system via network 100. In response to receiving the request, the secured note issuer administrator system may generate the secured note specifications based on the determined deposit value of each issuer. Once generated, the secured note issuer administrator system may send the secured note specifications to the administrator computer system via network 100. At step S612B, in embodiments, the administrator computer system may receive, from the secured note issuer administrator computer system, the secured note specifications.

In embodiments, the process for providing secured notes corresponding to the first amount of precious metal may continue with step S612C. At step S612C, in embodiments, the administrator computer system may provide the secured note specifications to at least one issuer computer system associated with each issuer of the plurality of issuers. In embodiments, the secured note specifications may be provided via a message generated, by the administrator computer system, and sent to each issuer of the plurality of issuers. The generated message, in embodiments, may include a prompt, requesting authorization and/or confirmation to create secured notes based on the generated secured note specifications.

In embodiments, the process for providing secured notes corresponding to the first amount of precious metal may continue with step S612D. At step S612D, in embodiments, the administrator computer system may receive, from the at least one issuer computer system, confirmation to create secured notes based on the secured note specifications. In embodiments, the confirmation may be in response to the prompt requesting authorization and/or confirmation. In embodiments, at least one issuer must confirm the creation of the secured notes based on the secured note specifications to create the secured notes. In embodiments, a majority of the plurality of issuers must confirm the creation of the secured notes based on the secured note specifications to create the secured notes. In embodiments, the plurality of issuers must confirm the creation of the secured notes based on the secured note specifications to create the secured notes. If confirmation requirements are not met, in embodiments, the administrator computer system may not request the creation of the secured notes based on the secured note specifications.

In embodiments, the process for providing secured notes corresponding to the first amount of precious metal may continue with step S612E. At step S612E, in embodiments, the administrator computer system requests the creation of the secured notes. In embodiments, once the creation of secured notes based on the secured note specifications has been confirmed, the administrator computer system may generate a secured note creation request to create the secured notes based on the secured note specifications. The secured note creation request, in embodiments, may be a request to generate secured notes based on the secured note specifications. The number of secured notes, in embodiments, may be based on one or more of the following: the first number of shares, the ratio of shares to precious metal, the number of issuers, the first set of rules, and/or the secured note specifications, to name a few. The secured note creation request, once generated, may be transmitted by the administrator computer system to the secured note issuer administrator system.

In response to receiving the secured note creation request, in embodiments, the secured note issuer administrator system may create the secured notes in an account associated with the secured note issuer administrator computer system. Once the secured notes have been generated, in embodiments, the secured note issuer administrator system may generate a sixth confirmation message indicating one or more of the following: confirmation of the creation of the secured notes, the amount of secured notes, the account that the secured notes is being held in, the date and/or time of the creation of the secured notes, and/or the authorized participant associated with the secured notes, to name a few. The sixth confirmation message, in embodiments, may be sent to one or more of the following: the administrator computer system, the secured note issuer administrator computer system, one or more issuer systems of the plurality of issuer systems, the authorized participant device, and/or vault administrator system, to name a few. In embodiments, the secured notes creation request may be generated prior to and/or during the confirmation of the creation of the secured notes based on the secured note specifications.

In embodiments, the process for providing secured notes corresponding to the first amount of precious metal may continue with step S612F. At step S612F, in embodiments, the administrator computer system receives, from the secured note issuer administrator computer system, confirmation of the creation of the secured notes. For example, the administrator computer system may receive the sixth confirmation message from the secured note issuer administrator system. In embodiments, once confirmation has been received by the administrator computer system, the administrator computer system may verify the confirmation. For example, the administrator computer system may verify the correct amount of secured notes was created by the secured note issuer administrator system.

In embodiments, the process for providing secured notes corresponding to the first amount of precious metal may continue with step S612G. At step S612G, in embodiments, the administrator computer system provides, to the secured note issuer administrator system, a second request to transfer the secured notes from the respective secured note issuer accounts to the first authorized participant account. In embodiments, once secured notes have been created and confirmed, the administrator computer system may generate the second request to transfer the created secured notes to an account associated with the first authorized participant. The second request, once generated, may be sent by the administrator computer system to the secured note issuer administrator computer system via network 100.

In response to being provided the second request, in embodiments, the secured note issuer administrator system may transfer the secured notes from the secured note issuer administrator computer system account to the authorized participant account. After the transfer has been executed, in embodiments, the secured note issuer administrator system may generate a seventh confirmation message indicating one or more of the following: confirmation of the transfer of secured notes, the amount of secured notes, the account that the secured notes was transferred to, and/or the date and/or time of the transfer of the secured notes, to name a few. The seventh confirmation message, in embodiments, may be sent to one or more of the following: the administrator computer system, the secured note issuer administrator computer system, one or more issuer systems of the plurality of issuer systems, the authorized participant device, and/or vault administrator system, to name a few.

The process for purchasing shares of a fund backed by secured notes, in embodiments, may continue with FIG. 6B. Referring to FIG. 6B, in embodiments, the process for purchasing shares of a fund backed by secured notes may continue with step S614. At step S614, in embodiments, the administrator computer system may receive, from the first secured note issuer administrator computer system, confirmation of the transfer of secured notes to the first authorized participant account. For example, the administrator computer system may receive the seventh confirmation message from the secured note issuer administrator system. In embodiments, once confirmation has been received by the administrator computer system, the administrator computer system may verify the confirmation. For example, the administrator computer system may verify the correct amount of secured notes was transferred to the authorized participant account.

In embodiments, the process for purchasing shares of a fund backed by secured notes may continue with step S616. At step S616, in embodiments, the administrator computer system may provide, to the secured note issuer administrator computer system, a third request to transfer the secured notes to a fund account. In embodiments, once secured notes have been transferred to the authorized participant account, the administrator computer system may generate the third request to transfer the created secured notes to the account associated with the administrator computer system (e.g. the fund account). The third request, once generated, may be sent by the administrator computer system to the secured note issuer administrator computer system via network 100.

In response to being provided the third request, in embodiments, the secured note issuer administrator system may transfer the secured notes from the authorized participant account to the account associated with the administrator computer system. In embodiments, the secured notes may be transferred into the fund account using an electronic ledger entry. The electronic ledger entry, in embodiments may be stored in memory (e.g. memory 102-2, and/or memory 104-2, to name a few) and/or a memory device accessible by the administrative computer system and/or the secured note issuer administrator computer system.

After the transfer has been executed, in embodiments, the secured note issuer administrator system may generate an eighth confirmation message indicating one or more of the following: confirmation of the transfer of secured notes, the amount of secured notes, the account that the secured notes was transferred to, and/or the date and/or time of the transfer of the secured notes, to name a few. The eighth confirmation message, in embodiments, may be sent to one or more of the following: the administrator computer system, the secured note issuer administrator computer system, one or more issuer systems of the plurality of issuer systems, the authorized participant device, and/or vault administrator system, to name a few.

In embodiments, the process for purchasing shares of a fund backed by secured notes may continue with step S618. At step S618, in embodiments, the administrator computer system may receive, from the secured note issuer administrator computer system, confirmation that the secured notes have been transferred to the fund account. For example, the administrator computer system may receive the eighth confirmation message from the secured note issuer administrator system. In embodiments, once confirmation has been received by the administrator computer system, the administrator computer system may verify the confirmation. For example, the administrator computer system may verify the correct amount of secured notes was transferred to the fund account.

In embodiments, the process for purchasing shares of a fund backed by secured notes may continue with step S620. At step S620, in embodiments, the administrator computer system may provide the first amount of shares to the first authorized participant account. In embodiments, the first amount of shares may be provided via an electronic ledger transaction. In embodiments, the administrator computer system may provide the first amount of shares by generating a share transfer request. The share transfer request, in embodiments, may be a request to transfer the first amount of shares from the administrator account to the authorized participant account. Once generated, the share transfer request, in embodiments, may be sent by the administrator computer system to the custodial system. Upon receipt of the share transfer request, in embodiments, the custodial system may transfer the first amount of shares from the administrator account to the authorized participant account. In embodiments, the first amount of shares may be transferred using an electronic ledger entry and/or an electronic ledger transaction. The electronic ledger entry, in embodiments may be stored in memory (e.g. memory 102-2, and/or memory 104-2, to name a few) and/or a memory device accessible by the administrative computer system, the custodial system, and/or the secured note issuer administrator computer system.

In embodiments, the first amount of shares may be provided to the first authorized participant by the secured note issuer administrator computer system. To provide the first amount of shares, the secured note issuer administrator system may perform step S620 described above, the description of which applying herein.

After the transfer has been executed, in embodiments, the custodial system may generate a ninth confirmation message indicating one or more of the following: confirmation of the transfer of the first amount of shares, the first amount, the account that the first amount of shares was transferred to, and/or the date and/or time of the transfer of the first amount of shares, to name a few. The ninth confirmation message, in embodiments, may be sent to one or more of the following: the administrator computer system, the secured note issuer administrator computer system, one or more issuer systems of the plurality of issuer systems, the authorized participant device, and/or vault administrator system, to name a few.

In embodiments, the steps of the processes described in connection with FIGS. 6A-6D may be rearranged or omitted.

Redeeming ETF Shares

As described above, a fund that tracks precious metal pricing while, in general, avoiding holding title to the precious metal may allow one or more authorized participants, market makers, and/or brokers to redeem shares that track said precious metal pricing. Administrator 102/104, in embodiments, may redeem one or more shares of one or more funds backed by secured notes. For example, referring to FIG. 5A, a process for redeeming fund shares in accordance with exemplary embodiments of the present invention may optionally begin at step R10 (which may be similar to the description of C10, described above in connection with FIG. 2A through FIG. 2D, the description of which applying herein). At R10, in embodiments, the Administrator 102/104 may publish and/or register diversification rules associated with a diversification algorithm for diversifying the Fund. For example, an administrator computer system (e.g. administrator computer system 104) may provide a first set of rules. The first set of rules, in embodiments, may be rules that are designed for diversification of fund shares among a plurality of issuers of secured notes. In embodiments, the published diversification rules may include one or more factors which can be weighted based on one or more diversification algorithms (e.g., similar, in embodiments, to the description of Equation 1 below in connection with FIG. 6A through FIG. 6D, the description of which applying herein). In embodiments, the first set of rules may include one or more diversification algorithms. The diversification algorithm(s) discussed herein may be similar to diversification algorithm(s) 128 described above in connection with FIG. 1B-2, the description of which applying herein.

In embodiments, the first set of rules may be stored in memory (e.g. memory 102-2, and/or memory 104-2, to name a few) and/or a memory device. The first set of rules, in embodiments, may be accessible by the Administrator 102/104. For example, the first set of rules may be stored on a memory device operatively connected to the Administrator 102/104. As another example, the first set of rules may be stored on memory of the administrative computer system 104 and/or memory of the secured note issuer administrator computer system 102.

In embodiments, the first set of rules may be stored in memory of and/or generated by one or more of the following: one or more issuer systems of the plurality of issuer systems 108 associated with the plurality of issuers, one or more authorized participant devices 106 associated with one or more authorized participants, one or more vault administrator systems 110, and/or one or more custodial systems 114 associated with one or more custody companies that hold shares of the fund in custody, to name a few. In embodiments, one or more issuer systems 108 generates the first set of rules and sends the generated first set of rules to memory operatively connected to the Administrator 102/104 where the Administrator 102/104 stores the first set of rules in memory.

The redemption process illustrated in connection with FIG. 5A may continue (or begin) with step R20. At step R20, in embodiments, the Administrator 102/104 may obtain an order to redeem a first amount of shares in the fund for a second amount of precious metal. In embodiments, Administrator 102/104 may obtain one or more orders to redeem shares. Each of those orders may be for an amount of precious metal in exchange for an amount of shares in the fund. In embodiments, an entity device associated with an entity (e.g., entity 1000) may generate and send an order to Administrator 102/104. For example, referring to FIG. 7B, entity 1000 may order a first amount of shares using entity device 700-2 (which may be similar to one or more of the following: Broker Device(s) 105, AP Device(s) 106, MM Device(s) 160, and/or AA Devices 107, to name a few, described above in connection with FIG. 1A-1 through FIG. 1E-5, the descriptions of which applying herein). Continuing the example, the entity device display 700-2A may display one or more of the following: purchase shares 702 option, redemption shares 704 option, transfer shares 706 option, the amount of shares associated with the order (e.g., First Amount of Shares 708), the amount of precious metal associated with the order (e.g., optional Estimated Value of Shares 714), and/or an option to place the order or transfer request (e.g., Place Order 712 option), to name a few. For the purposes of this example, in embodiments, entity 1000 may place an order to redeem the First Amount of Shares 708 valued at the Estimated Value of Shares 714 by selecting Place Order 712. Continuing the example, the order may be sent by entity device 700-2 to Administrator 102/104 via network 100. The order, in embodiments, may include metadata sufficient to identify the entity placing the order (e.g., an entity identification, time stamp, to name a few). The order, in embodiments and continuing the example, may be received by the Administrator 102/104. In embodiments, once the order is received, Administrator 102/104 may authenticate the order (e.g., determine the order originated from a device associated with the entity 1000) and verify the order (e.g., identify one or more accounts associated with the entity 1000 and determine whether the identified accounts include sufficient funds for the order). In embodiments, the received order and one or more pieces of information associated with the authentication and/or verification of the order, may be combined and saved in memory accessible by the Administrator 102/104. For example, referring to FIG. 7E, the Administrator 102/104 may generate Example Redemption Order 724 based on an order received from an entity (e.g., entity 1000). As illustrated in FIG. 7D, the generated Example Creation Order 724 may include one or more of the following: Entity Identification 724-1 (e.g., Account Information 138, Entity Account Information, Broker Account Information, Issuer Account Information 144, and/or Market Maker Account Information, to name a few), Fund Identification 724-2 (e.g., alphanumeric and/or symbol identifier associated with the fund), Date of Order 724-3 (e.g., the date the order was started, the date the order was sent, and/or the date of the last published diversification rules and/or algorithm, to name a few), Time of Order 711-4 (e.g., the time the order was started, the time the order was sent, and/or the time of the last published diversification rules and/or algorithm, to name a few), Entity Vault Account information 724-5 (e.g., the one or more accounts associated with entity 1000 at one or more vaults 112), Entity Custodian Account Information 724-6 (e.g., the one or more accounts associated with entity 1000 at one or more custodial system(s) 114), DTC Participant Identification Information 724-7 (e.g., the DTC participant associated with the entity 1000 and/or the fund), Entity Contact Information 724-8 (e.g., email address, telephone number, facsimile number, address, and/or a combination thereof, to name a few), Fund Ticker 724-9 (e.g., the ticker associated with the fund), Creation of shares 724-10 (e.g., the amount of shares associated with the example creation order 724), Redemption of shares 724-11 (e.g., the amount of shares associated with the example redemption order 724), Amount of Precious Metal 724-12 (e.g., the amount of precious metal associated with the example creation order 724), and/Order Identification 724-13 (e.g., an alphanumeric and/or symbol identifier associated with the example creation order 724), to name a few.

In embodiments, one or more orders may be for the amount of precious metal in exchange for one or more of the following: an amount of shares in the fund; an amount of notes purchased from one or more issuers (e.g., privately and/or on a secondary market); an amount of fiat; and/or a combination thereof, to name a few. For example, an order may be placed for a first amount of precious metal in exchange for a second amount of shares purchased from one or more issuers, up to a third amount of fiat. In embodiments, an entity (e.g., entity 1000) may order a redemption of shares in exchange for, at least, an amount of fiat. The order, for example, may list a specific amount of fiat and/or an amount of fiat the entity 1000 would like to receive (e.g., a minimum amount)—the remaining value being made up with an amount of precious metal. In embodiments, the Administrator 102/104 may generate and send a message to the entity 1000, notifying the entity 1000 of the amount of fiat the first order will include (and/or giving the entity 1000 an option to cancel the order). For example, referring to FIG. 5-20, a process for obtaining the order to redeem a first amount of shares may begin with step S504. At step S504, in embodiments, the entity 1000 (e.g., authorized participant device 106, broker device 105, market maker device 160, authorized applicant device 107, issuer device 108, and/or a combination thereof, to name a few) generates the order to redeem the first amount of shares for the second amount of precious metal. The order, in embodiments, may include one or more of the following: identification information associated with the entity 1000; a first number of shares to be redeemed by the entity 1000; a price associated with the first number of shares; and/or the second amount of precious metal associated with the first number of shares, to name a few. The identification information, in embodiments, may include one or more of the following: a username and password combination; biometric data associated with the authorized participant; personally identifiable information ("PII") associated with the authorized participant; a phone number associated with the authorized participant; a social security number associated with the authorized participant; an e-mail address associated with the authorized participant; a unique identifier associated with the authorized participant and issued by an administrator of the authorized participant; and/or a unique identifier associated with the authorized participant, to name a few. Continuing the process, for example, the entity 1000 at step S205 may send the order to redeem a first amount of shares for a second amount of precious metal to the Administrator 102/104 via network 100.

The order, once obtained by the Administrator 102/104, may be verified. In embodiments, the order may be verified by one or more of the following: administrator 104, secured note issuer administrator system 102, broker device(s) 105 and/or a combination thereof, to name a few. For example, the Administrator 102/104 may verify the obtained order (and/or a plurality of obtained orders) by confirming the Entity is an Entity associated with the fund based on identification information received with the order (e.g., confirm the authorized participant associated with order is an authorized participant associated with the fund). Continuing the example, the Administrator 102/104 may verify the Entity (and/or entities) associated with the order (and/or orders) has sufficient funds for the order (e.g., confirming the Entity owns the first amount of shares. In embodiments, the verification process may continue with the Administrator 102/104 determining that the second amount of secured notes corresponds to the first amount of shares. For example, the Administrator 102/104 may determine the value of the first amount of shares (e.g., at the time of the order, a predetermined time before the order, and/or a predetermined time after the order) and the second amount of secured notes. If the value, continuing the example is less than (e.g., to account for fees and/or a reserve portion held in reserve by the Administrator 102/104) or equal to the value of the second amount of secured notes, the Administrator may determine the second amount of secured notes corresponds to the first amount of shares.

In embodiments, referring to FIG. 5-20B, the order may be generated based on asks from one or more market makers (similar to the description above in connection with FIG. 2-20B, the description of which applying herein). For example, at step S504-1A, one or more market maker device(s) 160 may generate one or more asks for the fund. For example, a Market Maker (MM) shows a bid and ask price with a quote of $100 USD. This means, in embodiments, that the MM is willing to redeem shares from the fund for $100 USD. In embodiments, the ask may be a spread. For example, the MM may show a bid and ask price with a quote of $100-$120. This means, in embodiments, that the MM is willing to both buy fund shares for $100 and redeem fund shares at $120. The exemplary spread of twenty dollars may represent a potential profit per share traded to and/or from the market maker. In embodiments, the one or more asks may include an order to redeem an amount of shares for: precious metal, secured notes from the secondary market; fiat; and/or a combination thereof, to name a few.

Continuing S504-1, illustrated in connection with FIG. 5-20B, the one or more market maker device(s) 160, in embodiments, may send the one or more asks to one or more authorized participant device(s) via network 100. The one or more authorized participant device(s) 106, in embodiments, may receive the one or more asks (at step S504-C) and generate the order based on at least the one or more asks (at step S504-1D). In embodiments, the one or more authorized participant devices 106 may receive multiple asks from multiple different market maker device(s) 160. In embodiments, step S504-1 may be an alternative to step S504.

Referring to FIG. 5-20C, at step R20-1, the Administrator 102/104 (and/or AP device(s) 106, AA Devices 107) may obtain one or more redemption orders, including at least one of the following: (1) a first order to redeem an amount of shares for an amount of precious metal (e.g., the order described in connection with R20); (2) a second order to redeem an amount of shares for a combination of an amount of precious metal and an amount of secured notes from a secondary market (e.g., not purchased through an issuer and/or AP of the fund); (3) a third order to redeem an amount of shares for an amount of precious metal and a first amount of fiat; and/or (4) a fourth order to redeem an amount of shares for an amount of fiat and an amount of secured notes from a secondary market. In embodiments, the redemption orders may identify the amount of return (e.g., fiat, precious metal, and/or secured notes from a secondary market) as well as an amount to offer (e.g., the shares to redeem in combination with one or more of the following: precious metal, secured notes from a secondary market, and/or fiat, to name a few).

In embodiments, the order to redeem a first amount may be in exchange for consideration in addition to or in lieu of precious metal. For example, referring to FIG. 5-20D, at R20-2 the Administrator 102/104 may obtain a redemption order for one or more of the following: an amount of precious metal; an amount of secured notes from a secondary market; and/or a combination thereof, to name a few. In embodiments, the Administrator 102/104 may obtain the order by generate and publishing an offering to redeem. For example, referring to FIG. 5-20E, at R20-3, the Administrator 102/104 may generate and publish a first offering to redeem a first amount of shares. The first offering, in embodiments, may offer one or more of the following in exchange for the redemption of the first amount of shares: an amount of precious metal; an amount of secured notes from a secondary market; and/or a combination thereof, to name a few.

Referring back to FIG. 5-20A, Continuing the process, in embodiments, after receiving the order from the authorized participant device 106, the Administrator 102/104 may process the order (e.g. steps S506-S508). In embodiments, at step S506, the Administrator 102/104 may receive the order from the entity 1000. The Administrator 102/104 may receive the order from the entity 1000 via network 100, For example, the administrator system 104 may receive the order from the authorized participant device 106.

At step S507 and S508, in embodiments, the Administrator 102/104 may register and verify the order respectively. Continuing the example, the administrator system 104 may register the order to redeem the first amount of shares for the second amount of precious metal by storing the order with an account associated with the authorized participant device 106. In embodiments, the Administrator 102/104, in embodiments, may process the order by registering the order, with an electronic ledger operatively connected to the Administrator 102/104.

In embodiments, the Administrator 102/104 may process the order by confirming the identity of the entity 1000 (e.g., the authorized participant associated with the authorized participant device 106). Confirmation of the identity of the entity 1000, in embodiments, may be based on the received identification information. For example, the Administrator 102/104 may confirm the identity of an authorized participant associated with the order by comparing the received identification information with previously stored identification information associated with the authorized participant (e.g. information associated with the authorized participant and stored in the authorized participant database 120). If, for example, the Administrator 102/104 does not confirm the identity of the authorized participant, the Administrator 102/104 may not accept the order. In embodiments, the Administrator 102/104 may confirm the identity of the authorized participant.

In embodiments, the redemption process illustrated in connection with FIG. 5A may continue with step R30. At R30, in embodiments, the Administrator 102/104 may instruct an Entity (e.g., the entity 1000, described above in connection with FIG. 2A through FIG. 2E, the description of which applying herein) to initiate a transfer of the first amount of shares. For example, the Administrator 102/104 may generate first settlement instructions to transfer the first amount of shares from an Entity Account(s) associated with the Entity (e.g., first authorized participant account associated with the first authorized participant) to a fund account(s) associated with the fund (which may be similar to the description of the Administrator Accounts throughout, the description of which applying herein). The first settlement instructions, continuing the example, may be sent to one or more of the following: Entity 1000 (which may confirm and forward/generate and send the settlement instructions to the custodial system 114), broker device(s) 105 (which may forward to the custodial system 114, confirm and forward/generate and send the settlement instructions to the custodial system 114, and/or forward to the Entity 1000), and/or custodial system 114, to name a few. In embodiments, the custodial system 114 may receive and execute the first settlement instructions. Once the first settlement instructions are executed, in embodiments, the custodial system 114 may generate and send a confirmation message to one or more of the following: Administrator 102/104, Entity 1000, Broker Device(s) 105, and/or a combination thereof, to name a few. The confirmation message, in embodiments, may be received by one or more of the following: Administrator 102/104, Entity 1000, Broker Device(s) 105, and/or a combination thereof, to name a few.

For example, referring to FIG. 5-30, R30 may begin with step S510. In embodiments, at step S510, the Administrator 102/104 may generate a first message including instructions to transfer the first amount of shares to an administrator account associated with the Administrator 102/104. In embodiments, the generated deposit redemption (and/or the execution thereof) may verify the entity 1000 has sufficient shares for the redemption order. The first message, in embodiments, at step S511, is sent to the entity 1000 by the Administrator 102/104 (e.g., via the administrator system 104, secured note administrator system 102, AP Device(s) 106, AA Device(s) 107, custodial system 114, vault administrator system 110, one or more of the plurality of issuer devices 108, and/or a combination thereof, to name a few.) In embodiments, the entity 1000 may receive the first message (at step S511-1) and, generate and send a message based on the first message to the custodial system 114 via network 100.

Referring back to FIG. 5A, in embodiments, at step R30-1, the first amount of shares may not have been transferred (e.g., one or more shares not transferred correctly and/or one or more shares not transferred—within a time period and/or at all, to name a few). A more detailed description of such embodiments is located below in connection with R30-1 of FIG. 2A, the description of which applying herein.

In embodiments, the first amount of shares were transferred and the process may continue with R40. In embodiments, the redemption process illustrated in connection with FIG. 5A may continue with step R40. At R40, in embodiments, the Administrator 102/104 determines a third amount of secured notes based on the first amount of shares. The third amount of secured notes, in embodiments, may be the amount of secured notes representing one or more of the following: the value of the first amount of shares, the value of the first amount of shares plus a fee associated with the Administrator 102/104, and/or the value of the first amount of shares plus a fee associated with a broker associated with the fund and the entity 1000, to name a few Referring to FIG. 5-40A-1, in embodiments, R40 may begin with step S512. In embodiments, at step S512, the entity 1000 may generate and send, to a custodial system 114, instructions to transfer the first amount of shares from a fund entity account (e.g., the entity account described herein) to a fund administrator account (e.g., the administrator account described herein). In embodiments, the generated instructions may include the instructions from the Administrator 102/104. At step S513-1, in embodiments, the custodial system may receive and execute the instructions to transfer the first amount of shares from the entity account to the administrator account. The transfer of the first amount of shares may be confirmed by the custodial system 114. For example, at step S513-2, the custodial system 114 may generate and send, to the Administrator 102/104, a confirmation message confirming the transfer of the first amount of shares.

In embodiments, R40 may continue with step S514. In embodiments, at step S514, the Administrator 102/104 may receive confirmation from the custodial system 114 that the first amount of shares was transferred to the administrator account. For example, the administrator system 104 may receive the confirmation message from the custodial system 114. Continuing the example, the administrator system 104 may forward that confirmation message to the secured note issuer administrator system 102.

R40, in embodiments, may continue with FIG. 5-40A-2. Referring to FIG. 5-40A-2, in embodiments, R40 may continue with step S516. In embodiments, at step S516, the Administrator 102/104 may determine a third amount of secured notes backing the first amount of shares. For example, the administrator system 104 may generate a request for secured note specifications associated with an amount of secured notes associated with the first amount of shares. The administrator system 104, continuing the example, may send the request to the secured note issuer administrator system 102. In embodiments, continuing the example, the secured note issuer administrator system 102 may receive the first request and generate the secured note specifications in accordance with the diversification rules and diversification algorithm(s). Continuing the example, the secured note specifications may be sent by the secured note issuer administrator system 102 to the administrator system 104, resulting with the administrator system 104 receiving the secured note specifications.

In embodiments, R40 may continue with step S518. In embodiments, at step S518, the Administrator 102/104 may transfer the third amount of secured notes from the fund administrator account to the entity account. For example, the administrator system 104 may generate a request to transfer the third amount of secured notes from the fund administrator account to a fund authorized participant account. Continuing the example, the administrator system 104 may send the request to the secured note issuer administrator system 102. The secured note issuer administrator system 102 may receive the request from the administrator system 104. Continuing the example, the secured note issuer administrator system 102 may execute the transfer, resulting in the third amount of secured notes being transferred to the fund authorized participant account. In embodiments, the transfer may be executed by the custodial system 114. In embodiments, the transfer may be confirmed by the Administrator 102/104. For example, the secured note issuer administrator system 102 may generate a confirmation message confirming the transfer of the third amount of secured notes. The generated confirmation message, in embodiments, may be sent from the secured note issuer administrator system 102 to the administrator system 104. In embodiments, the third amount of notes may be transferred from the administrator account to one or more broker accounts associated with one or more broker device(s) 105. The one or more broker device(s), in embodiments, may be associated with one or more brokers associated with the fund and/or the entity 1000.

R40, in embodiments, may continue with step S520. In embodiments, at step S520, the Administrator 102/104 may generate and send, to the entity 1000, a request to authorize redemption of the third amount of secured notes. For example, the administrator system 104 may generate a request to authorize the redemption of the third amount of secured notes. Continuing the example, the administrator system 104 may send the request to the authorized participant device 106 via network 100. R40, in embodiments, may continue with step S522. In embodiments, at step S522, the authorized participant device 106 may receive the third request. At step S524, in embodiments, the entity 1000 may generate and send authorization to redeem the third amount of secured notes (e.g., to the Administrator 102/104, the custodial system 114, and/or a combination thereof, to name a few).

Referring back to FIG. 5A, an exemplary process for redeeming shares in accordance with embodiments of the present invention may continue with R45. In embodiments, R45 may begin with R45-1. At R45-1, in embodiments, the Administrator 102/104 may obtain diversification information associated with diversifying the fund. For example, the Administrator 102/104 may obtain first diversification information associated with the plurality of issuers. In embodiments, the administrator system 104 may generate and send a request for the first diversification information to the secured note issuer administrator system 102, which, in embodiments may receive the request. The secured note issuer administrator system 102, responding to the request, in embodiments may obtain the first diversification information, one or more diversification rules, and/or one or more a diversification algorithms associated with diversifying the fund (e.g., diversification algorithms 128). In embodiments the secured note issuer administrator system 102 and/or the administrator system 102 may request authorization and/or access the diversification algorithm(s) and/or diversification rule(s).

Figure 5A:
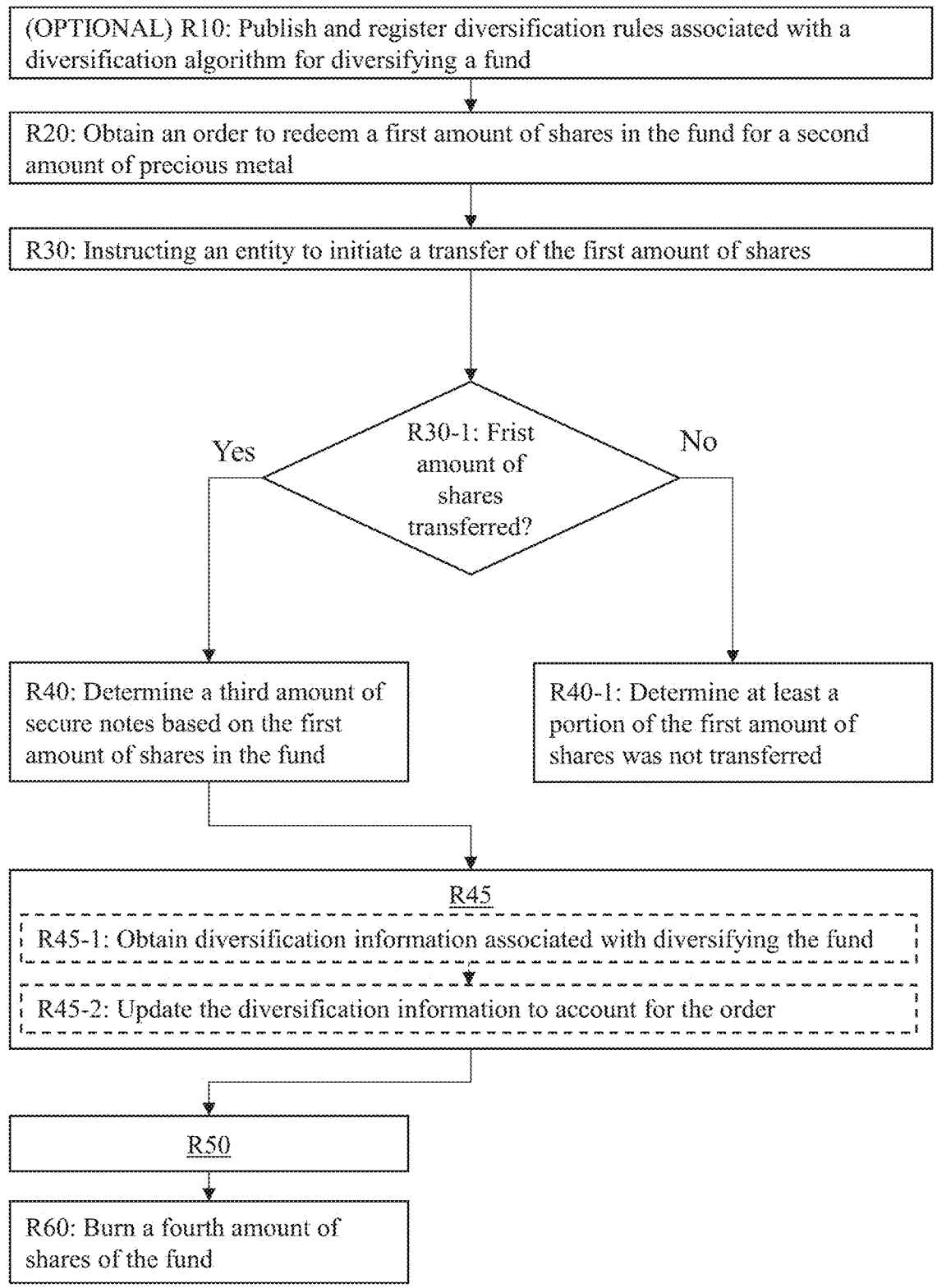
FIG. 5A through FIG. 5E are flow charts of an exemplary process for redeeming shares of a fund in accordance with exemplary embodiments of the present invention.
Figure 5B:
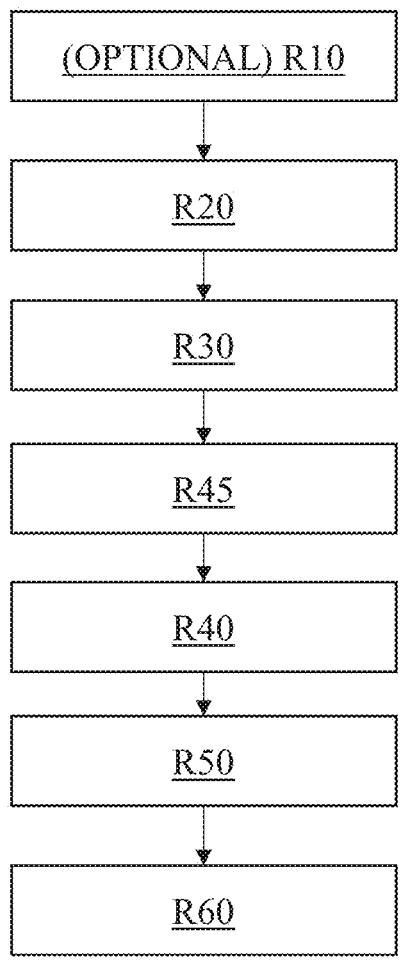
Figure 5C:
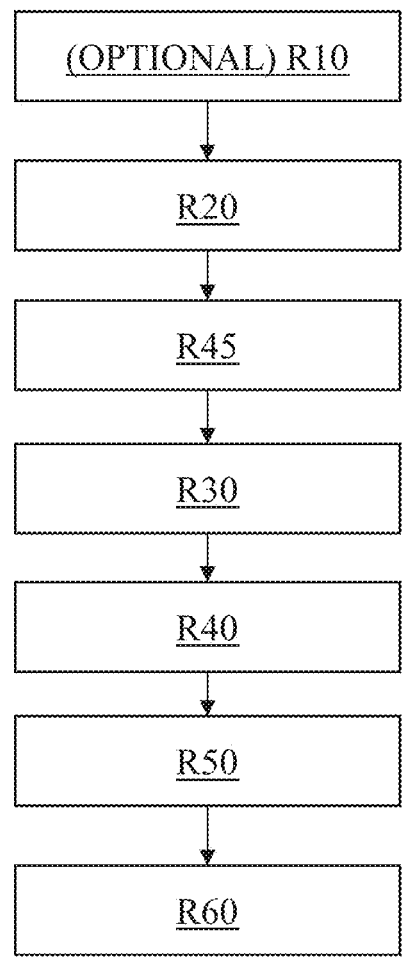

In embodiments referring to FIG. 5A, R45 may continue with R45-2. At R45-2, in embodiments, the Administrator 102/104 may update the diversification information. For example, the first diversification information may be updated by generating second diversification information to account for the order to redeem shares in accordance with the diversification algorithm(s) and diversification rule(s). In embodiments, the Administrator 102/104, may generate second diversification information in accordance with the diversification algorithm, the first diversification information, the diversification rules, the first amount of shares, and the second amount of precious metal. In embodiments, the secured note issuer administrator system 102 may generate second diversification information in accordance with the diversification algorithm(s) and/or the diversification rule(s). Continuing the example, the secured note issuer administrator system 102 may send the second diversification information to the administrator system 104. In embodiments, the Administrator System 104 may receive the second diversification information.

R45, in embodiments, may be similar to the description of C60, described above in connection with FIG. 2A through FIG. 2E, the description of which applying herein.

The process for redeeming shares, in embodiments, may continue with R50. Referring to FIG. 5-50A, in embodiments, R50 may begin with R50-1. At R50-1, in embodiments, the Administrator 102/104 may generate, based at least on the updated diversification information, settlement instructions (e.g., precious metal settlement instructions). In embodiments, the precious metal settlement instructions may not be generated (and/or sent) until the Administrator 102/104 receives confirmation that one or more of the following has occurred: (1) secured notes backed by the third amount of precious metal have been transferred from an account associated with the fund (e.g., the Administrator Account) to a first set of one or more issuers account; (2) the second amount of secured notes have been redeemed for the third amount of precious metal by the one or more issuers; (3) the transfer from the fund account to the issuer accounts has been confirmed by the Administrator 102/104; (4) the redemption of the second amount of secured notes by the one or more issuers; and/or (5) a combination thereof, to name a few. The settlement instructions, in embodiments, may include instructions to transfer precious metal at the vault 112. For example, the settlement instructions may include instructions to transfer an amount of precious metal (e.g., greater than or equal to the second amount of precious metal—for example, to account for fees) from one or more accounts associated with one or more issuers associated with the plurality of issuer device(s) to one or more accounts to which the Administrator 102/104 has access (e.g., the administrator account). As another example, the settlement instructions may include instructions to transfer an amount of precious metal (e.g., less than or equal to the amount to be received from the one or more accounts associated with the one or more issuers—for example, to account for fees) from one or more accounts associated with the Administrator 102/104 (e.g., the same accounts that received the amount from the one or more issuers, different accounts, and/or a combination thereof) to one or more accounts associated with an authorized participant associated with the authorized participant device 106. As another example, the settlement instructions may include instructions to transfer an amount of precious metal to one or more accounts associated with one or more Brokers and/or an amount of precious metal from one or more broker accounts to one or more accounts associated with the authorized participant associated with the authorized participant device 106. In embodiments, the settlement instructions may include issuer settlement instructions, administrator settlement instructions, and/or broker settlement instructions, to name a few.

In embodiments, the secured note issuer administrator system 102, may generate the administrator settlement instructions (e.g. using machine-readable transfer instructions 132). The administrator settlement instructions, in embodiments, may include instructions to transfer the amount of precious metal corresponding to the third amount of secured notes from the respective vault issuer accounts to a vault authorized participant account associated with the authorized participant associated with the authorized participant device 106. In embodiments, the secured note administrator system 102 may send the administrator settlement instructions to the administrator system 104. In embodiments, the administrator system 104 may receive the administrator settlement instructions from the secured note issuer administrator system 102.

In embodiments, R50-1 may include and/or be substituted in whole or in part, R50-1A. Referring to FIG. 5-50B, R50-1A, in embodiments, may being with R50-1A-1. At R50-1A-1, in embodiments, the Administrator 102/104 may generate a first message including first instructions for the entity 1000 (and/or a Broker associated with the entity 1000) to generate and send first share settlement instructions to a custodian (e.g., custodian system 114) associated with the Administrator 102/104.

In embodiments, R50-1A may continue with R50-1A-2 where the Administrator 102/104 generates first settlement instructions including instructions for one or more of the following: (1) a first set of deposits including one or more transfer instructions to transfer precious metal from the administrator account to a first entity account associated with the entity 1000 (and/or a first broker account associated with a first Broker); (2) a second set of deposits including one or more transfer instructions to transfer fiat from the administrator account to a second entity account (and/or a second broker account); and/or (3) a third set of deposits including one or more transfer instructions to transfer precious metal from the administrator account to a third entity account (and/or a third broker account), to name a few. At R50-1A-3, in embodiments, the first settlement instructions may be sent by the Administrator 102/104 to one or more of the following, depending in part on the generated first settlement instructions: (1) one or more vaults 112 via the vault administrator system(s) 110; (2) one or more financial institutions; and/or (3) one or more custodial systems 114, to name a few.

In embodiments, the first, second, and third entity accounts (and/or the first, second, and third broker accounts) may be the same account, different accounts, and/or a combination thereof, to name a few. In embodiments, each of the first, second, and third entity accounts (and/or each of the first, second, or third broker accounts) may include one or more accounts associated with the entity 1000 (and/or Broker).

Referring back to FIG. 5-50A, in embodiments, R50 may continue with R50-2. At R50-2, in embodiments, the Administrator 102/104 may generate, based at least on the updated diversification information, redemption instructions to redeem a set of secured notes for precious metal. The redemption instructions, in embodiments, may include instructions to redeem one or more secured notes via the custodial system 114 for an amount of precious metal at the one or more vaults 112. For example, the redemption instructions may include instructions to redeem an amount of secured notes backed by precious metal (e.g., greater than or equal to the value of the second amount of precious metal—for example, to account for fees). As another example, the redemption instructions may include instructions to transfer an amount of secured notes (e.g., greater than or equal to the value of the second amount of precious metal—for example, to account for fees) from one or more accounts associated with one or more issuers of the secured notes to one or more accounts associated with the Administrator 102/104. As another example, the redemption instructions may include instructions to transfer an amount of secured notes (e.g., less than or equal to the amount to be received from the one or more accounts associated with the one or more issuers—for example, to account for fees) from the one or more accounts associated with the Administrator 102/104 to one or more accounts associated with an authorized participant associated with the authorized participant device. As another example, the redemption instructions may include instructions to transfer an amount of secured notes from one or more accounts associated with the Administrator 102/104 to one or more accounts associated with the one or more issuer accounts associated with the one or more issuers. As another example, the redemption instructions may include instructions to transfer an amount of secured notes from one or more accounts associated with the Administrator 102/104 to one or more accounts associated with one or more Brokers. As another example, the redemption instructions may include instructions to transfer an amount of secured notes from one or more accounts associated with the one or more issuers to one or more accounts associated with one or more Brokers. As another example, the redemption instructions may include instructions to transfer an amount of secured notes from one or more accounts associated with the Broker to one or more accounts associated with the authorized participant. In embodiments, the redemption instructions may include issuer redemption instructions, administrator redemption instructions, and/or broker redemption instructions, to name a few.

In embodiments, R50 may continue with R50-3. In embodiments, at R50-3, the Administrator 102/104 may send, to one or more issuer devices (e.g., of the plurality of issuer devices 108) the issuer settlement instructions and the issuer redemption instructions. In embodiments, the Administrator 102/104 may send the broker settlement instructions and the broker redemption instructions to one or more broker device(s) 105 associated with one or more Brokers.

In embodiments, R50 may continue with R50-4. In embodiments, at R50-4, the Administrator 102/104 may transfer a third set of notes from the administrator account to one or more accounts associated with the issuers associated with the one or more issuer devices. In embodiments, R50-4 include the Administrator 102/104 executing the previously generated administrator redemption instructions (generated based at least on the updated diversification information).

In embodiments, R50 may continue with R50-5. In embodiments, at R50-5, the Administrator 102/104 may not confirm the execution of the issuer settlement instructions (which may be similar to the description of R30-1, described in connection with FIG. 5A, the description of which applying herein).

In embodiments, at R50-5, the Administrator 102/104 may confirm the execution of the issuer settlement instructions. In embodiments, referring to FIG. 5-50C, R50-5 may begin with step S214R. In embodiments, at step S214R, the one or more issuer device(s) of the plurality of issuer devices 108 (and/or one or more broker device(s) associated with one or more Brokers) may generate and send first settlement instructions to the vault administrator system 110. The settlement instructions, in embodiments, may instruct the vault administrator system 110 to transfer the second amount of precious metal from one or more issuer accounts associated with the vault 112 to an account associated with the vault 112 of which the Administrator 102/104 has access ("Administrator Account") (and/or to an account associated with the vault 112 of which the Broker has access).

In embodiments, referring to FIG. 5-50B, step S214R may be substituted and/or include one or more issuer devices(s) 108 generating and sending one or more messages to one or more authorized applicants associated with one more authorized applicant device(s) 107. The one or more authorized applicant device(s) 107 may receive the message(s) and generate the first settlement instructions.

The first settlement instructions, in embodiments, at step S215R, may be received and executed by the vault administrator system 110. The execution of the first settlement instructions, in embodiments, may result in the transfer of the second amount of precious metal into an account associated with the Administrator 102/104 (and/or one or more accounts associated with a Broker). The transfer of the second amount of precious metal may be instantaneous (e.g., if the second amount of precious metal is already located at vault 112) and/or may take one or more days to execute (e.g., if the second amount of precious metal needs to be moved to the vault 112).

In embodiments, the second amount of precious metal is not completely transferred into the administrator account at vault 112. Such embodiments may be similar to the description of C80-1 described above in connection with FIG. 2A, the description of which applying herein.

In the event that the second amount of precious metal is transferred into the administrator account at vault 112, the vault administrator system 110, in embodiments, may generate and send a third message confirmation the transfer of the second amount of precious metal (S216R). For example, once the second amount of precious metal is deposited into the administrator account, the vault administrator system 110 may generate a first confirmation message indicating that the second amount of precious metal was deposited into the administrator account by the one or more issuers and/or a third party (e.g., custodial system 114) acting on behalf of one or more issuers. In embodiments, the administrator account may be an account owned by the authorized participant over which the Administrator 102/104 has authority. The generated first confirmation message, in embodiments, may be sent to one or more of the following: Administrator 102/104, AP device(s) 106, MM device(s) 107, broker device(s) 105, one or more issuer systems of the plurality of issuer systems 108, and/or the custodial system 114, to name a few.

In embodiments, R50-5 may continue with step S217R. At step S217R, in embodiments, the Administrator 102/104, receives the confirmation message. In embodiments, the Administrator 102/104 may receive the first confirmation message from the vault administrator system 110 via network 100.

R50-5 may continue with step S218R. At step S218R, in embodiments, the Administrator 102/104 may register the second amount of precious metal with the fund account (e.g., the administrator account at the fund) associated with the fund and/or the entity account associated with the entity 1000. In embodiments the one or more issuer device(s) may have instructed the vault administrator system 110 to transfer the precious metal to an account associated with the entity 1000. In embodiments, the one or more issuer devices may have instructed the vault administrator system to transfer the precious metal to an account associated with the Administrator 102/104. In embodiments, the deposit of the second amount of precious metal may be registered in an electronic ledger. In embodiments, the secured note issuer administrator system 102 may register the second amount of precious metal.

In embodiments, the Administrator 102/104 may de-register (e.g., register as "non-pledged") the precious metal from the account associated with the one or more issuers. For example, Administrator 102/104 may de-register the second amount of precious metal with from one or more accounts associated with the issuers who executed the issuer settlement instructions.

Referring back to FIG. 5-50A, R50 may continue with R50-6. In embodiments, at R50-6, the Administrator 102/104 may send, to the vault administrator system 110, the generated administrator settlement instructions to transfer the second amount of precious metal (and/or less—for example—to account for a reserve amount and/or to account for fees) from the administrator account at vault 112 to the entity account at vault 112. Referring to FIG. 5-50D, in embodiments, R50-6 may begin with step S210-1R. At step S210-1R, in embodiments, the Administrator 102/104 sends the generated administrator settlement instructions to the vault administrator system 110.

The administrator settlement instructions, in embodiments, at step S212-1R, may be received and executed by the vault administrator system 110. The execution of the administrator settlement instructions, in embodiments, may result in the transfer of the second amount of precious metal (and/or an amount less than the amount transferred from the one or more issuer accounts to the administrator account—for example—to account for fees) into an account associated with the entity 1000 (and/or one or more accounts associated with a Broker). The transfer of the second amount of precious metal may be instantaneous (e.g., if the second amount of precious metal is already located at vault 112) and/or may take one or more days to execute (e.g., if the second amount of precious metal needs to be moved to the vault 112).

In embodiments, the second amount of precious metal is not completely transferred into the entity account (and/or broker account) at vault 112. Such embodiments may be similar to the description of C80-1 described above in connection with FIG. 2A, the description of which applying herein.

In the event that the second amount of precious metal is transferred into the entity account at vault 112, the vault administrator system 110, in embodiments, may generate and send a message confirming the transfer of the second amount of precious metal (S216-1R). For example, once the second amount of precious metal is deposited into the entity account, the vault administrator system 110 may generate a confirmation message indicating that the second amount of precious metal was deposited into the entity account by Administrator 102/104 and/or a third party (e.g., custodial system 114) acting on behalf of the Administrator 102/104. The generated confirmation message, in embodiments, may be sent to one or more of the following: Administrator 102/104, AP device(s) 106, MM device(s) 107, broker device(s) 105, one or more issuer systems of the plurality of issuer systems 108, and/or the custodial system 114, to name a few.

In embodiments, R50-6 may continue with step S218-1R. At step S218-1R, in embodiments, the Administrator 102/104, may register the second amount of precious metal with the entity account associated with the entity 1000 and/or a broker account associated with a Broker In embodiments, the deposit of the second amount of precious metal may be registered in an electronic ledger. In embodiments, the secured note issuer administrator system 102 may register the second amount of precious metal. In embodiments, the Administrator 102/104 may de-register the precious metal from the account associated with the Fund. For example, Administrator 102/104 may de-register the second amount of precious metal with from one or more accounts associated with the Administrator 102/104. In embodiments, once the transfer has been executed, the secured note issuer administrator system 102 and/or administrator system 104 may de-register the fourth amount of secured notes. The third amount of secured notes, in embodiments, may be unregistered in an electronic ledger operatively connected to the Administrator 102/104.

Referring back to FIG. 5-50A, in embodiments, R50 may continue with R50-7. In embodiments, at R50-7, the Administrator 102/104 may confirm the execution of the administrator settlement instructions (e.g., by verifying the confirmation message).

In embodiments, one or more Brokers, as described throughout, may act as an intermediary. For example, the one or more Brokers may be associated with one or more of the following: Administrator 102/104, one or more issuers associated with the Fund, one or more market makers, one or more authorized applications, one or more authorized participants, one or more entities, and/or a combination thereof, to name a few. For example, referring to FIG. 5-50F, the Administrator 102/104 (at step S242-2R) may transfer each note of a fourth amount of notes from an administrator account to one or more broker accounts associated with the one or more Brokers associated with the fund. At step S244-2R, in embodiments, the fourth amount of notes may be transferred from one or more broker accounts to one or more issuer accounts associated with one or more issuers of secured notes backing the Fund.

Referring back to FIG. 5A, in embodiments, the process for redeeming shares in accordance with one or more embodiments may continue with R60. At R60, in embodiments, the Administrator 102/104 may burn a fourth amount of shares of the fund (e.g., to account of the redemption of shares). For example, the Administrator 102/104 (and/or custodial system 114) may generate share eliminating instructions (e.g., burn instructions) to eliminate the first amount of shares corresponding to the second amount of secured notes and the corresponding third amount of precious metal. The share eliminating instructions, continuing the example, may be sent to the custodial system 114 via network 114. In embodiments, the custodial system 114 may receive the share eliminating instructions. Once received, in embodiments, the custodial system 114 may execute the share eliminating instructions. In embodiments, the share eliminating instructions may be completely, partially, and/or not executed by the custodial system 114. In embodiments, the custodial system 114 may generate and/or send a message to the Administrator 102/104 indicating the success and/or failure of the execution of the share eliminating instructions. The Administrator 102/104, in embodiments, may receive the message from the custodial system 114 via network 100.

In embodiments, referring to FIG. 5-60A, R60 may begin with step S528. In embodiments, at step S528, the Administrator 102/104 may generate and send, to the plurality of issuer systems 108, a second message indicating that a fourth amount of secured notes will be redeemed (e.g., the third amount less fees, for example). For example, the administrator system 104 may generate the second message, and, in embodiments, send the second message to the plurality of issuer systems 108 via network 100. In embodiments, the administrator system 104 may generate and send a request to redeem the fourth amount of secured notes. The request may include instructions to transfer the secured notes from the fund authorized participant account to the fund administrator account. In embodiments, the secured note issuer administrator system 102 may receive the request from the administrator system 104. The secured note issuer administrator system 102 may execute the request, transferring the fourth amount of secured notes from the fund authorized participant account to the fund administrator account. In embodiments, the request may be executed by custodial system 114.

In embodiments, the plurality of issuer systems 108 may receive the message from the Administrator 102/104 indicating that the fourth amount of secured notes will be redeemed. In embodiments, the Administrator 102/104 may also send the confirmation message to the plurality of issuer systems 108, confirming the transfer of the amount of precious metal.

R45, in embodiments, may continue with step S530. At step S530, in embodiments, the Administrator 102/104 may generate instructions to burn an amount of shares of the fund (e.g., the first amount). The instructions to burn, in embodiments, may be generated to account for one or more redemption orders (e.g. the order obtained by the Administrator 102/104). In embodiments, the Administrator 102/104 may generate instructions to burn shares each time an order to redeem shares is processed. The Administrator 102/104, in embodiments, may generate instructions to burn shares at predetermined times, when a gross predetermined amount of shares have been redeemed, when a net predetermined amount of shares have been redeemed, when a predetermined amount of redemption orders have been obtained, and/or a combination thereof, to name a few. For example, the Administrator 102/104 may burn an amount of shares each time the Fund has netted (e.g., created shares minus redeemed shares) 100 shares redeemed. As another example, the Administrator 102/104 may burn an amount of shares each time the Fund has netted (e.g., created shares minus redeemed shares) 100 shares redeemed, unless 100 redemption orders are received within a 24 hour period.

In embodiments, step S530 may further include calculating, by the Administrator 102/104, the amount of shares to burn. The calculation, in embodiments, may require the Administrator 102/104 to update the diversification information (e.g., similar to the description of C60, the description of which applying herein). In embodiments, the amount of shares to be burned may be based on one or more of the following: updated diversification information, one or more orders to redeem shares, one or more orders to create shares, issuer on-boarding, issuer off-boarding, the gross predetermined amount of shares which have been redeemed, the net predetermined amount of shares which have been redeemed, the predetermined amount of redemption orders which have been obtained, settlement instructions not being executed properly, insufficient balance(s), and/or a combination thereof, to name a few. The instructions to burn the amount of shares may be sent, in embodiments at step S532, by the Administrator 102/104 to the custodial system 114. For example, the administrator system 104 may generate the instructions to burn the first amount of shares. The administrator system 104, continuing the example, may send the request to the custodial system 114 via network 100.

The custodial system 114, upon receipt of the instructions, in embodiments, may execute the instructions. In embodiments, the instructions to burn the amount of shares may be successfully executed by the custodial system 114. Once the instructions are successfully executed, the custodial system may, in embodiments, generate and send a confirmation message to the Administrator 102/104. At step S534, in embodiments, the Administrator 102/104 may receive confirmation that the instructions to burn the first amount of shares were executed.

In embodiments, the custodial system 114 may not execute all or a portion of the received burn instructions. For example, the custodial system 114 may fail to burn the first amount of shares. Continuing the example, the custodial system 114 may generate and send a message, to the Administrator 102/104, indicating the failure to burn and/or the amount of shares failed to burn. The Administrator 102/104, in embodiments, may receive the message. In embodiments, continuing the example, the Administrator 102/104 may notify the affected parties (e.g., issuers, entity, broker, to name a few) and, in embodiments, update an electronic ledger to account for the failed burn of the first amount of shares.

In embodiments, referring to 5-60B, an exemplary alternative to R60 may be R60-1. For example, R60-1 may begin with step S536. At step S536, in embodiments, the Administrator 120/104 may generate a message including a request to destroy the fourth amount of shares (e.g., to account for the redemption order). The message, in embodiments, may be addressed to custodial system 114, which may be associated with one or more custodians associated with the Fund. In embodiments the secured note administrator system 102 may generate the instructions to delete the first amount of shares. The secured note administrator system 102 may send the instructions to the administrator system 104. The administrator system, in embodiments, may send the instructions to the custodial system 114 via network 100.

The message, in embodiments, may be sent to custodial system 114 by the Administrator 102/104 via network 100 (step S538). At step S540, in embodiments, the custodial system 114 may receive and execute the request. In embodiments, upon receipt, the fourth request may be executed by the custodial system 114. After burning the first amount of shares, the custodial system 114 may generate and send a confirmation message to the Administrator 102/104. The confirmation message, in embodiments, may confirm the burning of the first amount of shares.

In embodiments, the Administrator 102/104 may receive confirmation from the custodial system 114 that the first amount of shares were burned. For example, the administrator system 104 may receive the confirmation message from the custodial system 114. In embodiments, the first amount of shares may be deleted by updating an electronic ledger operatively connected to one or more of the following: Administrator 102/104, custodial system 114, and/or the plurality of issuer systems 108, to name a few.

In embodiments, the Administrator 102/104 may forward (and/or generate and send) the confirmation message to one or more of the following: the entity 1000, one or more Brokers, one or more issuers, and/or a combination thereof, to name a few.

Referring back to step R30-1 of FIG. 5A, in embodiments, the first amount of shares may not be transferred. In embodiments where the transfer instructions have not been executed, in whole or in part, the custodial system 114 may notify the Administrator 102/104 (e.g., which may be similar to the vault administrator system 110 notifying the Administrator 102/104, described in connection with FIG. 2-80B, the description of which applying herein). Continuing the process, in embodiments, at step R40-1, the Administrator 102/104 may determine at least a portion of the first amount of shares was not transferred (e.g., by receiving one or more notifications of the failure to transfer). For example, in embodiments, the generated instructions to transfer the first amount of shares to an administrator account may not have been properly executed by the entity 1000 and/or the custodial system 114. In embodiments, the custodial system 114 (and/or the entity 1000) may determine at least a portion of the amount of shares was not transferred into the administrator account. In the event at least a portion of the amount of shares was not transferred into the administrator account, in embodiments, the custodial system 114 (and/or the entity 1000) may generate and send a message identifying the transfer(s) that was not executed. The message, in embodiments may be sent to the entity 1000 which may notify the Administrator 102/104. In embodiments, the message may be sent to the Administrator 102/104. In embodiments, the message may be sent to and/or received by one or more of the following: the entity 1000 (e.g., AP device(s) 106, AA Devices 107, MM Devices 116), one or more Brokers (e.g., via broker device(s) 105)), the Administrator 102/104, and/or one or more of the plurality of issuer devices 108. The process, in embodiments where all or a portion of the transfer was not executed properly, may end (as shown in connection with FIG. 5A).

In embodiments, the steps of the processes described in connection with FIG. 5A may be rearranged or omitted. For example, referring to FIG. 5B, updating the diversification information (R45) may occur prior to the determination of the third amount of secured notes in R40 (i.e. the steps of the process illustrated in FIG. 5A may be rearranged from R10, R20, R30, R40, R45, R50, R60 to –R10, R20, R30, R45, R40, R50, R60). As another example, referring to FIG. 5C, updating the diversification information (R45) may occur prior to instructing the entity 1000 to initiate the transfer of the first amount of shares in R30 (i.e. the steps of the process illustrated in FIG. 5A may be rearranged from R10, R20, R30, R40, R45, R50, R60 to –R10, R20, R45, R30, R40, R50, R60). In embodiments, as illustrated in FIG. 5A through FIG. 5E, R10 may be optional.

Figure 5D:
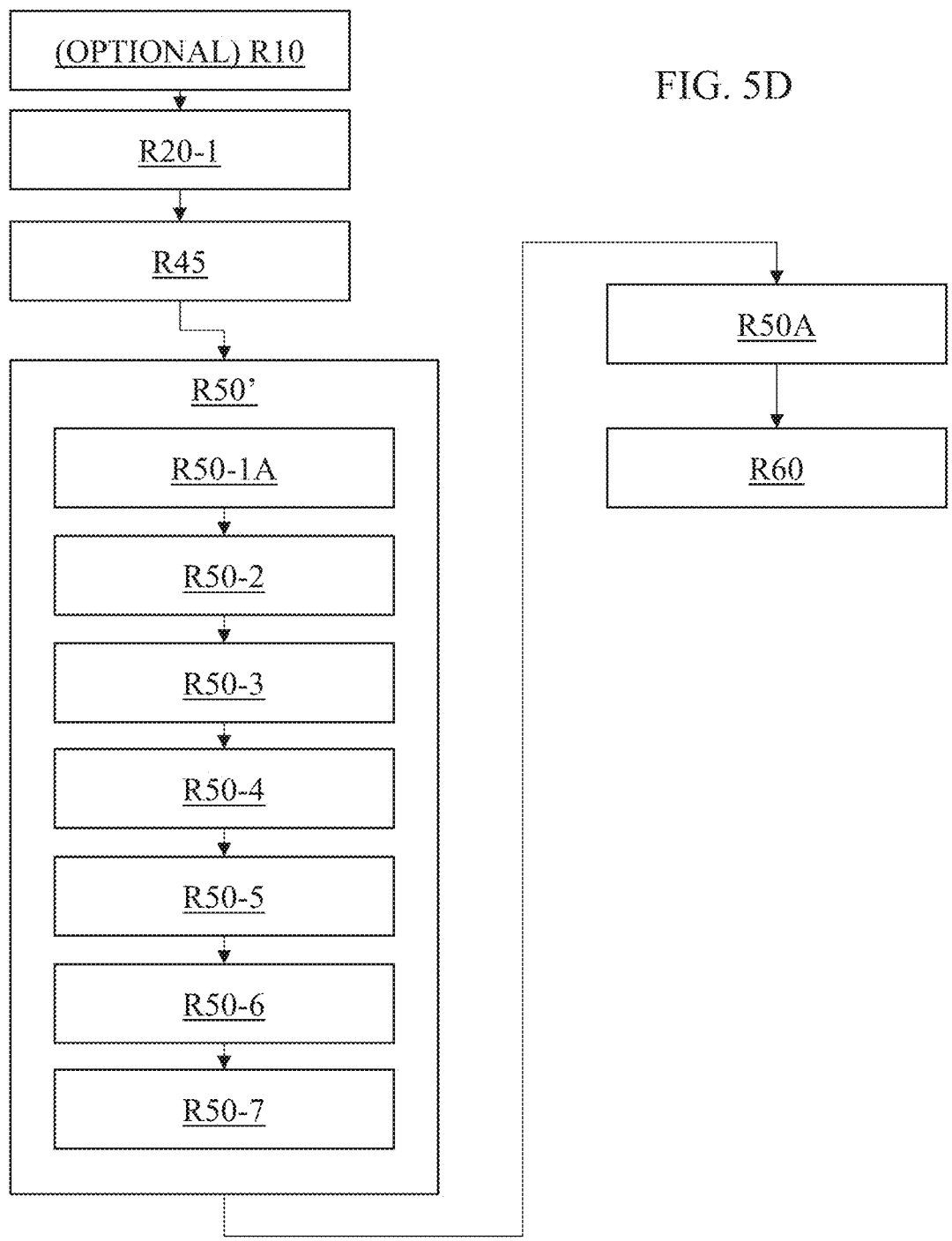

As another example, referring to FIG. 5D, the process for redeeming shares may include receiving and/or providing one or more in exchange for shares of the fund: fiat, secured notes, shares from the secondary market, and/or precious metal, to name a few. Continuing the example, an exemplary process may be as follows: R10, R20-2, R45, R50', R50A, R60. As shown in FIG. 5D, in embodiments, R30 may be omitted. R20, in embodiments and as illustrated in FIG. 5D, may be substituted with R20-1. R50, in embodiments may be substituted with R50' (e.g., substituting R50-1A for R50-1). Processing orders for redemption which include fiat, secured notes, shares from the secondary market, and/or precious metal, may include R50A. Referring to FIG. 5-50E, in embodiments, R50A may begin with step S242-1R.

In embodiments, at step S242-1R, the Administrator 102/104 may transfer one or more of the following: the fourth amount of notes from the entity 1000 (and/or broker) account to each respective issuer account; fiat associated with the order from an entity account to an account associated with at least one market maker; secured notes from a secondary market, from the entity account to an account associated with at least one market maker; and/or a combination thereof, to name a few. For example, the administrator system 104, in embodiments, may generate a request to make one or more of the transfers. In embodiments, the administrator system 104 may send the request to the secured note issuer administrator system 102 via network 100. The secured note issuer administrator system 102 may receive the request. In embodiments, the secured note issuer administrator system 102 may execute the transfers (and/or custodial system 114 may execute the transfers). In embodiments, the transfers (one or more) may be made by custodial system 114. In embodiments, the secured note issuer administrator system 102 may generate an additional confirmation message confirming the transfers. The secured note issuer administrator system 102, in embodiments, may send the additional confirmation message to the administrator system 104. The administrator system 104 may receive the additional confirmation message from the secured note issuer administrator system 102.

In embodiments, R50A may continue with step S244-1R. At step S244-1R, in embodiments, the Administrator 102/104 may transfer one or more of the following: (1) the fourth amount of notes from fourth administrator account to the entity account; (2) fiat associated with the order from a fifth administrator account to the entity account; (3) secured notes from a secondary market, from a sixth administrator account to the entity account; (4) pre-existing secured notes from a secondary market from a seventh administrator account to the entity account; and/or (5) a combination thereof, to name a few. In embodiments, first, second, third, fourth, fifth, sixth, and/or seventh administrator accounts may be the same account or different accounts.

Figure 5E:
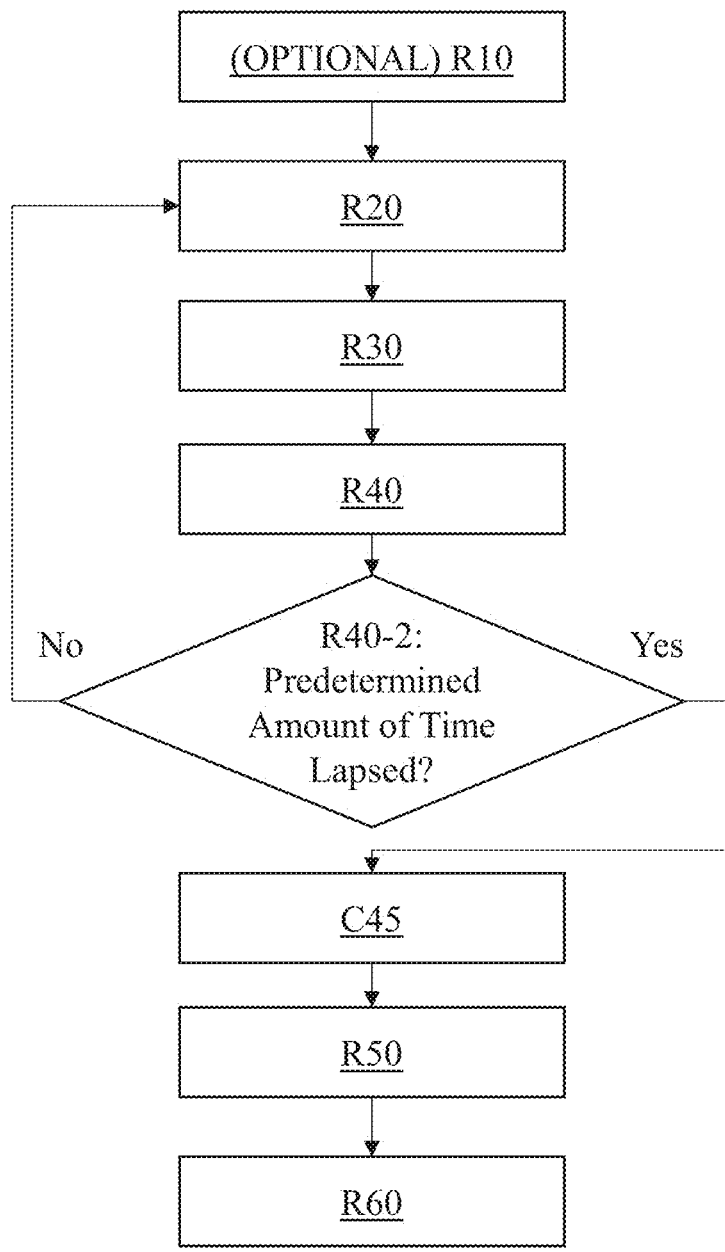
Figures 5, 6, 7, 8, 9, 10, 11, 12, 13, 14, 15, 16, 17, 18, 19, 20, 20A:
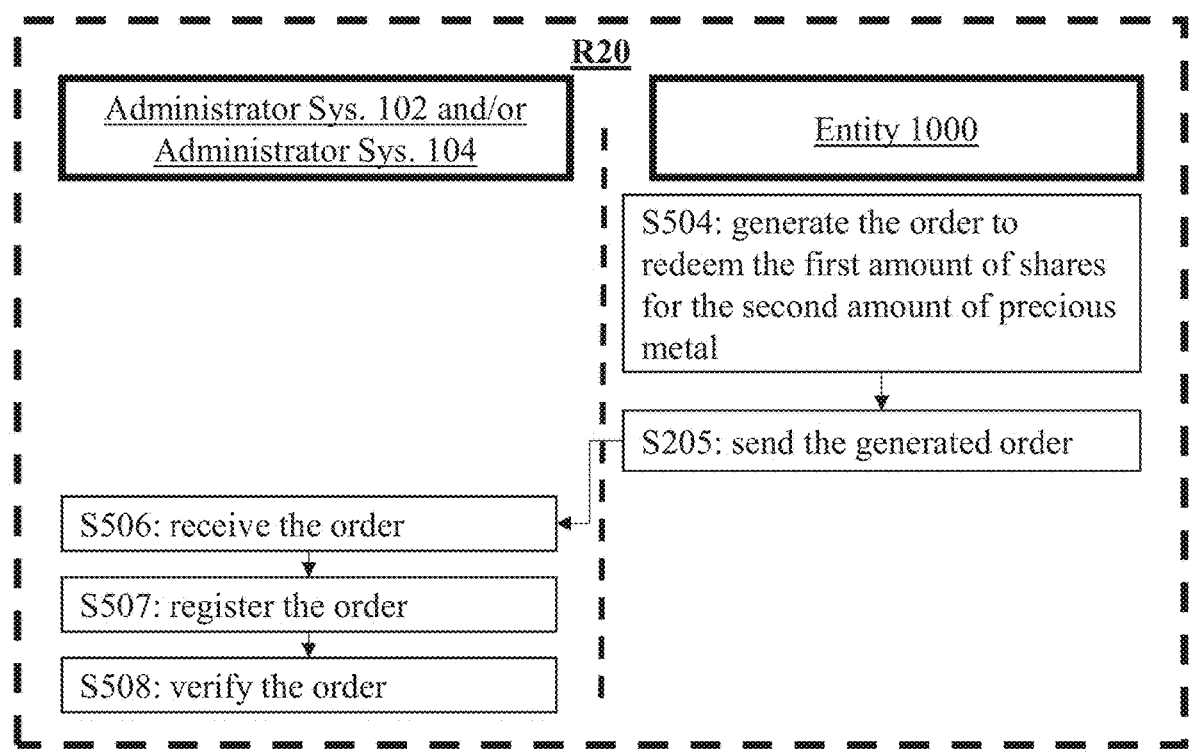
Figures 5, 6, 7, 8, 9, 10, 11, 12, 13, 14, 15, 16, 17, 18, 19, 20, 20B:
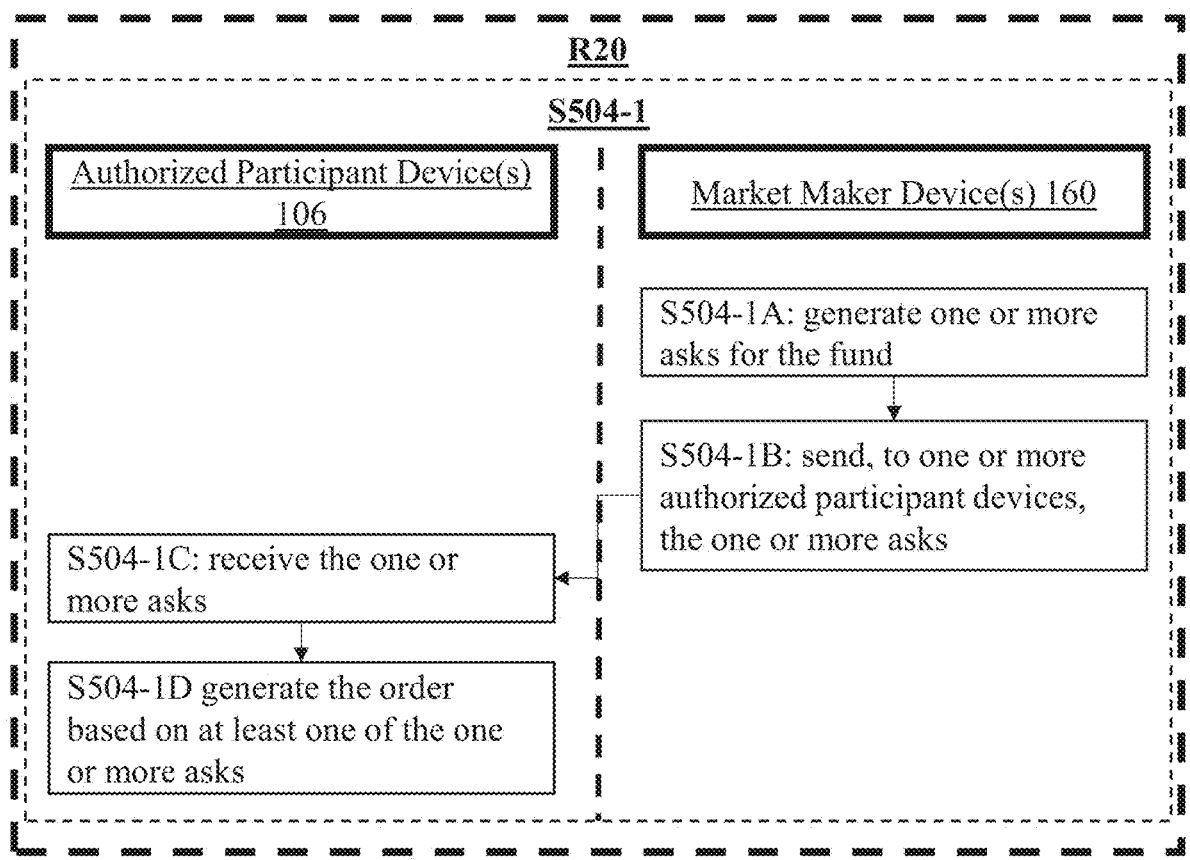
Figures 5, 6, 7, 8, 9, 10, 11, 12, 13, 14, 15, 16, 17, 18, 19, 20, 21, 22, 23, 24, 25, 26, 27, 28, 29, 30:
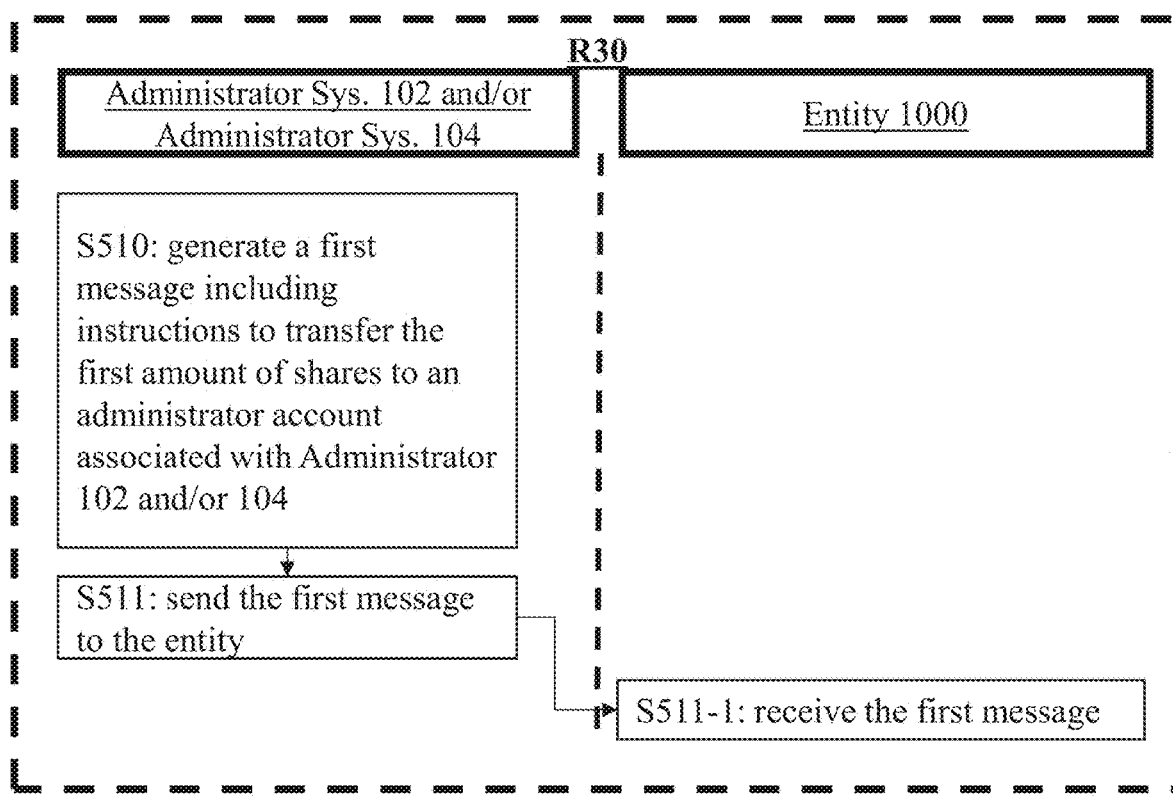
Figures 1, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 40A:
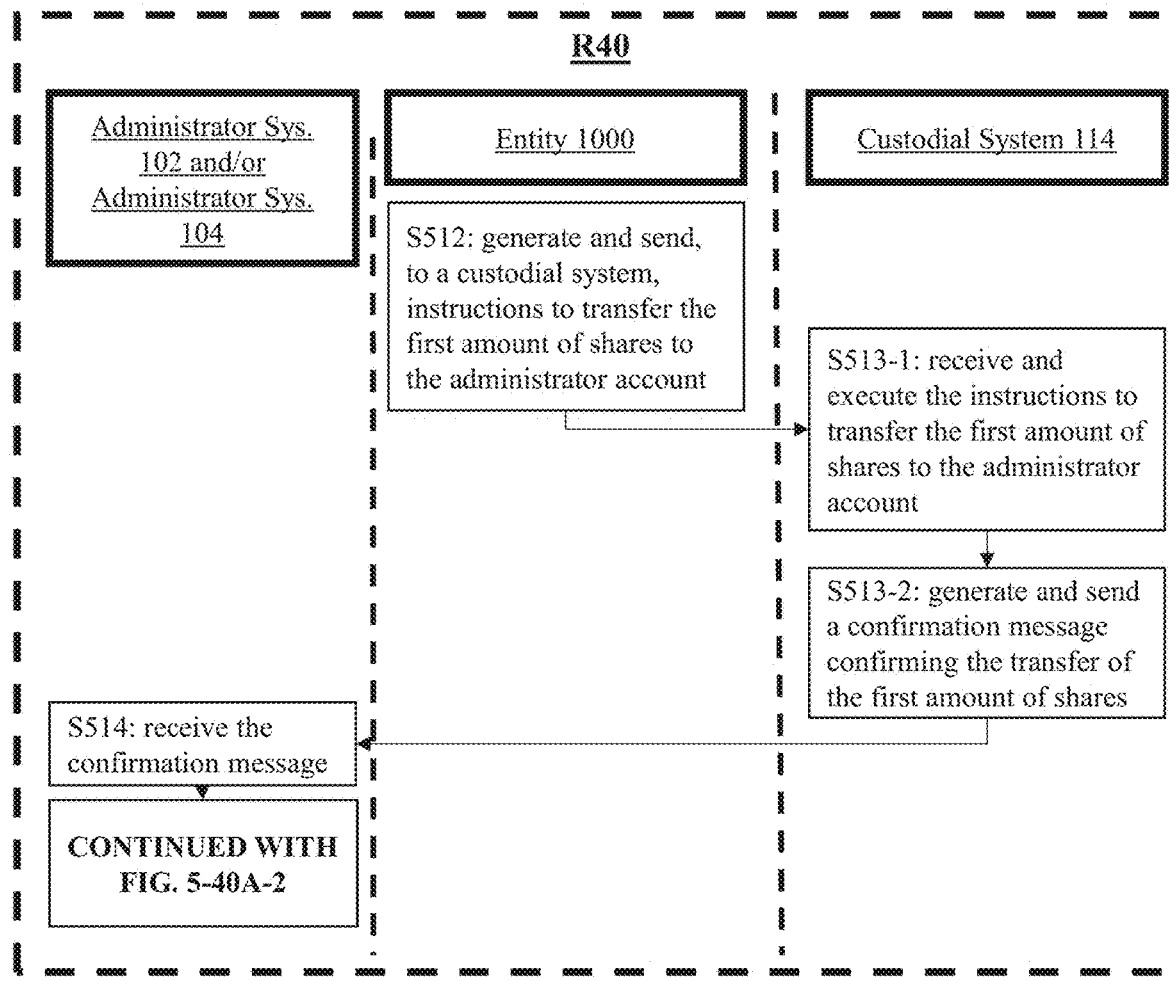
Figures 2, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 40A:
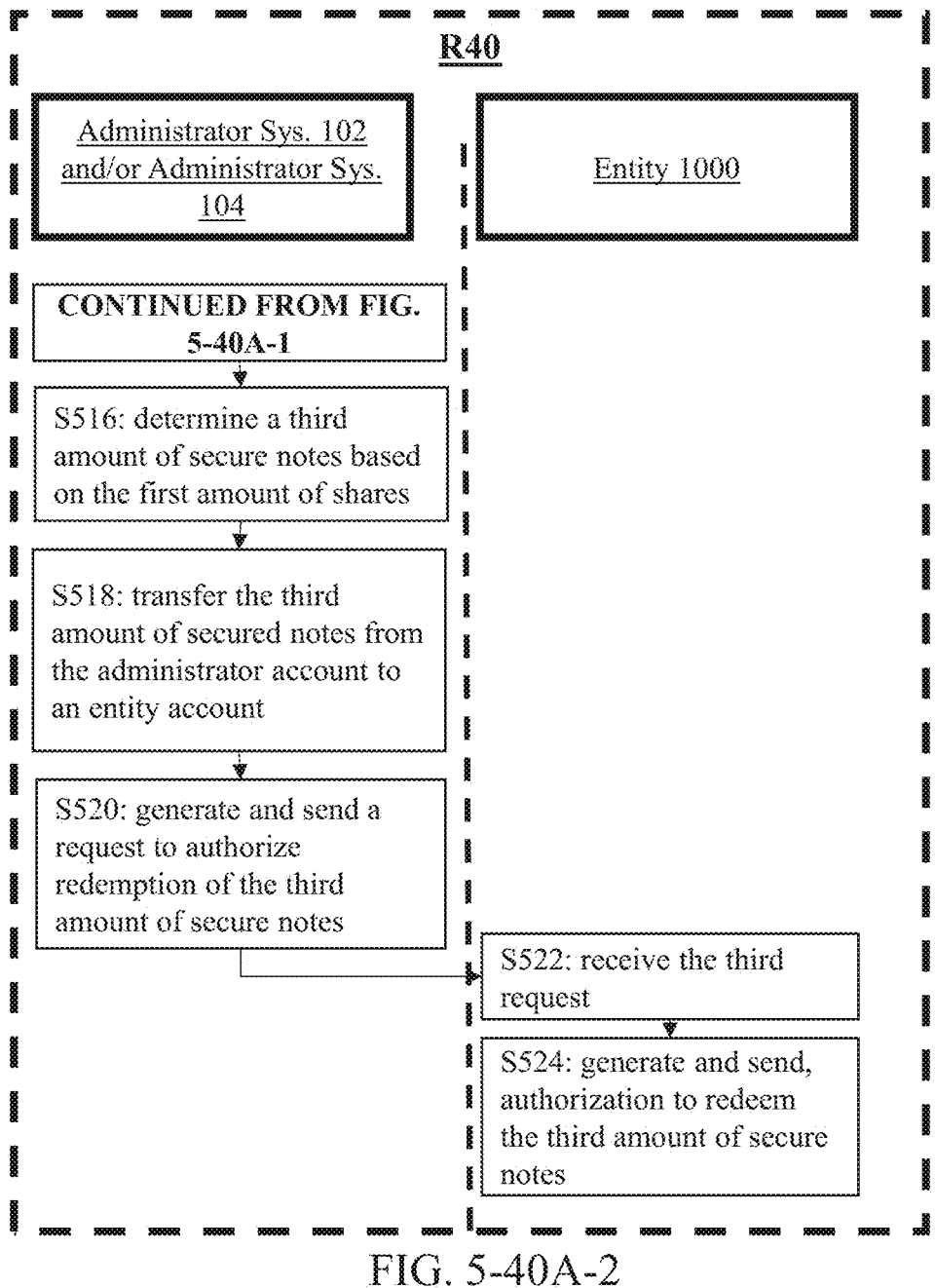
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50A:
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50B:
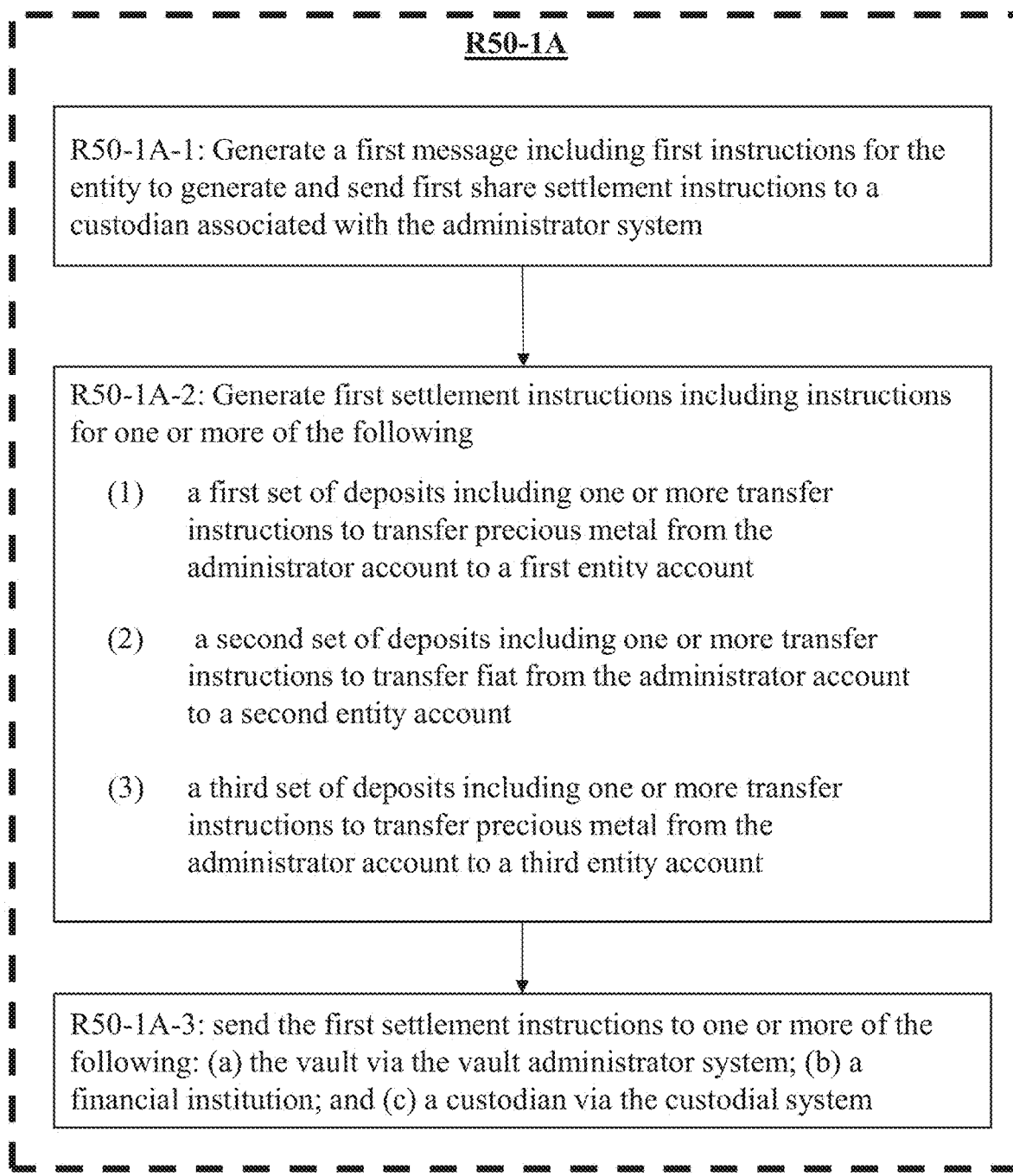
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50C:
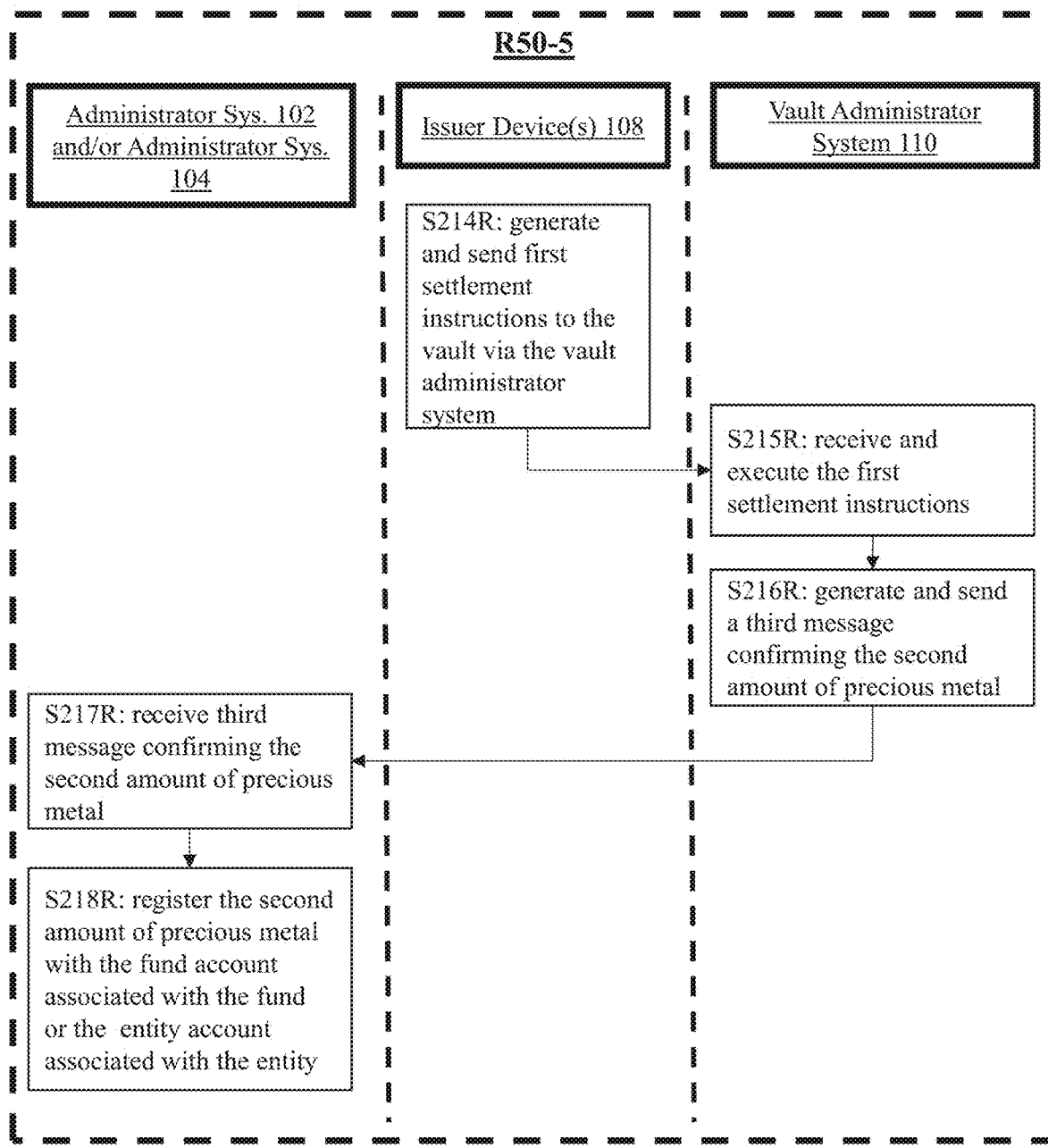
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50D:
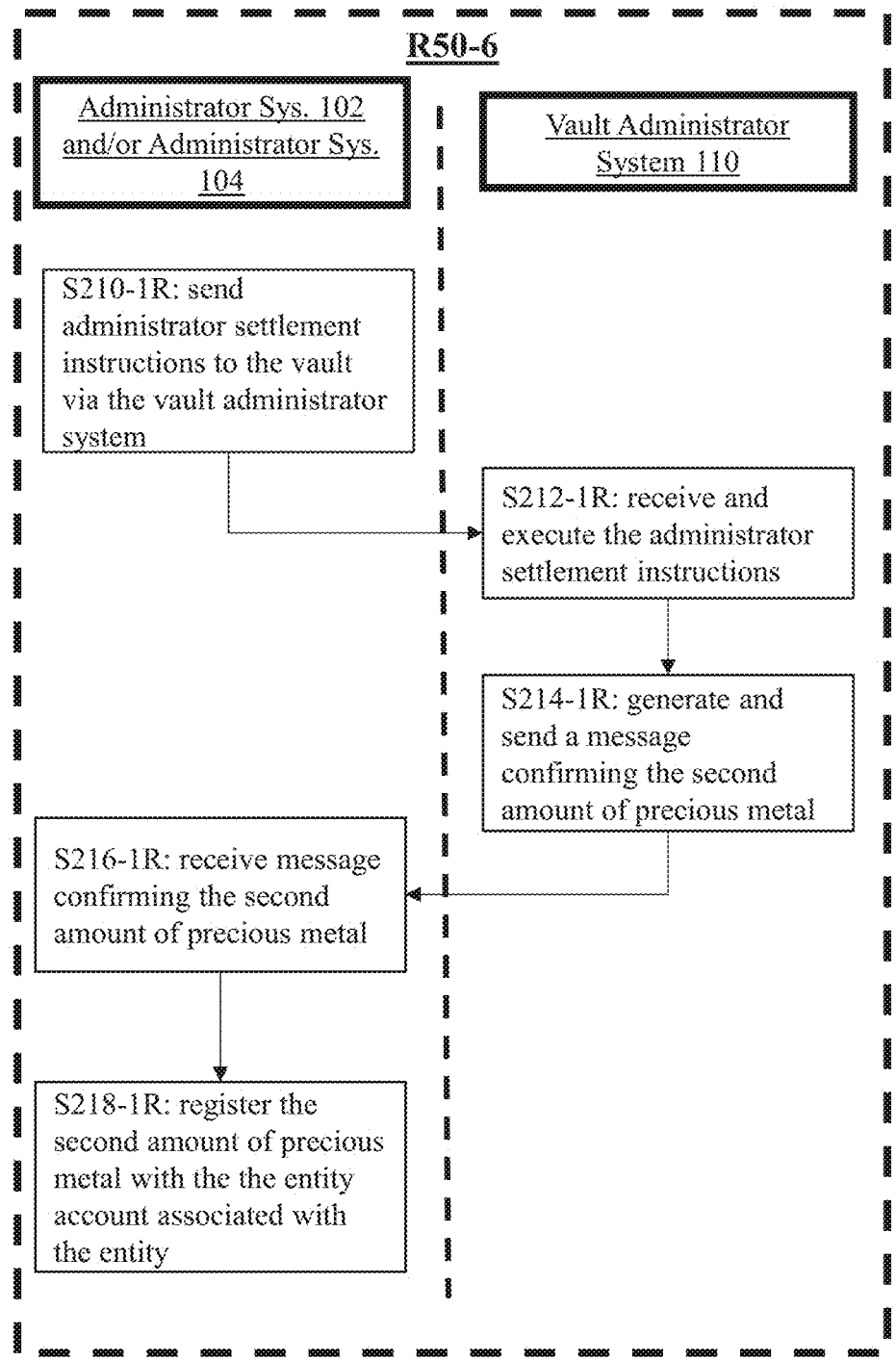
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50F:
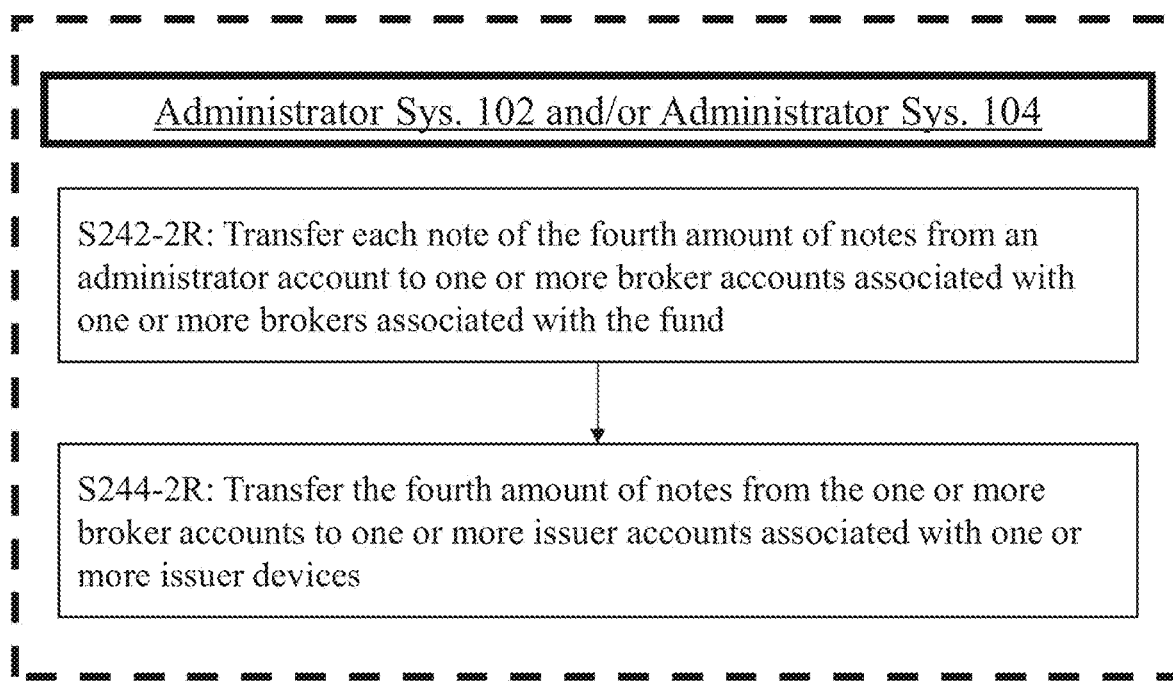
Figures 5, 60A:
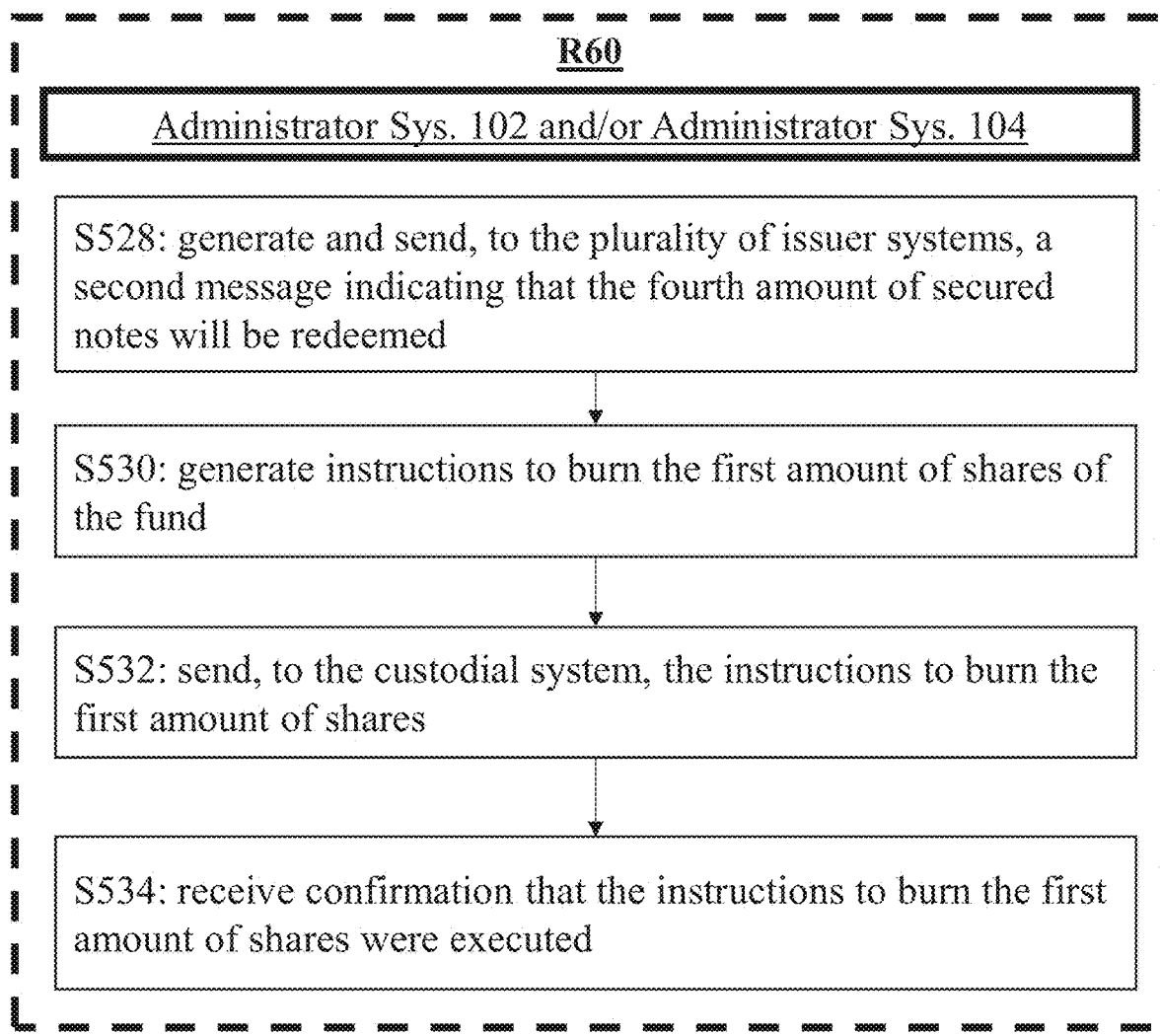
Figures 5, 60B:
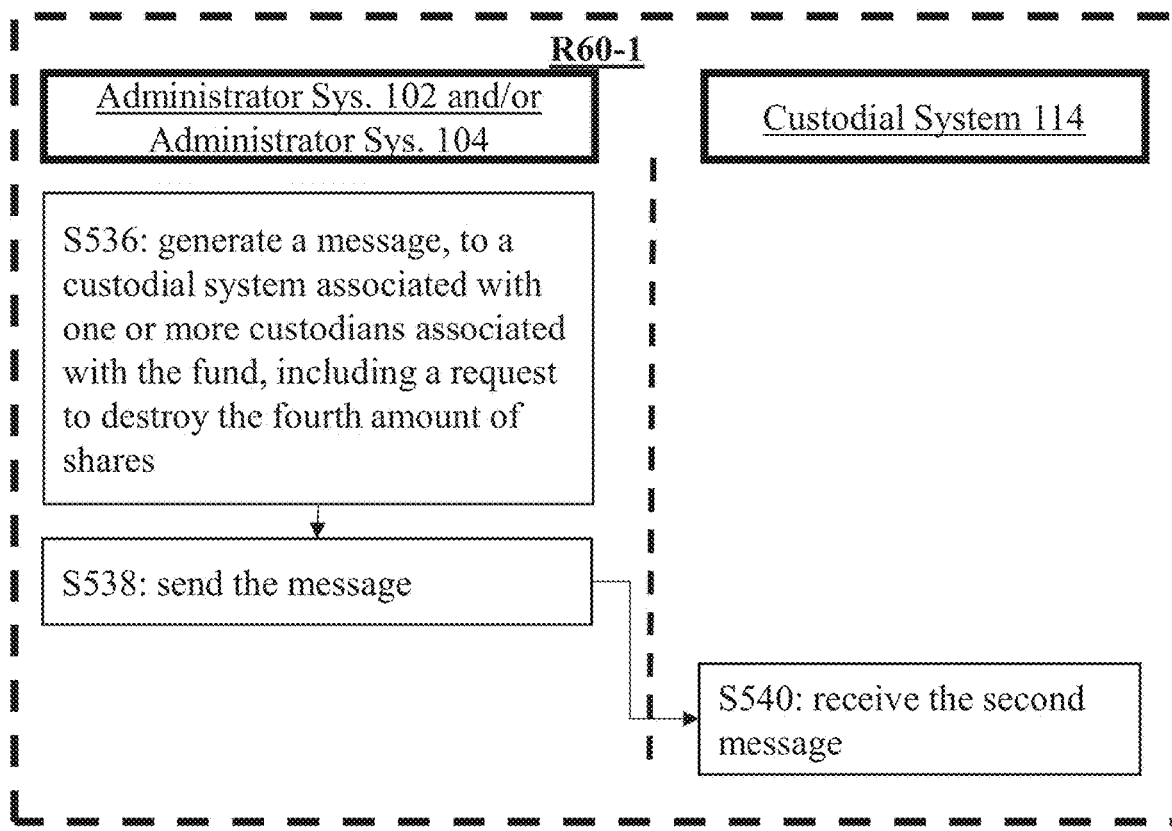

As another example, referring to FIG. 5E, the diversification information may not be updated (R45), until, at R40-2, a predetermined amount of time has elapsed. If a predetermined amount of time has not elapsed, orders may continue to be obtained at R20. For example, an administrator may update its diversification information every day at 3:00 PM. Continuing the example, R20, R30, and R40 may continue until the time reaches 3:00 PM, when step R40-2 will continue the process to R45 where the diversification information is updated in view of one or more of the orders obtained in step R20. The predetermined amount of time, as discussed herein, may be similar to the predetermined amount of time discussed above in connection with step S250 and FIG. 2C, the descriptions of which applying herein. In embodiments, R40-2 may be similar to step S250 described above in connection with FIG. 2C, the description of which applying herein.

In embodiments, the steps of the processes illustrated and described in connection with FIG. 5A through FIG. 5E, 2-10, FIG. 5-20A through FIG. 5-20E, FIG. 5-30, FIG. 5-40A-1 through FIG. 5-40A-2, FIG. 5-50A through FIG. 5-50F, and FIG. 5-60A through FIG. 5-60B may be rearranged or omitted.

Issuer Off-Boarding

Figure 4A:
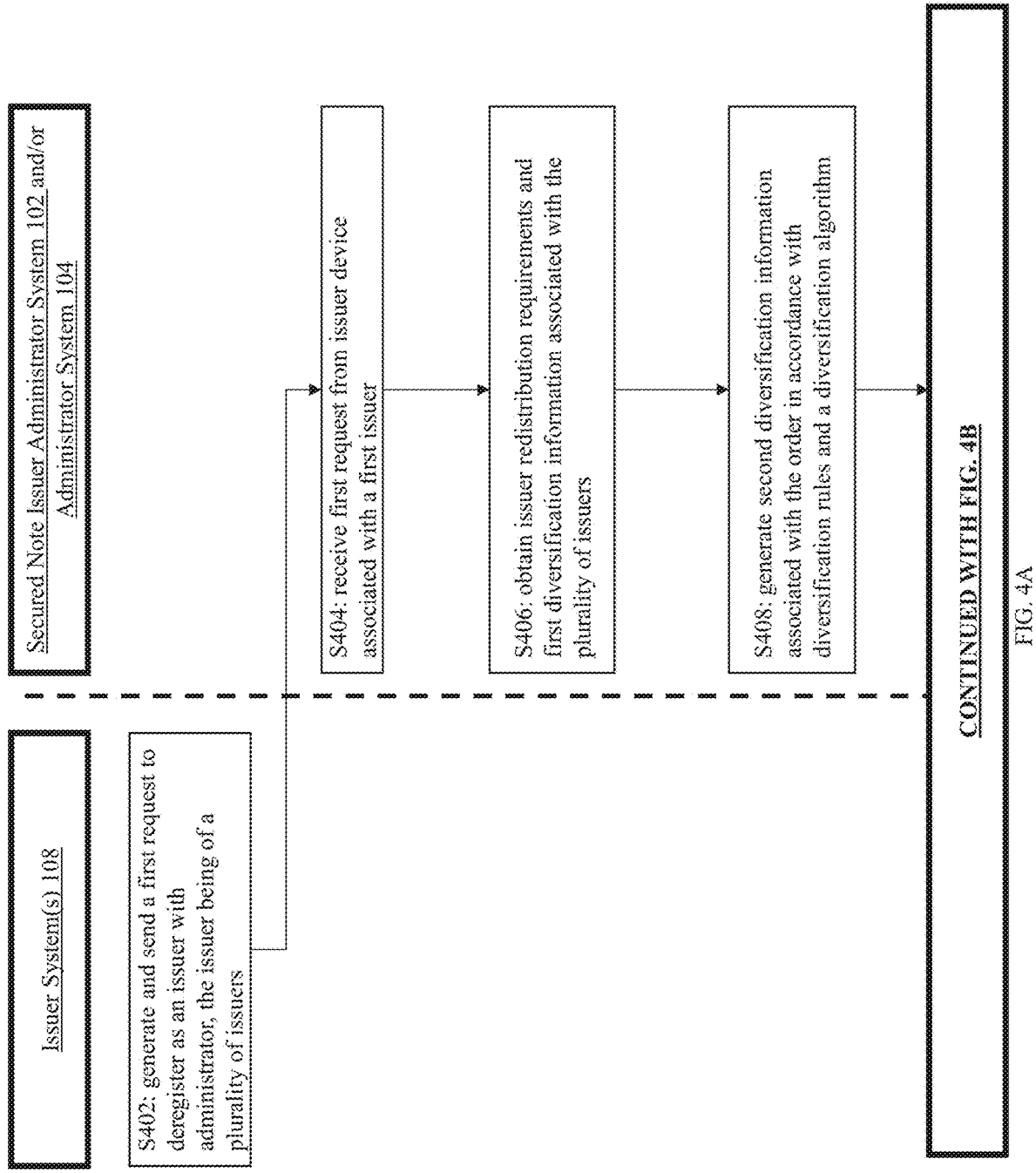
FIG. 4A through FIG. 4B are flow charts of an exemplary process for off-boarding an issuer of secured notes in accordance with exemplary embodiments of the present invention.
Figure 4B:
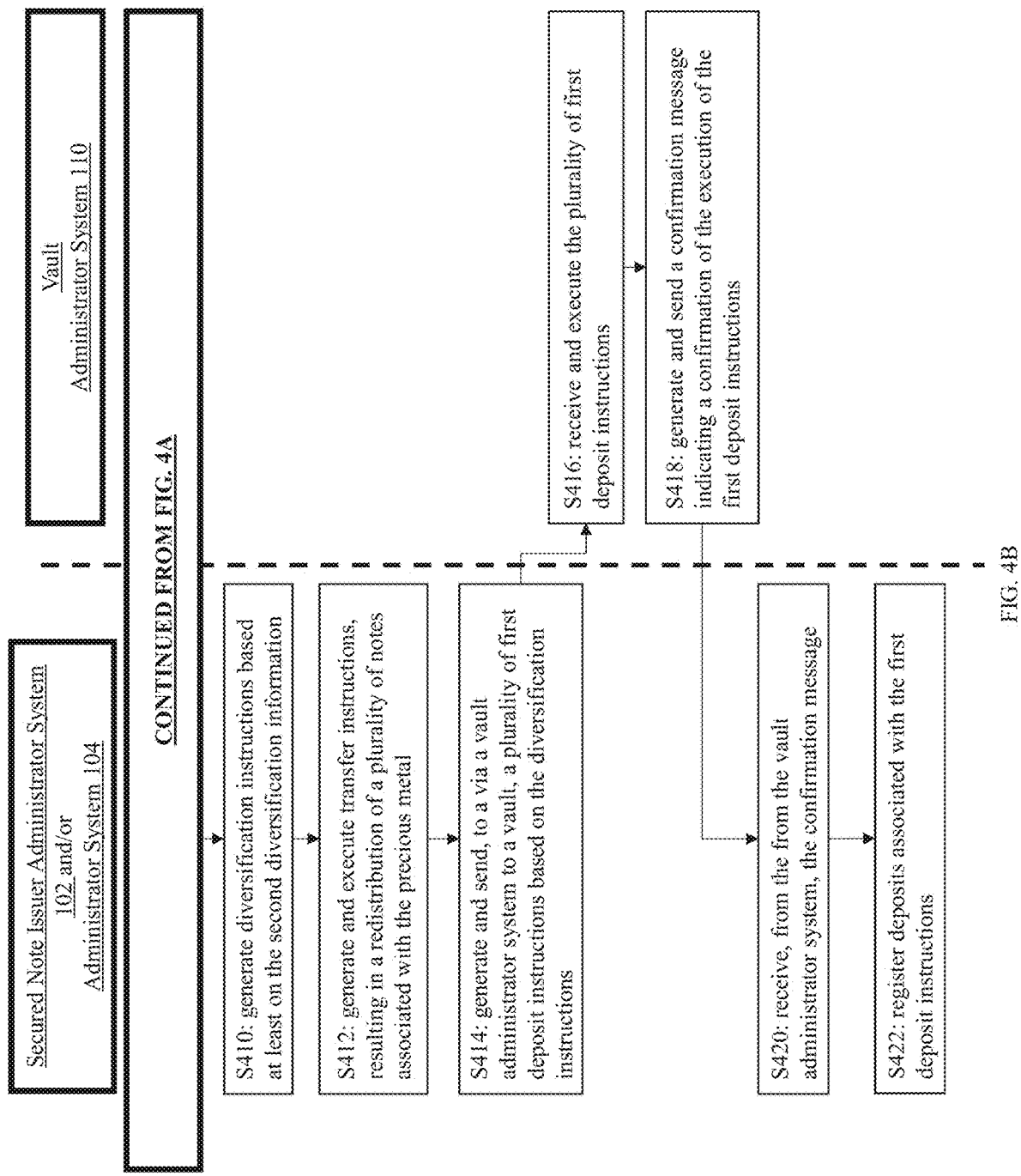
Figures 1, 4A:
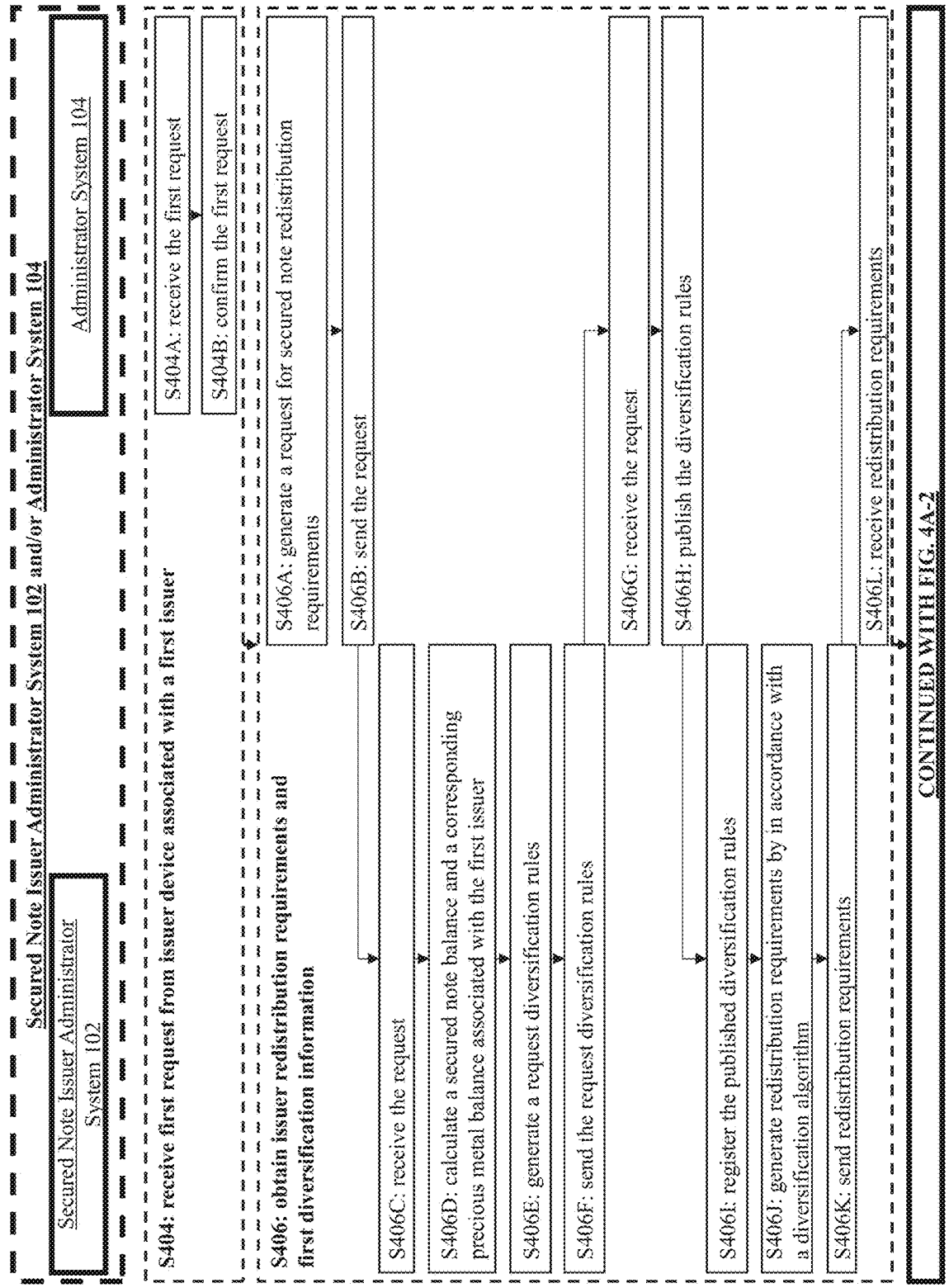
Figures 2, 4A:
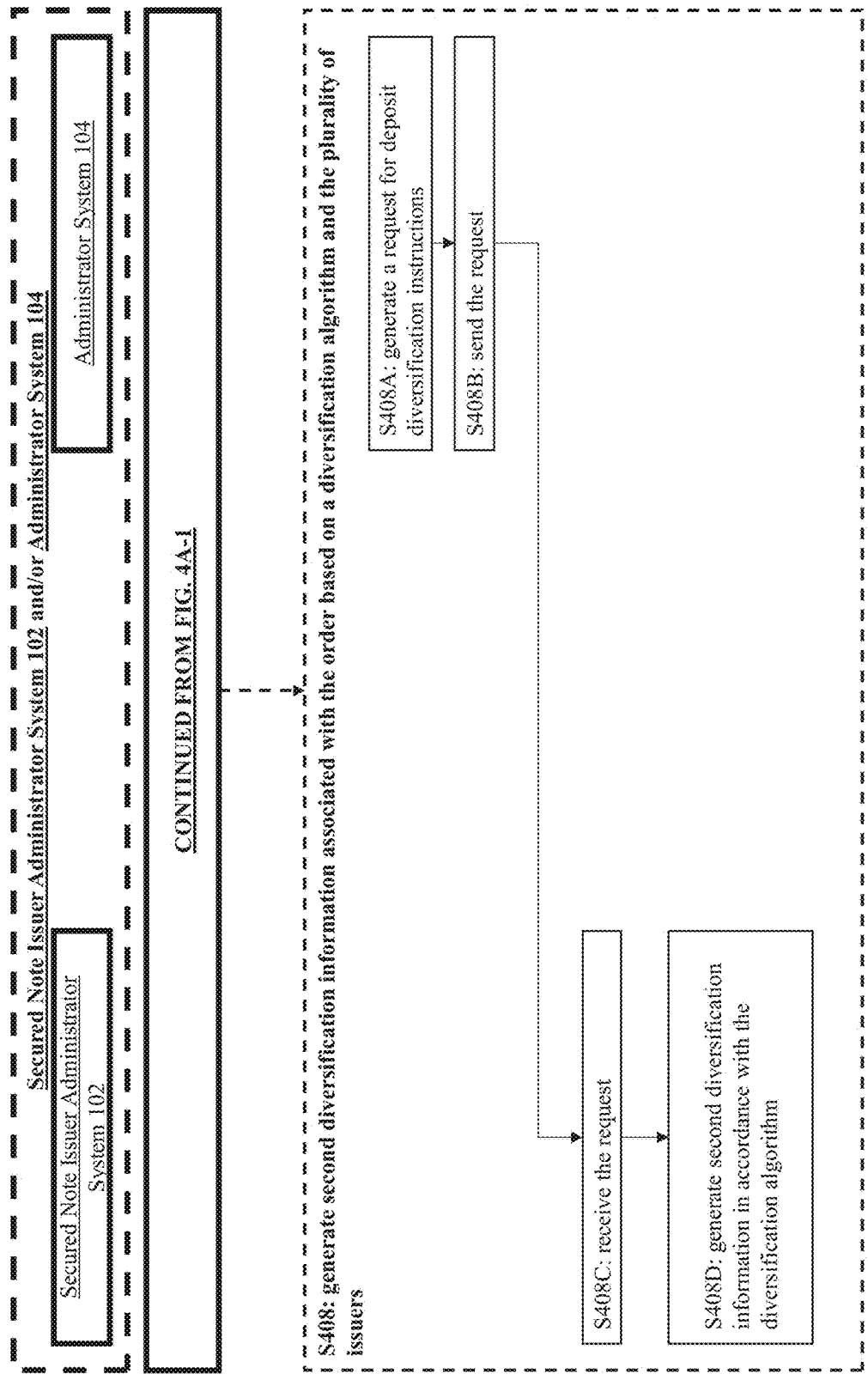
Figures 1, 4B:
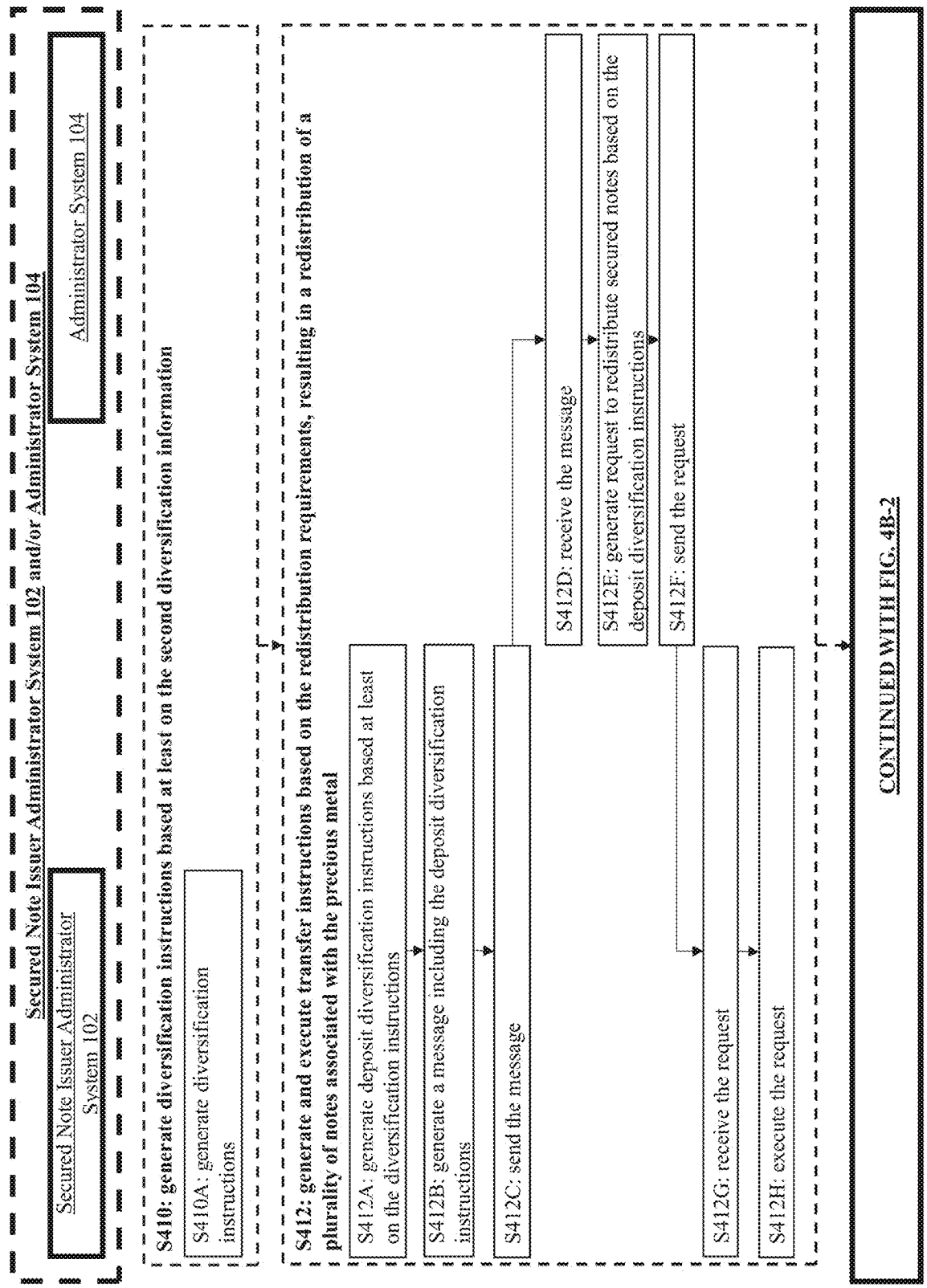
Figures 2, 4B:
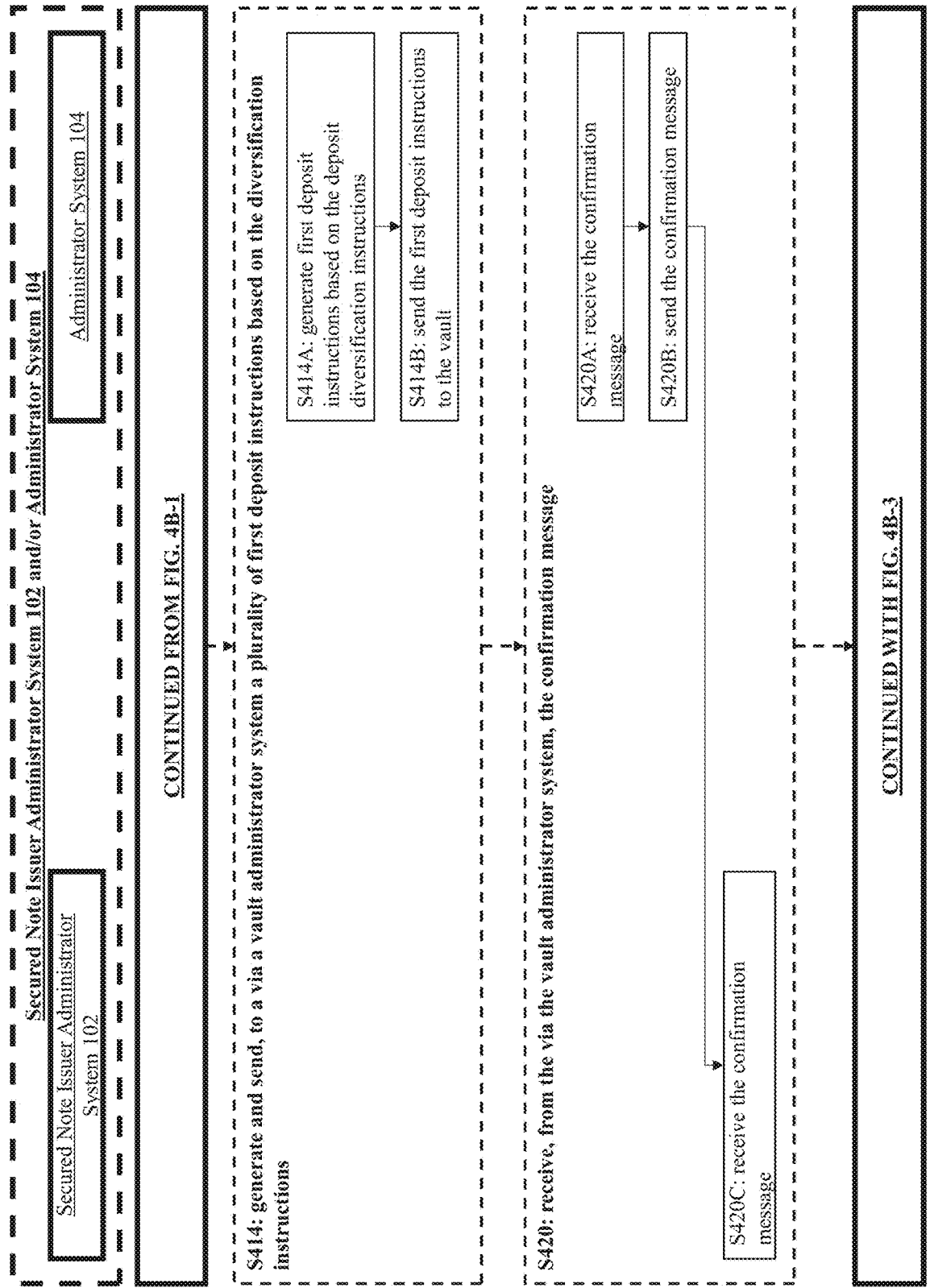
Figures 3, 4B:
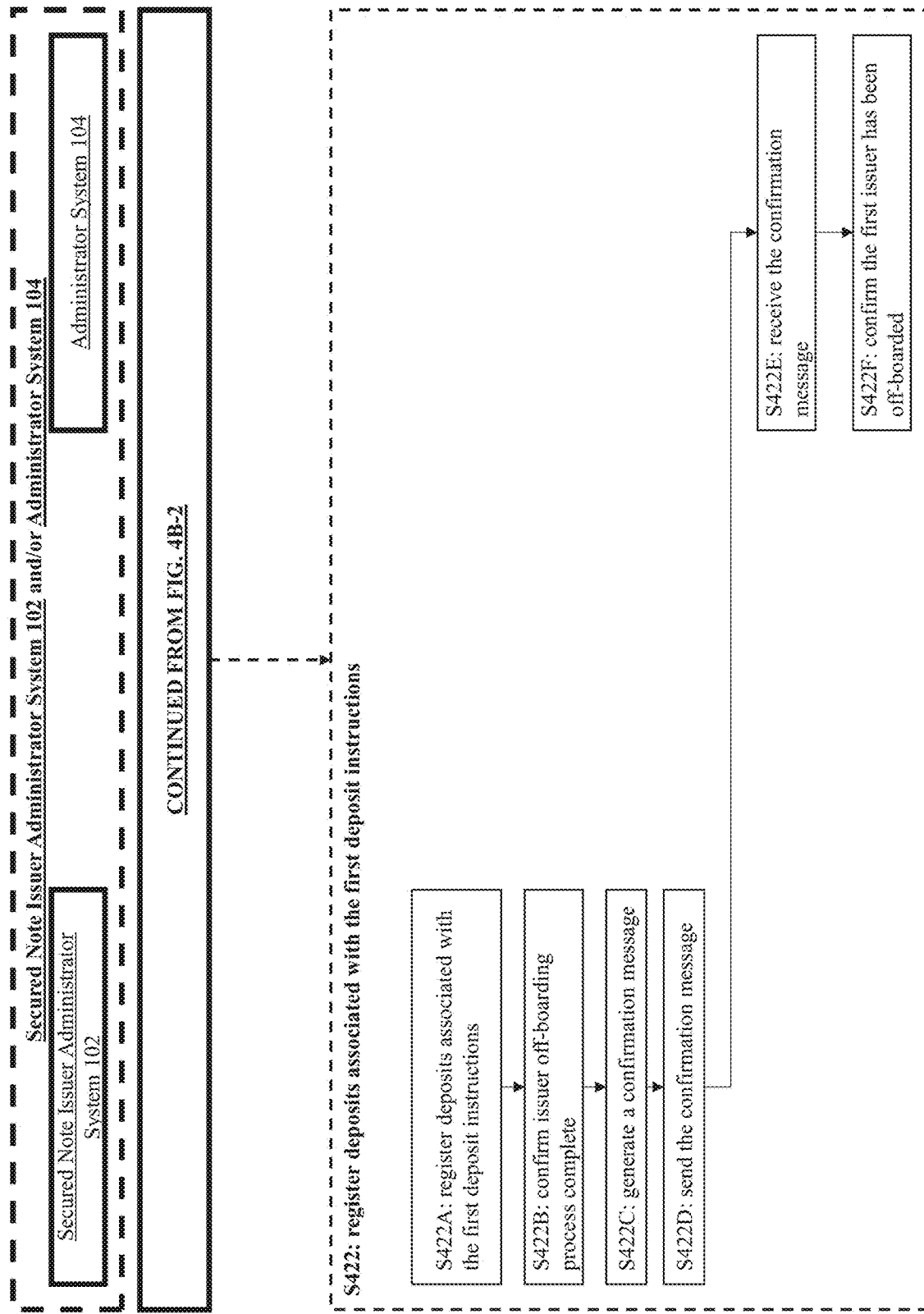

FIGS. 4A-4B are flow charts of an exemplary process for off-boarding an issuer of secured notes in accordance with exemplary embodiments of the present invention. Referring to FIG. 4A, in embodiments, the process for off-boarding an issuer may begin with step S402. At step S402, the issuer systems 108 may generate and send a first request to deregister as an issuer with the Administrator 102/104. The request, in embodiments, may include identification information associated with the issuer (e.g. issuer credential information).

The process for off-boarding an issuer may continue with step S404. In embodiments, at step S404, the Administrator 102/104 may receive the first request from an issuer device associated with the issuer requesting to be off-boarded. Referring to FIG. 4A-1, in embodiments, at step S404A, the administrator system may receive the first request. At step S404B, in embodiments, the administrator system may confirm the first request. The request may be confirmed, in embodiments, by confirming the identity of the issuer. In embodiments, the identity of the issuer may be confirmed using issuer credential information. Issuer account credential information, in embodiments may include may include one or more of the following: a username and password combination; biometric data associated with the authorized participant; personally identifiable information ("PII") associated with the issuer; a phone number associated with the authorized participant; a social security number associated with the authorized participant; an e-mail address associated with the authorized participant; a unique identifier associated with the authorized participant and issued by an administrator of the authorized participant; and/or a unique identifier associated with the authorized participant, to name a few. In embodiments, the issuer account credential information may be verified by comparing the received credential information to verified credential information stored in the issuer database 122 (e.g. issuer account information 144).

Referring to FIG. 4A, in embodiments, the process for off-boarding an issuer may continue with step S406. In embodiments, at step S406, the Administrator 102/104 may obtain issuer redistribution requirements and first diversification information associated with the plurality of issuers. Referring to FIG. 4A-1, in embodiments, at step S406A, the administrator system 104 may generate a request for secured note redistribution requirements. The secured note redistribution requirements, in embodiments, may be a required redistribution of secured notes issued by the issuer systems 108 in accordance with the diversification rules and/or diversification algorithm. At step S406B, in embodiments, the administrator system 104 may send the request to the secured note issuer administrator system 102.

In embodiments, at step S406C, the secured note issuer administrator system 102 may receive the request from the administrator system 104. At step S406D, in embodiments, the secured note issuer administrator system 102 may calculate a secured note balance and a corresponding precious metal balance—each associated with the issuer requesting to be off-boarded.

At step S406E, in embodiments, the secured note issuer administrator system 102 may generate a request for diversification rules associated with the plurality of issuer systems 108 less the issuer requesting to be off-boarded. In embodiments, at step S406F, the secured note issuer administrator system 102 may send the request for diversification rules to the administrator system. In response, in embodiments, at step S406G, the administrator system may receive the request, and at step S406H, the administrator system may publish the diversification rules associated with the plurality of issuer systems 108 less the issuer requesting to be off-boarded. The published diversification rules, in embodiments at step S406I, may be registered by the secured note issuer administrator system 102 and/or stored in memory operable connected to the Administrator 102/104.

In embodiments, at step S406J, the secured note issuer administrator system 102 may generate redistribution requirements in accordance with the diversification rules and/or a diversification algorithm. The redistribution requirements, in embodiments, may be requirements to redistribute secured notes issued by the plurality of issuer systems 108 in accordance with the diversification rules and/or the diversification algorithm. In embodiments, the diversification rules may be similar to the diversification rules 126 described above in connection with FIG. 1B-2, the description of which applying herein. In embodiments, the diversification algorithm may be similar to the diversification algorithms 128 described above in connection with FIG. 1B-2, the description of which applying herein. In embodiments, at step S406K, the secured note issuer administrator system 102 may send the redistribution requirements to the administrator system 104. At step S406L, in embodiments, the administrator system may receive the redistribution requirements.

Referring to FIG. 4A, in embodiments, the process for off-boarding an issuer may continue with step S408. In embodiments, at step S408, the Administrator 102/104 may generate second diversification information associated with the order in accordance with the diversification rules and the diversification algorithm. Referring to FIG. 4A-2, in embodiments, the administrator system 104 at step S408A may generate a request for deposit diversification instructions. The deposit diversification instructions, in embodiments, may be transfer instructions for the precious metal associated with the redistribution requirements. The precious metal, in embodiments, may be transferred to account for the redistribution requirements. In embodiments, at step S408B, the administrator system 104 may send the request to the secured note issuer administrator system 102.

In embodiments, at step S408C, the secured note issuer administrator system 102 may receive the request. In response, in embodiments, at step S408D, the secured note issuer administrator system 102 may generate second diversification information in accordance with the diversification algorithm and/or the diversification rules. The second diversification information, in embodiments, may be an update to account for the off-boarding of the issuer.

In embodiments, the process for off-boarding an issuer may continue with FIG. 4B. Referring to FIG. 4B, at step S410, in embodiments, the Administrator 102/104 may generate diversification instructions based at least on the second diversification information. The diversification instructions may be instructions to transfer the precious metal to account for the off-boarding of an issuer, the redistribution requirements, the diversification rules, and/or the diversification algorithm, to name a few. Referring to FIG. 4B-1, in embodiments, at step S410A, the diversification instructions may be generated by the secured note issuer administrator system 102.

Referring to FIG. 4B, in embodiments, the process for off-boarding an issuer may continue with step S412. In embodiments, at step S412, the Administrator 102/104 may generate and execute transfer instructions, resulting in a redistribution of a plurality of notes associated with the precious metal. Referring to FIG. 4B-1, in embodiments, at step S412A, the secured note issuer administrator system 102 may generate deposit diversification instructions based at least on the diversification instructions. The settlement instructions may be transfer instructions, may be transfer instructions for the precious metal in accordance with the diversification instructions. At step S412B, in embodiments, the secured note issuer administrator system 102 may generate a message including the deposit diversification instructions. In embodiments, at step S412C, the secured note issuer administrator system 102 may send the message to the administrator system 104.

At step S412D, in embodiments, the administrator system 104 may receive the message from the secured note issuer administrator system 102. In embodiments, at step S412E, the administrator system may generate a request to redistribute secured notes corresponding to the precious metal associated with the deposit diversification instructions. The request, in embodiments, may be based on the deposit diversification instructions. In embodiments, at step S412F, the administrator system 104 may send the request to the secured note issuer administrator system 102.

At step S412G, in embodiments, the secured note issuer administrator system 102 may receive the request. In embodiments, after receiving the request, the secured note issuer administrator system 102 may execute the request, resulting in the secured notes being redistributed in accordance with the diversification rules and/or the diversification algorithm. In embodiments, the secured note issuer administrator system 102 may generate and send a confirmation message to the administrator system 104. The confirmation message may indicate that the request was executed. In embodiments, the custodial system 114 may execute the request.

Referring to FIG. 4B, in embodiments, the process for off-boarding an issuer may continue with step S414. In embodiments, at step S414, the Administrator 102/104 may generate and send, to a via the vault administrator system(s) 110 to the vault(s) 112, a plurality of first settlement instructions based on the diversification instructions. Referring to FIG. 4B-2, in embodiments, at step S414A, the administrator system 104 may generate first settlement instructions based on the deposit diversification instructions. The settlement instructions may be transfer instructions for the vault 112 to transfer the amount of precious metal corresponding to the balance of secured notes in accordance with the diversification instructions, diversification rules, and/or the diversification algorithm, to name a few. The first settlement instructions, in embodiments at step S414B, may be sent by the administrator system 104 to the vault administrator system 110. In embodiments, multiple vaults may be used and the administrator may be in contact with a vault administrator associated with each of the vaults.

Referring to FIG. 4B, in embodiments, the process for off-boarding an issuer may continue with step S416. In embodiments, at step S416, the vault administrator system 110 may receive and execute the plurality of first settlement instructions. In embodiments, in response to receiving the first settlement instructions, the vault administrator system 110 may execute the settlement instructions, resulting in a redistribution of the precious metal corresponding to the balance of secured notes. In embodiments, multiple vaults may be used and the administrator may be in contact with a vault administrator associated with each of the vaults.

The process for off-boarding an issuer may continue, in embodiments, with step S418. At step S418, in embodiments, the vault administrator system(s) 110 may generate and send a confirmation message indicating a confirmation of the execution of the first settlement instructions. Once the settlement instructions have been executed, the vault administrator system(s) 110 may generate a confirmation message indicating that the first settlement instructions were executed. The confirmation message, in embodiments, may be sent from the vault administrator system(s) 110 to the Administrator 102/104 via network 100.

Referring to FIG. 4B, in embodiments, the process for off-boarding an issuer may continue with step S420. In embodiments, at step S420, the Administrator 102/104 may receive, from the vault administrator system(s) 110, the confirmation message. Referring to FIG. 4B-2, in embodiments, at step S420A, the administrator system 104 may receive the confirmation message. In embodiments, at step 420B, the administrator system 104 may forward and/or send (and/or generate an additional confirmation message and send said confirmation message) the confirmation message to the secured note issuer administrator system 102 via network 100. In embodiments, at step S420C, the secured note issuer administrator system 102 may receive the confirmation message (and/or the additional confirmation message).

Referring to FIG. 4B, in embodiments, the process for off-boarding an issuer may continue with step S422. In embodiments, at step S422, the Administrator 102/104 may register the deposits associated with the first settlement instructions. Referring to FIG. 4B-3, in embodiments, at step S422A the secured note issuer administrator system 102 may register the plurality of deposits associated with the plurality of first settlement instructions. In embodiments, the deposits may be registered using an electronic transaction ledger. At step S422B, the secured note issuer administrator system 102 may confirm the issuer off-boarding process is complete. In embodiments, at step S422C, the secured note issuer administrator system 102 may generate a confirmation message indicating the completion of the off-boarding process. At step S422D, the secured note issuer administrator system 102 may, in embodiments, send the confirmation message to the administrator system. At step S422E, the administrator system receives the confirmation message. In embodiments, at step S422F, the administrator system confirms the issuer has been off-boarded.

The process for off-boarding an issuer (and/or a Broker) may continue with the Administrator 102/104 instructing the off-boarding issuer (and/or off-boarding Broker) to close their vault account(s). For example, the Administrator 102/104 may generate and send instructions prompting the off-boarding issuer to close one or more accounts with one or more vaults. In embodiments, the administrator system 104 may generate the instructions. In embodiments, at step S318B, the administrator system 104 may send the instructions the off-boarding issuer (and/or off-boarding Broker) via network 100. In embodiments, the off-boarding issuer may close its one or more accounts with the vault 112. In embodiments, the issuer system 108 may close its account(s) with the vault 112 by sending a request to close its account the vault administrator system 110. In embodiments, the vault administrator system 110 may receive the request and close the account. The Administrator 102/104, in embodiments, may receive a confirmation message regarding the cancelled accounts from one or more vault administrators and/or the off-boarding issuer. The process of closing an account, in embodiments, may be similar to steps S318, S320, and S320-1, the description of which applying herein.

In embodiments, the Administrator 102/104 may off-board one or more Brokers (e.g., brokers and/or broker-dealers) associated with one or more of the broker device(s) (the process of which may be similar to off-boarding issuers described in connection with FIG. 4, the description of which applying herein). For example, in embodiments the Administrator 102/104 may generate and send instructions prompting a first broker (e.g., one or more Brokers) associated with a first broker device (e.g., one or more broker device(s) 105) to close its accounts with a vault (e.g., vault 112). Continuing the example, the one or more broker device(s) 105 may close one or more broker vault accounts with the vault 112. In embodiments, the one or more broker device(s) may close the broker vault account by sending instructions to close its account(s) the vault administrator system 110. The vault administrator system 110 may receive the instructions and close the broker vault account. In embodiments, multiple vaults may be used and the administrator may be in contact with a vault administrator associated with each of the vaults and/or require issuers and/or Brokers to close one or more accounts at one or more of the vaults as part of the off-boarding process.

In embodiments, the steps of the processes described in connection with FIGS. 4A-4B, 4A-1-4A-2, and 4B-1-4B-3 may be rearranged or omitted.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A system comprising an administrator computer system associated with a fund holding secured notes collateralized by a precious metal, a first authorized participant device associated with a first authorized participant of the fund and operably connected to the administrator computer system, a first set of two or more secured note issuer devices, each associated with one or more note issuers that issue secured notes held by the fund, a second set of two or more secured note issuer devices, the first set of two or more secured note issuer devices and the second set of two or more secured note issuer devices operably connected to the administrator computer system, a fourth set of one or more vault administrator devices associated with one or more vaults holding precious metal securing the secured notes held by the fund, the fourth set of one or more vault administrator devices operably connected to the administrator computer system and a custodian device associated with a custodian to issue and redeem shares in the fund where the custodian device is operably connected to the administrator computer system, wherein the administrator computer system is configured to perform the steps of:
   a. obtaining from the first authorized participant device, a first order to redeem a first amount of shares of the fund for a second amount of secured notes collateralized by a third amount of precious metal associated with the second amount of secured notes, including authorized participant identification information associated with the first authorized participant;
   b. verifying the first order, wherein the verifying step includes:
      (1) confirming that the first authorized participant is an authorized participant associated with the fund based on the authorized participant identification information;
      (2) confirming that the first authorized participant owns the first amount of shares;
      (3) determining that the second amount of secured notes and the third amount of precious metal corresponds to the first amount of shares;
   c. generating first settlement instructions to transfer the first amount of shares from a first authorized participant account associated with the first authorized participant to a fund account associated with the fund;
   d. sending the first settlement instructions to the first authorized participant device associated with the first authorized participant of the fund;
   e. confirming receipt of the first amount of shares in the fund account;
   f. confirming the second amount of secured notes corresponds to the third amount of precious metal and the first amount of shares;
   g. updating, using a diversification module operably connected to the administrator computer system, order diversification information associated with the second amount of secured notes collateralized by the third amount of precious metal in accordance with a diversification algorithm and a first allocation of all of the secured notes held by the fund among a fifth set of two or more secured note issuers prior to receiving the first order,
      wherein the order diversification information indicates a second allocation of the second amount of secured notes among the fifth set of two or more secured note issuers, and is based at least on the equation:

$$\sum_{N=1}^{M}\sum_{k=1}^{V_N} D_{N,k}(A_N(G)) = G$$

where M is a total number of secured note issuers in the fifth set of two or more secured note issuers, $A_N$ represents a respective amount of secured notes associated with each respective secured note issuer N of the fifth set of two or more secured note issuers M, $D_{N,k}$ represents an account allocation value for each respective account k of a first set of custody accounts $V_N$ for each respective secured note issuer N of the fifth set of two or more secured note issuers M, and G is the third amount of precious metal and
   wherein the diversification algorithm indicates a target amount of secured notes associated with each secured note issuer of the fifth set of the two or more secured note issuers and the order diversification information is updated to substantially maintain the target amount of secured notes associated with each secured note issuer after the first order is filled;
   h. generating secured note redemption instructions to transfer the second amount of secured notes to the fifth set of two or more secured note issuers in accordance with the order diversification information and the second allocation to redeem the second amount of secured notes for the third amount of precious metal;
   i. sending the secured note redemption instructions to the second set of two or more secured note issuer devices associated with the fifth set of two or more secured note issuers to:
      (1) transfer the second amount of secured notes from the fund to the fifth set of two or more secured note issuers; and
      (2) redeem the second amount of secured notes;
   j. receiving confirmation of the transfer of the second amount of secured notes to the fifth set of two or more secured note issuers;
   k. generating precious metal settlement instructions to transfer the third amount of precious metal in accordance with the order diversification information;
   l. sending the precious metal settlement instructions to the fourth set of one or more vault administrator devices associated with a third set of custody accounts at one or more vaults;
   m. receiving confirmation of the transfer of the third amount of precious metal in accordance with the order diversification information,
   wherein the third amount of precious metal is credited to a first authorized participant custody account associated with the first authorized participant;
   n. generating share eliminating instructions to eliminate the first amount of shares corresponding to the second amount of secured notes and the third amount of precious metal;
   o. sending the share eliminating instructions to a custodian device;
   p. receiving confirmation that the first amount of shares has been eliminated; and
   q. publishing share price information including diversification information associated with the fifth set of two or more secured note issuers.

2. The system of claim 1, wherein, prior to the obtaining step a, the administrator computer system is further configured to perform the step of publishing share price information indicating an amount of precious metal corresponding to an amount of shares in the fund.

3. The system of claim 2, wherein the share price information indicating the amount of precious metal includes diversification information associated with the fifth set of two or more secured note issuers that issue the secured notes held by the fund.

4. The system of claim 1, wherein the first order further comprises the third amount of precious metal that corresponds to the first amount of shares.

5. The system of claim 1, wherein the third amount of precious metal includes a fourth amount of a first precious metal and a fifth amount of a second precious metal.

6. The system of claim 1, wherein the first order further comprises, the third amount of precious metal and the second amount of secured notes collateralized by the precious metal.

7. The system of claim 1, wherein the first order further comprises the third amount of precious metal and a fourth amount of fiat.

8. The system of claim 1, wherein the verifying step b further comprises confirming that the third amount of precious metal corresponds to the first amount of shares.

9. The system of claim 5, wherein the verifying step b further comprises confirming that the fourth amount of the first precious metal and the fifth amount of a second precious metal correspond to the first amount of shares.

10. The system of claim 6, wherein the verifying step b further comprises confirming that the third amount of precious metal and the second amount of secured notes correspond to the first amount of shares.

11. The system of claim 7, wherein the verifying step b further comprises confirming that the third amount of precious metal and the fourth amount of fiat correspond to the first amount of shares.

12. The system of claim 1, wherein transfers into and out of the fund account are controlled by the administrator computer system.

13. The system of claim 1, wherein after step d, the first authorized participant device sends transfer instructions based on the first settlement instructions to a custodian device associated with a custodian of the fund to transfer the first amount of shares.

14. The system of claim 6, wherein the precious metal settlement instructions include instructions to transfer the third amount of the first precious metal and the fourth amount of the second precious metal in accordance with the order diversification information.

15. The system of claim 7, wherein the step of generating precious metal settlement instructions further includes generating fiat settlement instructions to transfer the fourth amount of fiat to a first authorized user fiat account.

16. The system of claim 5, wherein the confirmation includes confirmation of the transfer of the fourth amount of the first precious metal and the fifth amount of the second precious metal.

17. The system of claim 1, wherein the share eliminating instructions include instructions to burn the first amount of shares.

18. The system of claim 1, wherein the sending step d further comprises sending the first settlement instructions to transfer the first amount of shares to a custodian device associated with a transfer agent device for a custodial system associated with the fund.

19. The system of claim 1, wherein the first allocation is also based on one or more characteristics of each respective secured note issuer, wherein the characteristics include:
(1) a tangible common equity ratio associated with the respective secured note issuer;
(2) a capitalization rate associated with the respective secured note issuer;
(3) a current portfolio of assets associated with the respective secured note issuer;
(4) a country of origin associated with the respective secured note issuer;
(5) a credit quality associated with the respective secured note issuer;
(6) a credit score associated with the respective secured note issuer;
(7) a duration remaining associated with secured notes associated with the respective secured note issuer;
(8) maturity dates of the secured notes associated with the respective secured note issuer; and
(9) an owner or sponsor associated with the respective secured note issuer.

20. The system of claim 1, wherein the fund holds a reserve amount of precious metal.

21. The system of claim 1, wherein the precious metal settlement instructions include instructions to transfer the third amount of precious metal in accordance with the order diversification information.

22. The system of claim 1, wherein step m further comprises receiving confirmation of a transfer of a reserve amount of precious metal in accordance with the order diversification information.

* * * * *